Nov. 24, 1970 G. NUTTER 3,543,245

COMPUTER SYSTEMS

Filed Feb. 29, 1968 55 Sheets-Sheet 3

Nov. 24, 1970 G. NUTTER 3,543,245

COMPUTER SYSTEMS

Filed Feb. 29, 1968 55 Sheets-Sheet 7

Nov. 24, 1970 G. NUTTER 3,543,245

COMPUTER SYSTEMS

Filed Feb. 29, 1968 55 Sheets-Sheet 13

Nov. 24, 1970 G. NUTTER 3,543,245

COMPUTER SYSTEMS

Filed Feb. 29, 1968 55 Sheets-Sheet 15

Nov. 24, 1970 G. NUTTER 3,543,245

COMPUTER SYSTEMS

Filed Feb. 29, 1968 55 Sheets-Sheet 17

Nov. 24, 1970 G. NUTTER 3,543,245

COMPUTER SYSTEMS

Filed Feb. 29, 1968 55 Sheets-Sheet 43

United States Patent Office 3,543,245

Patented Nov. 24, 1970

3,543,245

COMPUTER SYSTEMS

Geoffrey Nutter, Cheadle, England, assignor to Ferranti, Limited, Lancashire, England, a company of the United Kingdom of Great Britain and Northern Ireland Filed Feb. 29, 1968, Ser. No. 709,430
Int. Cl. G06f 9/00
U.S. Cl. 340—172.5 81 Claims

ABSTRACT OF THE DISCLOSURE

A computer for operating with external orders in different machine codes in which means are provided for identifying the external order type and for selecting any desired field of the external order, the computer being controlled to carry out the function required by an external order by means of internal orders derived from an initial address determined by the function field of the external order.

This invention relates to computers.

Instructions for a computer are written as a program. The program is written in a code, known as a machine code, and the machine code is different for different kinds of machine. Machine codes consist of words having a given number of bits and each word is broken down into a number of fields, commonly three or four, each field also having a given number of bits. For example, in the Ferranti Argus machine code the words have a length of twenty-four bits and are divided into four fields known as the X, F, M and N fields having lengths of three, five, two and fourteen bits respectively. In the I.C.T. 1900 machine code, however, the words also have a length of twenty-four bits and are divided into four fields but in this case the field lengths are three, seven, two and twelve bits. In other machine codes the word length may be longer than in the above examples. The I.B.M. 360 machine code, for example, has a word length of thirty-two bits. Apart from the differences of word length and field breakdown, machine codes also differ in the number of functions which they define.

Program writing requires a skilled person and takes a considerable time and because of the differences pointed out above, once a program has been produced in one machine code the program cannot be run on a computer using a different machine code. Consequently, if a program user wishes to run the program on a different type of computer to that for which the program was written the program must be rewritten.

Attempts have been made in the past to modify a computer so that it will simulate a different computer by translating from the different machine code into its own code and whilst it has been possible to do this the speed of the computer has been so reduced compared with the simulated computer that the results have not been considered to be worthwhile.

Accordingly, it is an object of the present invention to provide a computer which is capable of efficiently and economically simulating a range of computers having different machine codes and code formats.

According to the present invention a computer includes first means for holding one word of one of a plurality of computer machine codes, said word comprising a plurality of fields including a function field, second means for holding information defining the field breakdown of a machine code word held in said first means, the information held in said second means being variable according to the machine code of the word held in said first means, third means for acting in conjunction with said second means for selecting a desired one of the fields of a word held in said first means, and fourth means for controlling the operation of said computer in accordance with the function field of the word held in said first means.

Figure 1:
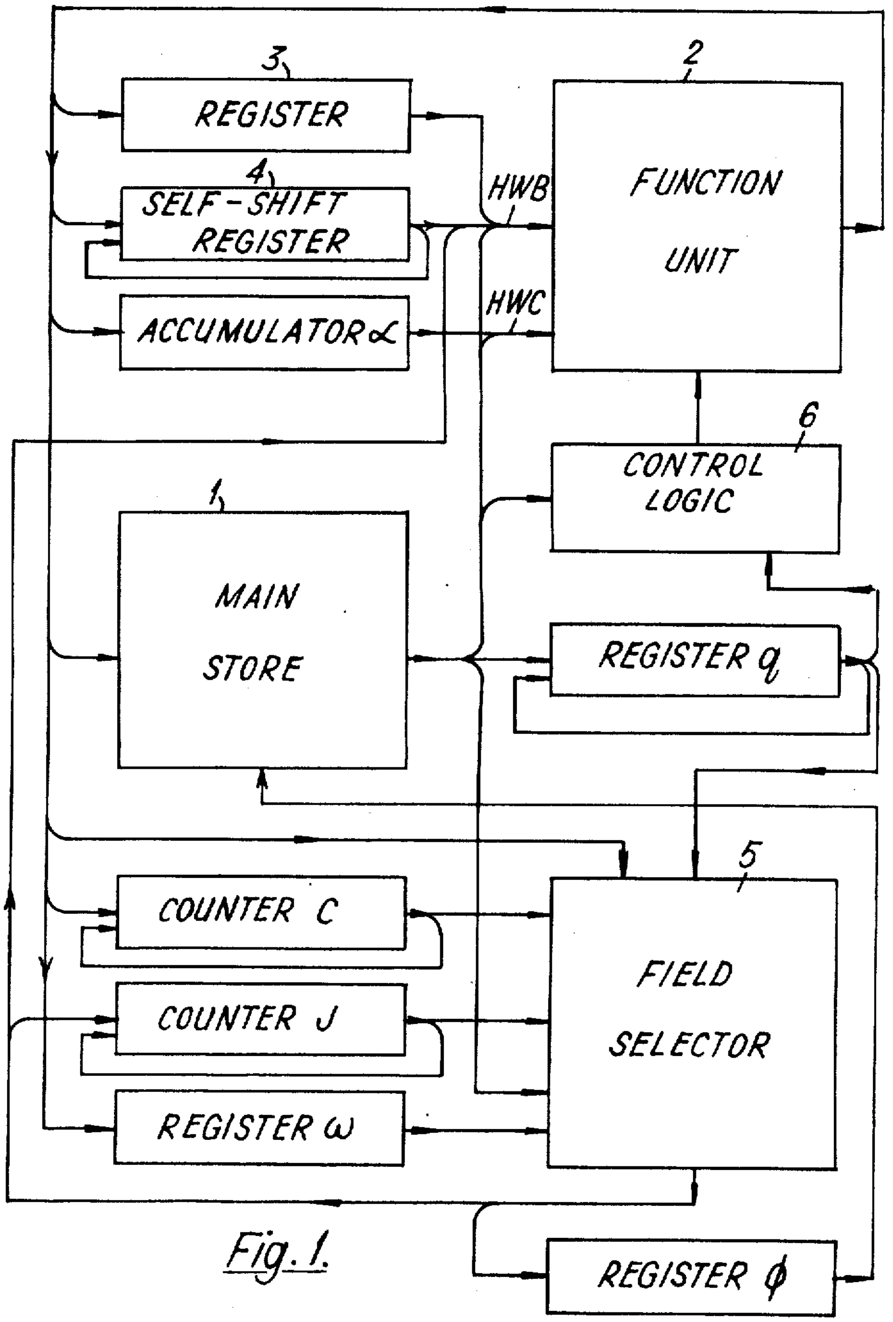
Figure 2:
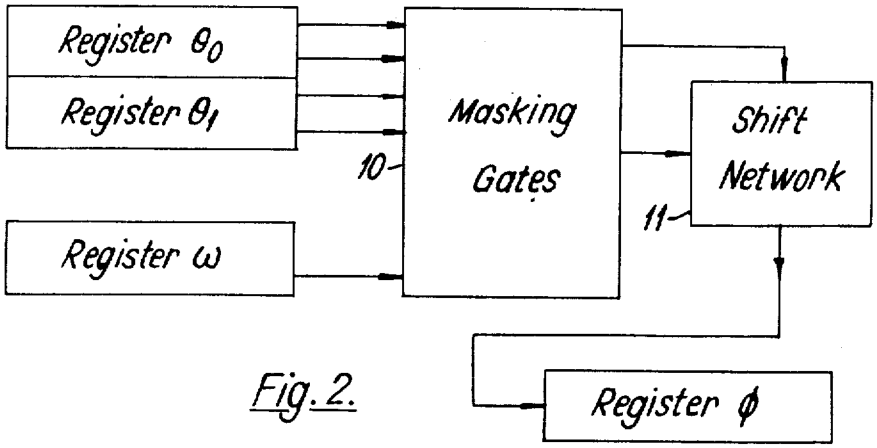
Figure 3:
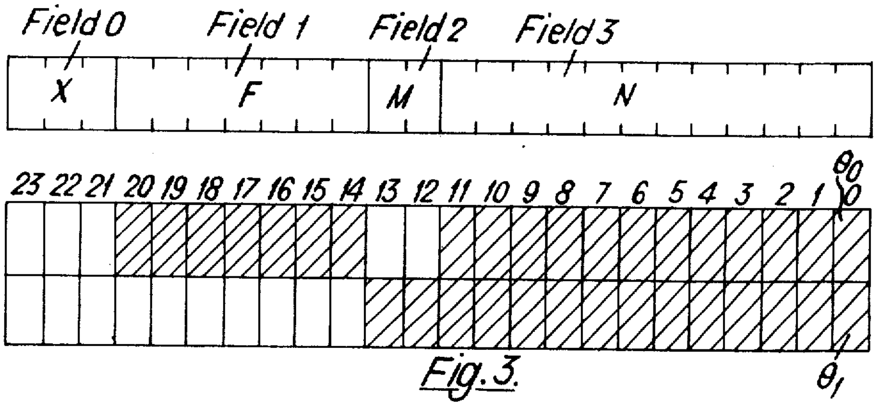
Figure 5:
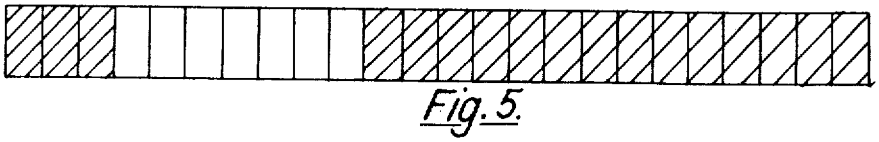
Figure 4:
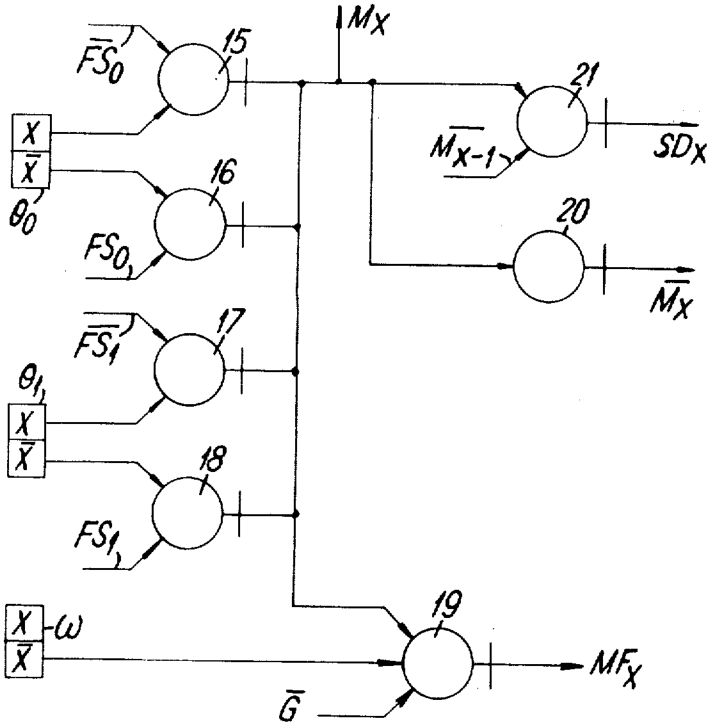
Figure 6:
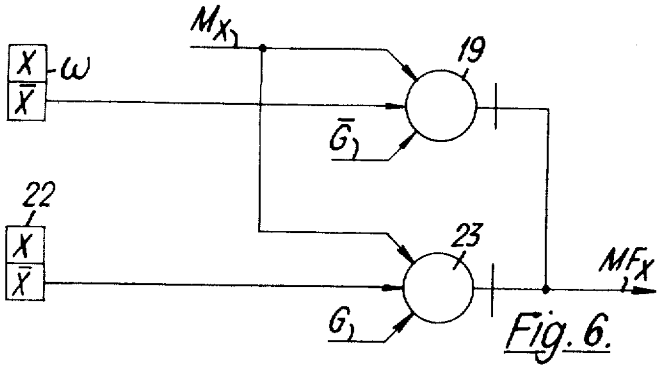
Figure 7:
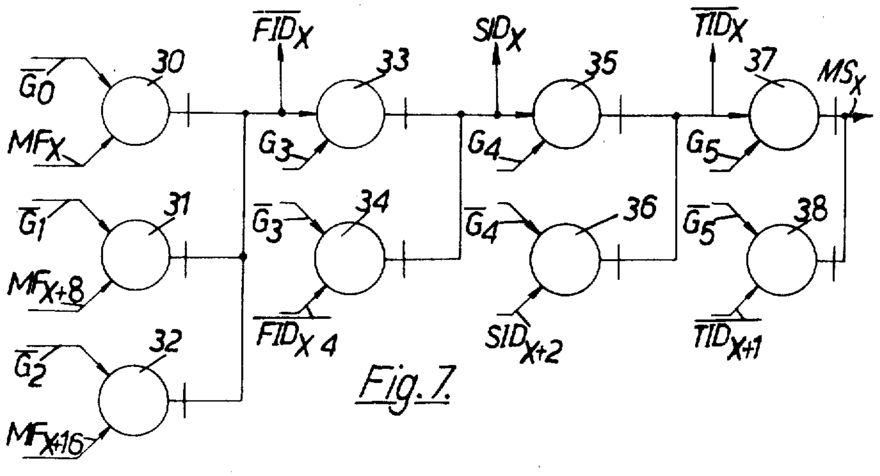
Figure 11:
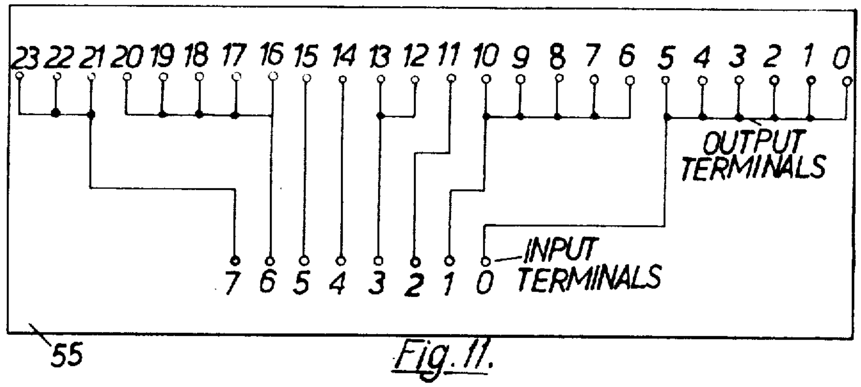
Figure 12:
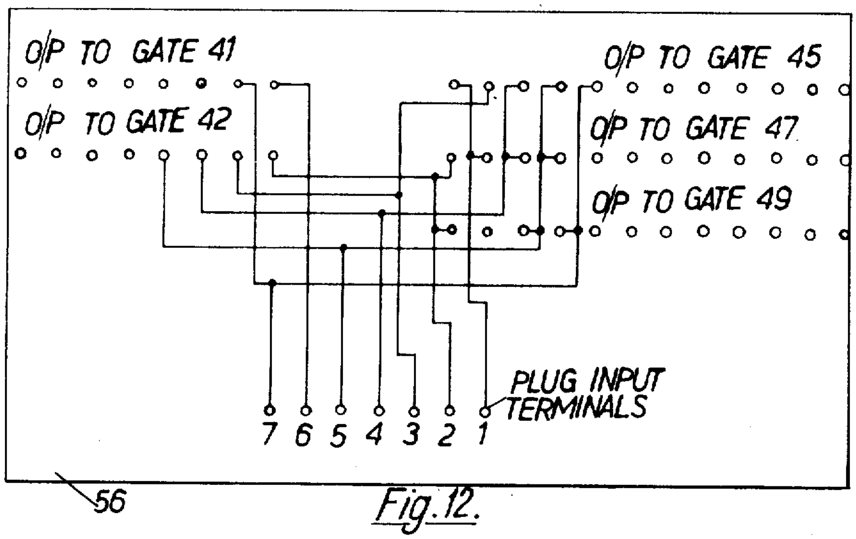
Figure 8:
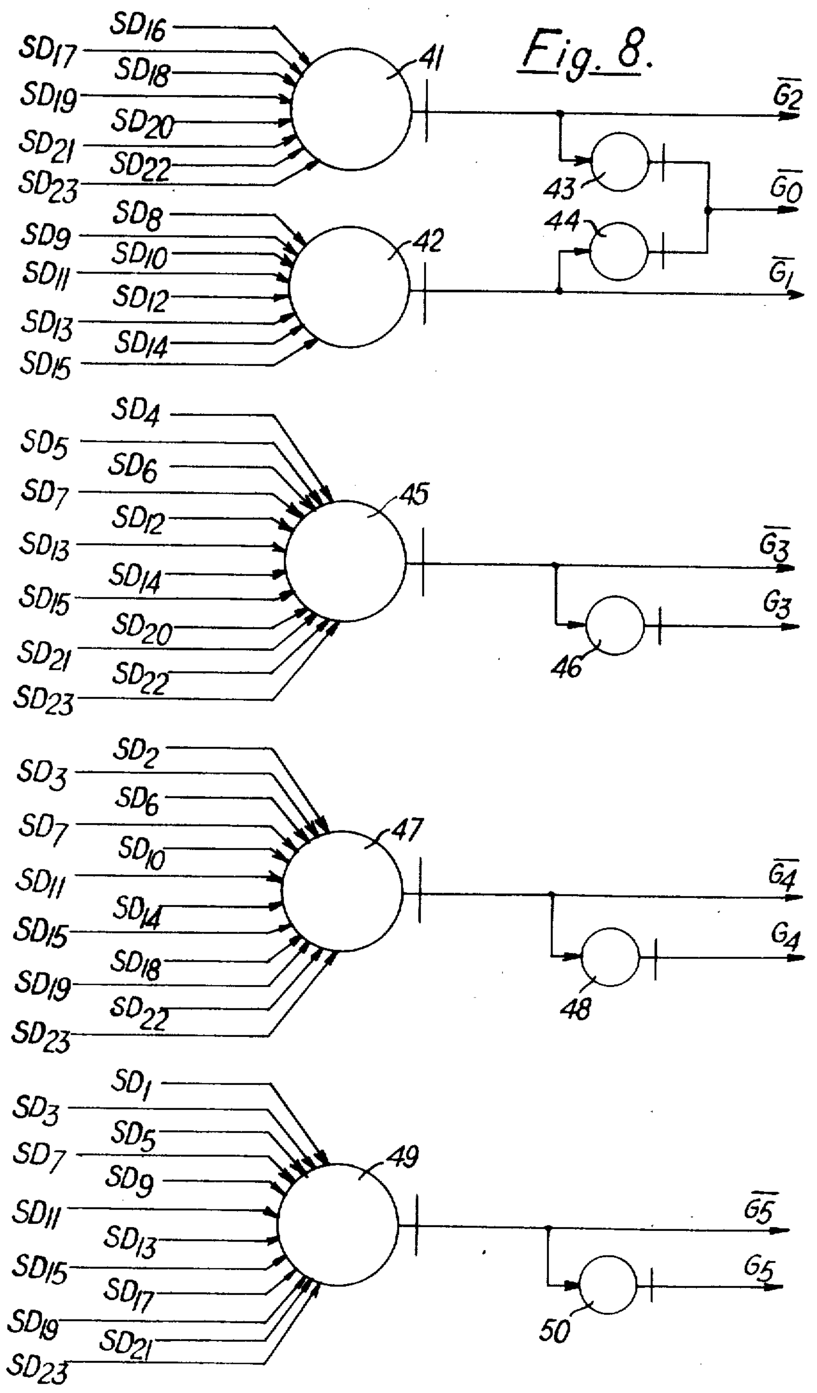
Figure 9:
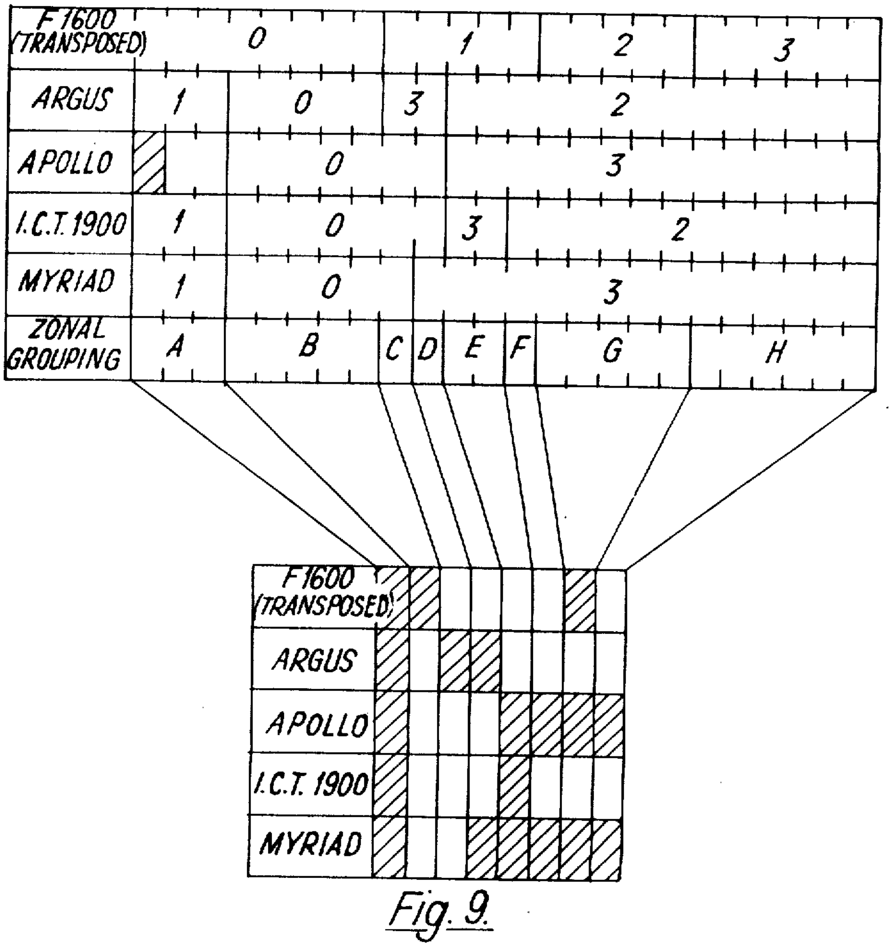
Figure 10:
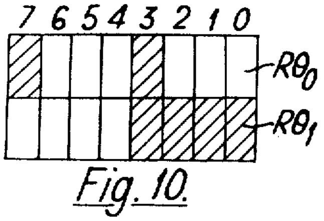
Figure 13:
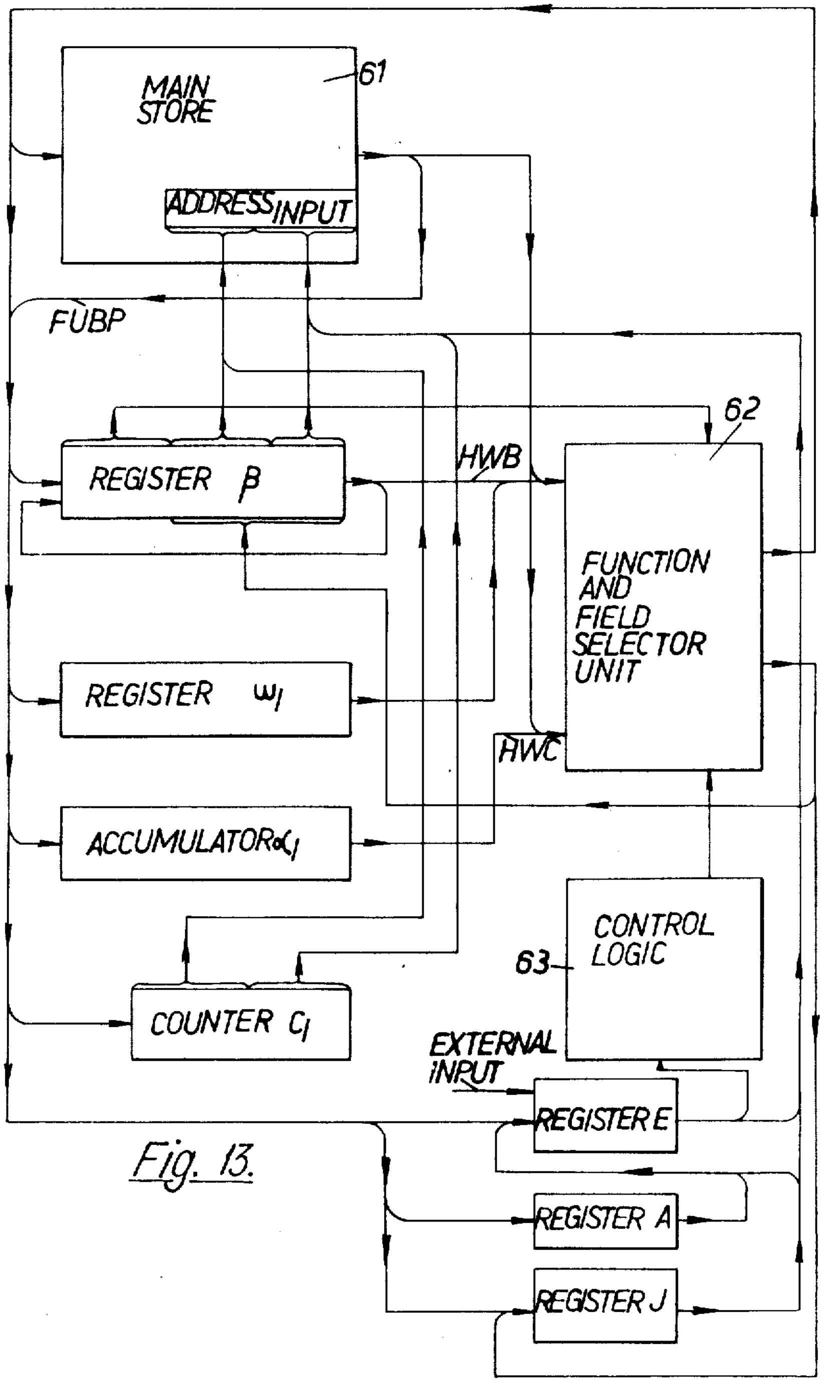
Figure 14:
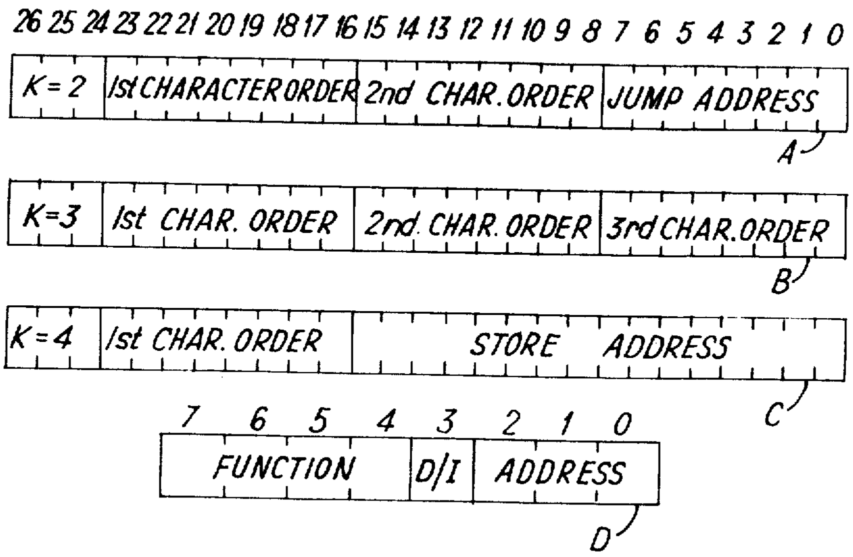
Figure 15:
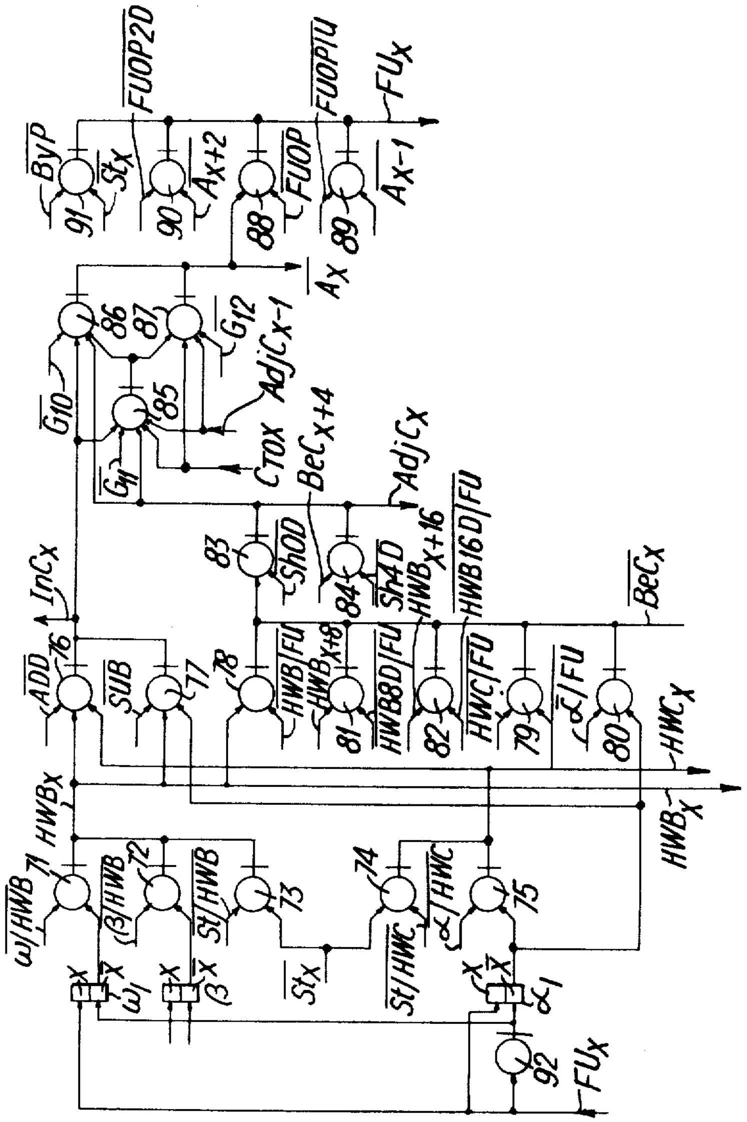
Figure 35:
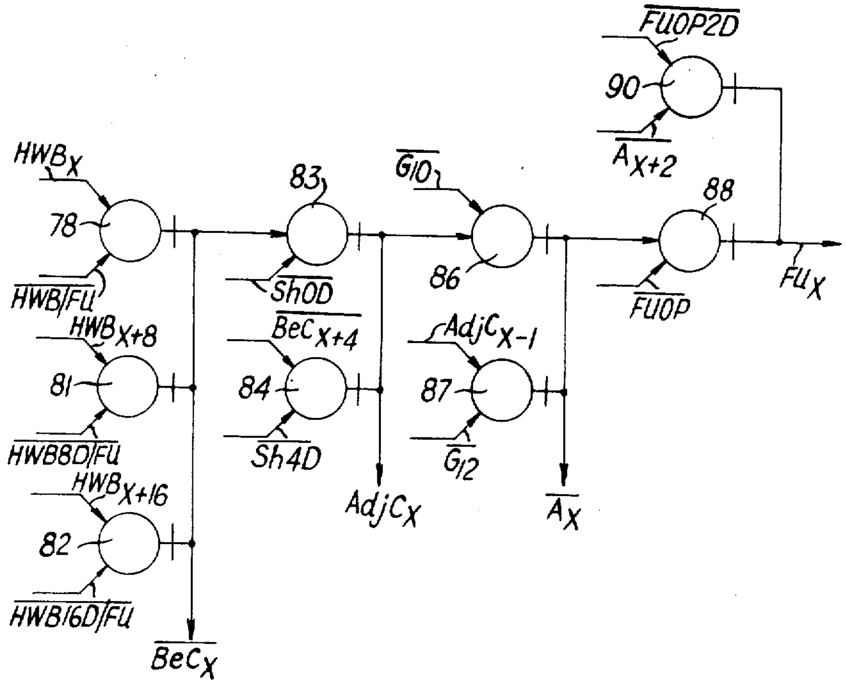
Figure 36:
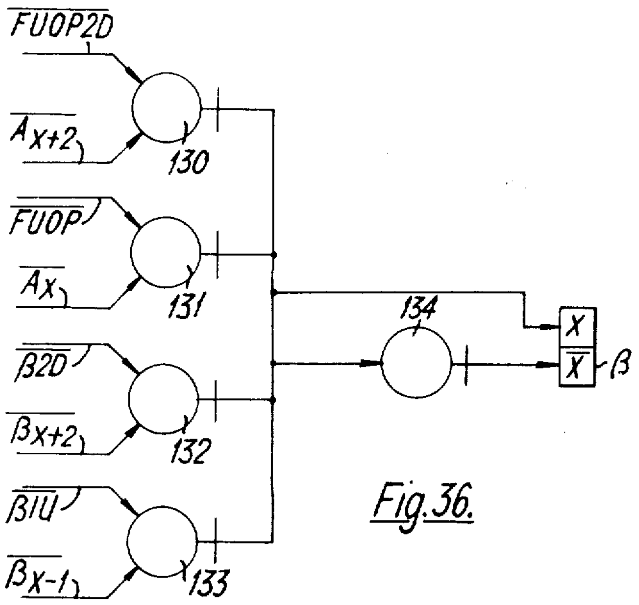
Figure 37:
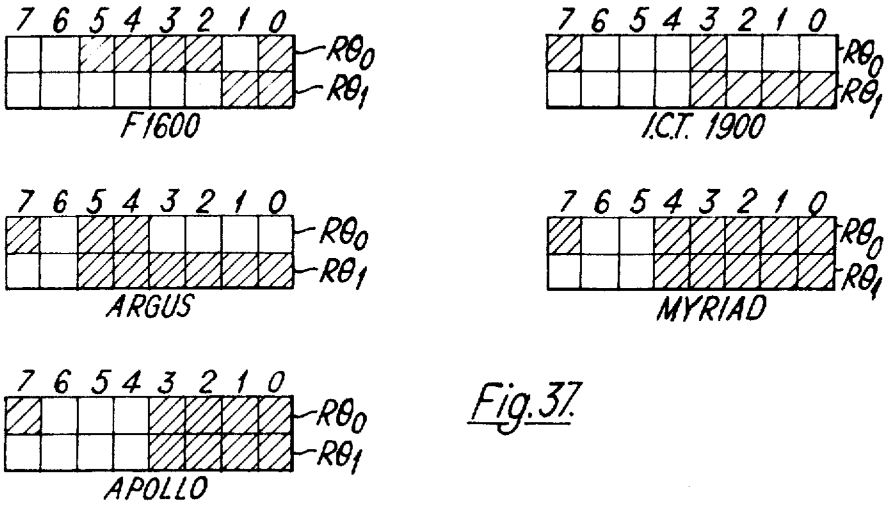
Figure 38:
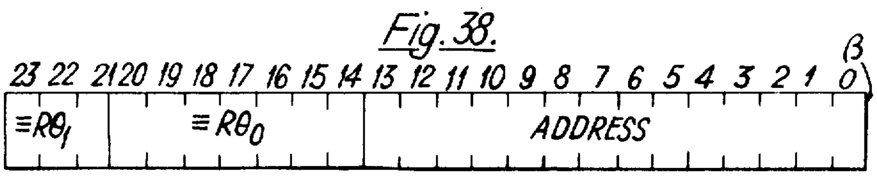
Figure 39:
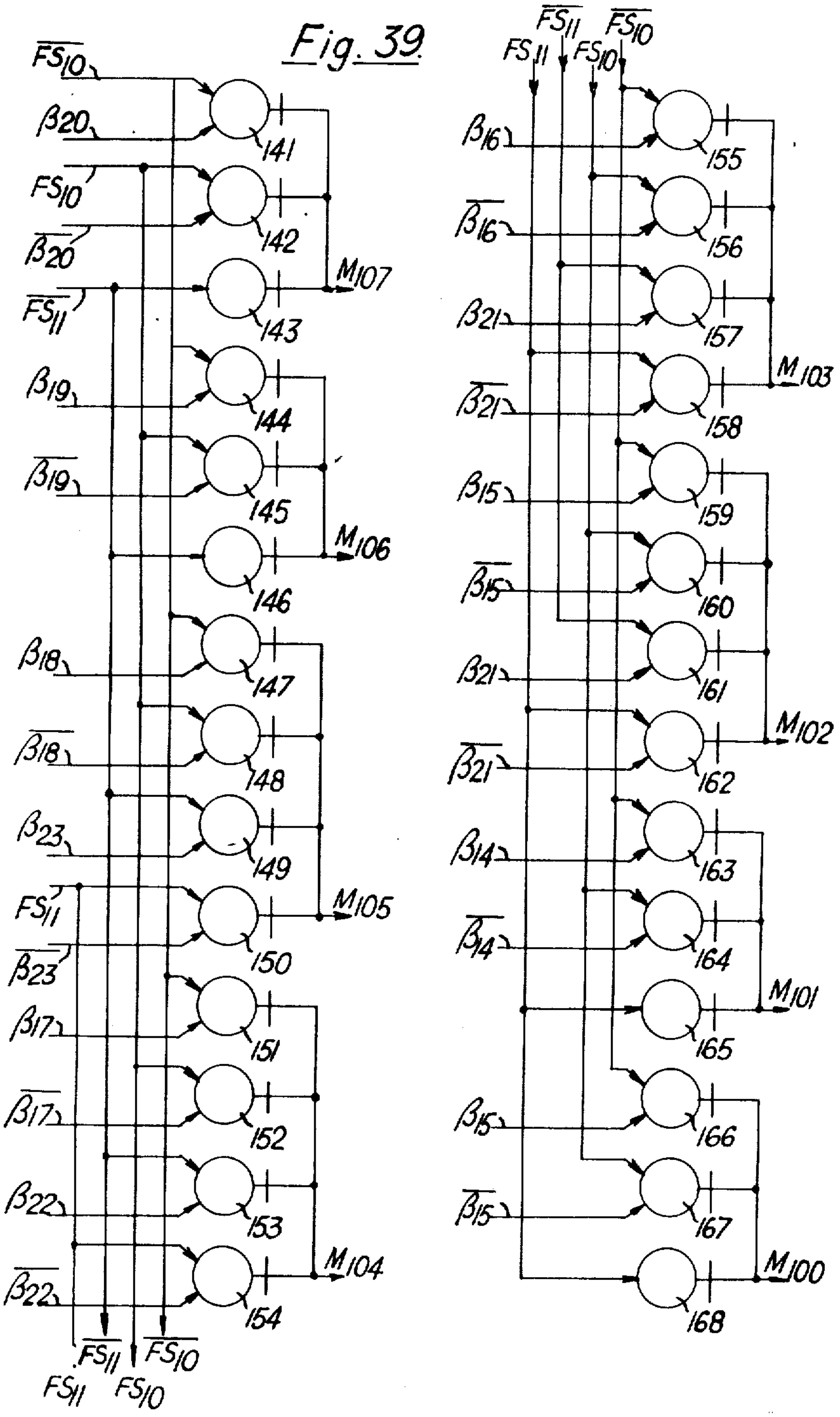
Figure 40:
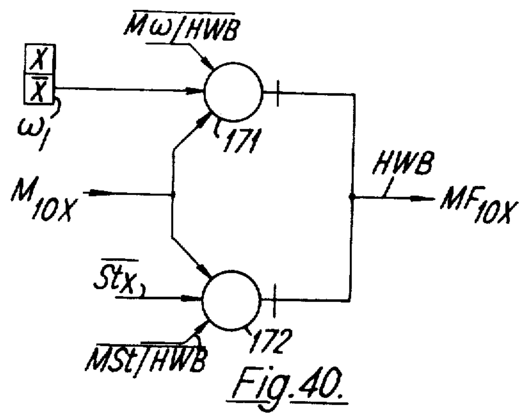
Figure 41:
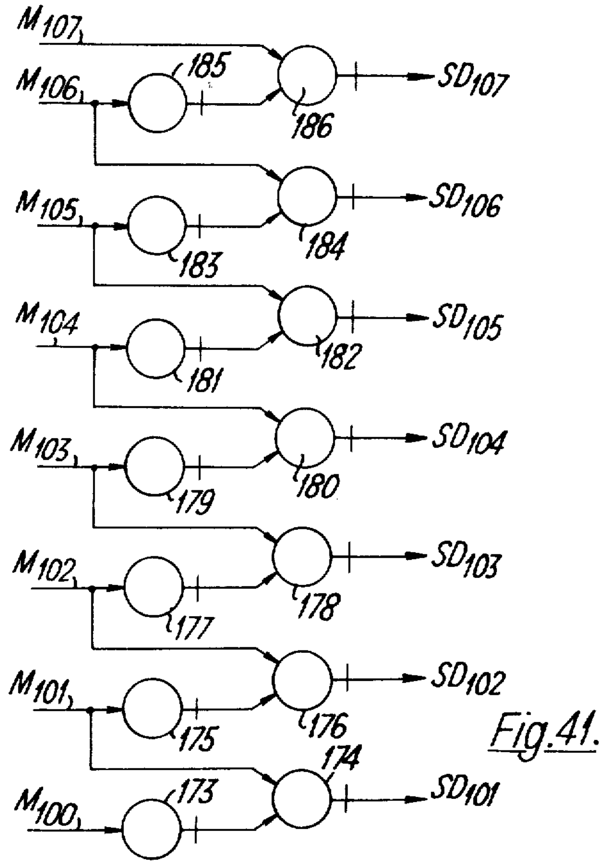
Figure 42:
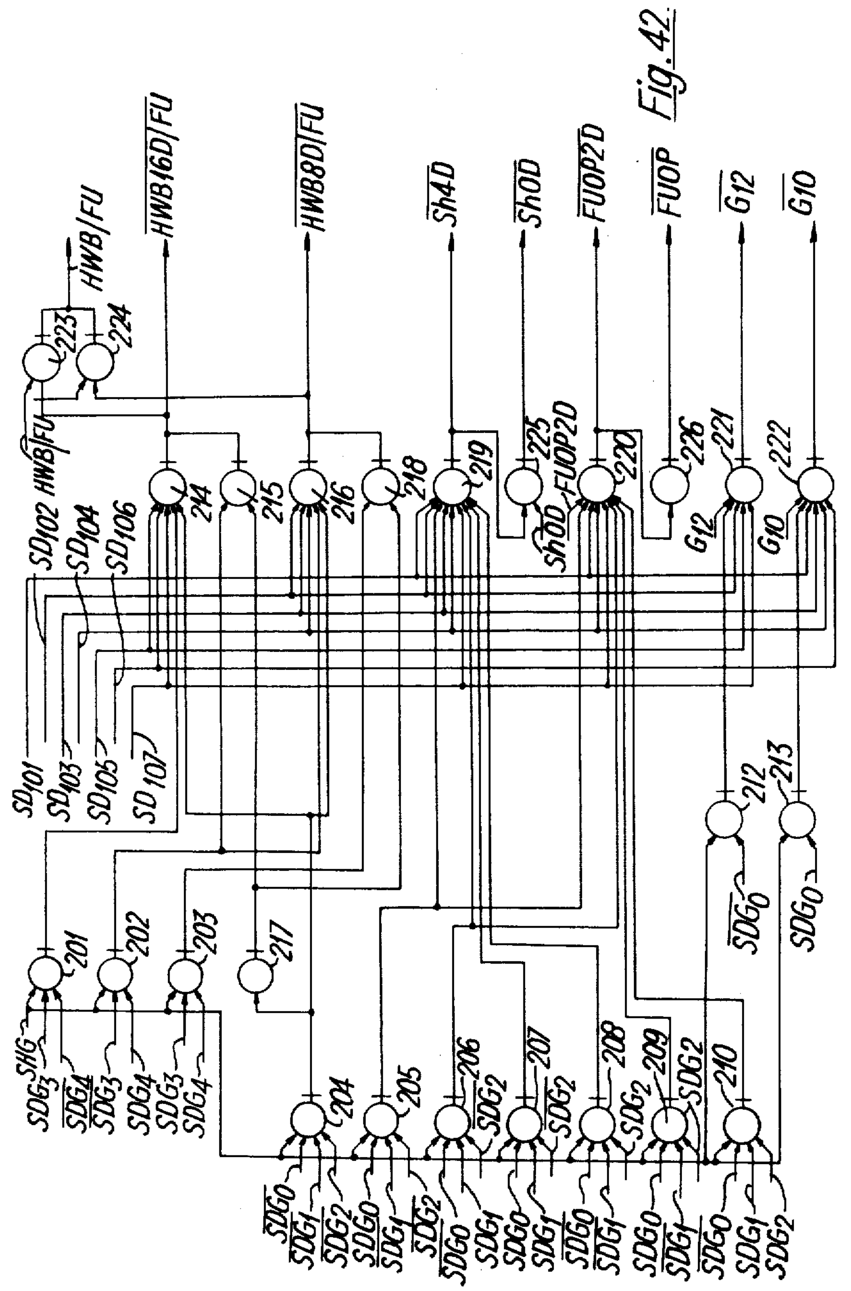
Figure 43:
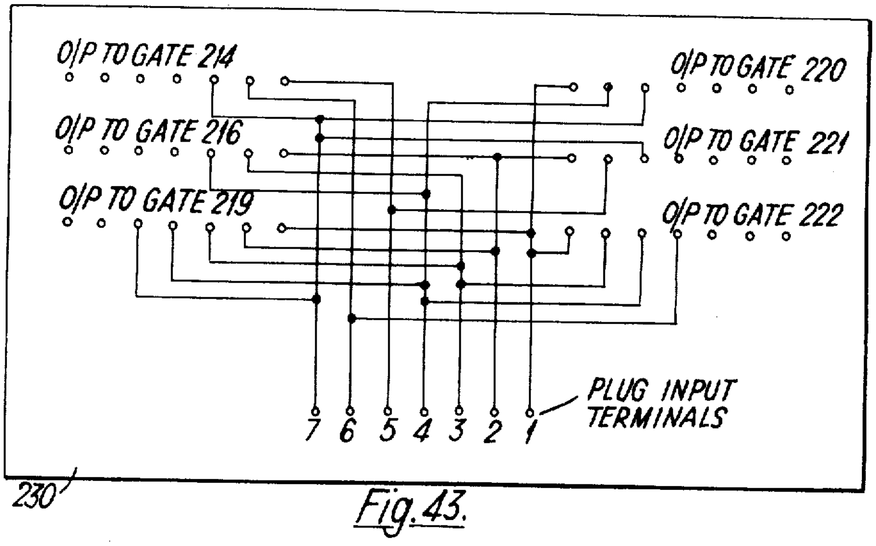
Figure 45:
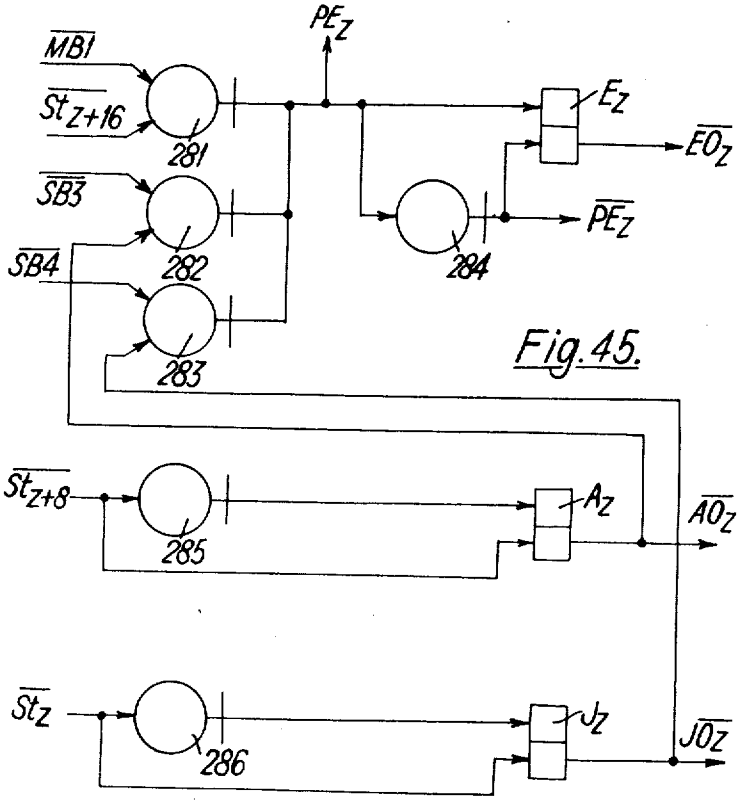
Figure 44:
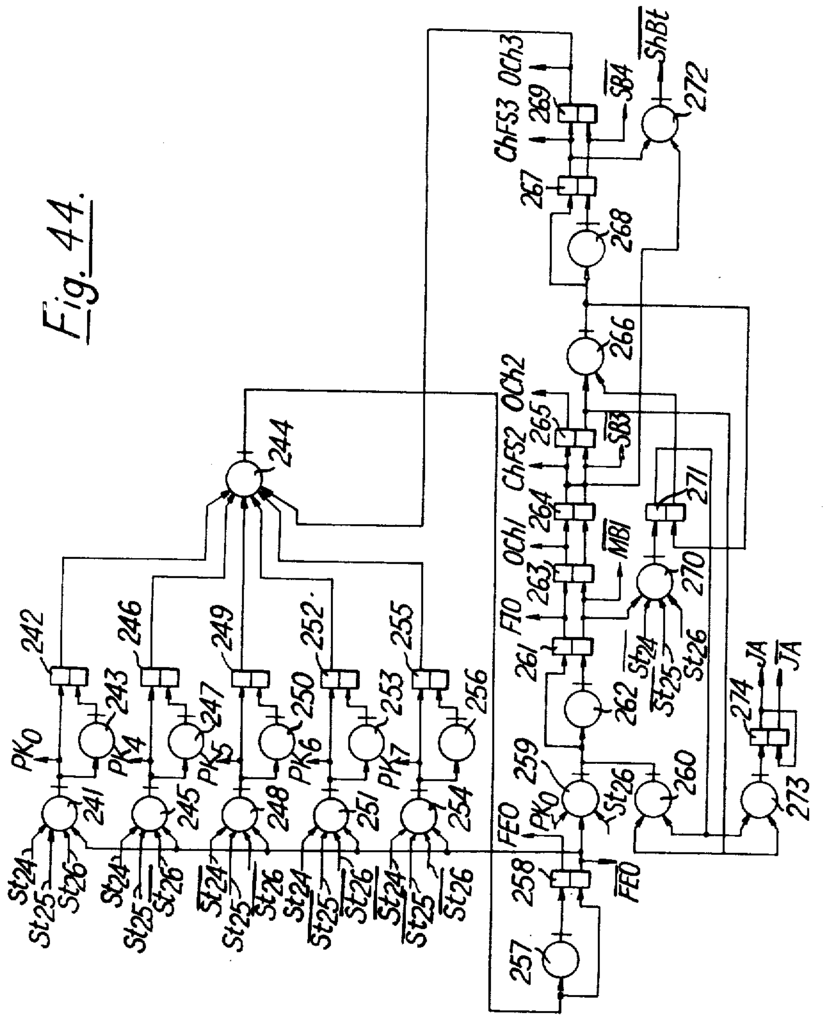
Figure 46:
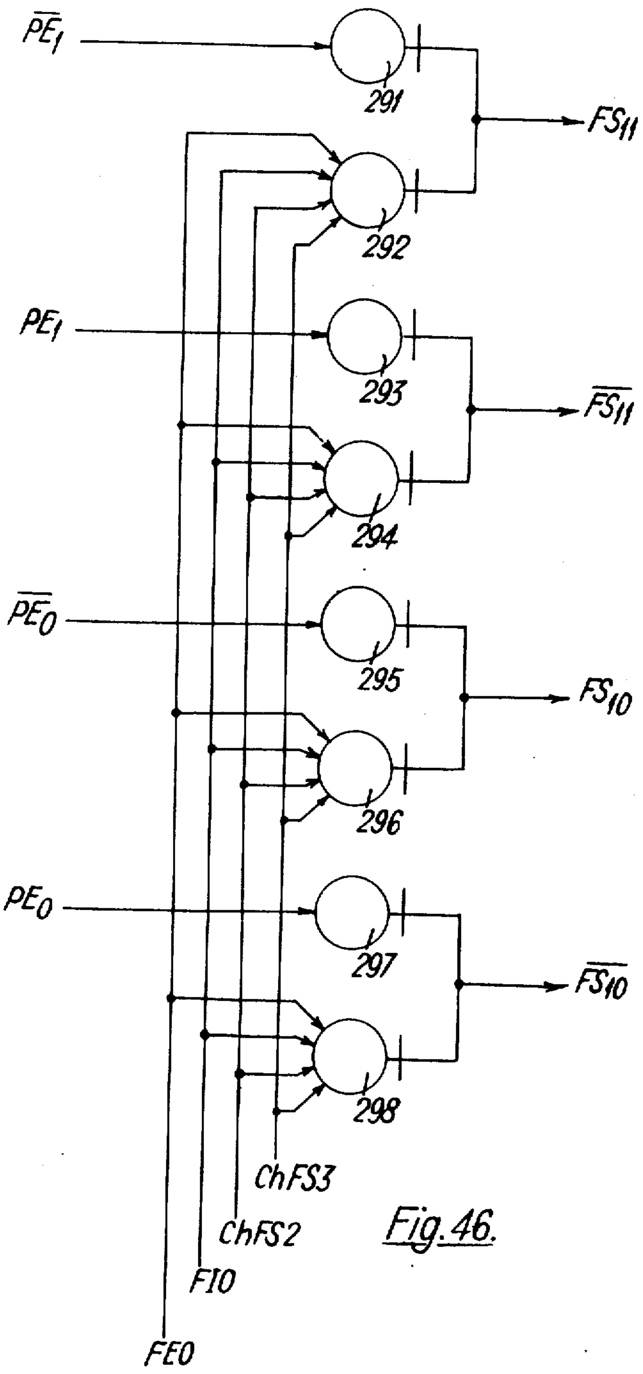
Figures 47, 48, 49:
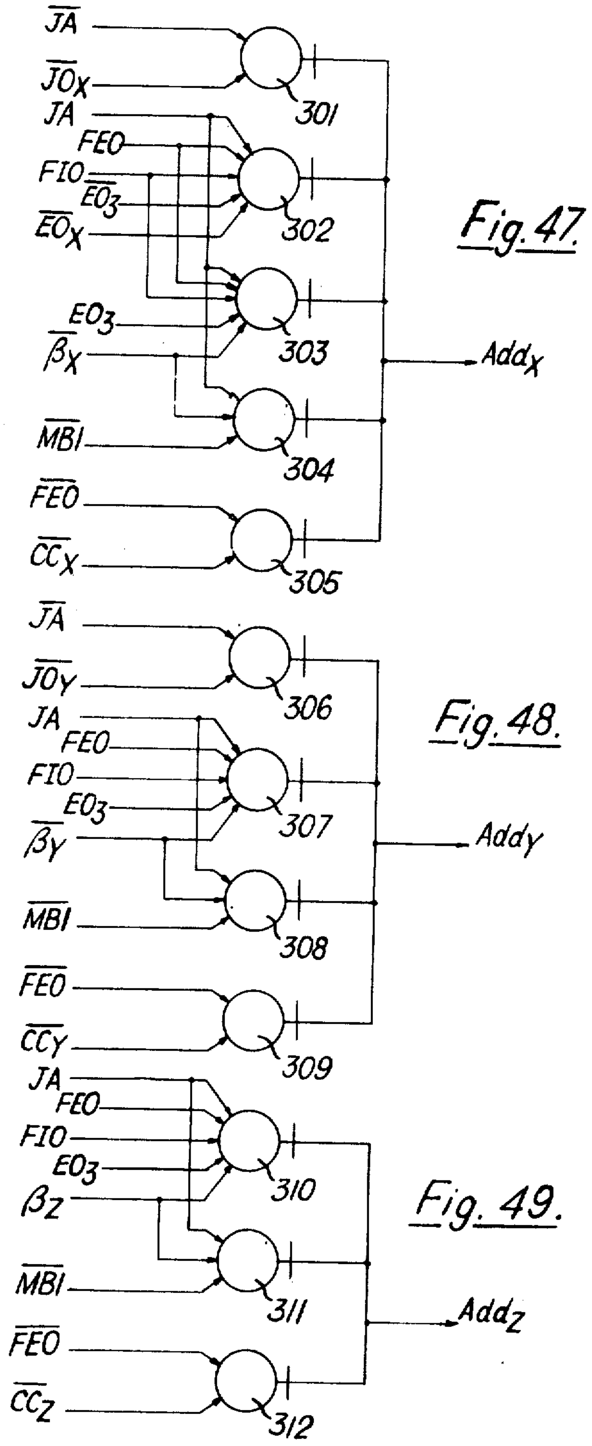
Figures 50, 55:
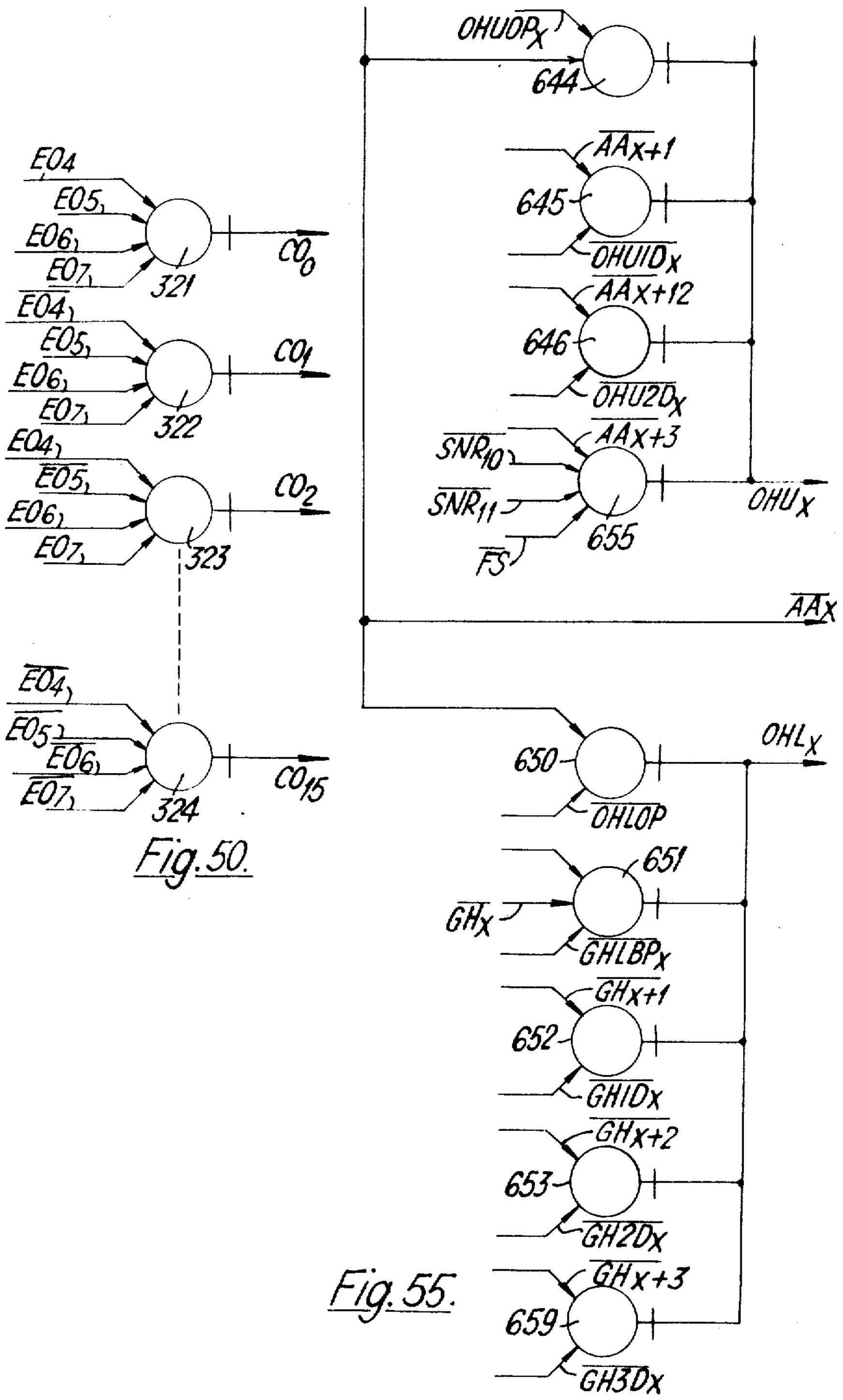
Figure 51:
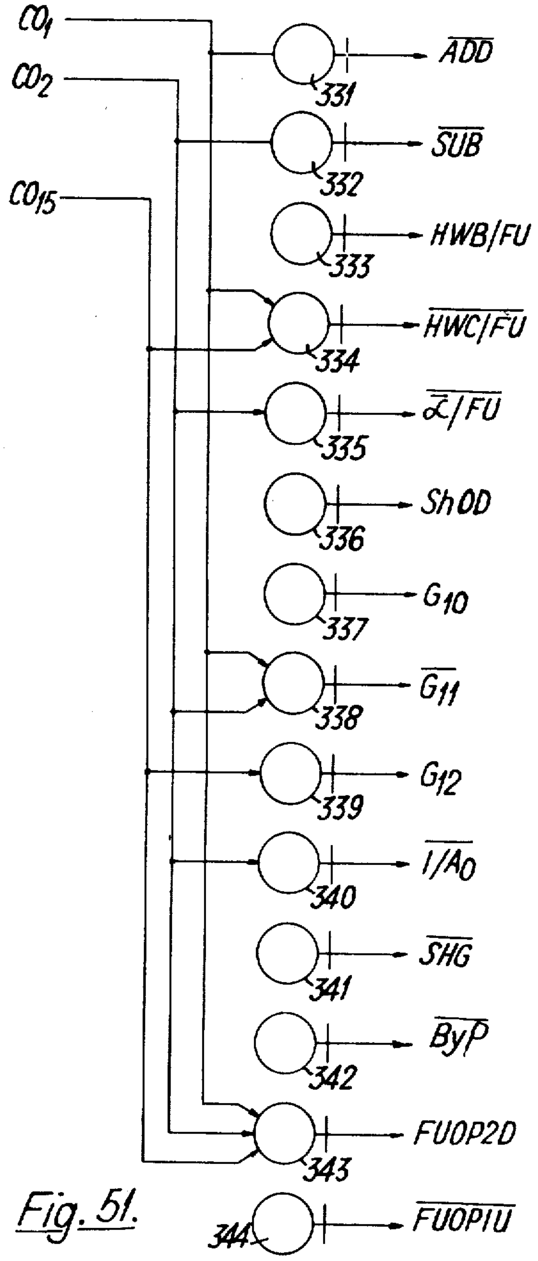
Figure 52:
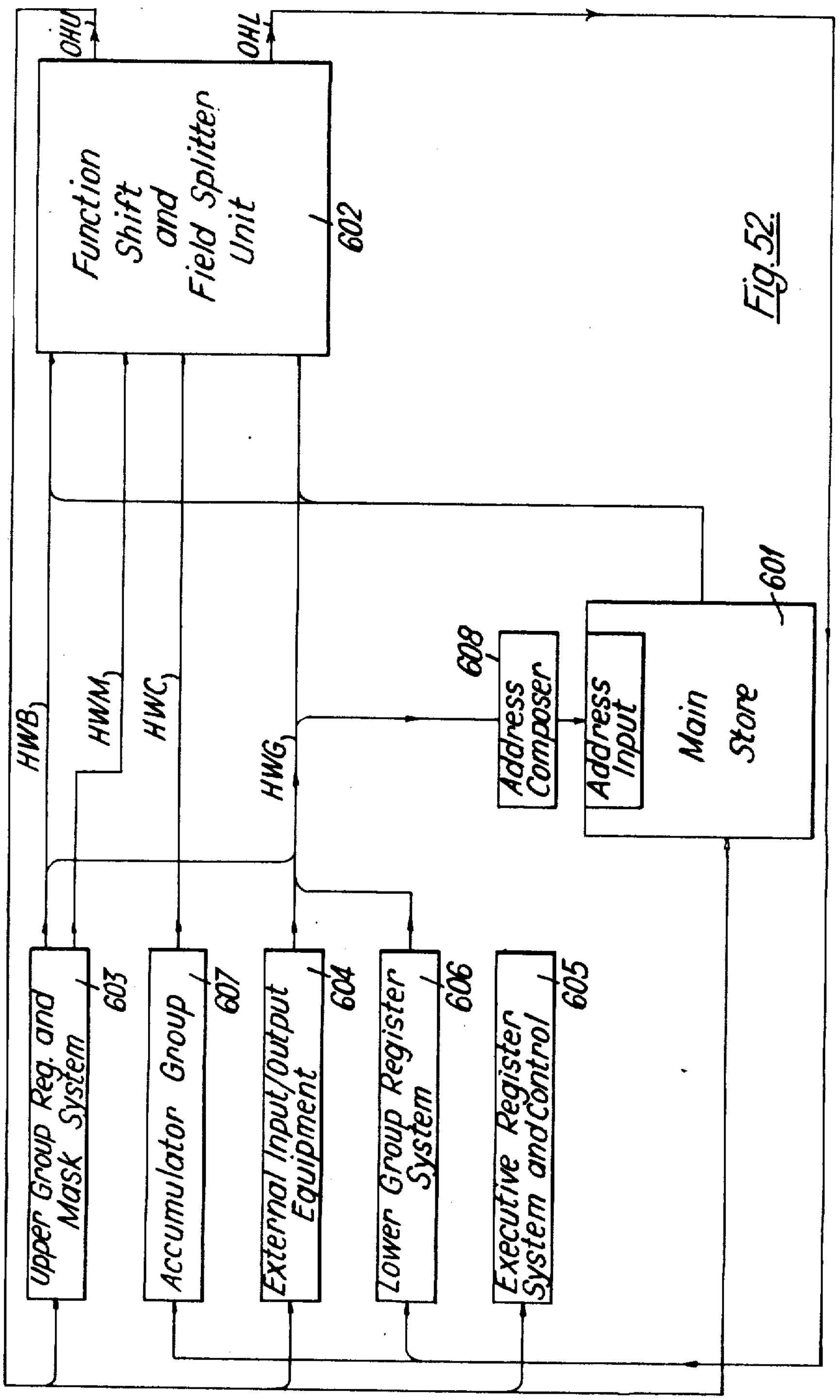
Figure 53:
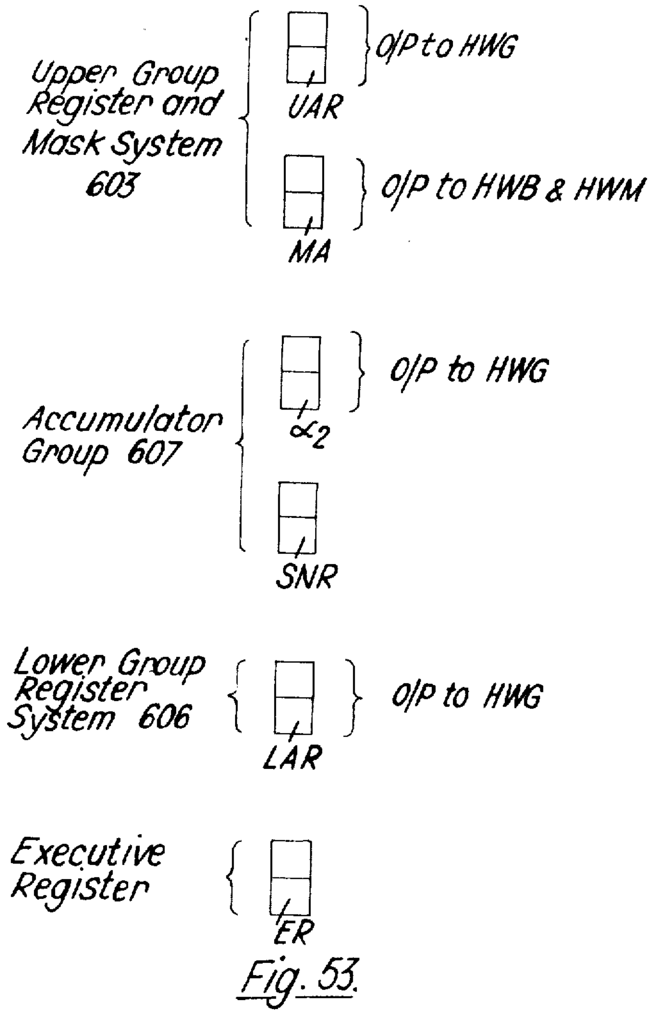
Figure 54:
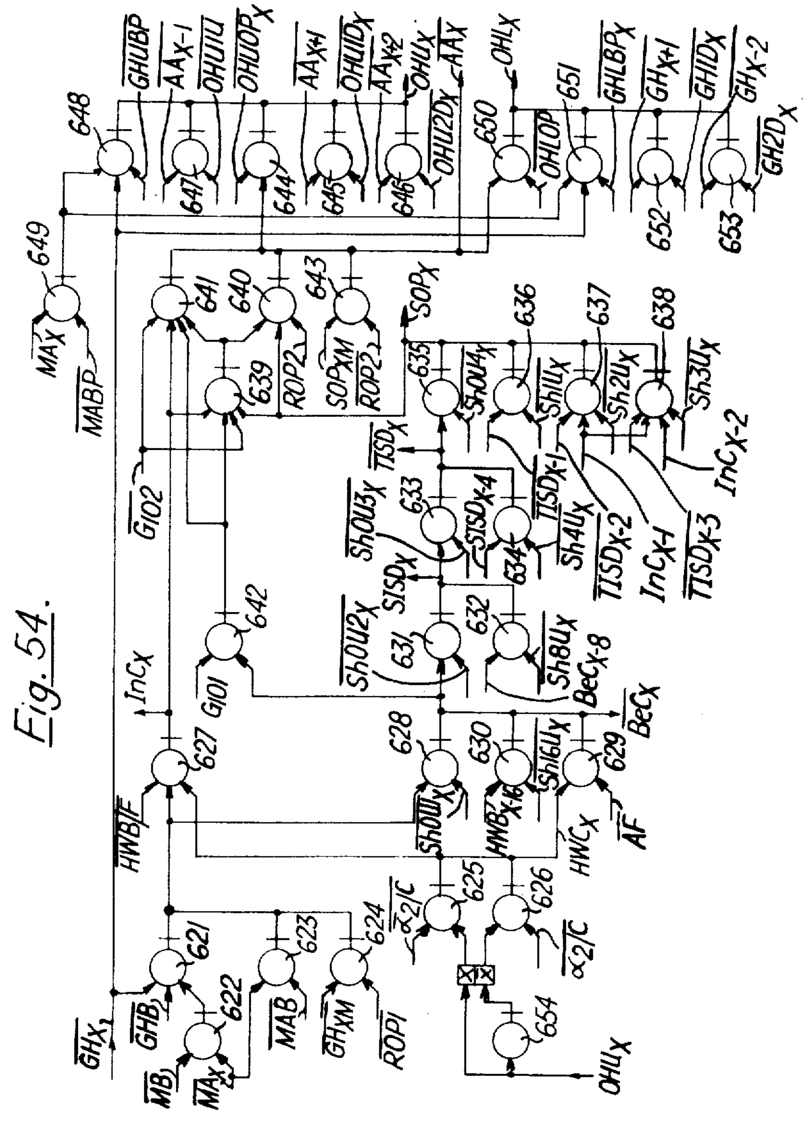
Figure 59:
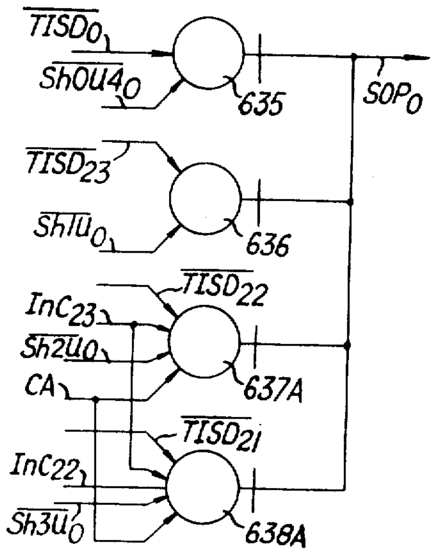
Figure 60:
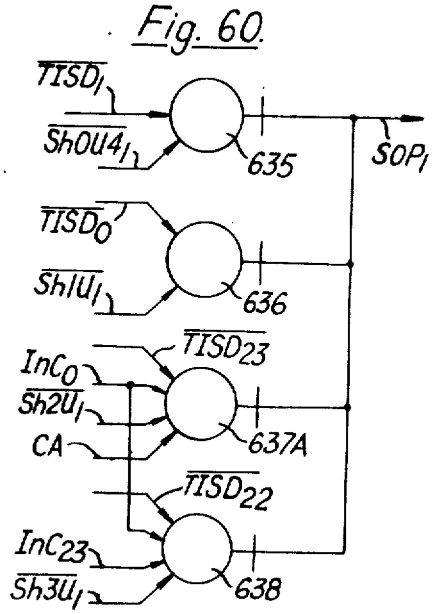
Figures 61, 62:
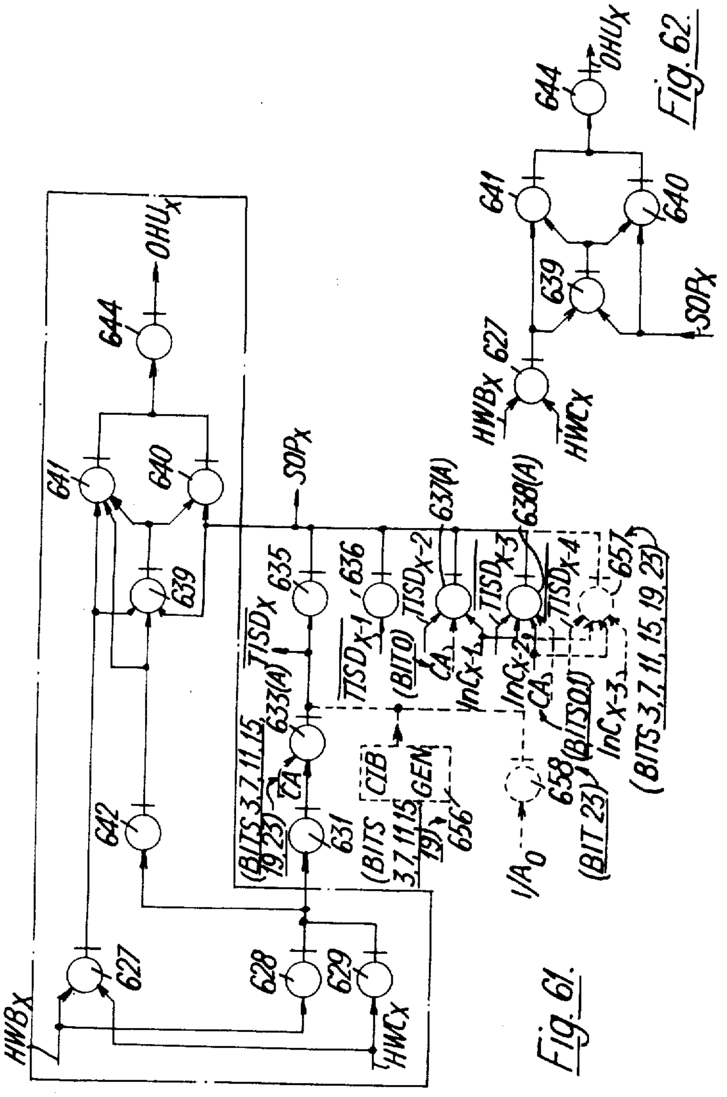
Figure 63:
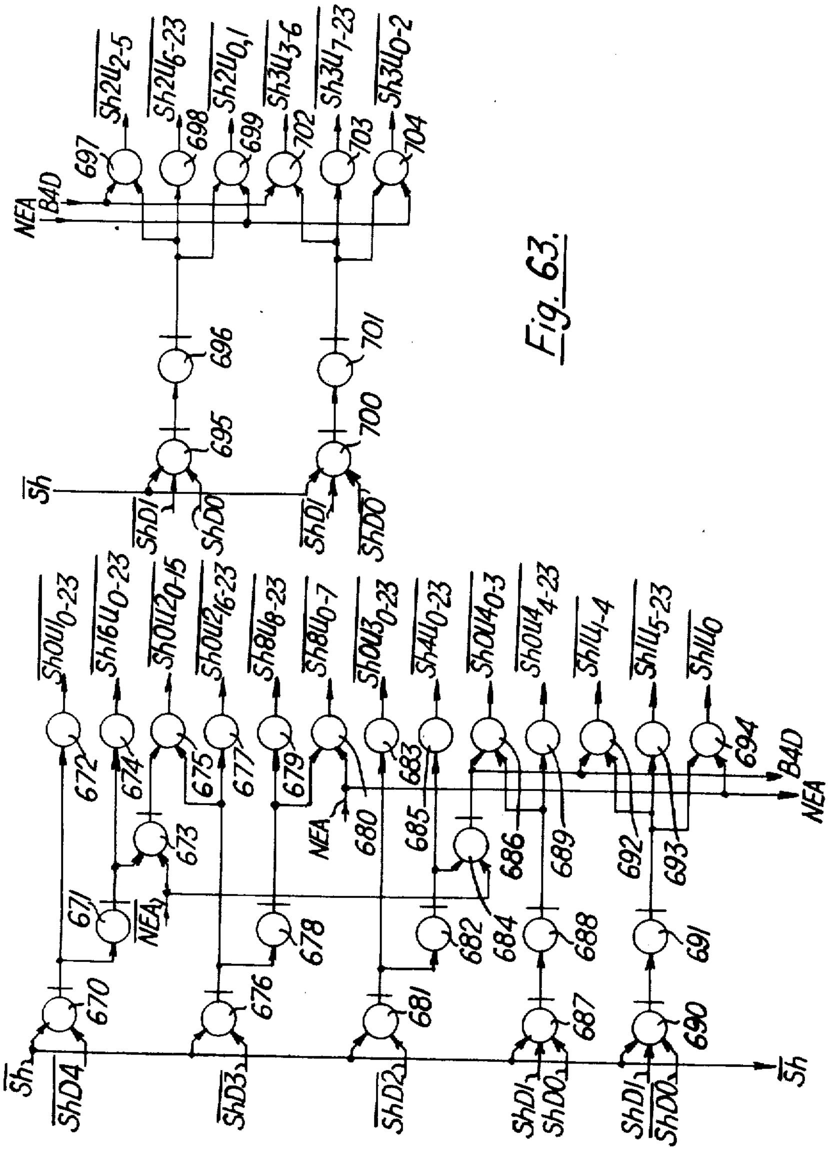
Figure 64:
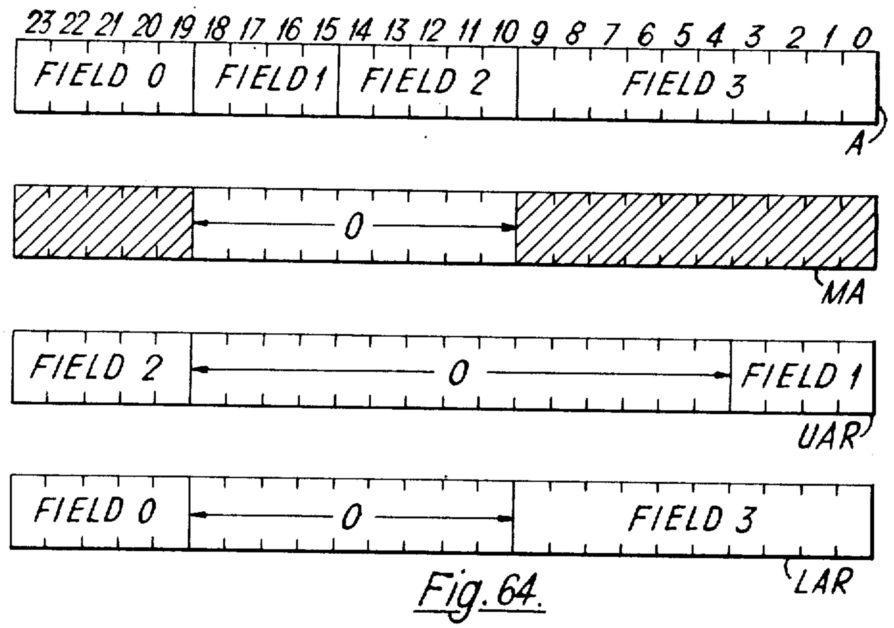
Figure 65:
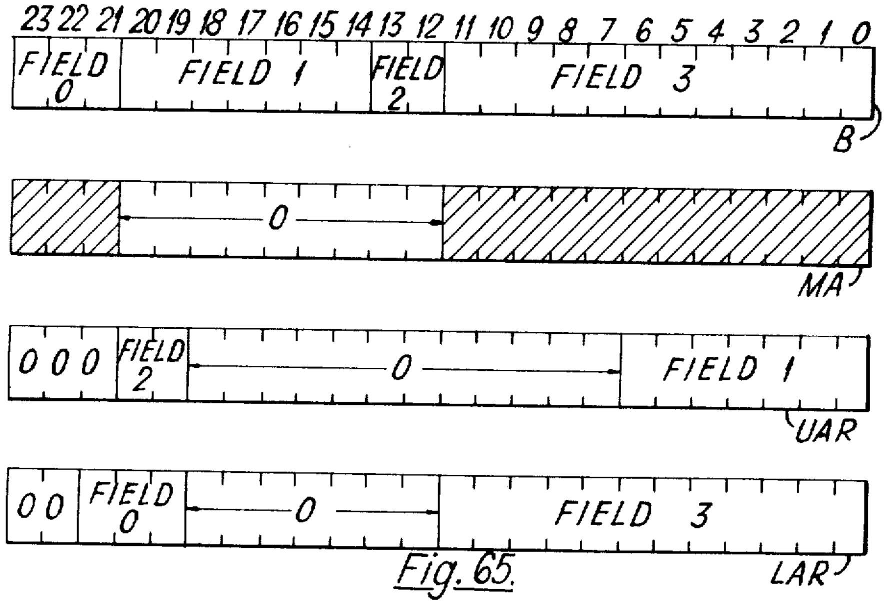
Figure 66:
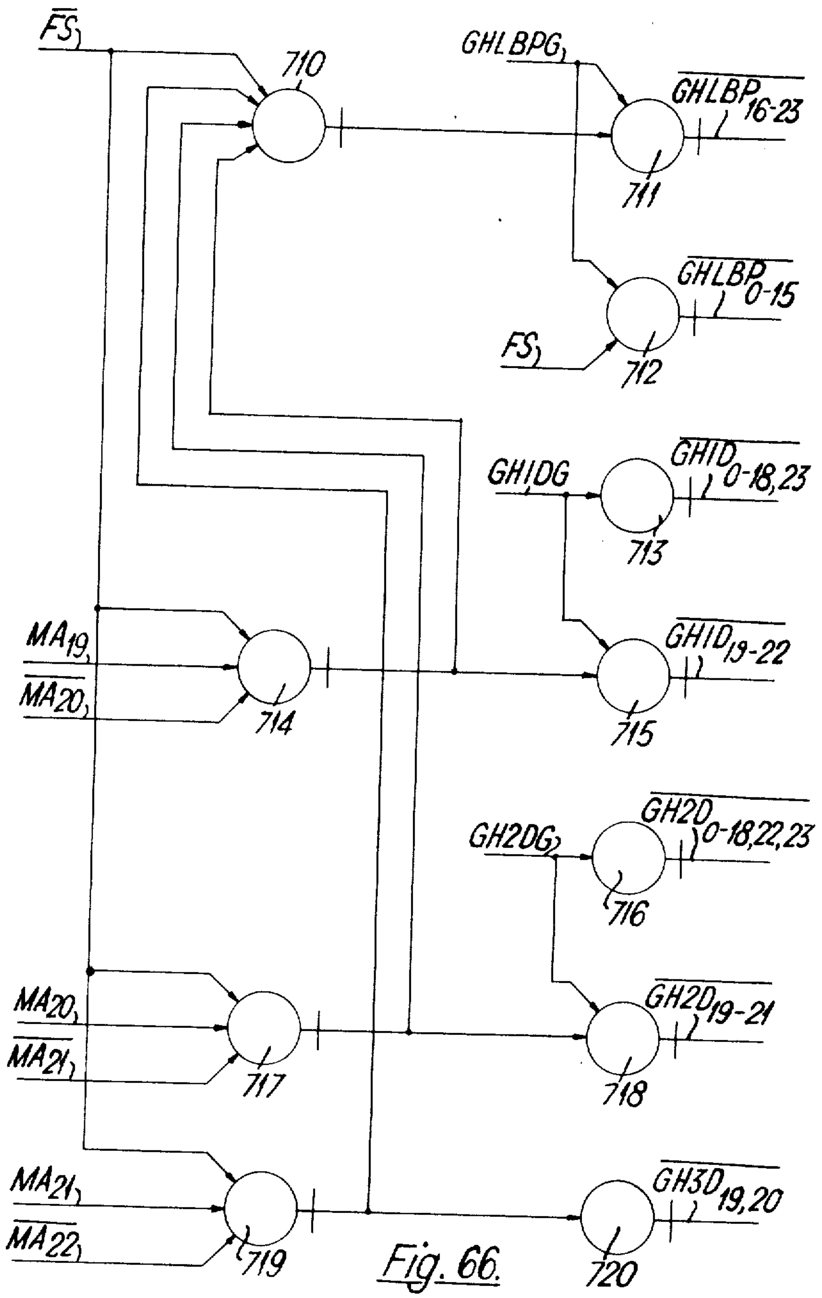
Figure 67:
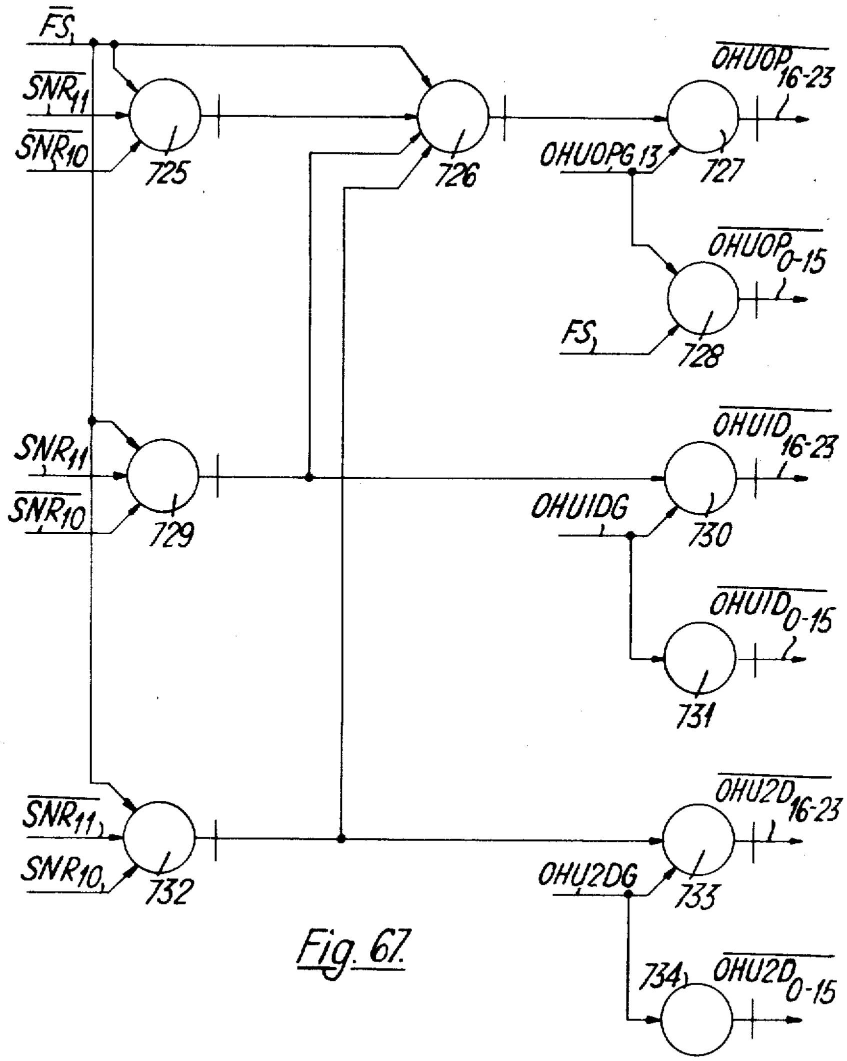
Figure 68:
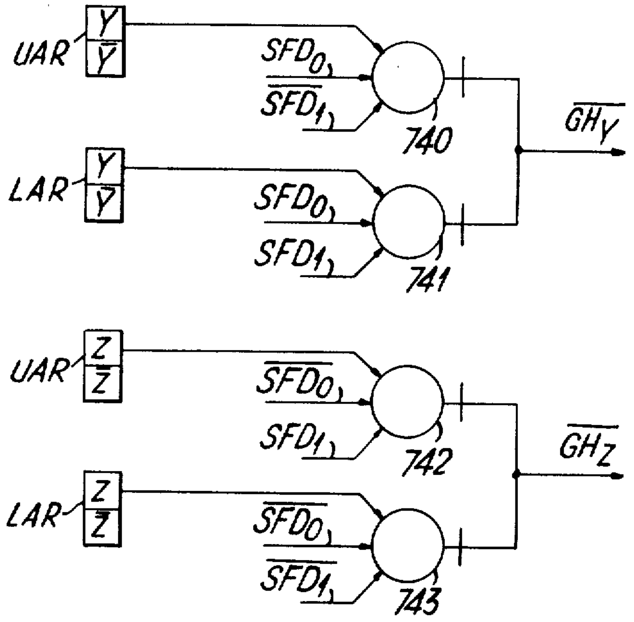
Figure 69:
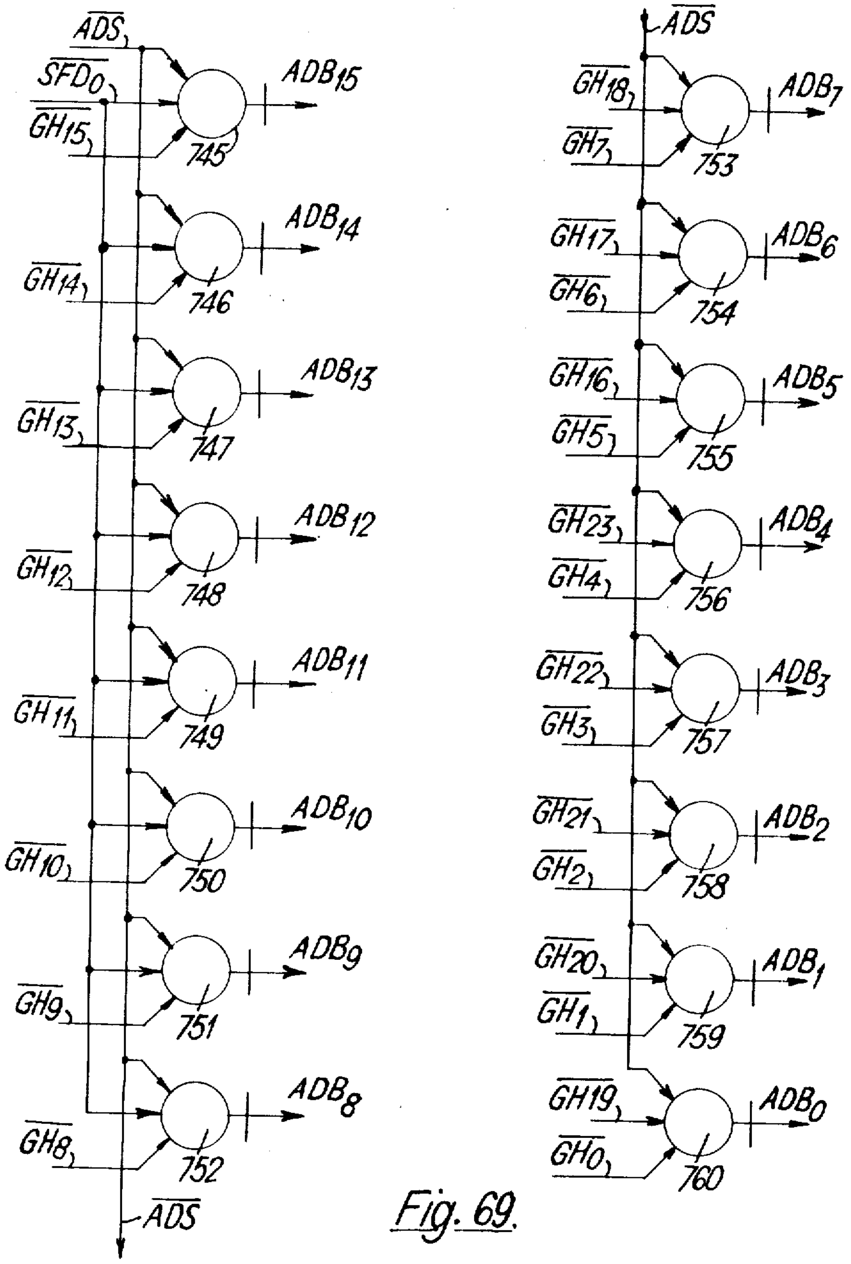

The present invention will now be described by way of example with reference to the accompanying drawings in which:

FIG. 1 is a simplified block diagram of a computer in accordance with the invention, FIG. 2 is a block schematic diagram of one form of field selector mechanism shown in FIG. 1, FIG. 3 shows two of the registers shown in FIG. 2 together with one word of a machine code, FIG. 4 is a schematic diagram of the masking gates shown in FIG. 2, FIG. 5 shows the outputs of the set of masking gates shown in FIG. 4, FIG. 6 is a schematic diagram of an additional masking gate, FIG. 7 is a schematic diagram of the shift network shown in FIG. 2, FIG. 8 is a schematic diagram of a decoding network asociated with the shift network shown in FIG. 7, FIG. 9 shows the field breakdown of five different machine codes, FIG. 10 shows a reduced form of the registers shown in FIG. 3, FIG. 11 is a schematic diagram of a wiring plug, FIG. 12 is a schematic diagram of a further wiring plug, FIG. 13 is a simplified block diagram of a further computer in accordance with the invention, FIG. 14 shows in tabular form the internal orders used in the computer shown in FIG. 13, FIG. 15 is a schematic diagram of the function unit of the computer shown in FIG. 13, FIGS. 16 to 24 are schematic diagrams of a fast carry network associated with the function unit shown in FIG. 15, FIGS. 25 to 34 show the different operative gates of the function unit when carrying out different functions, FIG. 35 shows the operative gates of the function unit when carrying out shift operations, FIG. 36 is a schematic diagram of the input gates from the register $\beta$ shown in FIG. 13, FIG. 37 shows certain register settings for defining five different machine codes, FIG. 38 shows the contents of the register $\beta$ for field selection operations, FIG. 39 is a schematic diagram of a set of gates for producing a set of masking digits, FIG. 40 is a schematic diagram of a set of masking gates, FIG. 41 is a schematic diagram of a set of gates for producing a set of shift digits, FIG. 42 is a schematic diagram of a shift decoding network, FIG. 43 is a schematic diagram of a wiring plug for use in connection with the shift decoding network shown in FIG. 42, FIG. 44 is a schematic diagram of part of the control logic shown in FIG. 13, FIG. 45 is a schematic diagram of the input gates for the registers E, A and J shown in FIG. 13, FIG. 46 is a schematic diagram of a set of gates for producing a set of field selection digits, FIGS. 47, 48 and 49 are schematic diagrams of sets of gates for producing certain store address bits, FIGS. 50 and 51 are schematic diagrams of further parts of the control logic shown in FIG. 13, FIG. 52 is a simplified block diagram of another computer in accordance with the invention, FIG. 53 shows the registers used in the computer shown in FIG. 52, FIG. 54 is a schematic diagram of the function unit of the computer shown in FIG. 52, FIGS. 55 to 60 are schematic diagrams, of modifications to certain bits of the function unit, FIG. 61 shows the operative gates of the function unit when carrying out the addition function, FIG. 62 shows the operative gates of the function unit when carrying out the OR function, FIG. 63 is a schematic diagram of a set of gates for producing shift control inputs, FIGS. 64 and 65 show the field splitting of two different machine codes, FIG. 66 is a schematic diagram of a set of gates for producing field masking control inputs, FIG. 67 is a schematic diagram of a set of gates for producing field shifting control inputs, FIG. 68 shows part of the output gating for the registers shown in FIG. 53, FIG. 69 is a schematic diagram of the address composer shown in FIG. 52, FIGS. 70 to 73 are schematic diagrams of the executive register and control system shown in FIG. 52, and FIGS. 74 to 92 are drawings illustrating a modified form of field splitting system.

GENERAL DESCRIPTION.—FIG. 1

Referring now to FIG. 1 of the drawings the computer shown is a parallel machine for operating with words of twenty-four bit length. The computer includes a main store 1 having outputs connected to the main highways HWB and HWC feeding into a function unit 2. Highways are shown throughout the drawings as single lines, but it should be understood that the lines represent multi-digit highways of the appropriate size to carry the required number of digits in parallel. The function unit 2 has an output highway feeding into a register 3, a self-shifting register 4, an accumulator $\alpha$, the main store 1, a counter C, a register $\omega$, and a field selector 5. The outputs from the register 3 and the self-shifting register 4 are connected to the highway HWB and the output from the accumulator $\alpha$ is connected to the highway HWC. The main store 1 also has output highways connected to a control logic stage 6, a register $q$ and to the field selector 5. The register $q$ has an output highway connected to the control logic 6 and the field selector 5. The counter C, a further counter J and the register $\omega$ also have output highways connected to the field selector 5. The field selector 5 has output highways connected to the highway HWB, the counter J and a register $\phi$ which has an output highway connected to the main store 1.

The operation of the simplified computer shown in FIG. 1 will now be described with reference to a one and a half address order without a modifier field for carrying out a subtraction order. In this specification the system of notation is used in which the address at which the result of a function is to be held is shown as a primed address on the left hand side of an equation and the addresses from which the operands are to be obtained are shown as unprimed addresses on the right hand side of the equation. Thus the subtraction order to be carried out is:

$$x'=x-n$$

This means that the contents of storage address N are to be subtracted from the contents of storage address X' and the result is to be written into storage address X.

In a computer built to operate with a particular code the carrying out of this operation would require three machine beats. On the first beat the order would be read, on the second beat the accumulator would be loaded with the contents of storage address N, and on the third beat the contents of the accumulator would be subtracted from the contents of storage address X and the result of the subtraction written into storage address X'. The machine would then be ready to read the next order.

The order is carried out on the computer shown in FIG. 1 in the following manner. On the first beat the external order is read from the main store 1 at the address contained in the external order control counter C into the external order register $\omega$. The contents at this address is a twenty-four bit order together with two additional bits, hereinafter referred to as the K bits, and therefore the external orders stored in the main store 1 are twenty-six bit words. The twenty-four bit order has three fields. These are the function field, F, which defines the order as a subtraction order, and two address fields, X and N. The number of bits in the function field is defined in the field selector 5. Whilst the external order is en route from the main store 1 to the external order register $\omega$ the function field F is selected by the field selector 5 and placed in the internal order control counter J. The contents of the function field F are used as an entry address to a simple routine of internal orders contained in the main store 1 which collectively define the original external order.

During this first beat the external control counter C is also stepped on by one to give the next external order address.

On the second beat the first internal order is read from the main store 1 at the address now contained in the internal order control counter J into the internal order register $q$. The internal orders comprise twenty-four bit words divided into three character orders each of eight bits, together with two additional K bits defining the type of internal order. Of the eight bits of each character order the first three bits are an address field and the last five bits are a function field. (In this specification bits in a group are counted from the least significant bit of the group.) Whilst the first internal order is en route to the internal order register $q$ the address field part of the first character order, i.e., the three least significant bits of the character order, are examined by the control logic 6 and this results in the selection of the N field of the external order as the address of the first operand required by the order. The number of bits in the N field of the external order is defined in the field selector 5 which selects the N field from the external order register $\omega$ and places it in the store address register $\phi$.

On the third beat the control logic 6 inspects the five function field bits of the first character order contained in the internal order register $q$. These are coded to cause the control logic 6 and the function unit 2 to transfer into the accumulator $\alpha$ an operand from the main store 1 at the address placed in the store address register $\phi$ on the previous beat. On this beat the three address field bits of the second character order contained in the internal order register $q$ are also examined by the control logic 6 and this results in the selection of the X field of the external order as the address of the second operand required by the order. The number of bits in the X field of the external order is defined in the field selector 5 which selects the X field from the external order register $\omega$ and places it in the store address register $\phi$.

On the fourth beat the control logic 6 inspects the five function field bits of the second character order contained in the internal order register $q$. These are coded to cause the control logic 6 and the function unit 2 to subtract the contents of the accumulator $\alpha$ from the contents of the main store 1 at the address placed in the store address register $\phi$ on the previous beat and write the result into the store at the same address. This is the last action required in carrying out the external order and the third character order contained in the internal oder register $q$ is therefore a dummy. On this beat the three address field bits of the third character order are inspected by the control logic 6 and this order is determined to be a dummy. This, in conjunction with the K bits of the internal order, signifies the termination of the routine of internal orders and the field selector 5 then causes the address contained in the external order control counter C to be entered in the store address register $\phi$ in preparation for the reading of the next external order in the program.

The above example using a simple one and a half address order illustrates the general method of working of the computer shown in FIG. 1. More complex orders are carried out in the same general manner, the register 3 and the self-shifting register 4 being provided for use in such operations as multiplication and division. More complex orders, however, may require the use of internal routines having more than three character orders and in such cases it is necessary to enter a series of two or more internal orders into the internal order register $q$ to interpret the external order.

The computer shown has three different modes of beat working. The first of these modes concerns the reading of external orders from the main store 1. The external orders are divided into four kinds, each particular kind being indicated by the two K bits attached to each twenty-four bit external order. These are:

(i) Normal orders defined by $K=1$. When one of these external orders is detected the computer operates in the manner described above using an internal order routine to interpret the external order.

(ii) Undefined orders defined by $K=0$. Detection of one of these external orders causes the computer to enter an interrupt program. There are many reasons why the computer should be required to enter an interrupt program, typical examples of which are that the external order may need converting into some other form before being normally obeyed, or the external order may be too complicated to be interpreted by a normal internal routine or may require interaction with monitoring or executive routines. The interrupt facility is also useful for removing the faults from a program.

(iii) and (iv) Varieties of equivalent forms defined by $K=2$ or $K=3$. Equivalent forms will be discussed in more detail later. It is sufficient to state here that an equivalent form is an order written in a format in accordance with the rules of internal orders or of a format closely related thereto and which replaces and is equivalent to an external order in the format of the external order code. Such external orders provide their own definitions and are obeyed without entering an internal routine.

The second mode of beat working concerns the reading of internal orders from the main store 1. The internal orders are also divided into four kinds, each particular kind being indicated by the two K bits attached to each twenty-four bit internal order. These are:

(i) Jump order type one defined by $K=0$. These orders consist of two eight-bit character orders and an eight-bit jump address. Each character order consists of a five-bit function field and a three-bit address field.

(ii) Jump order type two defined by $K=1$. These orders again consist of two eight-bit character orders and an eight-bit jump address but in this type of internal order each character order consists of a three-bit function field and a five-bit address field.

(iii) Terminate order defined by $K=2$. These orders consist of three eight-bit character orders each consisting of a five-bit function field and a three-bit address field. These orders are used as the last order in an internal routine.

(iv) Fast register order defined by $K=3$. These orders again consist of three eight-bit character orders each consisting of a five-bit function field and a three-bit address field, but these orders are used mainly for addressing fast registers.

The third mode of beat working is the data mode. This concerns the reading of operands which are intended to be words of data. Some words, however, will not be data but will give a further address at which the required data may be found. These operands are therefore again divided into four kinds, each particular kind being defined by the two K bits attached to each twenty-four bit operand. These are:

(i) Data words defined by $K=0$. These are genuine words of data and are operated on in accordance with the character order demanding the data.

(ii) Unconditional jump defined by $K=1$. These words contain a jump address which is automatically read on the next beat.

(iii) and (iv) Store addresses defined by $K=2$ or $K=3$.

These words contain store addresses and are used to introduce additional store cycles.

When words of kinds (ii), (iii) and (iv) are detected the character order operating on the data is not obeyed but is held in the internal order register $q$ until a data word of kind (i) is detected, whereupon the character order is obeyed.

Having described the general construction and operation of the computer shown in FIG. 1 and having indicated the three different modes of beat working, the detailed construction and operation of the computer will now be described.

DETAILED DESCRIPTION.—FIGS. 2 TO 12: FIELD SELECTOR SYSTEM.—FIGS. 2 TO 6

The object of the field selector system is to select the required field from the external order register $\omega$ and place it at the least significant end of the store address register $\phi$. To do this it is necessary to determine the number of places the required field must be shifted to position it at the least significant end of the external order, cause the shift, mask off the unwanted fields and then place the required field in the register $\phi$.

One method of achieving the desired result is shown schematically in block form in FIG. 2. The system shown includes two twenty-four bit flip-flop registers $\theta_0$ and $\theta_1$ each having their outputs and inverse outputs connected to a set 10 of masking gates to which are also connected the inverse outputs from the twenty-four bits of the external order register $\omega$ containing the external order, the two K bits not being connected. The output from the set 10 of masking gates is connected to a shift network 11 which is controlled by a control output also derived from the set 10 of masking gates.

The registers $\theta_0$ and $\theta_1$ are shown in FIG. 3 together with a twenty-four bit word of the I.C.T. 1900 machine code having X, F, M and N fields of three, seven, two and twelve bits respectively. The register $\theta_0$ has digits 0 to 11 and 14 to 20 set to ones (indicated by the hatching of the relevant digits) and digits 12, 13 and 21 to 23 set to noughts. The register $\theta_1$ has digits 0 to 13 set to ones and digits 14 to 23 set to noughts. The four fields X, F, M and N may now be uniquely defined by reference to the digit states of the registers $\theta_0$ and $\theta_1$. Thus the X field, field 0, is defined as the digits in which both the digits of $\theta_0$ and the digits of $\theta_1$ are noughts, i.e., digits 21 to 23, the F field, field 1, is defined as the digits in which the digits of $\theta_0$ are ones and the digits of $\theta_1$ are noughts, i.e., digits 14 to 20, the M field, field 2, is defined as the digits in which the digits of $\theta_0$ are noughts and the digits of $\theta_1$ are ones, i.e., digits 12 and 13, and the N field, field 3, is defined as the digits in which both the digits of $\theta_0$ and the digits of $\theta_1$ are ones.

FIG. 4 shows the set of masking gates associated with the bit X of each of the registers $\theta_0$ and $\theta_1$ for selecting the desired field and masking off the unwanted fields. The masking gates 10 shown in FIG. 2 include twenty-four such sets of masking gates associated with the twenty-four bits of the registers $\theta_0$ and $\theta_1$. The output of the bit X of the register $\theta_0$ is connected to one input of a double input NOR gate 15 and the inverse output is connected to one input of a double input NOR gate 16. Similarly the output of the bit X of the register $\theta_1$ is connected to one input of a double input NOR gate 17 and the inverse output is connected to one input of a double input NOR gate 18. The desired one of the four fields is selected by means of two field selection digits $FS_0$ and $FS_1$ and their inverses $\overline{FS_0}$ and $\overline{FS_1}$ (inverses are indicated in the usual manner by a bar over the digit or waveofrm). The field selection digits are derived from the control logic and the digit $FS_0$ is connected to the other input of the gate 16, the inverse digit $\overline{FS_0}$ is con-connected to the other input of the gate 15, the digit $FS_1$ is connected to the other input of the gate 18 and the inverse digit $\overline{FS_1}$ is connected to the other input of the gate 17. The outputs of the gates 15 to 18 are connected together and to one input, $M_X$, of a triple input NOR gate 19 the other two inputs of which are connected respectively to the inverse output of the bit X of the external order register $\omega$ and to a gating control waveform $\overline{G}$ derived from the control logic. The output of the gate 19, $MF_X$, is connected to the shift network 11, FIG. 2. The common outputs of the gates 15 to 18 are also connected to the input of a single input NOR gate 20 having an output $\overline{M_X}$ and to one input, $M_X$, of a double input NOR gate 21 which has an output $SD_X$. The other input to the gate 21, $\overline{M_{X-1}}$, is connected to the output of the gate 20 of the set of masking gates associated with the preceding bit $X-1$ of each of the registers $\theta_0$ and $\theta_1$. In the case of bit 0 the preceding bit is bit twenty-three.

To select one of the four fields the two field selection digits $FS_0$ and $FS_1$ are set to the binary number of the desired field. Thus the fields are selected by setting the field selection digits in the following manner:

| | $FS_1$ | $FS_0$ |
|---|---|---|
| Field No.: | | |
| 0 | 0 | 0 |
| 1 | 0 | 1 |
| 2 | 1 | 0 |
| 3 | 1 | 1 |

In field 1, the function field, is the desired field the field selection digit inputs to the gates 15 to 18 are nought, one, one, nought respectively. The desired field occupies bits 14 to 20 and in the register $\theta_0$ these bits are set to ones and the inverses are therefore set to noughts and in the register $\theta_1$ these bits are set to noughts and the inverses are therefore set to ones. Under these conditions all of the gates 15 to 18 associated with bits 14 to 20 have a one on one or other of the inputs and there is therefore no output from any of the gates 15 to 18 since a NOR gate only gives an output when there are no inputs applied. The $M_X$ input to the gate 19 is therefore a nought and if the gating waveform $\overline{G}$ is also a nought the gate is open. In passing through a NOR gate a digit is inverted and since the inverse of the bit X of the register $\omega$ is connected to the input to the gate 19, the output from the gate 19 is the same as the digit held in the bit X. For all bits other than bits 14 to 20 one or other of the gates 15 to 18 will have two noughts applied to its inputs and will therefore give an output. This will close the gate 19 and the outputs $MF_X$ for these bits will all be noughts. The desired field has thus been selected and the other fields masked off with noughts.

When selecting field 1 the output $M_X$ from the gates 15 to 18 are noughts for bits 14 to 20 and ones for all other bits. This is shown in FIG. 5 from which it will be seen that the number of places which it is necessary to shift the field to place it at the least significant end of the word may be determined by detecting the bit which is a nought and which is immediately preceded by a one. There is only one bit which meets this condition and it is detected by the gate 21, FIG. 4. For the required bit the input $M_X$ is a nought and, since the preceding bit is a one, the input $\overline{M_{X-1}}$ is also a nought. The output $SD_X$ is therefore a one and this output is used to determine the amount of shift to be applied to the field.

As previously stated, whilst the external order is en route from the main store 1 to the external order register $\omega$ the function field F is selected and placed in the internal order control counter J. FIG. 6 shows the means by which the function field is selected. The main store includes a store output register 22 of which bit X is shown in FIG. 6. The inverse output of the bit X is connected to one input of a triple input NOR gate 23 the other two inputs of which are connected respectively to the input $M_X$ derived from the masking gates 15 to 18, FIG. 4, and to a gating control waveform G derived from the control logic. The output of the gate 23 is connected to the output of the gate 19, $MF_X$.

When the field selection digits $FS_0$ and $FS_1$ are set the masking is applied to the contents of the store output register 22 in the manner described above. During the first beat, however, when it is necessary to select the function field from the store output register instead of from the external order register $\omega$, the gating waveform G is set to a nought and the inverse $\overline{G}$ is therefore a one. This opens the gate 23 and closes the gate 19 and the desired field is therefore entered in the internal order control counter J. During the following beats in reading the external order the gating waveform G is set to a one and the inverse $\overline{G}$ is therefore a nought. This opens the gate 19 and closes the gate 23 and the contents of the stored register $\theta$ are then derived from the external register $\omega$ and not from the store register 22.

SHIFT NETWORK.—FIG. 7

Having now selected the required field and determined the number of places the required field must be shifted to position it at the least significant end of the external order it is now necessary to cause the relevant shift. FIG. 7 shows the set of shift gates associated with the bit X of the external order register $\omega$. The shift network 11 shown in FIG. 2 includes twenty-four sets of shift gates associated with the twenty-four bits of the register $\omega$ but, as will be seen later, the sets associated with the more significant digits of the register $\omega$ do not include all of the gates included in the set shown in FIG. 7. The output $MF_X$ from the set of masking gates associated with the bit X of the register $\omega$ is connected to one input of a double input NOR gate 30 the other input of which is connected to a control waveform $\overline{G_0}$. The output $MF_{X+8}$ from the set of masking gates associated with the bit X+8 of the register $\omega$ is connected to one input of a double input NOR gate 31 the other input of which is connected to a control waveform $\overline{G_1}$ and the output $MF_{X+16}$ from the set of masking gates associated with the bit X+16 of the register $\omega$ is connected to one input of a double input NOR gate 32 the other input of which is connected to a control waveform $\overline{G_2}$. The outputs of gates 30, 31, 32 are connected together to give a first intermediate digit output $FID_X$ and are also connected to one input of a double input NOR gate 33 the other input of which is connected to a control waveform $G_3$. The output $\overline{FID_{X+4}}$ of the set of shift gates associated with the bit X+4 is connected to one input of a double input NOR gate 34 the other input of which is connected to the control waveform $\overline{G_3}$. The outputs of the gates 33 and 34 are connected together to give a second intermediate digit output $SID_X$ and are also connected to one input of a double input NOR gate 35 the other input of which is connected to a control waveform $G_4$. The output $SID_{X+2}$ of the set of shift gates associated with the bit X+2 is connected to one input of a double input NOR gate 36 the other input of which is connected to the control waveform $\overline{G_4}$. The outputs of the gates 35 and 36 are connected together to give a third intermediate digit output $\overline{TID_X}$ and are also connected to one input of a double input NOR gate 37 the other input of which is connected to a control waveform $G_5$. The output $\overline{TID_{X+1}}$ of the set of shift gates associated with the bit X+1 is connected to one input of a double input NOR gate 38 the other input of which is connected to the control waveform $\overline{G_5}$. The outputs of the gates 37 and 38 are connected together to give the masked and shifted output $MS_X$.

The control waveforms $G_3$ to $G_5$ and $\overline{G_0}$ to $\overline{G_5}$ are generated from the shift determining outputs $SD_X$, FIG. 4, and control the gates 30 to 38 to give the required shift. If, for example, a shift of sixteen bits is required, the control waveforms $\overline{G_2}$, $G_3$, $G_4$, $G_5$, are noughts and the remainder are ones. The gates 32, 33, 35 and 37 are therefore open and the gates 30, 31, 34, 36 and 38 are closed. The masked digit from the bit X+16 of the register $\omega$ therefore passes through the open gates of the set of gates associated with the bit X and appears on output $MS_X$ thus being given the required shift. Since the gates 34, 36 and 38 are all closed the intermediate digit outputs $\overline{FID}_X$, $SID_X$, and $\overline{TID}_X$ are not used in carrying out this particular shift. If, however, a shift of fifteen bits is required, the control waveforms $\overline{G_1}$, $\overline{G_3}$, $\overline{G_4}$ and $\overline{G_5}$ are noughts and the remainder are ones. The gates 31, 34, 36 and 38 are therefore open and the gates 30, 32, 33, 35 and 37 are closed. The masked digit from the bit X+15 therefore passes through gate 31 of the gates associated with the bit X+7, is inverted and emerges on the output $\overline{FID}_{X+7}$, passes through gate 34 of the gates associated with the bit X+3, is again inverted and emerges on the output $SID_{X+3}$, passes through gate 36 of the gates associated with the bit X+1, is inverted a third time and emerges on the output $TID_{X+1}$, passes through gate 38 of the gates associated with the bit X, is inverted a fourth time and appears on output $MS_X$ thus being given the required shift. Since the digit has been inverted four times it is in the correct form for entering into the store address register $\phi$ or the internal order control counter J. The output $MS_X$ is connected to the bit X of the store address register $\phi$ or, on the first beat when reading an external order, to the internal order control counter J.

The external order is held in the external order register $\omega$ and in selecting a required field it is therefore not necessary to preserve the whole order when performing the shift necessary to place the required field at the least significant end of the word. The shift therefore is not an end-around shift, i.e., digits shifted beyond bit 0 are not preserved by shifting them into the most significant end of the word. Therefore, the number of outputs from the shifting network is determined by the number of bits of the largest field to be selected and this must always be smaller than the number of bits in the whole word of an external order. Suppose, for example, that the largest field to be selected from an external order has sixteen bits. The number of outputs $MS_X$ required is therefore sixteen and only the sets of gates associated with the sixteen least significant bits need include the gates 37 and 38. The output $\overline{TID}_X$ from the gates 35 and 36 is applied to the gate 38 of the gates associated with the next preceding bit and since only sixteen of the gates 38 are required only the sets of gates associated with the seventeen least significant bits need include the gates 35 and 36. Similarly, the output $SID_X$ is applied to the gate 36 of the gates associated with the next but one preceding bit and since only seventeen of the gates 36 are required only the sets of gates associated with the nineteen least significant bits need include the gates 33 and 34. All sets of gates include the gates 30, 31 and 32, but the inputs $MF_{X+8}$ on the gates 31 associated with bits beyond the sixteenth bit will always be noughts and the inputs $MF_{X+16}$ on the gates 32 associated with bits beyond the eighth bit will always be noughts since there is a total of only twenty-four bits being acted upon. The gates are, however, necessary to interpret the control waveforms. In this manner there is a considerable saving made in the number of gates required to carry out the shifting of the required field.

SHIFT DECODING NETWORK.—FIG. 8

The network for decoding the shift determining outputs $SD_X$, FIG. 4, to generate the control waveforms $G_3$ to $G_5$ and $\overline{G_0}$ to $\overline{G_5}$, FIG. 7, is shown in FIG. 8. The eight shift determining outputs $SD_{16}$, $SD_{17}$, $SD_{18}$, $SD_{19}$, $SD_{20}$, $SD_{21}$, $SD_{22}$ and $SD_{23}$ are applied to the inputs of an eight input NOR gate 41 the output of which gives the control waveform $\overline{G_2}$. The eight shift determining outputs $SD_8$, $SD_9$, $SD_{10}$, $SD_{11}$, $SD_{12}$, $SD_{13}$, $SD_{14}$ and $SD_{15}$ are applied to the inputs of an eight input NOR gate 42 the output of which gives the control waveform $\overline{G_1}$. The output of the gate 41 is also connected to the input of a single input NOR gate 43 and the output of the gate 42 is also connected to the input of a single input NOR gate 44. The outputs of the gates 43 and 44 are connected together and give the control waveform $\overline{G_0}$. The twelve shift determining outputs $SD_4$, $SD_5$, $SD_6$, $SD_7$, $SD_{12}$, $SD_{13}$, $SD_{14}$, $SD_{15}$, $SD_{20}$, $SD_{21}$, $SD_{22}$ and $SD_{23}$ are connected to the inputs of a twelve input NOR gate 45 the output of which gives the control waveform $\overline{G_3}$. The output of the gate 45 is also connected to the input of a single input NOR gate 46 the output of which gives the control waveform $G_3$. The twelve shift determining outputs $SD_2$, $SD_3$, $SD_6$, $SD_7$, $SD_{10}$, $SD_{11}$, $SD_{14}$, $SD_{15}$, $SD_{18}$, $SD_{19}$, $SD_{22}$ and $SD_{23}$ are connected to the inputs of a twelve input NOR gate 47 the output of which gives the control waveform $\overline{G_4}$. The output of the gate 47 is also connected to the input of a single input NOR gate 48 the output of which gives the control waveform $G_4$. The twelve shift determining outputs $SD_1$, $SD_3$, $SD_5$, $SD_7$, $SD_9$, $SD_{11}$, $SD_{13}$, $SD_{15}$, $SD_{17}$, $SD_{19}$, $SD_{21}$ and $SD_{23}$ are connected to the inputs of a twelve input NOR gate 49 the output of which gives the control waveform $\overline{G_5}$. The output of the gate 49 is also connected to the input of a single input NOR gate 50 the output of which gives the control waveform $G_5$.

If a shift of sixteen bits is required the shift determining output $SD_{16}$ is a one and the remainder of the shift determining outputs are noughts. The shift determining output $SD_{16}$ is only applied to the gate 41 and the output from this gate is a nought, the outputs from gates 42, 45, 47 and 49 all being ones. The control waveforms $\overline{G_2}$, $G_3$, $G_4$ and $G_5$ are therefore noughts and the remaining control waveforms are ones and the gates of the shifting network are therefore controlled to cause a shift of sixteen bits as described above.

If a shift of fifteen bits is required the shift determining output $SD_{15}$ is a one and the remainder of the shift determining outputs are noughts. The shift determining output $SD_{15}$ is applied to the gates 42, 45, 47 and 49 and the outputs from these gates are all noughts, the output from the gate 41 being a one. The control waveforms $\overline{G_1}$, $\overline{G_3}$, $\overline{G_4}$ and $\overline{G_5}$ are therefore noughts and the remaining control waveforms are ones and the gates of the shifting network are therefore controlled to cause a shift of fifteen bits as described above.

REDUCED FIELD SELECTOR SYSTEM.—FIGS. 9 TO 12

The field selector system and the shift network so far described give the facility of selecting any one of four fields and shifting it to the least significant end of the word. The fields may be of any length provided the total length of the four fields does not exceed twenty-four bits in the system described. The computer is therefore capable of operating with external orders written in any twenty-four bit machine code. This general capability, however, is often not necessary and in practical use a computer may be required that will operate with external orders written in one of a restricted range of machine codes. In such cases considerable savings can be made in the field selector system by examining the machine codes with which the computer will be required to operate.

FIG. 9 shows the field breakdown of five different twenty-four bit machine codes. These are the Ferranti F 1600 machine code having four fields, the Ferranti Argus machine code having four fields, the Ferranti Apollo machine code having three fields (the shaded bit in the Apollo format is a spare bit but for the present purposes it is regarded as a bit of the adjacent two-bit field and field 1 is therefore considered to have three bits), the I.C.T. 1900 machine code having four fields and the English Electric Leo Marconi Myriad machine code having three fields. An examination of the field boundaries of these five machine codes reveals that the twenty-four bits may be broken down into eight zones A to H having varying numbers of bits and any field in any of the machine codes shown may then be defined by reference to these eight zones. The lower part of FIG. 9 shows the field breakdowns of the five machine codes by reference to these eight zones. Thus, for example, in the I.C.T. 1900 machine code field 1 having three bits is defined by zone A, field 0 having seven bits is defined by zones B, C and D, field 3 having two bits is defined by zone E, and field 2 having twelve bits is defined by zones F, G and H.

Having now defined the fields by means of eight zones the two twenty-four bit registers $\theta_0$ and $\theta_1$ shown in FIGS. 2 and 3 may be replaced by two eight bit registers $R\theta_0$ and $R\theta_1$. These are shown in FIG. 10 and are again set to read the I.C.T. 1900 machine code. The register $R\theta_0$ has bits 0 to 2 and 4 to 6 set to noughts and bits 3 and 7 set to ones, and the register $R\theta_1$ has bits 0 to 3 set to ones and bits 4 to 7 set to noughts. The four fields are uniquely defined by reference to the digit states of the registers $R\theta_0$ and $R\theta_1$ in the same manner as they were by reference to the digit states of the register $\theta_0$ and $\theta_1$.

The masking of the fields may now be carried out by the use of eight sets of the gates 15 to 18 and 20 and 21 shown in FIG. 4 but there must still be twenty-four of the gates 19 and 23 for masking the digits from the external order register and from the store output register 22, FIG. 6. Therefore the common output from each set of gates 15 to 18 must be decoded before application to the gates 19 and 23. This is achieved by means of a wiring plug shown in FIG. 11. The plug 55, which may conveniently be located in the back-wiring of the computer, have eight input terminals 0 to 7 and twenty-four output terminals 0 to 23. The input terminal 0 is connected to the output terminals 0 to 5, the input terminal 1 is connected to the output terminals 6 to 10, the input terminal 2 is connected to the output terminal 11, the input terminal 3 is connected to the output terminals 12 and 13, the input terminal 4 is connected to the output terminal 14, the input terminal 5 is connected to the output terminal 15, the input terminal 6 is connected to the output terminals 16 to 20, and the input terminal 7 is connected to the output terminals 21 to 23. The outputs from the eight sets of masking gates 15 to 18, FIG. 4, are applied to the input terminals 0 to 7 of the plug 55 and the output terminals thereof are connected to the $M_X$ inputs to the gates 19 and 23, FIG. 6.

Similarly, the shift determining output is detected by the eight gates 21 and although these outputs are derived from the eight bit registers $R\theta_0$ and $R\theta_1$ they correspond directly to the required shift determining outputs. Thus the output derived from bit 1 denotes a shift of six places and corresponds to $SD_6$, the output derived from bit 2 denotes a shift of eleven places and corresponds to $SD_{11}$, the output derived from bit 3 denotes a shift of twelve places and corresponds to $SD_{12}$, the output derived from bit 4 denotes a shift of fourteen places and corresponds to $SD_{14}$, the output derived from bit 5 denotes a shift of fifteen places and corresponds to $SD_{15}$, the output from bit 6 denotes a shift of sixteen places and corresponds to $SD_{16}$, and the output from bit 7 denotes a shift of twenty-one places and corresponds to $SD_{21}$.

The shift determining outputs from the seven gates 21, FIG. 4 may be connected directly to the appropriate ones of the decoding gates 41, 42, 45, 47 and 49, FIG. 8 but in this case the gate 41 need only have two inputs $SD_{16}$ and $SD_{21}$, the gate 42 need only have four inputs $SD_{11}$, $SD_{12}$, $SD_{14}$ and $SD_{15}$, the gate 45 need only have five inputs $SD_6$, $SD_{12}$, $SD_{14}$, $SD_{15}$ and $SD_{21}$, the gate 47 need only have four inputs $SD_6$, $SD_{11}$, $SD_{14}$ and $SD_{15}$, and the gate 49 need only have three inputs $SD_{11}$, $SD_{15}$ and $SD_{21}$. Alternatively the decoding gates 41, 42, 45, 47 and 49 may have the number of inputs shown in FIG. 8 and the shift determining outputs from the seven gates 21, FIG. 4 may be connected to these gates by means of a further wiring plug shown in FIG. 12. The plug 56, which may also conveniently be located in the back-wiring of the computer has seven input terminals 1 to 7 (there is no requirement for an input terminal for bit 0 since a field defined by this bit does not require any shift), two sets of eight output terminals for connecting to the inputs of gates 41 and 42 and three sets of twelve output terminals for connecting to the inputs of gates 45, 47 and 49. The input terminal 1 is connected to output terminals to gates 45 and 47, the input terminal 2 is connected to output terminals to gates 42, 47 and 49, the input terminal 3 is connected to output terminals to gates 42 and 45, the input terminal 4 is connected to output terminals to gates 42, 45 and 47, the input terminal 5 is connected to output terminals to gates 42, 45, 47 and 49, the input terminal 6 is connected to an output terminal to gate 41, and the input terminal 7 is connected to output terminals to gates 41, 45 and 49. In this way the shift determining outputs are applied to the correct decoding gates to cause the required shift in the manner described above.

This alternative method of connecting the shift determining outputs to the decoding gates via a wiring plug has the advantage that if the computer is required to operate with a different range of machine modes the computer can be modified simply by replacing the plugs 55 and 56 with new plugs appropriately connected provided that the field boundaries of the new range of machine codes can be defined by means of eight zones in the manner described with reference to FIG. 9.

It is possible to make further savings in the field selector system. In both twenty-four bit register $\theta_1$ and the eight bit register $R\theta_1$ the first and last bits may be omitted since these are always set to one and nought respectively. This not only saves two bits on the register but also saves two gates in the masking gates since in the case of the first bit which is always set to a one the gate 17, FIG. 4, may be omitted since this gate would always be closed by a one input, and in the case of the last bit which is always set to a nought the inverse output would always be a one and the gate 18 may be omitted since this gate also would always be closed. For a computer required to operate with the particular range of machine codes shown in FIG. 9 the first two and the last two bits of the register $R\theta_1$ could be omitted since these will always be set to ones and noughts respectively and the register $R\theta_1$ would then become a four bit register with a saving of two each of the gates 17 and 18, FIG. 4. It is also possible, as will be described later, to replace the register $R\theta_1$ by logical networks.

The computer shown in FIG. 1 is a simplified machine in which the field selector system and shift network have been shown as separate items. This has been done to show clearly the methods used and the reasons for the field selector system and the shift network. To some extent the computer shown in FIG. 1 is a hypothetical machine and the control logic 6 will therefore not be described in detail. It is possible to provide a computer in which an important saving is achieved by arranging that one piece of equipment will carry out the functions shown as being carried out by two or more pieces of equipment in FIG. 1. Such a computer will now be described.

GENERAL DESCRIPTION.—FIG. 13

Referring now to FIG. 13 of the drawings the computer shown is again a parallel machine for operating with words of twenty-four bit length.

The computer includes a main store 61 having outputs connected to the main highways HWB and HWC feeding into a combined function and field selector unit 62. The unit 62 has an output highway feeding into the main store 61, a twenty-four bit self shifting register $\beta$, a twenty-four bit register $\omega_1$, a twenty-four bit accumulator $\alpha_1$, a sixteen-bit counter $C_1$, and three eight-bit registers E, A and J. Of the twenty-four bits of the highway feeding the registers E, A, and J the eight most significant bits, bits 16 to 23, are connected to the register E, the next eight bits, bits 8 to 15, are connected to the register A, and the eight least significant bits, bits 0 to 7, are connected to the register J. The output of the main store 61 is also connected to a function unit by-pass highway FUBP which is connected into the main output highway from the unit 62. The outputs from the registers $\beta$ and $\omega_1$ are connected to the highway HWB and the output from the accumulator $\alpha_1$ is connected to the highway HWC. The eight most significant bits of the register $\beta$ are connected to a further input to the unit 62 and the sixteen least significant bits of the register $\beta$ are connected to the sixteen-bit address input of the main store 61 to which are also connected the sixteen bits of the counter $C_1$. The eight least significant bits of the address input of the main store 61 are also connected to the output of registers E and J. The outputs of the registers A and J are also connected to the input to the register E, to which is also connected an external input. The output of the register E is connected to the input to a set of control logic 63. The output of the control logic is connected to a further input to the function and field selector unit 62. The unit 62 has a further output connected to the sixteen least significant bits of the register $\beta$ and to the input of the eight bit register J.

In the computer shown in FIG. 13 the register $\beta$ performs the functions of the registers 4, $\phi$ and $\theta_0$ shown in FIGS. 1 and 2, the function of the register $\theta_1$ shown in FIG. 2 being performed by the control logic 63, the register $\omega_1$ performs the functions of the registers 3 and $\omega$ shown in FIG. 1, and the registers E, A and J perform the functions of the register $q$ and the counter J shown in FIG. 1.

The operation of the computer shown in FIG. 13 will now be described with reference to the carrying out of a single external order having four fields X, F, M and N. The carrying out of this single external order is assumed to require the following four steps:

(1) Decrease by one the contents of the address held in the modifier field M.

(2) Load the accumulator $\alpha_1$ with the contents of the store held at the address defined in the field X.

(3) Increase by one the contents of the store held at the address defined in the field X.

(4) Perform a logical AND operation between the contents of the store held at the address defined in the field N and the contents of the accumulator $\alpha_1$, the result being written into the store at address N.

These four steps may be written:

(1) $m'=m-1$
(2) $\alpha'_1=x$
(3) $x'=x+1$
(4) $n'=n$ and $\alpha_1$

The order is carried out in the following manner. On the first main beat the external order is read from the main store at the address contained in the external order control counter $C_1$. With this machine the orders are defined by three K bits giving eight types of order. These are:

| | |
|---|---|
| K=0 | Operands and external orders causing interrupt before being obeyed. |
| K=1 | Normal external orders. |
| K=2 | Internal order. |
| K=3 | Internal order indicating termination of the internal routine. |
| K=4 to 7 | Equivalent forms, to be discussed later. |

For the external order $K=1$ and this causes the external order to be entered into the external order register $\omega_1$. The number of bits in the function field F of the external order is defined in the function and field selector unit 62 and whilst the external order is en route from the main store 61 to the register $\omega_1$ the function field is selected and placed at the least significant end of the register $\beta$.

On the second main beat the first internal order is read from the main store 61 at the address now contained in the register $\beta$. This first internal order is defined by $K=2$ and comprises two eight-bit character orders and an eight-bit jump address at which the next internal order will be found. With $K=2$ the first and second character orders are read into the registers E and A respectively and the eight-bit jump address is read into the register J. Whilst the first internal order is en route to the registers E, A, and J the address field of the first character order is examined by the control logic 63 and this results in the selection of the M field of the external order as the address of the first operand required by the order. The M field is selected by the unit 62 and placed at the least significant end of the register $\beta$ destroying the function field placed there during the first beat.

On the third main beat the function field of the first character order held in the register E is examined. The register E is an executive register and it is the contents of this register which control the operation of the function and field selector unit 62. The function field of the first character order causes the contents of the store at the address now held in the register $\beta$ to be decreased by one, i.e., $m'=m-1$, this operation being carried out by the unit 62. Also on the third beat the address field of the second character order contained in the register A is examined. This requires the selection of the X field of the external order as the address of the next operand. During this beat, however, the unit 62 is performing the function $m'=m-1$ and the unit 62 is therefore not available for performing a field selection operation. Therefore, when the unit 62 has completed the functional operation an additional subsidiary beat is introduced to permit the performance of the field selection operation. On this subsidiary beat the X field of the external order is selected and placed in the least significant end of the register $\beta$ and the contents of the register A are transferred to the executive register E. The subsidiary beat does not involve a store cycle and may therefore be shorter than the main beats. With present day stores, for example, the subsidiary beat may take only one third of the time taken by a main beat.

On the fourth main beat the function field of the second character order held in the executive register E is examined and this causes the contents of the store at the address now contained in the register $\beta$ to be entered into the accumulator $\alpha_1$, i.e., $\alpha_1'=x$.

On the fifth main beat the second internal order is read from the main store 61 at the jump address contained in the register J. This second internal order is defined by $K=3$ and comprises three eight-bit character orders of which the third is a dummy since only two more characters are required to complete the interpretation of the external order. With $K=3$ the first, second and third character orders are read into the registers E, A and J respectively. Whilst the second internal order is en route to the registers E, A and J the address field of the first character order is examined by the control logic 63 and this results in the selection of the X field of the external order as the address of the next operand required. The X field is selected by the unit 62 and placed at the least significant end of the register $\beta$.

On the sixth main beat the function field of the character order held in the register E is examined. This causes the contents of the store at the address X now held in the register $\beta$ to be increased by one, i.e., $x'=x+1$, this operation being carried out by the unit 62. Also on the sixth beat the address field of the next character order contained in the register A is examined. This requires the selection of the N field of the external order as the address of the next operand. A further subsidiary beat is therefore introduced by the control logic and on the subsidiary beat the N field of the external order is selected and placed in the least significant end of the register $\beta$ and the contents of the register A are transferred to the executive register E.

On the seventh main beat the function field of the character order now held in the register E is examined. This causes the performance of a logical AND operation between the contents of the store at the address N now held in the register $\beta$ and the contents of the accumulator $a_1$, the result being written into the store at the address N, i.e., $n'=n$ and $a_1$, this operation being carried out by the unit 62. Also on the seventh beat the address field of the next character order contained in the register J is examined and it is found that this character order is a dummy. This, together with the detection of $K=3$ signifies the end of the internal routine and at the completion of the seventh main beat the computer is ready to read the next external order.

Having described the general construction and operation of the computer shown in FIG. 13 the internal order code and the internal orders for the computer will now be briefly described before proceeding with the detailed description of the computer.

INTERNAL ORDER CODE AND INTERNAL ORDERS.—FIG. 14

The internal character orders consist of eights bits of which the four least significant bits are address bits and the four most significant bits are function bits. For normal internal orders defined by $K=2$ bits sixteen to twenty-three and bits eight to fifteen represent the first and second character orders respectively and bits nought to seven represent an eight bit jump address at which the next internal order is located in the main store 61. This kind of order is shown at A in FIG. 14. For internal orders defined by $K=3$ indicating the termination of the internal routine no jump address is required and bits nought to seven represent a third character order as shown at B in FIG. 14. Other types of orders are the equivalent forms defined by $K=4$ to 7. As an example of this type of order an equivalent form defined by $K=4$ is shown at C in FIG. 14 in which bits sixteen to twenty-three represent a first character order and bits nought to fifteen represent the store address of an operand.

A single character order is shown at D in FIG. 14. The four function bits of each character order define sixteen functions which the computer may carry out. These functions are predetermined and may include such functions as Null, Addition, Subtraction, Equivalence, Non-equivalence, Logical AND, Logical NOT AND, Logical OR, Increment, Decrement and TEST.

Of the four address bits of each character order the most significant bit determines whether the address is direct or indirect. If bit three of the character order contains a one a direct address is indicated and the address is the three bit address represented by bits nought one and two of the character order. If bit three of the character order contains a nought, however, an indirect address is indicated and the address is derived from the fourteen least significant bits of the register $\beta$ the contents of which may be determined by bits nought and one of the character order which are used in selecting a desired field from the external order for entering into the register $\beta$.

Having described the general construction and operation of the computer shown in FIG. 13 and having briefly described the internal order code and internal orders, the detailed construction and operation of the computer will now be described.

DETAILED DESCRIPTION.—FIGS. 15 to 51: FUNCTION UNIT.—FIG. 15

FIG. 15 shows the function unit set of gates associated with the bit X of the twenty-four bits. The complete function unit includes twenty-four such sets of gates. The set of gates shown includes a double input NOR gate 71 having one input connected to the inverse output of the bit X of the register $\omega_1$ and the other input connected to a control input $\omega/\overline{HWB}$ which controls the entry of the output from the register $\omega_1$ onto the highway HWB. The inverse output of the bit X of the register $\beta$ is connected to one input of a double input NOR gate 72 the other input of which is connected to a control input $\beta/\overline{HWB}$ which controls the entry of the output from the register $\beta$ onto the highway HWB. The inverse output $\overline{St}_X$ from the bit X of the store output from the main store 61, FIG. 13, is connected to one input of a double input NOR gate 73 and to one input of a double input NOR gate 74. The second input to the gate 73 is connected to a control input $\overline{St/HWB}$ which controls the entry of the output from the main store onto the highway HWB, and the second input to the gate 74 is connected to a control input $\overline{St/HWC}$ which controls the entry of the output from the main store onto the highway HWC. The inverse output of the bit X of the accumulator $\alpha_1$ is connected to one input of a double input NOR gate 75 the other input of which is connected to a control input $\alpha/\overline{HWC}$ which controls the entry of the output from the accumulator $\alpha_1$ onto the highway HWC.

The outputs from the gates 71, 72 and 73 are connected together and to the line $HWB_X$ for carrying the bit X on the highway HWB. Similarly, the outputs from the gates 74 and 75 are connected together and to the line $HWC_X$ for carrying the bit X on the highway HWC. The line $HWB_X$ is connected to one input of each of three NOR gates 76, 77 and 78, and the line $HWC_X$ is connected to a second input to the gate 76 and to one input of a double input NOR gate 79. The gate 76 is a triple entry gate and the third input is connected to a control input $\overline{ADD}$ which is used to control the adding function of the unit. The gate 77 is also a triple entry gate and the second input of this gate is connected to a control input $\overline{SUB}$ which is used to control the subtracting function of the unit. The third input of the gate 77 is connected to the inverse output of the bit X of the accumulator $\alpha_1$ which is also connected to one input of a double input NOR gate 80 the other input of which is connected to a control input $\alpha/\overline{FU}$. The gate 78 is a double input gate and the other input is connected to a control input $\overline{HWB/FU}$. The gate 79 is also a double input gate and the other input is connected to a control input $\overline{HWC/FU}$. The line $HWB_{X+8}$ from the set of function unit gates associated with the bit X+8 is connected to one input of a double input NOR gate 81 the other input of which is connected to a control input $\overline{HWB8D/FU}$ which is used in shifting a bit eight places down towards the least significant end of a word. The function unit is required to carry out end-around shifts and therefore the line $HWB_7$ associated with bit number seven is connected to one input of the gate 81 of the set of gates associated with bit number twenty-three, the line $HWB_6$ associated with bit number six is connected to one input of the gate 81 of the set of gates associated with bit number twenty-two, and so on. Similarly the line $HWB_{X+16}$ from the set of function unit gates associated with the bit X+16 is connected to one input of a double input NOR gate 82 the other input of which is connected to a control input $\overline{HWB16D/FU}$ which is used in shifting a bit sixteen places down towards the least significant end of a word.

The outputs of the gates 78 to 82 are connected together to give an output $\overline{BcC}_X$ used in the carry network to be described and are also connected to one input of a double input NOR gate 83 the other input of which is connected to a control input $\overline{Sh0D}$ which is used for shift control. A further double input NOR gate 84 has one input connected to the output $\overline{BcC}_{X+4}$ from the gates 78 to 82 of the set of gates associated with the bit $X+4$ and the other input connected to a control input $\overline{Sh4D}$ which is also used for shift control. The outputs of the gates 83 and 84 are connected together to give an output $AdjC_X$ and are also connected to one input of a five-input NOR gate 85 and to one input of a four-input NOR gate 86. The second input of the gate 85 is connected to a control input $\overline{G_{11}}$ which is used for shift control. The third input of the gate 85 is connected to an output $C_{TOX}$ derived from the carry network and this output is also connected to one input of a four-input NOR gate 87. The fourth input of the gate 85 is connected to the output $AdjC_{X-1}$ from the gates 83 and 84 of the set of gates associated with the bit $X-1$ and this output is also connected to a second input of the gate 87. The output of the gate 85 is connected to a second input of the gate 86 and to the third input of the gate 87, the fourth input of which is connected to a control input $\overline{G_{12}}$ which is used for shift control.

The outputs of the gates 76 and 77 are connected together to give an output $InC_X$ which is used in the carry network and are also connected to the fifth input of the gate 85 and to the third input of the gate 86, the fourth input of which is connected to a control input $\overline{G_{10}}$ which is used for shift control.

The outputs of the gates 86 and 87 are connected together to give an output $\overline{A}_X$ and are also connected to one input of a double input NOR gate 88 the other input of which is connected to a control input $\overline{FUOP}$ which is used to control the output of the function unit. The output $\overline{A}_{X-1}$ from the gates 86 and 87 of the set of gates associated with the bit X−1 is connected to one input of a double input NOR gate 89 the other input of which is connected to a control input $\overline{FUOP1U}$ which is used for shifting the output of the function unit one place up towards the most significant end of the word. Similarly the output $\overline{A}_{X+2}$ from the gates 86 and 87 of the set of gates associated with the bit X+2 is connected to one input of a double input NOR gate 90 the other input of which is connected to a control input $\overline{FUOP2D}$ which is used for shifting the output of the function unit two places down towards the least significant end of the word. A further double input NOR gate 91 has one input connected to the inverse output $St_X$ from the bit X of the main store output and the other input connected to a control input $\overline{ByP}$ which is used when the output from the main store is required to by-pass the function unit. The outputs of the gates 88 to 91 are connected together to give an output $FU_X$ and this output is connected directly to the inputs to the bit X and via a single input NOR gate 92 to the inverse inputs to the bit X of the accumulator $\alpha_1$ and the register $\omega_1$. The register $\beta$ has separate inputs to be described later.

The function unit shown in FIG. 15 has associated with it a fast carry circuit shown in FIGS. 16 to 24. For the fast carry circuit the twenty-four bits are divided into six blocks of four bits, the blocks being numbered from nought to five. Throughout the description of the fast carry circuit the bit X refers to the first bit in a block and the bit X is therefore one of the bits nought, four, eight, twelve, sixteen or twenty. Each of blocks 0 to 4 includes a set of gates, shown in FIG. 16, for determining whether a carry digit is to pass out of the block, no such set of gates being required for block 5. This set of gates includes four NOR gates 101, 102, 103 and 104. The gate 101 is a single input gate having its input connected to the output $\overline{BcC}_{X+3}$ from the function unit. The gate 102 is a double input gate having its inputs respectively connected to the function unit outputs $InC_{X+3}$ and $\overline{BcC}_{X+2}$. The gate 103 is a triple input gate having its inputs respectively connected to the function unit outputs $InC_{X+3}$, $InC_{X+2}$; and $\overline{BcC}_{X+1}$. The gate 104 is a four-input gate having its inputs respectively connected to the function unit inputs $InC_{X+3}$, $InC_{X+2}$, $\overline{InC}_{X+1}$ and $\overline{BcC}_X$. The outputs from the gates 101 to 104 are connected together to give an output $COB_Y$. Block 0, in addition to the gates 101 to 104, includes a five-input NOR gate 105 having its output connected to the outputs of gates 101 to 104 and having its inputs respectively connected to the function unit inputs $InC_{X+3}$, $InC_{X+2}$, $\overline{InC}_{X+1}$ $InC_{X+1}$, $InC_X$ and a control input $\overline{I/A_0}$ which is used in carrying out subtractions.

The rules for carry digits are as follows. If two ones are to be added a carry digit is generated and the function unit output $\overline{BcC}_X$ is a nought signifying the beginning of a carry digit. If a one and a nought are to be added a carry digit is not generated and the output $\overline{BcC}_X$ is a one but if a carry digit is presented in addition to the one and the nought the carry digit will be propagated and will not be absorbed. If two noughts are to be added a carry digit is not generated and the output $\overline{BcC}_X$ is again a one and if a carry digit is presented in addition to the two noughts the carry digit will be absorbed and the function unit output $InC_X$ will be a one signifying that any carry digit presented is to be inhibited from further propagation.

Figure 16:
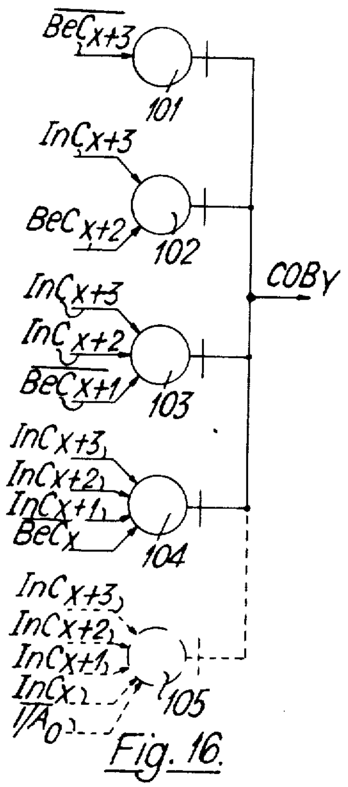

Therefore in FIG. 16 the output $COB_Y$ will be a one signifying that a carry digit is to pass out of block Y if the output from any one of the gates 101 to 104 is a one. For example, if two ones are to be added on bit X the function unit output $\overline{BcC}_X$ will be a nought. If at the same time there are not two noughts to be added on any of bits X+1, X+2 and X+3 the function unit outputs $InC_{X+1}$, $InC_{X+2}$ and $InC_{X+3}$ will all be noughts and the output from gate 104 and therefore the output $COB_Y$ will be a one. If, however, there are two noughts to be added on bit X+2, for example, the function unit outputs $InC_{X+2}$ and $\overline{BcC}_{X+2}$ will both be ones and the outputs from gates 102, 103 and 104 will all be noughts. The output $COB_Y$ will then depend on what digits are to be added on bit X+3. If these are two ones the output $COB_Y$ will be a one but otherwise the output $COB_Y$ will be a nought.

Figure 17:
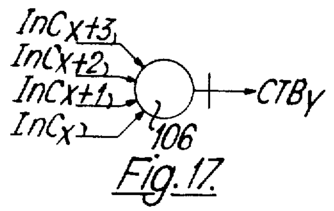

Each of blocks 1 to 4 includes a four-input NOR gate 106, FIG. 17 for determining whether a carry digit presented to the input of the block will pass through the block or not. The four inputs of the gate 106 are respectively connected to the function unit outputs $InC_{X+3}$, $InC_{X+2}$, $InC_{X+1}$ and $InC_X$ and the gate 106 has an output $CTB_Y$.

If there are not two noughts to be added on any digit within the block all of the inputs to the gate 106 will be noughts and the output $CTB_Y$ will be a one signifying that a carry digit presented to the input to the block will be carried through the block. If, however, there are two noughts to be added on any digit within the block one of the inputs to the gate 106 will be a one and the output $CTB_Y$ will be a nought signifying that a carry digit presented to the input of the block will be absorbed within the block.

Each of blocks 1 to 5 also includes one or more gates for determining whether there is a carry input into the block. The carry input into block 1 is determined by a single input NOR gate 107, FIG. 18, having its input connected to the output $COB_0$ from block 0 and having an output $\overline{CIB_1}$. If the output $COB_0$ from the block 0 is a one the output $\overline{CIB_1}$ is a nought signifying that there is a carry input into block 1. If, however, the output $COB_0$ from block 0 is a nought the output $\overline{CIB_1}$ is a one signifying that there is no carry input into block 1.

Figure 19:
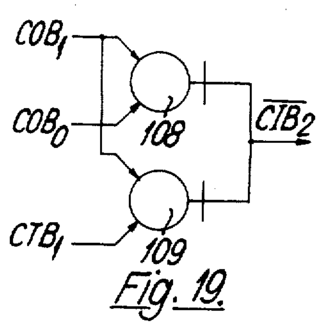

The carry input into block 2 is determined by two NOR gates 108 and 109, FIG. 19. The gate 108 has two inputs respectively connected to the output $COB_1$ from block 1 and $COB_0$ from block 0, and the gate 109 has two inputs respectively connected to the outputs $COB_1$ and $CTB_1$ from block 1. The outputs of the gates 108 and 109 are connected together to give an output $\overline{CIB_2}$.

If the output $COB_1$ from block 1 or the output $COB_0$ from block 0 together with the output $CTB_1$ from block 1 are both ones the output $\overline{CIB_2}$ is a nought signifying that there is a carry input into block 2. If, however, the output $COB_0$ is a one but the outputs $COB_1$ and $CTB_1$ are both noughts the output from the gate 109, and therefore the output $\overline{CIB_2}$, is a one signifying that there is no carry input into block 2, the carry out of block 1 having been absorbed in block 2.

Figure 20:
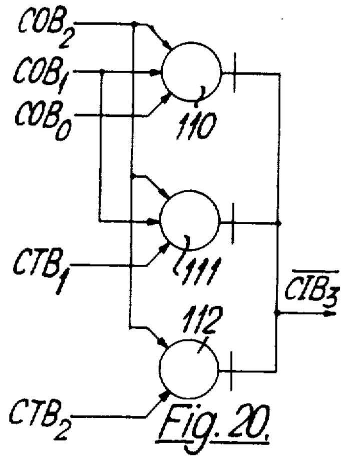

The carry input into block 3 is determined by three NOR gates 110, 111 and 112, FIG. 20. The gate 110 has three inputs respectively connected to the outputs $COB_2$, $COB_1$ and $COB_0$. The gate 111 has three inputs respectively connected to the outputs $COB_2$, $COB_1$ and $CTB_1$, and the gate 112 has two inputs respectively connected to the outputs $COB_2$ and $CTB_2$. The outputs of the gates 110, 111 and 112, are connected together to give an output $\overline{CIB_3}$.

If the output $COB_2$ from block 2 is a one the output $\overline{CIB_3}$ is a nought signifying that there is a carry input into block 3. If the output $COB_1$ from block 1 is a one and the output $COB_2$ is a nought, the output $CTB_2$ from block 2 must be a one for $\overline{CIB_3}$ to be a nought. If the output $CTB_2$ is a nought the output from the gate 112, and therefore the output $\overline{CIB_3}$, is a one signifying that there is no carry input into block 3. Similarly, if the output $COB_0$ from block 0 is a one but the outputs $COB_1$ and $COB_2$ are both noughts the outputs $CTB_1$ and $CTB_2$ must be ones for the output $\overline{CIB_3}$ to be a nought.

Figure 21:
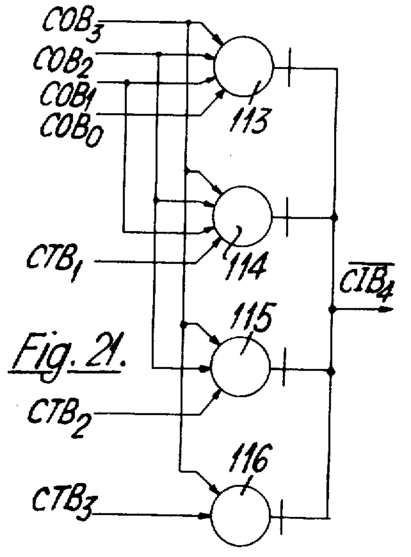

The carry input into block 4 is determined by four NOR gates 113, 114, 115 and 116, FIG. 21. The gate 113 has four inputs respectively connected to the outputs $COB_3$, $COB_2$, $COB_1$ and $COB_0$. The gate 114 has four inputs respectively connected to the outputs $COB_3$, $COB_2$, $COB_1$ and $CTB_1$. The gate 115 has three inputs respectively connected to the outputs $COB_3$, $COB_2$ and $CTB_2$ and the gate 116 has two inputs respectively connected to the outputs $COB_3$ and $CTB_3$. The outputs of the gates 113 to 116 are connected together to give an output $\overline{CIB_4}$.

If the output $COB_3$ from block 3 is a one the output $\overline{CIB_4}$ is a nought signifying that there is a carry input into block 4. If the output $COB_2$ from block 2 is a one and the output $COB_3$ is a nought, the output $CTB_3$ must be a one for the output $\overline{CIB_4}$ to be a nought. Similarly, if the output $COB_0$ or $COB_1$ is a one and the output $COB_Y$ from each higher numbered block is a nought, the output $CTB_Y$ from each higher numbered block must be a one for the output $\overline{CIB_4}$ to be a nought otherwise the output $\overline{CIB_4}$ will be a one signifying that there is no carry input into block 4.

Figures 22, 23, 24:
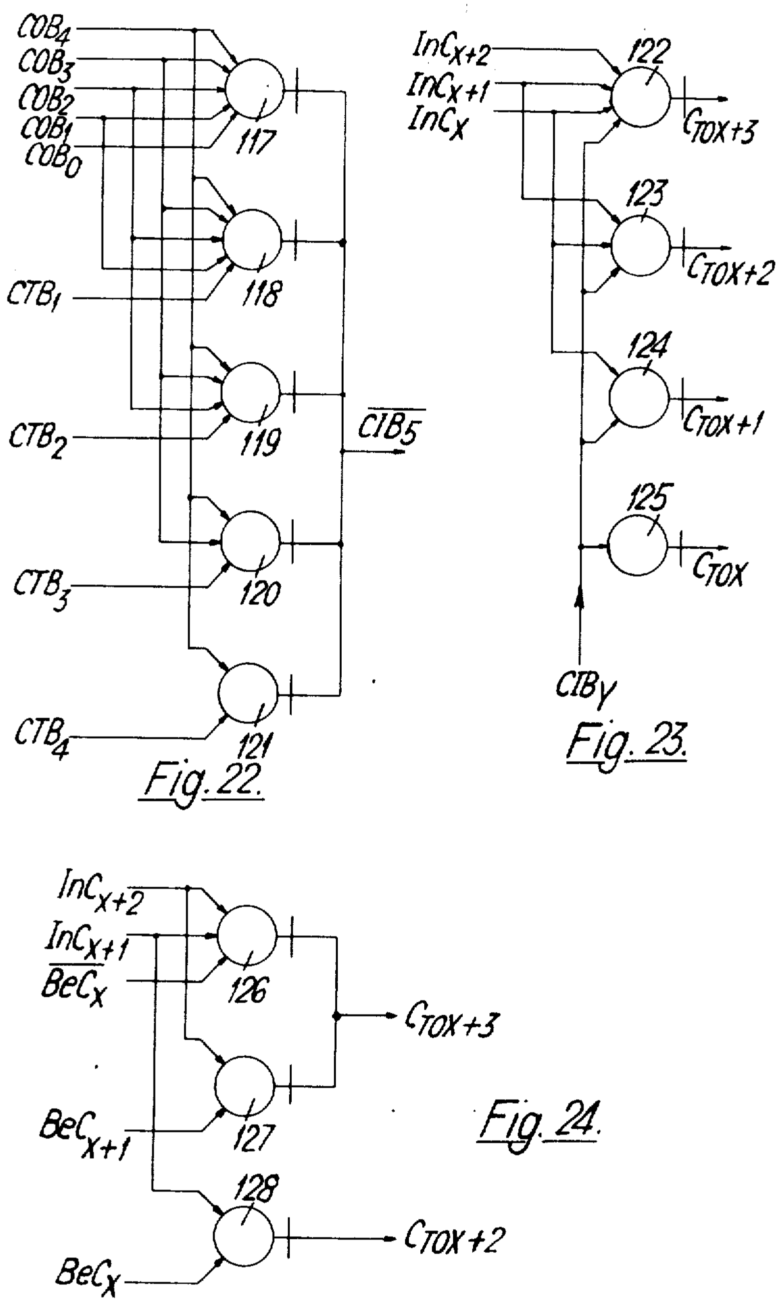

The carry input into block 5 is determined by five NOR gates 117, 118, 119, 120 and 121, FIG. 22. The gate 117 has five inputs respectively connected to the outputs $COB_4$, $COB_3$, $COB_2$, $COB_1$ and $COB_0$. The gate 118 has five inputs respectively connected to the outputs $COB_4$, $COB_3$, $COB_2$, $COB_1$ and $CTB_1$. The gate 119 has four inputs respectively connected to the outputs $COB_4$, $COB_3$, $COB_2$ and $CTB_2$. The gate 120 has three inputs respectively connected to the outputs $COB_4$, $COB_3$ and $CTB_3$ and the gate 121 has two inputs respectively connected to the outputs $COB_4$ and $CTB_4$. The outputs of the gates 117 to 121 are connected together to give an output $\overline{CIB_5}$.

If the output $COB_4$ from block 4 is a one the output $\overline{CIB_5}$ will be a 0 signifying that there is a carry input into block 5. If, however, one of the outputs $COB_3$, $COB_2$, $COB_1$ or $COB_0$ is a one and the output $COB_Y$ of each higher numbered block is a nought, the output $CTB_Y$ from each higher numbered block must be a one for the output $\overline{CIB_5}$ to be a nought otherwise the output $\overline{CIB_5}$ will be a one signifying that there is no carry input into block 5.

Each of blocks 0 to 5 also includes a set of gates, shown in FIG. 23, for determining to which of the four digits within the block a carry input shall be applied when there is a carry input into the block. This set of gates includes four NOR gates 122, 123, 124 and 125. The gate 122 has four inputs respectively connected to the function unit outputs $InC_{X+2}$, $InC_{X+1}$ and $InC_X$ and to carry input into the block $\overline{CIB_Y}$. The gate 123 has three inputs respectively connected to the outputs $InC_{X+1}$ and $InC_X$ and the input $\overline{CIB_Y}$. The gate 124 has two inputs respectively connected to the output $InC_X$ and the input $\overline{CIB_Y}$, and the gate 125 has a single input connected to the input $\overline{CIB_Y}$. For block 0 the input $\overline{CIB_Y}$ is the input $\overline{I/A_0}$.

If the function unit outputs $InC_X$, $InC_{X+1}$ and $InC_{X+2}$ are all ones the gates 122, 123 and 124 are all closed and the only carry output is $C_{TOX}$ from gate 125 which is applied to the first digit X of the block. If, however, the output $InC_X$ is a nought the gate 124 is opened and carry inputs are applied to the digits X and X+1, if the outputs $InC_X$ and $InC_{X+1}$ are both noughts the gates 123 and 124 are opened and carry inputs are applied to the digits X, X+1 and X+2, and if the outputs $InC_X$, $InC_{X+1}$ and $InC_{X+2}$ are all noughts the gates 122, 123 and 124 are opened and carry inputs are applied to all four digits in the block. It should be noted that if $InC_X$ is a one the gates 122, 123 and 124 are all closed even though one or both of the outputs $InC_{X+1}$ and $InC_{X+2}$ are noughts. Similarly, if the output $InC_X$ is a nought and if the output $InC_{X+1}$ is a one the gates 122 and 123 are both closed even if the output $InC_{X+2}$ is a nought.

Finally, each of blocks 0 to 5 also includes a set of gates, shown in FIG. 24, to determine what happens to a carry input generated within the block but which does not pass out of the block. This set of gates includes three NOR gates 126, 127 and 128. The gate 126 has three inputs respectively connected to the function unit outputs $InC_{X+2}$, $InC_{X+1}$ and $\overline{BeC_X}$. The gate 127 has two inputs respectively connected to the function unit outputs $InC_{X+2}$ and $\overline{BeC_{X+1}}$. The outputs of the gates 126 and 127 are connected together to give an output $C_{TOX+3}$. The gate 128 has two inputs respectively connected to the function unit outputs $InC_{X+1}$ and $\overline{BeC_X}$ and the output of the gate 128 gives an output $C_{TOX+2}$.

If there is a carry generated by bit X of the block such that the function unit output $\overline{BeC_X}$ is a nought and if the function unit outputs $InC_{X+1}$ and $InC_{X+2}$ are both noughts the outputs from the gates 126 and 128 are therefore the outputs $C_{TOX+3}$ and $C_{TOX+2}$ are ones and carry inputs are applied to the bits X+3 and X+2. Similarly, if there is a carry generated by bit X+1 such that the function unit output $\overline{BeC_{X+1}}$ is a nought and if the function unit output $InC_{X+2}$ is also a nought the output $C_{TOX+3}$ is a one and a carry input is applied to the bit X+3. Carries between adjacent bits within the blocks all take place within the function unit itself and are not performed by the carry network.

The use of the carry network described greatly reduces the number of gates through which a carry digit may have to pass. Thus for the worst case of a carry digit inserted on the input $\overline{I/A_0}$ to bit 0 and passing through to bit 23 the carry digit has only to pass through three gates instead of forty-eight gates as it would have to if there were no such carry network.

Figure 25:
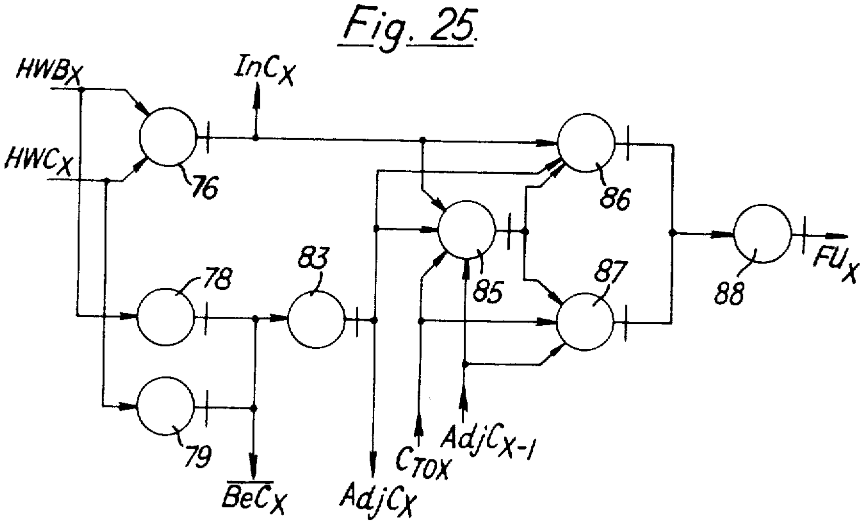

Referring again to the function unit, the basic functions of the function unit are carried out in the following way. For addition the control inputs $\overline{ADD}$, $\overline{HWB/FU}$, $\overline{HWC/FU}$, $\overline{SHOD}$, $\overline{G_{10}}$, $\overline{G_{11}}$, $\overline{G_{12}}$ and $\overline{FUOP}$ together with the control inputs on the appropriate ones of gates 71 to 75 are all noughts and the remaining control inputs are all ones. The resultant configuration of the function unit is shown in FIG. 25 in which the operative gates are shown without their control inputs since these are all noughts and in which the non-operative gates are not shown since their control inputs are all ones and their outputs therefore noughts. The operative ones of gates 71 and 75 are also not shown since they only control what is present on the highways HWB and HWC.

From FIG. 25 it will be seen that if the inputs on highways HWB and HWC are both noughts the outputs $InC_X$ and $\overline{BcC_X}$ are both ones and the output $FU_X$ is a one or a nought depending on whether or not there is a carry input into the gates 85 and 87. If the inputs on highways HWB and HWC are a one and a nought the output $InC_X$ is a nought, the output $\overline{BcC_X}$ is a one and the output $FU_X$ again depends on the carry input. If the inputs on highways HWB and HWC are both ones the outputs $InC_X$ and $\overline{BcC_X}$ are both noughts and the output $FU_X$ again depends on the carry input.

The addition function may also be used to transfer the contents of the accumulator $\alpha_1$ to the function unit output by making the control inputs $\overline{\omega/HWB}$, $\overline{\beta HWB}$ and $\overline{St/HBW}$ all ones. This closes gates 71 to 73 and makes the inputs on highway HWB all noughts. The contents of the accumulator $\alpha_1$ may then be entered onto highway HWC by making the control input $\overline{\alpha/HWC}$ a nought and if this is then added to the noughts on highway HWB the contents of the accumulator $\alpha_1$ appear on the outputs $FU_X$.

The complementary function to addition is subtraction and this is carried out by adding the negative value of the number to be subtracted, the negative value being obtained by inverting the number contained in the accumulator $\alpha_1$ and adding a one to the least significant digit. For this function the control inputs $\overline{SUB}$, $\overline{HWB/FU}$, $\overline{\overline{\alpha}/FU}$, $\overline{Sh0D}$, $\overline{G_{10}}$, $\overline{G_{11}}$, $\overline{G_{12}}$ and $\overline{FUOP}$ to gether with the control input on the appropriate one of gates 71 to 73 are all noughts and the remaining control inputs are all ones and also the input $1/A_0$ to gate 105, FIG. 16, and to gates 122 to 125 of block 0 in place of $\overline{CIB_Y}$, FIG. 23, is a nought this being the way of adding a one to the least significant digit. The resultant configuration of the function unit is shown in FIG. 26 in which the operative gates are shown without their control inputs.

Figure 26:
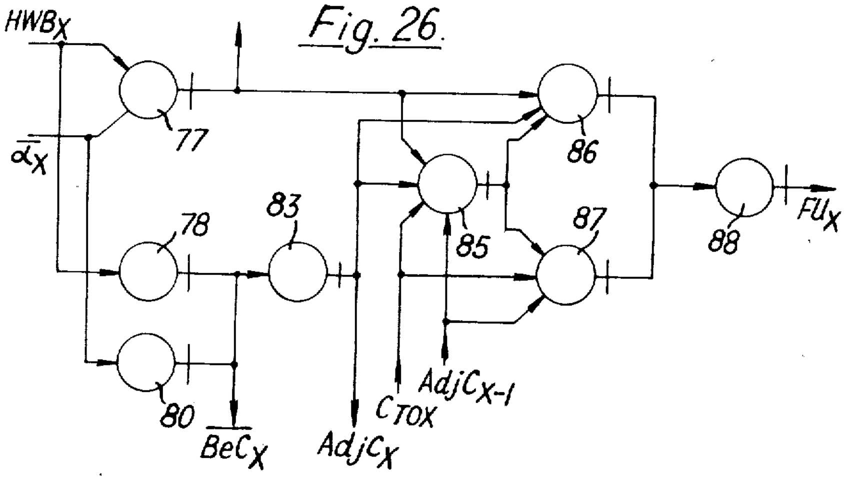

The operation of the gates shown in FIG. 26 is the same as that of the gates shown in FIG. 25, the difference being that since only the inverse of the contents of the accumulator $\alpha_1$ and not the highway HWC are applied to the inputs of gates 77 and 80 it is only the contents of the accumulator $\alpha_1$ that can be subtracted from highway HWB.

For the equivalence function the control inputs $\overline{ADD}$, $\overline{HWB/FU}$, $\overline{HWC/FU}$, $\overline{Sh0D}$, $\overline{G_{10}}$ and $\overline{FUOP}$ together with the control inputs on the appropriate ones of gates 71 to 75 are all noughts and the remaining control inputs are all ones. The resultant configuration of the function unit is shown in FIG. 27 in which the operative gates are shown without their control inputs.

Figure 27:
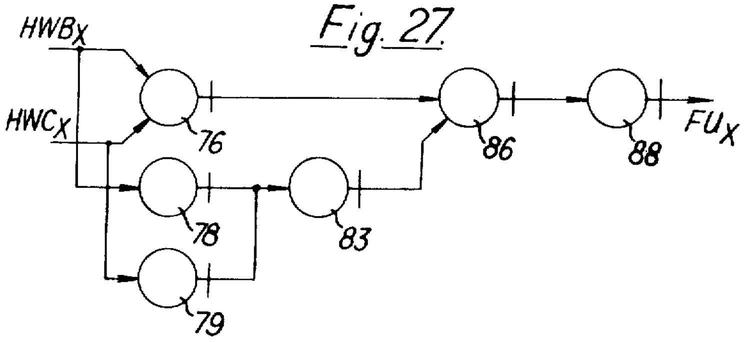

From FIG. 27 it will be seen that if the inputs on highways HWB and HWC are both noughts or both ones one input to gate 86 will be a one and the output $FU_X$ will therefore also be a one. If, however, the inputs on highways HWB and HWC are not equivalent, the outputs from gates 76 and 83 are both noughts and the output $FU_X$ is also a nought.

This function may also be used for transferring the inverse of the contents of the accumulator $\alpha_1$ to the function unit output by making the control inputs $\overline{\omega/HWB}$, $\overline{\beta/HWB}$ and $\overline{St/HWB}$ all ones thus making the inputs on highway HWB all noughts.

The complementary function to equivalence is non-equivalence and for this function the control inputs $\overline{SUB}$, $\overline{\overline{\alpha}/FU}$, $\overline{HWB/FU}$, $\overline{Sh0D}$, $\overline{G_{10}}$ and $\overline{FUOP}$ together with the control input on the appropriate one of gates 71 to 73 are all noughts and the remaining control inputs are all ones. The resultant configuration of the function unit is shown in FIG. 28 in which the operative gates are shown without their control inputs.

Figure 28:
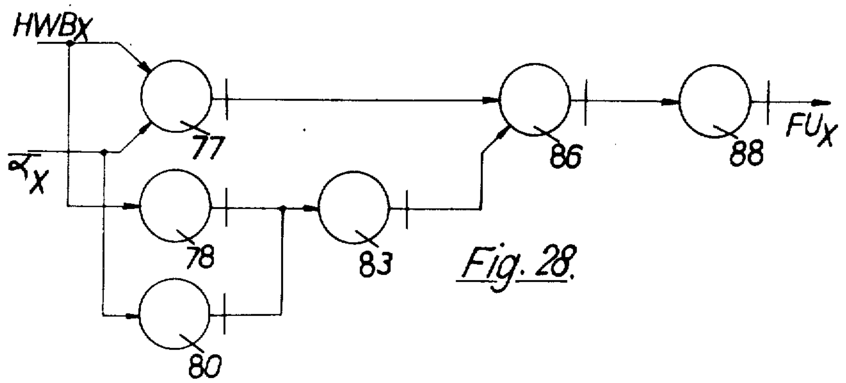

The operation of the gates shown in FIG. 28 is the same as that of the gates shown in FIG. 27, the difference being that since only the inverse of the contents of the accumulator $\alpha_1$ and not the highway HWC are applied to the inputs to the gates 77 and 80 the non-equivalence function can only be carried out between the highway HWB and the contents of the accumulator $\alpha_1$.

This function may also be used for transferring the contents of the accumlator $\alpha_1$ to the function unit output by making the control inputs $\overline{\omega/HWB}$, $\overline{\beta/HWB}$ and $\overline{St/HWB}$ all ones thus making the inputs on highway HWB all noughts.

For the logical AND function the control inputs $\overline{HWB/FU}$, $\overline{HWC/FU}$, $\overline{Sh0D}$, $\overline{G_{10}}$ and $\overline{FUOP}$ together with the control inputs on the appropriate ones of gates 71 to 75 are all noughts and the remaining control inputs are all ones. The resultant configuration of the function unit is shown in FIG. 29 in which the operative gates are shown without their control inputs.

Figure 29:
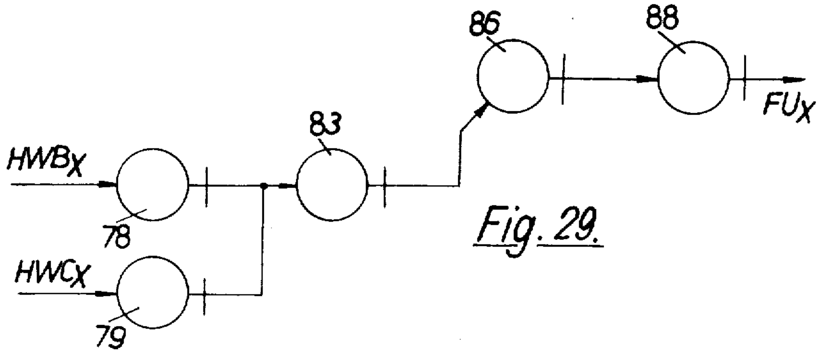

From FIG. 29 it will be seen that if the inputs on highways HWB and HWC are both ones the input to gate 83 is a nought and the output $FU_X$ will be a one. If one of the inputs on highways HWB and HWC is a one and the other a nought or if both inputs are noughts, however, the input to gate 83 is a one and the ouptut $FU_X$ will be a nought.

The complementary function to logical AND is the logical NOT AND function and for this function the control inputs $\overline{HWB/FU}$, $\overline{\overline{\alpha}/FU}$, $\overline{Sh0D}$, $\overline{G_{10}}$ and $\overline{FUOP}$ together with the control input on the appropriate one of gates 71 to 73 are all noughts and the remaining control inputs are all ones. The resultant configuration of the function unit is shown in FIG. 30 in which the operative gates are shown without their control inputs.

Figure 30:
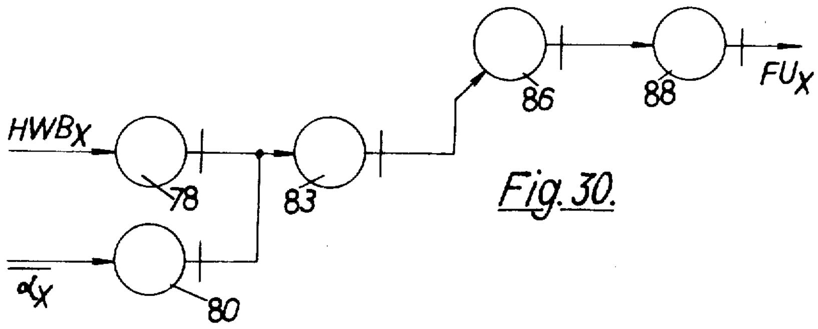

The operation of the gates shown in FIG. 30 is the same as that of the gates shown in FIG. 29, the difference being that the inverse of the contents of the accumulator $\alpha_1$ is applied to the input to the gate 80 in FIG. 30 whereas the highway HWC is applied to the gate 79 in FIG. 29. Consequently, in FIG. 30 the output $FU_X$ is a one only when the inputs to both gates 78 and 80 are both ones, i.e., when bit X on highway HWB is a one and when bit X of the accumulator $\alpha_1$ is a nought such that the inverse output $\overline{\alpha_X}$ applied to the input to gate 80 is a one.

For the increment function the control inputs $\overline{\alpha/HWC}$, $\overline{ADD}$, $\overline{SUB}$, $\overline{HWB/FU}$, $\overline{HWC/FU}$, $\overline{\overline{\alpha}/FU}$, $\overline{G_{10}}$, $\overline{G_{11}}$, $\overline{G_{12}}$ and $\overline{FUOP}$ together with the control input on the appropriate one of gates 71 to 73 are all noughts and the remaining control inputs are all ones. Also, the input $\overline{1/A_0}$ to gate 105, FIG. 16, and to gates 122 to 125 of block 0 in place of $\overline{CIB_Y}$, FIG. 23, is a nought. The resultant configuration of the function unit is shown in FIG. 31 in which the operative gates are shown without their control inputs.

Figure 31:
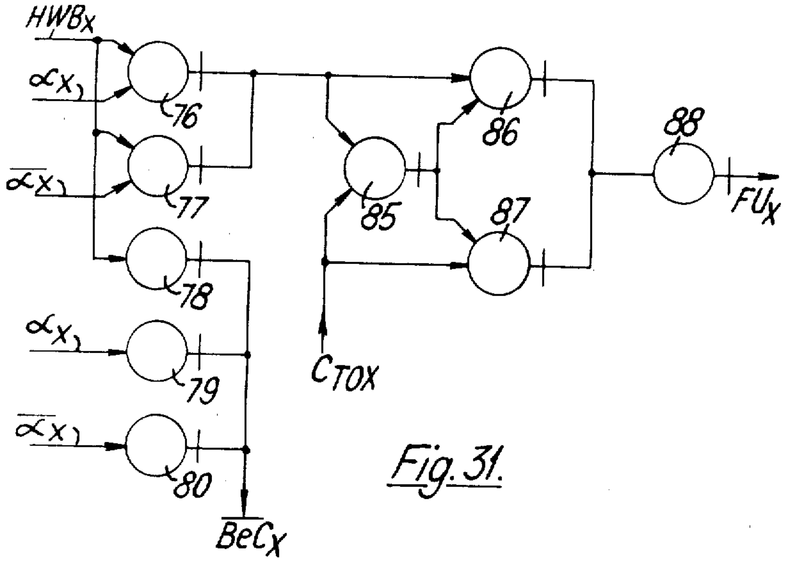

From FIG. 31 it will be seen that since the control input $\overline{\alpha/HWC}$ is a nought the inputs to gates 79 and 80 are $\alpha_X$ and $\overline{\alpha_X}$ respectively. The output $\overline{BcC_X}$ from these gates is therefore always a one whatever the contents of $\alpha$ are. Similarly, the output of gates 76 and 77 is always the inverse of the input on highway HWB since if $\alpha_X$ is a one which closes gate 76, $\overline{\alpha_X}$ will be a nought and gate 77 will be open and if $\alpha_X$ is a nought such that gate 76 is open, $\overline{\alpha_X}$ will be a one and gate 77 will be closed. Therefore, the effect of adding a one into the carry network by making the control input $\overline{1/A_0}$ a nought is to increment the contents of highway HWB.

Figure 32:
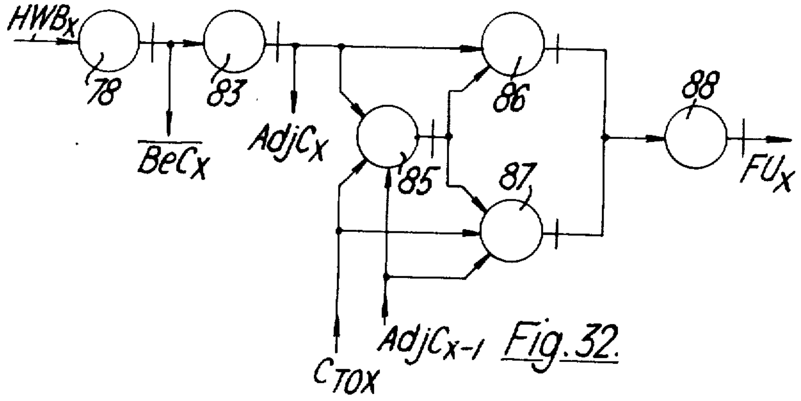

The complementary function to increment is decrement and for this function the control inputs $\overline{HWB/FU}$, $\overline{Sh0D}$, $\overline{G_{10}}$, $\overline{G_{11}}$, $\overline{G_{12}}$ and $\overline{FUOP}$ together with the control input on the appropriate one of gates 71 to 73 are all noughts and the remaining control inputs are all ones. The resultant configuration of the function unit is shown in FIG. 32 in which the operative gates are shown without their control inputs.

The effect of making the control inputs $\overline{ADD}$, $\overline{SUB}$, $\overline{\overline{HWC}/FU}$, $\overline{\alpha/FU}$, and the input $\overline{I/A_0}$ into the carry network all ones is the same as making highway HWC all ones, which is the binary equivalent of minus one, and adding this to the contents of highway HWB, since if highway HWC is all ones the gates 76 and 79 of the adder network, FIG. 25, are always closed. FIG. 28 shows the resultant operative gates and the effect of this is to decrement the contents of highway HWB.

In addition to the functions described above the function unit is also used for logical OR functions and for the inversion of the information on the highway HWB. For the logical OR function the control inputs $\overline{ADD}$, $\overline{G_{11}}$, $\overline{G_{12}}$ and $\overline{FUOP}$ together with the control input on the appropriate ones of the gates 71 to 75 are all noughts and the remaining control inputs are all ones. The resultant configuration of the function unit is shown in FIG. 33 in which the operative gates are shown without their control inputs.

Figure 33:
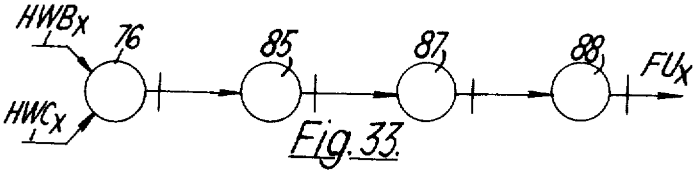

From FIG. 33 it will be seen that if either one of the inputs to the gate 76 is a one the output $FU_X$ will be a one but if neither input is a one the output $FU_X$ will be a nought.

For inversion of the information on the highway HWB the control inputs $\overline{ADD}$, $\overline{SUB}$, $\overline{G_{10}}$, $\overline{FUOP}$ and $\overline{\alpha/HWC}$ together with the control input on the appropriate one of the gates 71 to 73 are all noughts and the remaining control inputs are all ones. The effect of making the control input $\overline{\alpha/HWC}$ a nought is to gate the contents of the accumulator $\alpha_1$ onto the highway HWC and therefore the inputs to gate 76 are $HWB_X$ and $\alpha_X$. The resultant configuration of the function unit is shown in FIG. 34 in which the operative gates are shown without their control inputs.

Figure 34:
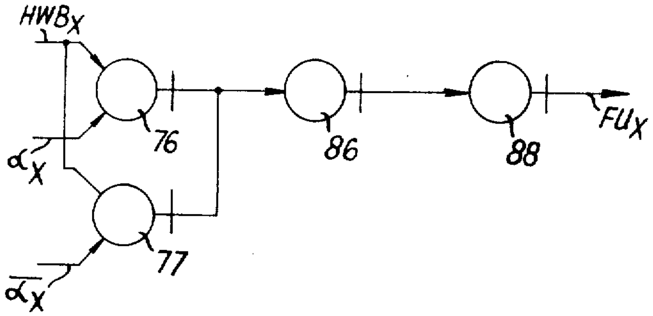

From FIG. 34 it will be seen that if $\alpha_X$ is a nought gate 76 will be open and gate 77 closed, but if $\alpha_X$ is a one $\overline{\alpha_X}$ will be a nought and therefore gate 77 will be open and gate 76 will be closed. Therefore the input $HWB_X$ passes through three gates and appears in inverted form on the output $FU_X$.

The function unit is also used as a shift network and for this purpose the gates 78, 81, 82, 83, 84, 86, 87, 88 and 90 are used. These are shown in FIG. 35 with their appropriate inputs, all other gates except for the appropriate one of gates 71 to 73 being closed by making their control inputs ones. The resultant shift network shown in FIG. 35 is similar to that shown in FIG. 7 but in this network due to the use of the gates 86 and 87, operation of the gate 87 causes a shift of one place towards the most significant end and to enable shifts of one place towards the least significant end to be made the gate 90 is used, operation of which causes a shift of two places towards the least significant end, the combined effect of the operation of gates 87 and 90 therefore being a shift of one place towards the least significant end. As in FIG. 7, shifts of the required number of places are obtained by a suitable selection of the control inputs. Thus for zero shift the control inputs $\overline{HWB/FU}$, $\overline{Sh0D}$, $\overline{G_{10}}$ and $\overline{FUOP}$ are noughts and all other control inputs are ones causing gates 78, 83, 86 and 88 to open and the remaining gates to close. For a shift of sixteen places towards the least significant end the control inputs $\overline{HWB16D/FU}$, $\overline{Sh0D}$, $\overline{G_{10}}$ and $\overline{FUOP}$ are noughts and all other control inputs are ones causing gates 82, 83, 86 and 88 to open and the remaining gates to close. For a shift of thirteen places towards the least significant end, however, the control inputs $\overline{HWB8D/FU}$, $\overline{Sh4D}$, $\overline{G_{12}}$ and $\overline{FUOP2D}$ are noughts and all other control inputs are ones causing gates 81, 84, 87 and 90 to open and the remaining gates to close.

The function unit is also used for multiplication and division operations but since these do not form part of the present invention they are not described in detail. For these operations the register $\beta$ is used and because of the several functions which this register is required to serve it is provided with a separate input network, the gates of this network associated with the bit X of the register $\beta$ being shown in FIG. 36. The gates shown include four double input NOR gates 130 to 133. The gate 130 has its inputs respectively connected to the control input $\overline{FUOP2D}$ and the function unit output $\overline{A_{X+2}}$ and the gate 131 has its inputs respectively connected to the control input $\overline{FUOP}$ and the function unit output $A_X$. The gate 132 has its inputs respectively connected to a control input $\overline{\beta 2D}$ and the inverse output $\overline{\beta_{X+2}}$ of the bit X+2 of the register $\beta$. Similarly, the gate 133 has its inputs respectively connected to a control input $\overline{\beta 1U}$ and the inverse output $\overline{\beta_{X-1}}$ of the bit X−1 of the register $\beta$. The gates 130 and 131 are duplicates of the gates 90 and 88 respectively of the function unit shown in FIG. 15 and the gates 132 and 133 are used for self-shifting operations of the register $\beta$ the gate 132 being used for shifts of two places down towards the least significant end of the register $\beta$ and the gate 133 being used for shifts of one place up towards the most significant end of the register $\beta$.

For double length operations the register $\beta$ serves as the least significant end and the register $\omega$ serves as the most significant end, this being particularly useful in multiplication and division operations. The simplest form of multiplication in which the partial products are shifted one place after the arithmetic operation requires the provision of gates to shift the function unit output one place towards the least significant end together with corresponding self-shift gates for the register $\beta$. No such gates are shown in FIGS. 15 and 36 and if this simple form of multiplication is to be used these additional gates would have to be provided. As an alternative, some form of radix four multiplication may be used and since this involves shifts of two places towards the least significant end the gates 90, FIG. 15, could serve this purpose for the most significant end of the double length word and the gates 132, FIG. 36, for the least significant end. Furthermore, a radix four system would normally require the provision of additional gates, not shown, to gate 2$\alpha$ or $\overline{2}\alpha$ onto the highway HWC. In more economical systems, however, the provision of these additional gates may be avoided by using a double arithmetic beat for adding or subtracting the contents of the accumulator $\alpha_1$, the first beat of such double beat not causing any shift of the function unit output.

REDUCED FIELD SELECTOR SYSTEM.—FIGS. 37 TO 43

Referring now to FIG. 37 there is shown the five arrangements of two eight bit registers $R\theta_0$ and $R\theta_1$ for defining the five machine codes shown in FIG. 9, the shaded bits representing bits set to one. A study of these five arrangements shows that in the register $R\theta_0$ bits nought and two are always set to the same value as each other, i.e., either both are ones or both are noughts. Therefore in a machine required to operate with these five codes bit nought of the register $R\theta_0$ may be omitted since its values is determined by bit two. The function of the register $R\theta_0$ may therefore be carried out by a register having seven bits instead of eight. With regard to the register $R\theta_1$, bits nought and one are always set to one and bits six and seven are always set to nought and these four bits may therefore be omitted as previously described. Furthermore, bits two and three are always set to the same value as each other and bit two may be omitted since its value is determined by bit three. The function of the register $R\theta_1$ may therefore be carried out by a register having three bits instead of eight. The functions of the registers $R\theta_0$ and $R\theta_1$ may thus be carried out by ten register bits and in the computer being described the ten register bits are provided by the ten most significant bits of the register $\beta$. FIG. 38 shows the arrangement of the register $\beta$ for field selection operations and from this it will be seen that the functions of the registers $R\theta_0$ and $R\theta_1$ are carried out by the bits fourteen to twenty and twenty-one to twenty-three respectively of the register $\beta$ which are indicated as $\equiv R\theta_0$ and $\equiv R\theta_1$.

FIG. 39 shows the complete set of masking gates associated with bits fourteen to twenty-three of the register $\beta$ for selecting the desired field and masking off the unwanted fields. The output $\beta_{20}$ of the bit twenty of the register $\beta$ is connected to one input of a double input NOR gate 141 the other input of which is connected to a field selection digit input $\overline{FS_{10}}$. The inverse output $\overline{\beta_{20}}$ of the bit twenty of the register $\beta$ is connected to one input of a double input NOR gate 142 the other input of which is connected to a field selection digit input $FS_{10}$. A single input NOR gate 143 has its input connected to an inverse field selection digit input $\overline{FS_{11}}$ and the outputs of the gates 141 to 143 are connected together to give a masking digit output $M_{107}$. The output $\beta_{19}$ of the bit 19 of the register $\beta$ is connected to one input of a double input NOR gate 144 the other input of which is connected to input $\overline{FS_{10}}$. The inverse output $\overline{\beta_{19}}$ of the bit nineteen of the register $\beta$ is connected to one input of a double input NOR gate 145 the other input of which is connected to the input $FS_{10}$. A single input NOR gate 146 has its input connected to the input $\overline{FS_{11}}$ and the outputs of the gates 144 to 146 are connected together to give a masking digit output $M_{106}$. The output $\beta_{18}$ of the bit eighteen of the register $\beta$ is connected to one input of a double input NOR gate 147 the other input of which is connected to the input $\overline{FS_{10}}$. The inverse output $\overline{\beta_{18}}$ of the bit eighteen of the register $\beta$ is connected to one input of a double input NOR gate 148 the other input of which is connected to the input $FS_{10}$. The output $\beta_{23}$ of the bit twenty-three of the register $\beta$ is connected to one input of a double input NOR gate 149 the other input of which is connected to the input $\overline{FS_{11}}$. The inverse output $\beta_{23}$ of the bit twenty-three of the register $\beta$ is connected to one input of a double input NOR gate 150 the other input of which is connected to a field selection digit input $FS_{11}$. The outputs of the gates 147 to 150 are connected together to give a masking of digit output $M_{105}$. The output $\beta_{17}$ of the bit seventeen of the register $\beta$ is connected to one input of a double input NOR gate 151 the other input of which is connected to the input $\overline{FS_{10}}$. The inverse output $\overline{\beta_{17}}$ of the bit seventeen of the register $\beta$ is connected to one input of a double input NOR gate 152 the other input of which is connected to the input $FS_{10}$. The output $\beta_{22}$ of the bit twenty-two of the register $\beta$ is connected to one input of a double input NOR gate 153 the other input of which is connected to the input $\overline{FS_{11}}$. The inverse output $\overline{\beta_{22}}$ of the bit twenty-two of the register $\beta$ is connected to one input of a double input NOR gate 154 the other input of which is connected to the input $FS_{11}$. The outputs of the gates 151 to 154 are connected together to give a masking digit output $M_{104}$. The output $\beta_{16}$ of the bit sixteen of the register $\beta$ is connected to one input of a double input NOR gate 155 the other input of which is connected to the input $\overline{FS_{10}}$. The inverse output $\overline{\beta_{16}}$ of the bit sixteen of the register $\beta$ is connected to one input of a double input NOR gate 156 the other input of which is conneced to the input $FS_{10}$. The output $\beta_{21}$ of the bit twenty-one of the register $\beta$ is connected to one input of a double input NOR gate 157 the other input of which is connected to the input $\overline{FS_{11}}$. The inverse output $\overline{\beta_{21}}$ of the bit twenty-one of the register $\beta$ is connected to one input of a double input NOR gate 158 the other input of which is connected to the input $FS_{11}$. The outputs of the gates 155 to 158 are connected together to give a masking digit output $M_{103}$. The output $\beta_{15}$ of the bit fifteen of the register $\beta$ is connected to one input of a double input NOR gate 159 the other input of which is connected to the input $\overline{FS_{10}}$. The inverse output $\overline{\beta_{15}}$ of the bit fifteen of the register $\beta$ is connected to one input of a double input NOR gate 160 the other input of which is connected to the input $FS_{10}$. The output $\beta_{21}$ of the bit twenty-one of the register $\beta$ is also connected to one input of a double input NOR gate 161 the other input of which is connected to the input $\overline{FS_{11}}$. The inverse output $\overline{\beta_{21}}$ of the bit twenty-one of the register $\beta$ is also connected to one input of a double input NOR gate 162 the other input of which is connected to the input $FS_{11}$. The outputs of the gates 159 to 162 are connected together to give a masking digit output $M_{102}$. The output $\beta_{14}$ of the bit fourteen of the register $\beta$ is connected to one input of a double input NOR gate 163 the other input of which is connected to the input $\overline{FS_{10}}$. The inverse output $\beta_{14}$ of the bit fourteen of the register $\beta$ is connected to one input of a double input NOR gate 164 the other input of which is connected to the input $FS_{10}$. A single input NOR gate 165 has its input connected to the input $FS_{11}$ and the outputs of the gates 163 to 165 are connected together to give a masking digit output $M_{101}$. The output $\beta_{15}$ of the bit fifteen of the register $\beta$ is also connected to one input of a double input NOR gate 166 the other input of which is connected to the input $\overline{FS_{10}}$. The inverse output $\overline{\beta_{15}}$ of the bit fifteen of the register $\beta$ is also connected to one input of a double input NOR gate 167 the other input of which is connected to the input $FS_{10}$. A single input NOR gate 168 has its input connected to the input $FS_{11}$ and the outputs of the gates 166 to 168 are connected together to give a masking digit output $M_{100}$.

The masking digit outputs $M_{100}$, $M_{101}$, $M_{106}$ and $M_{107}$ are derived from three gates instead of four gates as are required for the other masking digit outputs due to the fact that the first two bits and the last two bits of the equivalent of the register $R\theta_1$ have been omitted thus permitting the omission of one gate for each output for the reason given when first describing the reduced field selector system. Also, the inputs to the pairs of gates 157, 158 and 161, 162 are the same as each other because the bit twenty-one of the register $\beta$ determines the value of an omitted bit as described above. For the same reason, the inputs to the pairs of gates 159, 160 and 166, 167 are the same as each other.

To select a desired field the field selection digits $FS_{10}$ and $FS_{11}$ are set to the binary number of the desired field. Thus to select field nought of the Argus code the digits $FS_{10}$ and $FS_{11}$ would both be noughts and the inverse digits $\overline{FS_{10}}$ and $\overline{FS_{11}}$ would both be ones. For the Argus code, as may be ascertained from FIGS. 37 and 38, the outputs $\beta_{14}$, $\beta_{15}$, $\beta_{16}$ and $\beta_{19}$ would be noughts and the outputs $\beta_{17}$, $\beta_{18}$, $\beta_{20}$, $\beta_{21}$, $\beta_{22}$ and $\beta_{23}$ would be ones together with corresponding inverse outputs. Under these conditions the only set of gates in which there is at least one one input to each gate is the set of gates 144, 145 and 146. Each of the other sets of gates includes at least one gate having two nought inputs. The outputs $M_{100}$ to $M_{105}$ and $M_{107}$ would therefore all be ones and the output $M_{106}$ would be a nought signifying field nought as may be seen from FIG. 37. If the desired field is field three the digits $FS_{10}$ and $FS_{11}$ would both be ones. Under these conditions the outputs $M_{100}$ to $M_{103}$, $M_{106}$ and $M_{107}$ would all be ones and the outputs $M_{104}$ and $M_{105}$ would both be noughts signifying field three for the Argus code.

For effecting the masking operation a set of gates is provided for each of the twenty-four bits of the register $\omega_1$ and the store output register. The set of gates for the bit X is shown in FIG. 40 and comprises two three-input NOR gates 171 and 172. The first input of the gate 171 is connected to the inverse output of the bit X of the register $\omega_1$ and the second input thereof is connected to a control input $\overline{M\omega/HWB}$. Similarly, the first input of the gate 172 is connected to the inverse output $\overline{St}_X$ of the bit X of the store output register and the second input thereof is connected to a control input $\overline{MSt/HWB}$. The third input of each of the gates 171 and 172 is connected to one of the masking digit outputs $M_{10X}$ from the set of gates shown in FIG. 39 by means of a wiring plug the same as that shown in FIG. 11. The outputs of the gates 171 and 172 are connected together to give a masked field output $MF_{10X}$ which is connected to the highway HWB.

To obtain a masked output from the register $\omega_1$ the control input $\overline{M\omega/HWB}$ is a nought and the control input $\overline{MSt/HWB}$ is a one. This opens the gate 171 and closes the gate 172 and for all bits on which the masking digit input $M_{10X}$ is a nought the contents of the register $\omega_1$ will be entered onto the highway HWB and for the remaining bits for which the input $M_{10X}$ is a one, a nought will be entered onto the highway HWB. Similarly, to obtain a masked output from the store output register the control input $\overline{MSt/HWB}$ is a nought and the control input $\overline{M\omega/HWB}$ is a one.

The amount of shift to be applied to a masked field to shift it to the least significant end is determined, as in the previous example, by determining the least significant of the masking digit outputs which is a nought and which is preceded by a masking digit output which is a one. The complete set of gates for determining this is shown in FIG. 41 from which it will be seen that the masking digit output $M_{100}$ is connected to the input of a single input NOR gate 173 the output of which is connected to one input of a double input NOR gate 174 the other input of which is connected to the masking digit output $M_{101}$ and the output of which is the shift determining output $SD_{101}$. The masking digit output $M_{101}$ is also connected to the input of a single input NOR gate 175 the output of which is connected to one input of a double input NOR gate 176 the other input of which is connected to the masking digit output $M_{102}$ and the output of which is the shift determining output $SD_{102}$. The masking digit output $M_{102}$ is also connected to the input of a single input NOR gate 177 the output of which is connected to one input of a double input NOR gate 188 the other input of which is connected to the masking digit output $M_{103}$ and the output of which is the shift determining output $SD_{193}$. The masking digit output $M_{103}$ is also connected to the input of a single input NOR gate 179 the output of which is connected to one input of a double input NOR gate 180 the other input of which is connected to the masking digit output $M_{104}$ and the output of which is the shift determining output $SD_{104}$. The masking digit output $M_{104}$ is also connected to the input of a single input NOR gate 181 the output of which is connected to one input of a double input NOR gate 182 the other input of which is connected to the masking digit output $M_{105}$ and the output of which is the shift determining output $SD_{105}$. The masking digit output $M_{105}$ is also connected to the input of a single input NOR gate 183 the output of which is connected to one input of a double input NOR gate 184 the other input of which is connected to the masking digit output $M_{106}$ and the output of which is the shift determining output $SD_{106}$. The masking digit output $M_{106}$ is also connected to the input of a single input NOR gate 185 the output of which is connected to one input of a double input NOR gate 186 the other input of which is connected to the masking digit output $M_{107}$ and the output of which is the shift determining output $SD_{107}$.

For any desired field only one of the shift determining outputs $SD_{101}$ to $SD_{107}$ will be a one the remainder being noughts. Considering the Argus code again, for example, for field 0 the masking digit output $M_{106}$ is a nought and the remainder are ones. Under these conditions, the gate 184 is the only one of the double input gates to have two noughts on its inputs and the shift determining output $SD_{106}$ is therefore a one, the remaining shift determining outputs being noughts. Similarly, for field three of the Argus code the masking digit outputs $M_{104}$ and $M_{105}$ are noughts and the remainder are ones. Under these conditions the gate 180 is the only one of the double input gates to have two noughts on its inputs and the shift determining output $SD_{104}$ is therefore a one, the remaining shift determining outputs being noughts.

FIG. 42 shows the shift decoding network for decoding the shift determining outputs $SD_{101}$ to $SD_{107}$ and also for decoding a set of general shift determining digits $SDG_0$ to $SDG_4$. The network includes a three-input NOR gate 201 having its first input connected to a control input $\overline{SHG}$. The second input of the gate 201 is connected to a shift determining digit input $SDG_3$ and the third input thereof is connected to a shift determining digit input $\overline{SDG_4}$. A three-input NOR gate 202 has its first input connected to the control input $\overline{SHG}$. The second input of the gate 202 is connected to a shift determining digit input $\overline{SDG_3}$ and the third input thereof is connected to a shift determining digit input $SDG_4$. A three-input NOR gate 203 has its first input connected to the control input $\overline{SHG}$. The second input of the gate 203 is connected to the input $SDG_3$ and the third input thereof is connected to the input $SDG_4$. A four-input NOR gate 204 has its first input connected to the control input $\overline{SHG}$ and its second input connected to a shift determining digit input $\overline{SDG_0}$. The third input of the gate 204 is connected to a shift determining digit input $\overline{SDG_1}$ and the fourth input thereof is connected to a shift determining digit input $\overline{SDG_2}$. A four-input NOR gate 205 has its first input connected to the control input $\overline{SHG}$ and its second input connected to a shift determining digit input $SDG_0$. The third input of the gate 205 is connected to the input $\overline{SDG_1}$ and the fourth input thereof is connected to the input $\overline{SDG_2}$. A four-input NOR gate 206 has its first input connected to the control input $\overline{SHG}$ and its second input connected to the input $\overline{SDG_0}$. The third input of the gate 206 is connected to a shift determining digit input $SDG_1$ and the fourth input thereof is connected to the input $\overline{SDG_2}$. A four-input NOR gate 207 has its first input connected to the control input $\overline{SHG}$ and its second input connected to the input $SDG_0$. The third input of the gate 207 is connected to the input $SDG_1$ and the fourth input thereof is connected to the input $\overline{SDG_2}$. A four-input NOR gate 208 has its first input connected to the control input $\overline{SHG}$ and its second input connected to the input $\overline{SDG_0}$. The third input of the gate 208 is connected to the input $\overline{SDG_1}$ and the fourth input thereof is connected to a shift determining digit input $SDG_2$. A four-input NOR gate 209 has its first input connected to the control input $\overline{SHG}$ and its second input connected to the input $SDG_0$. The third input of the gate 209 is connected to the input $\overline{SDG_1}$ and the fourth input thereof is connected to the input $SDG_2$. A four-input NOR gate 210 has its first input connected to the control input $\overline{SHG}$ and its second input connected to the input $\overline{SDG_0}$. The third input of the gate 210 is connected to the input $SDG_1$ and the fourth input thereof is connected to the input $SDG_2$. A two-input NOR gate 212 has its first input connected to the control input $\overline{SHG}$ and its second input connected to the input $\overline{SDG_0}$. A two-input NOR gate 213 has its first input connected to the control input $\overline{SHG}$ and its second input connected to the input $SDG_0$.

The output of the gate 201 is connected to one input of a five-input NOR gate 214 the second input of which is connected to the output of the gate 204. The third input of the gate 214 is connected to the shift determining output $SD_{105}$, the fourth input thereof is connected to the shift determining output $SD_{106}$ and the fifth input thereof is connected to the shift determining output $SD_{107}$. The output of the gate 202 is connected to one input of a two-input NOR gate 215 and to one input of a five-input NOR gate 216. The second input of the gate 215 is connected to the output of a single input NOR gate 217 the input of which is connected to the output of the gate 204. The second input of the gate 216 is connected to the output of the gate 204 and the third input thereof is connected to the shift determining output $SD_{102}$. The fourth input of the gate 216 is connected to the shift determining output $SD_{103}$ and the fifth input thereof is connected to the shift determining output $SD_{104}$. The output of the gate 203 is connected to one input of a two-input NOR gate 218 the second input of which is connected to the output of the gate 217. The output of the gate 205 is connected to one input of a nine-input NOR gate 219 and to one input of an eight-input NOR gate 220. The second input of the gate 219 is connected to the output of the gate 206, the third input thereof is connected to the output of the gate 207 and the fourth input thereof is connected to the output of the gate 208. The fifth input of the gate 219 is connected to the shift determining output $SD_{101}$, the sixth input thereof is connected to the shift determining output $SD_{102}$ and the seventh input thereof is connected to the shift determining output $SD_{103}$. The eighth input of the gate 219 is connected to the shift determining output $SD_{104}$ and the ninth input thereof is connected to the shift determining output $SD_{107}$.

The second input of the gate 220 is connected to the output of the gate 206, the third input thereof is connected to the output of the gate 209 and the fourth input thereof is connected to the output of the gate 210. The fifth input of the gate 220 is connected to the shift determining output $SD_{101}$, the sixth input thereof is connected to the shift determining output $SD_{104}$ and the seventh input thereof is connected to the shift determining output $SD_{107}$. The eighth input of the gate 220 is connected to a control input FUOP2D.

The output of the gate 212 is connected to one input of a five-input NOR gate 221, the second input of which is connected to a control input $G_{12}$. The third input of the gate 221 is connected to the shift determining output $SD_{102}$, the fourth input thereof is connected to the shift determining output $SD_{105}$ and the fifth input thereof is connected to the shift determining output $SD_{107}$. The output of the gate 213 is connected to one input of a six-input NOR gate 222 the second input of which is connected to a control input $G_{10}$. The third input of the gate 222 is connected to the shift determining output $SD_{101}$ and the fourth input thereof is connected to the shift determining output $SD_{103}$. The fifth input of the gate 222 is connected to the shift determining output $SD_{104}$ and the sixth input thereof is connected to the shift determining output $SD_{106}$.

A two-input NOR gate 223 has one input connected to a control input HWB/FU and the other input connected to the output of the gate 214. A two-input NOR gate 224 has one input connected to the control input HWB/FU and the other input connected to the output of the gate 216. The outputs of the gates 223 and 224 are connected together and the combined outputs produce the control input $\overline{HWB/FU}$. The outputs of the gates 214 and 215 are connected together and the combined outputs produce the control input $\overline{HWB16D/FU}$. The outputs of the gates 216 and 218 are connected together and the combined outputs produce the control input $\overline{HWB8D/FU}$. The output of the gate 219 produces the control input $\overline{Sh4D}$ and is also connected to one input of a two-input NOR gate 225. The other input of the gate 225 is connected to a control input Sh0D and the output thereof produces the control input $\overline{Sh0D}$. The output of the gate 220 produces the control input $\overline{FUOP2D}$ and is also connected to the input of a single input NOR gate 226 the output of which produces the control input $\overline{FUOP}$. The output of the gate 221 produces the control input $\overline{G_{12}}$ and the output of the gate 222 produces the control input $\overline{G_{10}}$.

In operation the shift determining outputs cause the selection of the appropriate control inputs which in turn cause the required shift to place the selected field at the least significant end of a word. Selection of field 0 of the Argus code, for example, results in the shift determining output $SD_{106}$ becoming a one, the remaining shift determining outputs being noughts. When selecting a field the control inputs HWB/FU, Sh0D, FUOP2D, $G_{10}$, and $G_{12}$ are all noughts, the general shift control input $\overline{SHG}$ is a one and the outputs of the gates 201 to 210, 212 and 213 are therefore all noughts. The output of the gate 217 is therefore a one and consequently the outputs of the gates 215 and 218 are both noughts. The shift determining output $SD_{106}$ is connected to one input of each of the gates 214 and 222 and when the output $SD_{106}$ is a one the outputs of these two gates are both noughts. The outputs of the gates 219 and 220 are both ones and therefore the outputs of the gates 225 and 226 are both noughts. Since the control input $G_{12}$ is a nought the output of the gate 221 is a one. Therefore the control inputs $\overline{HWB/FU}$, $\overline{HWB8D/FU}$, $\overline{Sh4D}$, $\overline{FUOP2D}$ and $\overline{G_{12}}$ are ones the control inputs $\overline{HWB16D/FU}$, $\overline{Sh0D}$, $\overline{FUOP}$ and $\overline{G_{10}}$ being noughts. Under these conditions a shift of sixteen places is caused, this being the shift necessary to place field 0 of the Argus code at the least significant end of a word. Similarly for field 3 of the Argus code the shift determining output $SD_{104}$ is a one. This output is connected to one input of each of the gates 216, 219, 220 and 222. Consequently when the output $SD_{104}$ is a one the control inputs $\overline{HWB/FU}$, $\overline{HWB16D/FU}$, $\overline{Sh0D}$, $\overline{FUOP}$ and $\overline{G_{12}}$ are ones and the control inputs $\overline{HWB8D/FU}$, $\overline{Sh4D}$, $\overline{FUOP2D}$ and $\overline{G_{10}}$ are noughts.

Under these conditions a shift of fourteen places is caused, this being the shift necessary to place field 3 of the Argus code at the least significant end of a word.

For carrying out a general shift for purposes other than field selecting the control inputs HWB/FU, Sh0D, FUOP2D, $G_{10}$, $G_{12}$ and $\overline{SHG}$ are all noughts, the shift determining outputs $SD_{101}$ to $SD_{107}$ are all noughts and the general shift determining digit inputs $SDG_0$ to $SDG_4$ are set to the binary equivalent of the number of places of the required shift. For example, if a shift of fifteen places is required the inputs $SDG_4$, $SDG_3$, $SDG_2$, $SDG_1$ and $SDG_0$ are set to nought, one, one, one and one respectively, the inputs $\overline{SDG_4}$, $\overline{SDG_3}$, $\overline{SDG_2}$, $\overline{SDG_1}$ and $\overline{SDG_0}$ therefore being one, nought, nought, nought and nought respectively. Under these conditions the outputs of the gates 201, 203, 205 to 210 and 213 are all noughts, the outputs of the gates 202, 204 and 212 are all ones and the output of the gate 217 is a nought. Consequently, the outputs of the gates 214, 215, 216, 225, 226 and 221 are noughts and the outputs of the gates 218, 219, 220 and 222 are ones. Therefore, the control inputs $\overline{HWB16D/FU}$, $\overline{Sh0D}$, $\overline{FUOP}$ and $\overline{G_{12}}$ are noughts and the control inputs $\overline{HWB/FU}$, $\overline{HWB8D/FU}$, $\overline{Sh4D}$, $\overline{FUOP2D}$ and $\overline{G_{10}}$ are ones. Under these conditions the required shift of fifteen places is caused. General shifts of any required number of places up to twenty-three may be caused in a similar manner.

The shift determining outputs $SD_{101}$ to $SD_{107}$ may be directly connected to the appropriate ones of the decoding gates 214, 216, 219, 220, 221 and 222 as shown in FIG. 42. Alternatively, these gates may be provided with a larger number of inputs and the shift determining outputs connected to the inputs of the appropriate gates by means of a wiring plug 230 shown in FIG. 43. The plug 230, which may conveniently be located in the backwiring of the computer, has seven input terminals 1 to 7 to which the shift determining outputs $SD_{101}$ to $SD_{107}$ are respectively connected. The plug 230 also has six sets of output terminals for connecting to the inputs of the gates 214, 216, 219, 220, 221 and 222, each set being shown as having seven terminals to allow the maximum number of inputs to each gate. The input terminal 1 is connected to output terminals to gates 219, 220 and 222, the input terminal 2 is connected to output terminals to gates 216, 219 and 221, the input terminal 3 is connected to output terminals to gates 216, 219 and 222, the input terminal 4 is connected to output terminals to gates 216, 219, 220 and 222, the input terminal 5 is connected to output terminals to gates 214 and 221, the input terminal 6 is connected to output terminals to gates 214 and 222, and the input terminal 7 is connected to output terminals to gates 214, 219, 220 and 221. In this way the shift determining outputs are applied to the correct decoding gates to cause the required shift in the manner described above. If the computer is required to operate with a different range of machine codes which can be defined by means of eight zones in the manner described with reference to FIG. 9 the computer may be modified simply by replacing the plug 230 and the plug for connecting the masking digit outputs $M_{10X}$ to the gates 171 and 172, FIG. 40, with new plugs appropriately connected.

CONTROL LOGIC AND REGISTERS E, A AND J.—FIGS. 44 TO 51

The control logic includes the set of gates and flip-flops shown in FIG. 44. This set includes a four-input NOR gate 241 having one input connected to the output $St_{24}$ of bit twenty-four of the store output register. The second input of the gate 241 is connected to the output $St_{25}$ of bit twenty-five of the store output register and the third input thereof is connected to the output $St_{26}$ of bit twenty-six of the store output register. The output of the gate 241 produces an output $PK_0$ and is connected directly to the input of a flip-flop 242 and via a single input NOR gate 243 to the inverse input of the flip-flop 242 the output of which is connected to the first input of a six-input NOR gate 244. A four-input NOR gate 245 has its first input connected to the output $St_{24}$, its second input connected to the output $St_{25}$ and its third input connected to the inverse output $\overline{St_{26}}$ of bit twenty-six of the store output register. The output of the gate 245 produces an output $PK_4$ and is connected directly to the input of a flip-flop 246 and via a single input NOR gate 247 to the inverse input of the flip-flop 246 the output of which is connected to the second input of the gate 244. A four-input NOR gate 248 has its first input connected to the inverse output $\overline{St_{24}}$ of bit twenty-four of the store output register, its second input connected to the output $St_{25}$ and its third input connected to the inverse output $\overline{St_{26}}$. The output of the gate 248 produces an output $PK_5$ and is connected directly to the input of a flip-flop 249 and via a single input NOR gate 250 to the inverse input of the flip-flop 249 the output of which is connected to the third input of the gate 244. A four-input NOR gate 251 has its first input connected to the output $St_{24}$, its second input connected to the inverse output $\overline{St_{25}}$ of bit twenty-five of the store output register and its third input connected to the inverse output $\overline{St_{26}}$. The output of the gate 251 produces an output $PK_6$ and is connected directly to the input of a flip-flop 252 and via a single input NOR gate 253, to the inverse input of the flip-flop 252 the output of which is connected to the fourth input of the gate 244. A four-input NOR gate 254 has its first input connected to the inverse output $\overline{St_{24}}$, its second input connected to the inverse output $\overline{St_{25}}$ and its third input connected to the inverse output $\overline{St_{26}}$. The output of the gate 254 produces an output $PK_7$ and is connected directly to the input of a flip-flop 255 and via a single input NOR gate 256 to the inverse input of the flip-flop 255 the output of which is connected to the fifth input of the gate 244.

The output of the gate 244 is connected via a single input NOR gate 257 to the input of a flip-flop 258 and is also connected directly to the inverse input of the flip-flop 258 the output of which produces an output FEO. The inverse output of the flip-flop 258 produces an output $\overline{FEO}$, is connected to the fourth input of each of the gates 241, 245, 248, 251 and 254, and is also connected to one input of a three-input NOR gate 259. The second input of the gate 259 is connected to the output $St_{26}$ of bit twenty-six of the store output register and the third input thereof is connected to the output $PK_0$ from the gate 241. The output of a two-input NOR gate 260 is connected to the output of the gate 259 and the combined outputs are connected directly to the input of a flip-flop 261 and via a single input NOR gate 262 to the inverse input of the flip-flop 261. The output of the flip-flop 261 produces an output FIO and is connected directly to the input of a flip-flop 263. The inverse output of the flip-flop 261 produces an output $\overline{MBI}$ and is connected directly to the inverse input of the flip-flop 263. The output of the flip-flop 263 produces an output OC*h*1 and is connected directly to the input of a flip-flop 264 the inverse input of which is connected directly to the inverse output of the flip-flop 263. The output of the flip-flop 264 produces an output C*h*FS2 and is connected directly to the input of a flip-flop 265 the output of which produces an output OC*h*2. The inverse output of the flip-flop 264 produces an output $\overline{SB3}$ and is connected directly to the inverse input of the flip-flop 265. The inverse output of the flip-flop 265 is connected to one input of a two-input NOR gate 266 the output of which is connected directly to the input of a flip-flop 267 and via a single input NOR gate 268 to the inverse input of the flip-flop 267. The output of the flip-flop 267 produces an output C*h*FS3 and is connected directly to the input of a flip-flop 269 the output of which produces an output OC*h*3 and is connected to the sixth input of the gate 244. The inverse output of the flip-flop 267 produces an output $\overline{SB4}$ and is connected directly to the inverse input of the flip-flop 269.

The inverse output of the flip-flop 261 is connected to one input of a four-input NOR gate 270 the second input of which is connected to the inverse output $\overline{St_{24}}$. The third input of the gate 270 is connected to the inverse output $\overline{St_{25}}$ and the fourth input thereof is connected to the output $St_{26}$. The output of the gate 270 is connected to the input of a flip-flop 271 the inverse input of which is connected to the output of the gate 266. The inverse output of the flip-flop 271 is connected to the second input of the gate 266 and the output of the flip-flop 271 is connected to the first input of the gate 260 the second input of which is connected to the inverse output of the flip-flop 265. The output of the flip-flop 264 is connected to one input of a two-input NOR gate 272 the second input of which is connected to the output of the flip-flop 267. The output of the gate 272 produces an output $\overline{ShBt}$. A two-input NOR gate 273 has one input connected to the output of the flip-flop 271 and the other input connected to the inverse output of the flip-flop 265. The output of the gate 273 is connected to the input of a flip-flop 274 the output of which produces an output JA. The output of the flip-flop 274 is connected to the inverse input thereof and the inverse output of this flip-flop produces an output $\overline{JA}$.

FIG. 45 shows the input set of gates for bit Z of the registers E, A and J where Z may have a value from nought to seven. This set of gates includes a two-input NOR gate 281 having one input connected to the inverse output $\overline{MBI}$ from the flip-flop 261 (FIG. 4) and the other input connected to the inverse output $\overline{St_{Z+16}}$ from bit Z+16 of the store output register. A two-input NOR gate 282 has one input connected to the inverse output $\overline{SB3}$ from the flip-flop 264 (FIG. 44) and the other input connected to the inverse output of the bit $A_Z$ of the register A. A two input NOR gate 283 has one input connected to the inverse output $\overline{SB4}$ of the flip-flop 267 (FIG. 44) and the other input connected to the inverse output of the bit $J_Z$ of the register J. The outputs of the gates 281, 282 and 283 are connected together to give an output $PE_Z$ and are also connected directly to the input of the bit $E_Z$ of the register E and via a single input NOR gate 284 to the inverse input of the bit $E_Z$. The output of the gate 284 produces an output $\overline{PE}_Z$. The inverse output of the bit $E_Z$ produces an output $\overline{EO}_Z$.

The inverse output $\overline{St}_{Z+8}$ of bit Z+8 of the store output register is connected directly to the inverse input of the bit $A_Z$ and via a single input NOR gate 285 to the input of the bit $A_Z$ the inverse output of which produces an output $\overline{AO}_Z$. The inverse output $\overline{St}_Z$ of bit Z of the store output register is connected directly to the inverse input of the bit $J_Z$ and via a single input NOR gate 286 to the input of the bit $J_Z$ the inverse output of which produces an output $\overline{JO}_Z$.

FIG. 46 shows the set of gates for determining the field selection digits $FS_{10}$ and $FS_{11}$. This set of gates includes a single input NOR gate 291 having its input connected to the output $\overline{PE_1}$ from the gate 284 (FIG. 45) of the set of gates associated with bit one of the register E. A four-input NOR gate 292 has its first input connected to the output FEO from the flip-flop 258, its second input connected to the output FIO from the flip-flop 261, its third input connected to the output *Ch*FS2 from the flip-flop 264, and its fourth input connected to the output *Ch*FS3 from the flip-flop 267. The outputs of the gates 291 and 292 are connected together and produce the field selection digit $FS_{11}$. A single input NOR gate 293 has its input connected to the output $PE_1$ from the gates 281, 282 and 283 of the set of gates associated with bit one of the register E. A four-input NOR gate 294 has its four inputs respectively connected to the outputs FEO, FIO, *Ch*FS2 and *Ch*FS3. The outputs of the gates 293 and 294 are connected together and produce the field selection digit $\overline{FS_{11}}$. A single input NOR gate 295 has its input connected to the output $\overline{PE_0}$ from the gate 284 of the set of gates associated with bit nought of the register E. A four-input NOR gate 296 has its four inputs respectively connected to the outputs FEO, FIO, *Ch*FS2 and *Ch*FS3. The outputs of the gates 295 and 296 are connected together and produce the field selection digit $FS_{10}$. A single input NOR gate 297 has its input connected to the output $PE_0$ from the gates 281, 282 and 283 of the set of gates associated with bit nought of the register E. A four-input NOR gate 298 has its four inputs respectively connected to the outputs FEO, FIO, *Ch*FS2 and *Ch*FS3. The outputs of the gates 297 and 298 are connected together and produce the field selection digit $\overline{FS_{10}}$.

Referring now to FIGS. 44, 45 and 46, when the flip-flop 258 is set to a one the flip-flops 242, 246, 249, 252, 255, 261, 263, 264, 265, 267, 269, 271 and 274 are all cleared to noughts. Therefore on the first beat the outputs FEO, $\overline{MBI}$, $\overline{SB3}$, $\overline{SB4}$, $\overline{ShBt}$ and $\overline{JA}$ are ones and the outputs $\overline{FEO}$, FIO, OC*h*1, *Ch*FS2, OC*h*2, *Ch*FS3, OC*h*3 and JA are noughts. Since the outputs $\overline{MBI}$, $\overline{SB_3}$ and $\overline{SB_4}$ are ones the outputs $PE_{0-7}$ are noughts and the outputs $\overline{PE}_{0-7}$ are ones. The output FEO is a one and therefore the outputs of the gates 292, 294, 296 and 298 are noughts. Consequently the field selection digits $FS_{11}$ and $FS_{10}$ are both noughts and the field selection digits $\overline{FS_{11}}$ and $\overline{FB_{10}}$ are both ones such that field nought i.e. the function field, is selected. The output FEO causes the external order to be fetched and entered into the register ω and the function field is selected and placed at the least significant end of the register β. Assuming that this is a normal external order defined by $K=1$ the outputs $St_{24}$, $St_{25}$ and $St_{26}$ from the store output register are one, nought and nought respectively and the outputs $PK_0$ and $PK_{4-7}$ are therefore all noughts. Consequently the outputs of the gates 244 and 259 are both ones and the flip-flop 258 is therefore cleared to a nought and the flip-flop 261 is set to a one.

On the next beat the output FIO is a one, the output FEO is a nought and the output $\overline{MBI}$ is a nought. This results in the first internal order being fetched from the main store and entered into the registers E, A and J which are all pulsed on this beat, the eight bits $St_{16-23}$ being entered into the register E via the gate 281, the eight bits $St_{8-15}$ being entered into the register A via the gate 285, and the eight bits $St_{0-7}$ being entered into the register J via the gate 286. Since the output FIO is a one the outputs of the gates 292, 294, 296 and 298 are noughts and the field selection digits are therefore determined by the outputs $PE_0$ and $PE_1$ from the gates 281 associated with bits nought and one of the register E. If the address bits of the first character being entered into the register E require the selection of a field of the external order held in the register ω the selected field is entered into the least significant end of the register β destroying the function field placed there on the first beat. Assuming that the first internal order is defined by $K=2$ the outputs $St_{24}$, $St_{25}$ and $St_{26}$ from the store output register are nought, one and nought respectively. When this is so the output $PK_0$ is a nought but the inverse output of the flip-flop 258 is a one and the output of the gate 259 is a nought. Also since the inverse output of the flip-flop 265 is a one the output of the gate 260 is a nought and the flip-flop 261 is cleared to a nought as the flip-flop 263 is set to a one. The output of the gate 270 is a nought and since the output of the gate 266 is a nought the flip-flop 271 remains at nought.

On the next beat the output OC*h*1 is a one and this results in the carrying out of the instruction held in the function field of the first character order held in the register E. On this beat the output of the gate 244 is a one and the outputs of the gates 259, 260 and 270 are noughts. The flip-flop 263 is therefore cleared to a nought, the flip-flop 264 is set to a one and the other flip-flops remain cleared at nought.

On the next beat the output *Ch*FS2 is a one and the output $\overline{SB3}$ is a nought. The register E is pulsed on this beat and since the output $\overline{SB3}$ is a nought the second character order held in the register A is transferred to the register E via the gates 282. Since the output *Ch*FS2 is a one the outputs of the gates 292, 294, 296 and 298 are noughts and the field selection digits are determined by the outputs $PE_0$ and $PE_1$ from the gates 282 associated with bits nought and one of the register E, the outputs of the gates 281 and 283 being noughts. If the address bits of the second character being entered into the register E require the selection of a field of the external order the selected field is entered into the least significant end of the register β. Also on this beat since the output of the flip-flop 264 is a one the output $\overline{ShBt}$ of the gate 272 is a nought. This results in the beat length being reduced in known manner. For example, the output $\overline{ShBt}$ may cause the clock pulse to enter a delay line having a shorter delay time than that of the delay line which determines the duration of the main beats. As explained earlier, this reduction of beat length is possible because the field selection process does not involve a store cycle. On this beat the output of the gate 244 is a one and the outputs of the gates 259, 260 and 270 are noughts. The flip-flop 264 is therefore cleared to a nought, the flip-flop 265 is set to a one and the other flip-flops remain cleared at nought.

On the next beat the output OC*h*2 is a one and this results in the carrying out of the instruction held in the function field of the second character order held in the register E. The inverse output of the flip-flop 265 is a nought and this is applied to one input of each of the gates 266 and 260. The inverse output of the flip-flop 271 is a one and therefore the output of the gate 266 is a nought and the flip-flop 267 remains cleared at nought. The output of the flip-flop 271, however, is a nought and the output of the gate 260 is therefore a one which results in the flip-flop 261 being set to a one. Also, the output of the gate 273 is a one and the flip-flop 274 is set to a one. The output of the gate 244 is still a one and the other flip-flops therefore remain cleared at nought.

On the next beat the outputs FIO and JA are ones and the next internal order is fetched from the jump address held in the register J. If this next internal order is defined by $K=2$ the cycle is repeated in the manner described above, the flip-flop 174 being cleared on the beat on which the internal order is fetched since the inverse output of the flip-flop 265 is a one on this beat. This continues until an internal order defined by $K=3$ is fetched which indicates the termination of the internal routine. When this happens the outputs $St_{24}$, $St_{25}$ and $St_{26}$ from the store output register are one, one and nought respectively. When the terminating internal order is fetched from the main store the inverse output of the flip-flop 261 is a nought and the output from the gate 270 is a one. The flip-flop 271 is therefore set to a one. This has no effect until the beat on which the output OC*h*2 is a one and the first two character orders of the terminating internal order are carried out in the manner described above. When the output OC*h*2 is a one, however, the inverse output of the flip-flop 265 is a nought and since the inverse output of the flip-flop 271 is also a nought the output of the gate 266 is a one and the flip-flop 267 is set to a one. Since the output of the flip-flop 271 is a one the output of the gate 260 is a nought and the flip-flop 261 remains cleared at nought. The inverse output of the flip-flop 261 is a one and the output of the gate 270 is therefore a nought, which, together with the one output from the gate 266, causes the flip-flop 271 to be cleared to a nought. The output of the gate 244 is a one and the other flip-flops remain cleared at nought.

On the next beat the output C*h*FS3 is a one and the output $\overline{SB4}$ is a nought. The register E is pulsed on this beat and since the output $\overline{SB4}$ is a nought the third character order held in the register J is transferred to the register E via the gate 283. Since the output C*h*FS3 is a one the outputs of the gates 292, 294, 296 and 298 are noughts and the field selection digits are determined by the outputs $PE_0$ and $PE_1$ from the gates 283 associated with bits nought and one of the registers E, the outputs of the gates 281 and 282 being noughts. If the address bits of the third character order being entered into the register E required the selection of a field from the external order the selected field is entered into the least significant end of the register $\beta$. Also on this beat, since the output of the flip-flop 267 is a one, the output $\overline{ShBt}$ of the gate 272 is a nought resulting in this beat being a short beat. On this beat the output of the gate 244 is a one and the outputs of the gates 259, 260 and 270 are noughts. The flip-flop 267 is therefore cleared to a nought, the flip-flop 269 is set to a one and the other flip-flops remain cleared at nought.

On the next beat the output OC*h*3 is a one and this results in the carrying out of the instruction held in the function field of the third character order held in the register E. Since the output of the flip-flop 269 is a one the output of the gate 244 is a nought. The outputs of the gates 259, 260 and 270 are also noughts and the flip-flop 258 is therefore set to a one, the flip-flop 269 is cleared to a nought and the other flip-flops remain cleared at nought.

On the next beat the output FEO is a one and this results in the next external order being fetched from the main store and entered into the register $\omega_1$. If this external order is defined by $K=1$ it is carried out in the manner described above. On a beat when an external order requiring an interrupt and therefore defined by $K=0$ is fetched the outputs $St_{24}$, $St_{25}$ and $St_{26}$ are all noughts and the output $PK_0$ is a one. The output of the gate 259 is therefore a nought and the flip-flop 261 remains cleared at nought. The output of the gate 244 is also a one and the flip-flop 258 is therefore cleared to a nought. Since the output of the gate 241 is a one the flip-flop 242 is set to a one.

On the next beat the interrupt operation required by the external order is carried out. The output of the flip-flop 242 on this beat is a one and the output of the gate 244 is therefore a nought. Consequently the output of the gate 257 is a one and the flip-flop 258 is set to a one.

On the next beat the output FEO is a one causing the next external order to be fetched.

Similarly on a beat when an external order defined by $K=4$, $K=5$, $K=6$ or $K=7$ is fetched the output $St_{26}$ is a one and the output of the gate 259 is a nought causing the flip-flop 261 to remain cleared at nought. The output of the gate 244 is again a one and the flip-flop 258 is cleared to a nought whilst the appropriate one of the flip-flops 246, 249, 252 and 255 is set to a one. The appropriate one of the outputs $PK_4$, $PK_5$, $PK_6$, $PK_7$ causes an action defined by the nature of the equivalent form of the external order being fetched. For example, $K=4$ may define a type of equivalent form in which the eight most significant bits of the external order represent a single character order and the fourteen least significant bits represent the store address of an operand. In this event the output $PK_4$ would cause the eight most significant bits of the external order to be entered into the register E and the fourteen least significant bits of the external order to be entered into the fourteen least significant bits of the register $\beta$.

On the next beat the equivalent form external order is carried out. The output of the appropriate one of the flip-flops 246, 249, 252 and 255 is a one on this beat and the output of the gate 244 is therefore a nought. Consequently the output of the gate 257 is a one and the flip-flop 258 is set to a one.

On the next beat the output FEO is a one causing the next external order to be fetched.

FIGS. 47, 48 and 49 show the means by which the fourteen-bit address is determined. To determine bits nought, one and two of the address three sets of five gates are provided and FIG. 47 shows the set of gates which produce the address bit $Add_X$ where X may have a value of nought, one or two. This set of gates includes a two-input NOR gate 301 having one input connected to the inverse output $\overline{JA}$ from the flip-flop 274 (FIG. 44) and the second input connected to the inverse output $JO_X$ from bit X of the register J. A five-input NOR gate 302 has its first input connected to the output JA from the flip-flops 274 and its second input connected to the output FEO from the flip-flop 258. The third input of the gate 302 is connected to the output FIO from the flip-flop 261, the fourth input thereof is connected to the inverse output $EO_3$ from bit three of the register E, and the fifth input thereof is connected to the inverse output $\overline{EO}_X$ from bit X of the register E. A five-input NOR gate 303 has its first input connected to the output JA, its second input connected to the output FEO and its third input connected to the output FIO. The fourth input of the gate 303 is connected to the output $EO_3$ from bit three of the register E and the fifth input thereof is connected to the inverse output $\overline{\beta}_X$ from bit X of the register $\beta$. A three-input NOR gate 304 has its first input connected to the output JA, its second input connected to the inverse output $\overline{\beta}_X$, and its third input connected to the inverse output $\overline{MBI}$ from the flip-flop 261. A two-input NOR gate 305 has its first input connected to the inverse output $\overline{FEO}$ from the flip-flop 258 and its second input connected to the inverse output $\overline{CC}_X$ from bit X of the counter $C_1$. The outputs of the gates 301, 302, 303, 304 and 305 are connected together and the combined outputs produce the address bit $Add_X$.

To determine bits three to seven of the address five sets of four gates are provided and FIG. 48 shows the set of gates which produce the address bit $Add_Y$ where Y may have a value of three to seven. This set of gates includes a two-input NOR gate 306 having one input connected to the inverse output $\overline{JA}$ and the other input connected to the inverse output $\overline{JO_Y}$ from bit Y of the register J. A five-input NOR gate 307 has its first input connected to the output JA, its second input connected to the output FEO, and its third input connected to the output FIO. The fourth input of the gate 307 is connected to the output $EO_3$ and the fifth input thereof is connected to the inverse output $\overline{\beta_Y}$ from bit Y of the register $\beta$. A three-input NOR gate 308 has its first input connected to the output JA, its second input connected to the inverse output $\overline{\beta_Y}$ and its third input connected to the output $\overline{MBI}$. A two-input NOR gate 309 has one input connected to the inverse output $\overline{FEO}$ and the other input connected to the inverse output $\overline{CC_Y}$ from bit Y of the counter $C_1$. The outputs of the gates 306, 307, 308 and 309 are connected together and the combined outputs produce the address bit $Add_Y$.

To determine bits eight to thirteen of the address, six sets of three gates are provided and FIG. 49 shows the set of gates which produces the address bit $Add_Z$ where Z may have a value of eight to thirteen. This set of gates includes a five-input NOR gate 310 having its first input connected to the output JA, its second input connected to the output FEO and its third input connected to the output FIO. The fourth input of the gate 310 is connected to the output $EO_3$ and the fifth input thereof is connected to the inverse output $\overline{\beta_Z}$ from bit Z of the register $\beta$. A three-input NOR gate 311 has its first input connected to the output JA, its second input connected to the inverse output $\overline{\beta_Z}$ and its third input connected to the inverse output $\overline{MBI}$. A two-input NOR gate 312 has one input connected to the inverse output $\overline{FEO}$ and the other input connected to the inverse output $\overline{CC_Z}$ from bit Z of the counter $C_1$. The outputs of the gates 310, 311 and 312 are connected together and the combined outputs produce the address bit $Add_Z$.

When it is required to fetch an external order the output FEO is a one as also are the outputs $\overline{JA}$ and $\overline{MBI}$ whilst the outputs JA, FIO and $\overline{FEO}$ are noughts. Consequently, the outputs of the gates 301, 302, 303, 304, 306, 307, 308, 310 and 311 are noughts and the address bits are determined by the outputs of the gates 305, 309 and 312 with the result that the address of the external order is the address held in the counter $C_1$. When it is required to fetch an internal order on a beat immediately following the fetching of an external order, the output FIO is a one as also are the outputs $\overline{JA}$ and $\overline{FEO}$ whilst the outputs JA, FEO and $\overline{MBI}$ are noughts. Consequently, the outputs of the gates 301, 302, 303, 305, 306, 307, 309, 310 and 312 are noughts and the address bits are determined by the outputs of the gates 304, 308 and 311 with the result that the address of the internal order is the address held in the fourteen least significant bits of the register $\beta$. Since this is a beat immediately following the fetching of an external order the contents of these bits of the register $\beta$ is the function field of the external order which was entered in the register $\beta$ on the preceding beat and it is therefore the function field of the external order which forms the initial address of the internal order.

When it is required to fetch a further internal order after obeying the second character order of an internal order, the outputs FIO and $\overline{FEO}$ are ones, but in this case the output JA is also a one and the outputs $\overline{JA}$, FEO and $\overline{MBI}$ are ones. Therefore, the outputs of the gates 302, 303, 304, 305, 307, 308, 309, 310, 311 and 312 are noughts and the address bits are determined by the outputs of the gates 301 and 306. Consequently, the address of the further internal order is the eight-bit jump address held in the register J, the six most significant bits of the fourteen-bit address being noughts.

When obeying a character order the required address may be either a direct address which is indicated by the setting of bit three of the register E to a one or an indirect address which is indicated by a nought in bit three of the register E. The direct address is a three-bit address held in bits nought, one and two of the register E and the indirect address is the address held in the fourteen least significant bits of the register $\beta$. When obeying character orders the outputs $\overline{JA}$, $\overline{FEO}$ and $\overline{MBI}$ are ones and the outputs JA, FEO and FIO are noughts. Also, when a direct address is required the output $EO_3$ is a one and the output $\overline{EO_3}$ is a nought. Under these conditions the outputs of the gates 301, 303, 304, 305, 306, 307, 308, 309, 310, 311 and 312 are noughts and the address bits are determined by the outputs of the gates 302 having inputs $EO_0$, $EO_1$ and $EO_2$ from bits nought, one and two of the register E. When an indirect address is required, however, the output $\overline{EO_3}$ is a one and the output $EO_3$ is a nought. Under these conditions the outputs of the gates 301, 302, 304, 305, 306, 308, 309, 311 and 312 are noughts and the address bits are determined by the outputs of the gates 303, 307 and 310. Consequently, the indirect address is the address held in the fourteen least significant bits of the register $\beta$.

For decoding the four function bits of the character orders held in the register E sixteen four-input NOR gates are provided of which four gates 321, 322, 323 and 324 are shown in FIG. 50. The gate 321 has its first input connected to the output $EO_4$, its second input connected to the output $EO_5$, its third input connected to the output $EO_6$ and its fourth input connected to the output $EO_7$. The output of the gate 321 produces an output $CO_0$. The gate 322 has its first input connected to the inverse output $\overline{EO_4}$, its second input connected to the output $EO_5$, its third input connected to the output $EO_6$ and its fourth input connected to the output $EO_7$. The output of the gate 322 produces an output $CO_1$. The gate 323 has its first input connected to the output $EO_4$, its second input connected to the inverse output $\overline{EO_5}$, its third input connected to the output $EO_6$ and its fourth input connected to the output $EO_7$. The output of the gate 323 produces an output $CO_2$. The gate 324 has its first input connected to the inverse output $\overline{EO_4}$, its second input connected to the inverse output $\overline{EO_5}$, its third input connected to the inverse output $\overline{EO_6}$ and its fourth input connected to the inverse output $\overline{EO_7}$. The output of the gate 324 produces an output $CO_{15}$. The remaining twelve gates which are not shown have their inputs connected to the appropriate outputs from bits four, five, six and seven of the register E and the outputs of these gates produce the control outputs $CO_3$ to $CO_{14}$.

The control outputs produced by decoding the function bits of the character orders held in the register E effect the control of the computer by means of the set of gates shown in FIG. 51. This set of gates includes a NOR gate 331 having an output producing the control input $\overline{ADD}$ and a NOR gate 332 having an output producing the control input $\overline{SUB}$. A NOR gate 333 has an output which produces the control input HWB/FU and a NOR gate 334 has an output which produces the control input $\overline{HWC/FU}$. A NOR gate 335 has an output which produces the control input $\overline{\alpha/FU}$ and a NOR gate 336 has an output which produces the control input S/*h*0D. A NOR gate 337 has an output which produces the control input $G_{10}$ and a NOR gate 338 has an output which produces the control input $\overline{G_{11}}$. A NOR gate 339 has an output which produces the control input $G_{12}$ and a NOR gate 340 has an output which produces the control input $\overline{I/A_0}$. A NOR gate 341 has an output which produces the control input $\overline{SHG}$ and a NOR gate 342 has an output which produces the control input $\overline{B\textit{y}P}$. A NOR gate 343 has an output which produces the control input FUOP2D and a NOR gate 344 has an output which produces the control input $\overline{FUOP1U}$.

In operation the control outputs $CO_{1-15}$ derived from the register E each cause the carrying out of a single predetermined function. Suppose, for example, that when the output $CO_1$ is a one an ADD function is required. The output $CO_1$ is shown connected to one input of each of the gates 331, 334, 338 and 343. When the output $CO_1$ is a one the other CO outputs are all noughts and therefore the outputs of the gates 331, 334, 338 and 343 are noughts and the outputs of the remaining gates shown in FIG. 51 are all ones. Therefore the control inputs $\overline{ADD}$, $\overline{HWC/FU}$, $\overline{G_{11}}$ and FUOP2D are noughts and the remaining control inputs derived from FIG. 51 are ones. Since the control inputs HWB/FU, S*h*0D, $G_{10}$ and $G_{12}$ are ones and the control input FUOP2D is a nought the control inputs $\overline{HWB/FU}$, $\overline{Sh0D}$, $\overline{G_{10}}$, $\overline{G_{12}}$ and $\overline{FUOP}$ are also noughts, as may be seen by reference to FIG. 42 and under these conditions the function unit is set up to carry out an ADD function in the manner previously described.

Similarly, suppose that when the control output $CO_2$ is a one a SUBTRACT function is required. The output $CO_2$ is shown connected to one input of each of the gates 332, 335, 338, 340 and 343. When the control output $CO_2$ is a one the outputs of these gates are noughts and therefore the control inputs $\overline{SUB}$, $\overline{\alpha/FU}$, $\overline{G_{11}}$, $\overline{1/A_0}$ and FUOP2D are noughts and the remaining control inputs derived from FIG. 51 are ones. Under these conditions the function unit is set up to carry out a SUBTRACT function in the manner previously described.

As a further example, suppose that when the control output $CO_{15}$ is a one a logical AND function is required. The output $CO_{15}$ is shown connected to one input of each of the gates 334, 339 and 343. When the control output $CO_{15}$ is a one the outputs of these gates are noughts and therefore the control inputs $\overline{HWC/FU}$, $G_{12}$ and FUOP2D are noughts and the remaining control inputs derived from FIG. 51 are ones. Since the control inputs HWB/FU, S*h*0D, and $G_{10}$ are ones and the control inputs $G_{12}$ and FUOP2D are noughts, the control inputs $\overline{HWB/FU}$, $\overline{Sh0D}$, $\overline{G_{10}}$ and $\overline{FUOP}$ are noughts and the control input $\overline{G_{12}}$ is a one, as may be seen by reference to FIG. 42, and under these conditions the function unit is set up to carry out a logical AND function in the manner previously described.

The remaining CO outputs are used to cause different operations of the computer by connections to an input of each of the relevant ones of the gates 331 to 344 to produce the required control inputs in the manner described above. Other functions may require control inputs in addition to those shown in FIG. 51 and these may be provided by the addition of further NOR gates whose outputs produce the required control inputs. Additional inputs to these gates are also used to derive the necessary control inputs for such beats as fetch external order, fetch internal order and field select operations.

The computer described with reference to FIGS. 13 to 51 operates by selecting the function field of the external order on the beat when the external order is fetched from the store and selecting the other fields of the external order on subsequent beats as and when they are required in carrying out the external order. An alternative system will now be described in which the fields of the external order are split and entered into separate register sections on the beat when the external order is fetched from the store.

GENERAL DESCRIPTION.—FIG. 52

Referring now to FIG. 52 of the drawings the computer shown is again a parallel machine for operating with words of twenty-four bit length. The computer includes a main store 601 having an output connected to two highways HWG and HWB feeding into a combined function shift and field splitter unit 602. The unit 602 has two output highways OHU and OHL. The highway OHU feeds into an upper group register and mask system 603, the external input/output equipment of the computer shown generally as box 604, an executive register and control system 605 and into the main store 601. The highway OHL feeds into a lower group register system 606 and into an accumulator group 607.

The upper group register and mask system 603 has two outputs one of which is connected to the highways HWB and HWG and the other of which is connected to a mask highway HWM feeding into the unit 602. The accumulator group 607 has a single output which is connected to a further highway HWC which also feeds into the unit 602. The lower group register system 606 has a single output which is connected to the highway HWG. The highway HWG also feeds into an address composer 608 the output of which is connected to the address input of the main store 601. The executive register and control system 605 controls the operation of the computer in a manner to be described later.

In carrying out an external order the functions of the computer shown in FIG. 52 are divided into four types of operation. These are:

(1) Fetch the external order from the main store 601.

(2) Load the appropriate registers from the main store 601.

(3) Using the function, shift and field splitter unit 602 carry out operations on the information held in the appropriate registers, and (4) Unload the appropriate registers into the main store 601.

To carry out the first of these operations a maximum of three machine beats is required. On beat one the address in the control counter which is held at a location in the main store 601 is entered into the lower group register and mask system 606 and the control counter is indexed. On beat two the external order is read from the main store 601 at the address now held in the lower group register and mask system 603 and split into four fields using field defining information held in the upper group register and mask system 603. The four fields are separated and two fields are placed in the upper group register and mask system 603 and the other two fields are placed in the lower group register system 606. (External orders having three fields are for these purposes considered to have four fields, one being of zero bits length.) On beat three the internal order is read from the main store 601 at the address now held in the upper group register and mask system 603 and placed into the executive register and control system 605.

For equivalent forms in which the external order is equivalent to an internal order it is not necessary to read the internal order from the main store 601 and when this is so beat three may be omitted.

When the internal order is held in the executive register and control system 605 the internal order is carried out using operations of the second, third and fourth types until the termination of the order is indicated. The computer then returns to the first type of operation to fetch the next external order.

With the computer shown in FIG. 52 the internal orders are such that each bit of an order is capable of controlling one operation of the computer in a manner to be described later.

DETAILED DESCRIPTION.—FIGS. 53 TO 73: REGISTER SYSTEMS.—FIG. 53

The register systems are shown in more detail in FIG. 53. The upper group register and mask system 603 includes a twenty-four bit upper address register UAR having its outputs gated onto the highway HWG and a twenty-four bit mask register MA having its outputs gated onto the highways HWB and HWM. The accumulator group 607 includes a twenty-four bit accumulator register $\alpha_2$ having its outputs gated onto the highway HWC and a twelve bit shift number register SNR of which the five least significant bits are used to hold a shift number when carrying out logical shifting operations and the other seven bits are used to hold a five bit and a two bit number used in the field splitting operation to be described later. The lower group register system includes a single twenty-four bit lower address register LAR having its outputs gated onto the highway HWG. The executive register comprises a twenty-four bit register ER which will later be described in more detail.

For such purposes as diagnostic operations and interrupt operations other registers may be provided and would be gated onto the highway HWG. These registers are not shown since they form no part of the present invention.

FUNCTION, SHIFT AND FIELD SPLITTER UNIT.—FIGURES 54 TO 67

FIG. 54 shows the function unit, shift and field splitter unit set of gates associated with the bit X of the twenty-four bits. The set of gates shown includes a three-input NOR gate 621 having one input connected to the inverse of the bit X on the general highway $\overline{GH}_X$, the second input connected to a control input $\overline{GHB}$ which controls the entry of information on the general highway GH onto the highway HWB, and the third input connected to the output ofa double ipnut NOR gate 622. The gate 622 has one input $\overline{MA}_X$ connected to the inverse output of the bit X of the mask register MA and the other input connected to a control input $\overline{MB}$. A further double input NOR gate 623 has one input connected to the output $\overline{MA}_X$ from the mask register MA and the other input connected to a control input $\overline{MAB}$ which controls the entry of masking information onto the highway HWB. A double input NOR gate 624 has one input $\overline{GH}_{XM}$ connected to the "mirror image" of the inverse of the bit X on the general highway GH. By the term "mirror image" of the bit X is meant the bit that would correspond in the image if a mirror were placed between bits eleven and twelve of the twenty-four bits. Thus for bit eleven the mirror image is bit twelve and vice versa. For bit ten the mirror image is bit thirteen and vice versa. For bit nine the mirror image is bit fourteen and vice versa and so on until for bit nought the mirror image is bit twenty-three and vice versa. The other input of the gate 624 is connected to a control input $\overline{ROP1}$ which controls the entry of reversed information from the general highway GH onto the highway HWB. The outputs of the gates 621, 623 and 624 are connected together and to the bit $HWB_X$ on the highway HWB.

The accumulator $\alpha_2$, which is part of the upper group register system, has the output of the bit X connected to one input of a double input NOR gate 625 the other input of which is connected to a control input $\overline{\overline{\alpha_2/C}}$ which controls the entry of information from the accumulator $\alpha_2$ onto the highway HWC. Similarly the inverse output of the bit X of the accumulator $\alpha_2$ is connected to one input of a double input NOR gate 626 the other input of which is connected to a control input $\overline{\alpha_2/C}$. The outputs of the gates 625 and 626 are connected together and to the bit $HWC_X$ on the highway HWC.

The bit $HWB_X$ is connected to one input of a three-input NOR gate 627 and to one input of a double input NOR gate 628. The bit $HWC_X$ is connected to the second input of the gate 627 and to one input of a double input NOR gate 629. The third input of the gate 627 is connected to a control input $\overline{HWB/F}$, the second input of the gate 628 is connected to a control input $\overline{Sh0U1}_X$ and the second input of the gate 629 is connected to a control input $\overline{AF}$. A further double input NOR gate 630 has one input connected to the bit $HWB_{X-16}$ of the highway HWB and the other input connected to a control input $\overline{Sh16U}_X$. The bits of highway HWB are connected to the inputs of the gates 630 end-around, i.e., for bit fifteen the input of the gate 630 is connected to bit twenty-three of the highway HWB, for bit fourteen the input of the gate 630 is connected to bit twenty-two of the highway HWB and so on. The outputs of the gates 628, 629, and 630 are connected together to give an output $\overline{BcC}_X$ and are also connected to one input of a double input NOR gate 631 the other input of which is connected to a control input $\overline{Sh0U2}_X$. A further double input NOR gate 632 has one input connected to the output $\overline{BcC}_{X-8}$ from the gates 628, 629 and 630 of the set of gates associated with the bit X−8 and the other input connected to a control input $\overline{Sh8U}_X$. The outputs of the gates 631 and 632 are connected together to give an output $SISD_X$ and are also connected to one input of a double input NOR gate 633, the other input of which is connected to a control input $\overline{Sh0U3}_X$. A further double input NOR gate 634 has one input connected to the output $SISD_{X-4}$ from the gates 631 and 632 associated with the bit X−4 and the other input connected to a control input $\overline{Sh4U}_X$. The outputs of the gates 633 and 634 are connected together to give an output $\overline{TISD}_X$ and are also connected to one input of a double input NOR gate 635 the other input of which is connected to a control input $\overline{Sh0U4}_X$. The output $\overline{TISD}_{X-1}$ from the gates 633 and 634 associated with the bit X−1 is connected to one input of a double input NOR gate 636 the other input of which is connected to a control input $\overline{Sh1U}_X$. The output $\overline{TISD}_{X-2}$ from the gates 633 and 634 associated with the bit X−2 is connected to one input of a three-input NOR gate 637 the second input of which is connected to the output $InC_{X-1}$ derived from the gate 627 associated with the bit X−1 and the third input of which is connected to a control input $\overline{Sh2U}_X$. The output $\overline{TISD}_{X-3}$ from the gates 633 and 634 associated with the bit X−3 is connected to one input of a four-input NOR gate 638, the second input of which is connected to the output $InC_{X-1}$. The third input of the gate 638 is connected to the output $InC_{X-2}$ derived from the gate 627 associated with the bit X−2 and the fourth input of the gate 638 is connected to a control input $\overline{Sh3U}_X$.

The outputs of the gates 635, 636, 637 and 638 are connected together to give an output $SOP_X$ and are also connected to one input of a four-input NOR gate 639 and to one input of a three-input NOR gate 640. The second input of the gate 639 is connected to the output of the gate 627 which is also connected to one input of a four-input NOR gate 641. The third input of the gate 639 is connected to the output of a double input NOR gate 642 the output of which is also connected to the second input of the gate 641. One input of the gate 642 is connected to the output of the gates 628, 629 and 630 and the other input is connected to a control input $\overline{G_{101}}$. The fourth input of the gate 639 and the third input of the gate 641 are connected to a control input $\overline{G_{102}}$ and the second input of the gate 640 is connected to a control input ROP2. The output of the gate 639 is connected to the fourth input of the gate 641 and to the third input of the gate 640. A further double input NOR gate 643 has one input connected to the output $SOP_{XM}$ from the gates 635 to 638 of the "mirror image" of the bit X and the other input connected to a control input $\overline{ROP2}$.

The outputs of the gates 640, 641 and 643 are connected together to give an output $\overline{AA}_X$ and are also connected to one input of a double input NOR gate 644 the other input of which is connected to a control input $\overline{OHU0P}_X$. The output $\overline{AA}_{X+1}$ from the set of gates associated with the bit X+1 is connected to one input of a double input NOR gate 645 the other input of which is connected to a control input $\overline{OHU1D}_X$. The output $\overline{AA}_{X+2}$ from the set of gates associated with the bit X+2 is connected to one input of a double input NOR gate 646 the other input of which is connected to a control input $\overline{OHU2D}_X$. The output $\overline{AA}_{X-1}$ from the set of gates associated with the bit X−1 is connected to one input of a double input NOR gate 647 the other input of which is connected to a control input $\overline{OHU1U}$. A three-input NOR gate 648 has one input connected to the inverse of the bit X on the general highway $\overline{GH}_X$ and the second input connected to the output of a double input NOR gate 649. One input of the gate 649 is connected to the output $MA_X$ from the bit X of the masking register and the other input is connected to a control input $\overline{MABP}$. The third input of the gate 648 is connected to a control input $\overline{GHUBP}$. The outputs of the gates 644, 645, 646, 647 and 648 are connected together to give an output $OHU_X$ on the output highway OHU.

The outputs of the gates 640, 641 and 643 are also connected to one input of a double input NOR gate 650 the other input of which is connected to a control input $\overline{OHLOP}$. The inverse of the bit X on the general highway $\overline{GH}_X$ is also connected to one input of a three-input NOR gate 651, the second input of which is connected to the output of the gate 649. The third input of the gate 651 is connected to a control input $\overline{GHLBP}_X$. The inverse of the bit X+1 on the general highway $\overline{GH}_{X+1}$ is connected to one input of a double input NOR gate 652 the other input of which is connected to a control input $\overline{GH1D}_X$. The inverse of the bit X+2 on the general highway $\overline{GH}_{X+2}$ is connected to one input of a double input NOR gate 653 the other input of which is connected to a control input $\overline{GH2D}_X$. The outputs of the gates 650, 651, 652 and 653 are connected together to give an output $OHL_X$ on the output highway OHL.

The output $OHU_X$ is connected directly into the bit X of the accumulator $\alpha_2$ and via a single input NOR gate 654 into the inverse of the bit X of the accumulator $\alpha_2$.

For certain ones of the twenty-four bits the set of gates shown in FIG. 54 is modified and these modifications are shown in FIGS. 55 to 60. Referring now to FIG. 55, for bits nineteen and twenty, two additional NOR gates 655 and 659 are provided. The gate 655 has four inputs, the first of which is connected to the output $\overline{AA}_{X+3}$ from the set of gates associated with the bit X+3. The second and third inputs of the gate 655 are respectively connected to the inverse outputs $\overline{SNR}_{10}$ and $\overline{SNR}_{11}$ of bits ten and eleven of the shift number register SNR (FIG. 53) and the fourth input of the gate 655 is connected to a control input $\overline{FS}$. The output of the gate 655 is connected to the outputs of the gates 644, 645 and 646. The gate 659 has two inputs, the first of which is connected to the inverse of the bit X+3 on the general highway $\overline{GH}_{X+3}$ and the second of which is connected to a control input $\overline{GH3D}_X$. The output of the gate 659 is connected to the outputs of the gates 650, 651, 652 and 653.

Figure 56:
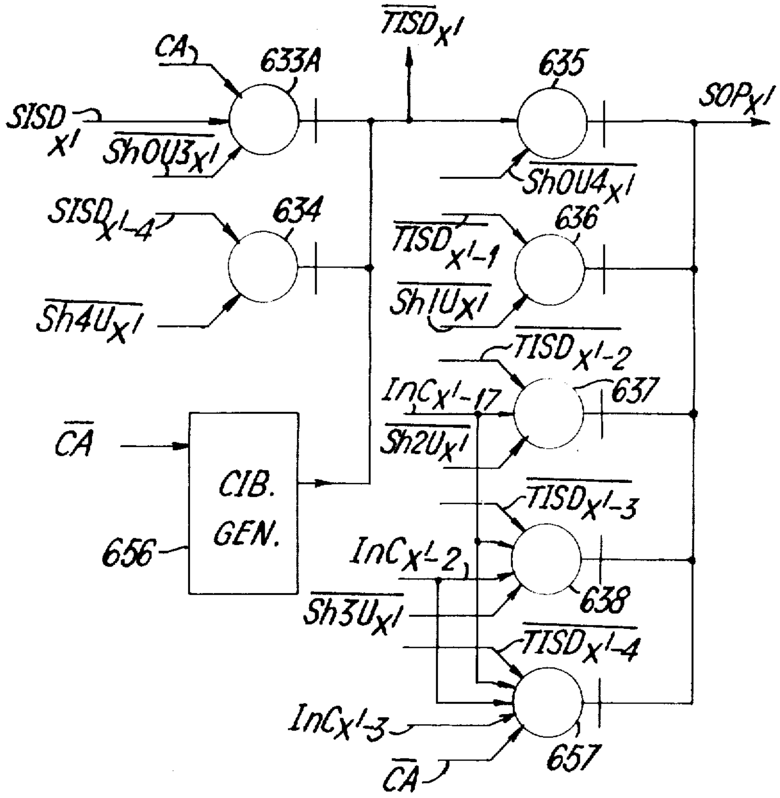

For the purposes of carry operations modifications are necessary to the set of gates associated with every fourth bit starting from bit three. For carry purposes the twenty-four bits are again divided into six blocks, blocks 0 to 5, each of four bits. Each of blocks 0 to 4 includes a set of gates the same as those shown in FIG. 16 for determining whether a carry digit is to pass out of the block, block 0 again including the additional gate 105. Each of blocks 1 to 4 also includes a four-input NOR gate the same as that shown in FIG. 17 for determining whether or not a carry digit presented to the input of the block will pass through the block. Each of blocks 1 to 5 also includes one or more gates for determining whether there is a carry input into the block and these gates are similar to those shown in FIGS. 18 to 22, the difference being that each gate has an additional input which is connected to a control input $\overline{CA}$. FIG. 56 shows the connection of the carry into block (CIB) generation gates, shown generally as block 656 for the bit X′ where X′ is one of the bits three, seven, eleven, fifteen or nineteen. For these bits the double input gate 633 shown in FIG. 54 is replaced by a three-input NOR gate 633A the third input of which is connected to a control input CA which is the inverse of the control input $\overline{CA}$ to the block 656 the output of which is connected to the outputs of the gates 633A and 634. For these bits an additional five-input NOR gate 657 is also provided. The first input of the gate 657 is connected to the output $\overline{TISD}_{X'-4}$ from the set of gates associated with the bit X′−4. The second input of the gate 657 is connected to the output $InC_{X'-1}$ and the third input thereof is connected to the output $InC_{X'-2}$. The fourth input of the gate 657 is connected to the output $InC_{X'-3}$ from the set of gates associated with the bit X′−3 and the fifth input thereof is connected to the control input $\overline{CA}$. The output of the gate 657 is connected to the outputs of the gates 635, 636, 637 and 638.

Figure 18:
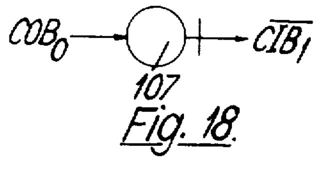
Figure 57:
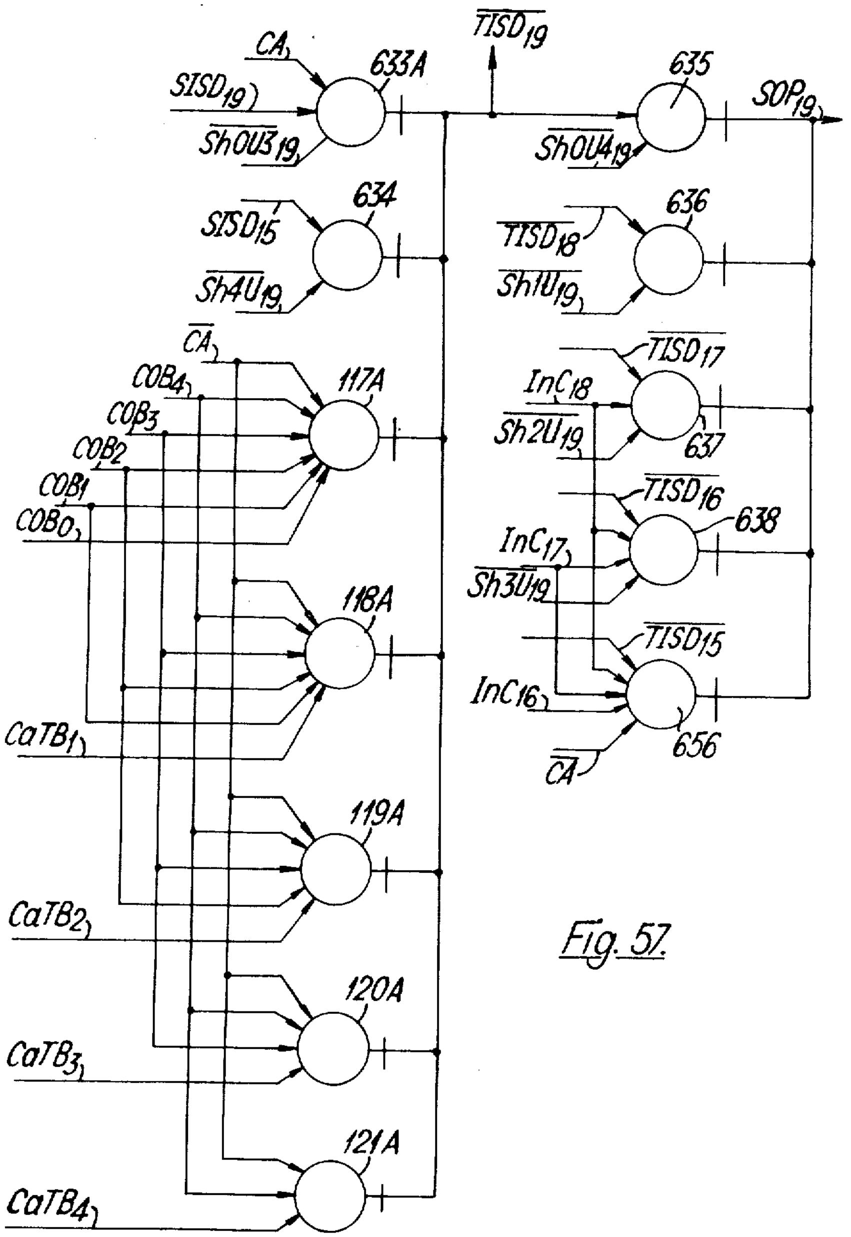

For bit three the block 656 is similar to the single gate shown in FIG. 18. For bit seven it is similar to the gates shown in FIG. 19. For bit eleven it is similar to the gates shown in FIG. 20. For bit fifteen it is similar to the gates shown in FIG. 21 and for bit nineteen it is similar to the gates shown in FIG. 22. FIG. 57 shows the detailed connections for bit nineteen, the gates 117 to 121 of FIG. 22 being replaced by the gates 117A to 121A each having an additional input connected to the control input $\overline{CA}$ as previously stated.

Figure 58:
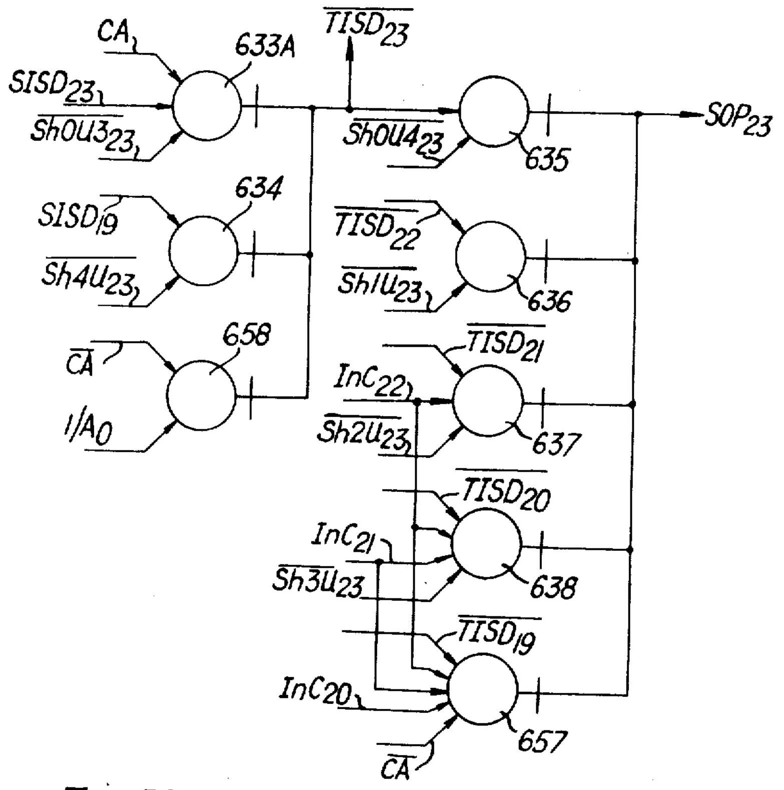

The set of gates associated with the bit twenty-three shown in FIG. 58 is also modified by the inclusion of a three input gate 633A in place of the double input gate 633 and by the provision of the additional gate 657. It is further modified by the provision of a double input NOR gate 658 having one input connected to an input $1/A_0$ and its other input connected to the control input $\overline{CA}$. The output of the gate 658 is connected to the outputs of the gates 633A and 634.

Bits nought and one are also modified for carry purposes. The modifications to bit nought are shown in FIG. 59 and consist of replacing the gates 637 and 638, FIG. 54, by gates 637A and 638A each having an additional input which is connected to the control input CA. The modification to bit one is shown in FIG. 60 and consists of replacing the gate 637, FIG. 54, by a gate 637A having an additional input which is connected to the control input CA.

Referring again to FIG. 54 the basic functions of the function unit are carried out in the following way. For addition the control inputs $\overline{GHB}$, $\overline{\alpha_2/C}$, $\overline{HWB/F}$, $\overline{ShOU1}_X$, $\overline{ShOU2}_X$, $\overline{ShOU3}_X$, $\overline{AF}$, $\overline{G_{101}}$, $\overline{G_{102}}$, $ROP_2$, $\overline{Sh1U}_X$, $\overline{Sh2U}_X$, $\overline{Sh3U}_X$, $\overline{CA}$ and $\overline{OHU0P}_X$ are all noughts, the remaining control inputs are all ones and the input $1/A_0$ to gate 658, FIG. 58, is a nought. The resultant configuration of the function unit is shown in FIG. 61 in which the operative gates, other than gates 621 and 626 are shown without any control inputs apart from the control input CA. The modifications to the sets of gates associated with various bits are indicated in broken line and the bits to which these modifications apply are also indicated. The gates 627, 628, 629, 642, 639, 640, 641 and 644 contained within the chain dotted line form the basic adder circuit and correspond to the gates 76, 78, 79, 83, 85, 87, 86 and 88 shown in FIG. 25, the two adder circuits operating in a similar manner. In this embodiment, however, the fast carry circuit operates in a slightly different manner. For bits other than bits three, seven, eleven, fifteen and nineteen the carry output from the bit is determined by the output $\overline{TISD}_X$ from the gate 633 and this output is applied to the appropriate one ofthe gates 636, 637 or 638 of the sets of gates associated with the next three bits. For bits three, seven, eleven, fifteen and nineteen, however, the gate 633A is cut off by the control input CA, which is a one, and the output $\overline{TISD}_X$ for these bits is therefore determined by the output of the carry into block generation set of gates 656 and this output is applied to the appropriate one of the gates 636, 637, 638 or 657 of the sets of gates associated with the next four bits. Thus, for example, the output $\overline{TISD_{19}}$ from the set of gates associated with bit nineteen is derived from the outputs of the carry into block generation gates 117A to 121A, FIG. 57, and is applied to the gate 636 of the set of gates associated with bit twenty, to the gate 637 of the set of gates associated with bit twenty-one, to the gate 638 of the set of gates associated with bit twenty-two and to the gate 657 of the set of gates associated with bit twenty-three.

The control input CA also cuts off the gate 633A of the set of gates associated with bit twenty-three and the output $\overline{TIDS_{23}}$ is therefore derived from the output of the gate 658 which is determined by the input $1/A_0$. The control input CA also cuts off the gates 637A and 638A of the set of gates associtaed with bit nought and the gate 638A of the set of gates associated with bit one. This prevents the output $\overline{TISD_{22}}$ from causing a carry input into bit nought or bit one and the output $\overline{TISD_{21}}$ from causing a carry input into bit nought. In this way the outputs $TISD_X$ other than $TISD_{23}$ are prevented from propagating beyond bit twenty-three when the control input CA is a one.

For the subtract function the control inputs are the same as for the addition except that the control input $\overline{\overline{\alpha_2/C}}$ is a nought, the control input $\overline{\alpha_2/C}$ is a one and the input $1/A_0$ to gate 658, FIG. 58, is a one. The resultant configuration of the function unit is then the same as that shown in FIG. 61 and the gate 625, FIG. 54, is open instead of the gate 626 such that the highway HWC then carries the inverse of the contents of the accumulator $\alpha_2$ due to the inversion caused by the gate 625.

For the increment function the control inputs are the same as for addition except that the control input $\overline{\alpha_2/C}$ is a one and the input $1/A_0$ to gate 658, FIG. 58, is also a one. This results in gates 625 and 626 both being cut off such that the highway HWC carries all noughts and therefore one is added to the quantity present on the highway HWB.

For the decrement function the control inputs are the same as for addition except that the control input $\overline{\overline{\alpha_2/C}}$ is a nought. This results in gates 625 and 626 both being open such that the highway HWC carries all ones, which is the binary equivalent of minus one, which is added to the quantity present on the highway HWB.

For the equivalence function the control inputs $\overline{GHB}$, $\overline{\overline{\alpha_2/C}}$, $\overline{HWB/F}$, $Sh0U1_X$, $\overline{AF}$, $\overline{G_{101}}$, $\overline{G_{102}}$, FOP2, CA and $\overline{0HU0P_X}$ are all noughts and the remaining control inputs are all ones. The resultant configuration of the function unit is that shown within the chain dotted line in FIG. 61 the highway HWC carrying the inverse of the contents of the accumulator $\alpha_2$ and the input $SOP_X$ to the gates 639 and 640 always being a nought. Under these conditions it will be seen from FIG. 62 that if the inputs on the highways HWB and HWC are different the outputs from gates 627 and 642 will both be noughts and the output from the gate 639 will therefore be a one which cuts off gates 640 and 641 to give a one output from the gate 644. Since the highway HWC is carrying the inverse of the contents of the accumulator $\alpha_2$ a one output signifies equivalence between the information on the highway HWB and the contents of the accumulator $\alpha_2$.

For the non-equivalence function the control inputs are the same as for equivalence except that the control input $\overline{\alpha_2/C}$ is a nought and the control input $\overline{\overline{\alpha_2/C}}$ is a one.

If both of the control inputs $\overline{\alpha_2/C}$ and $\overline{\overline{\alpha_2/C}}$ are noughts and the other control inputs are the same as for equivalence, the highway HWC carries all ones and the resultant output on the output highway OHU is the inverse of the information on the highway HWB.

For the AND function the control inputs $\overline{GHB}$, $\overline{\overline{\alpha_2/C}}$, $\overline{Sh0U1_X}$, $\overline{Sh0U4_X}$, $\overline{AF}$, $\overline{G_{101}}$, $\overline{G_{102}}$, ROP2, CA, and $\overline{0HU0P_X}$ are all noughts and the remaining control inputs are all ones. Since the control inputs $\overline{Sh0U3_X}$ and $\overline{Sh4U_X}$ are both ones and the control input $\overline{Sh0U4_X}$ is a nought the output $SOP_X$ is a one and the gates 639 and 640 are therefore cut off. Therefore, the effective gates are the gates 628, 629, 642, 641 and 644 and these correspond to the gates 78, 79, 83, 86 and 88 shown in FIG. 29 and the two circuits operate in a similar manner.

For the NOT AND function the control inputs are the same as for AND except that the control input $\overline{\overline{\alpha_2/C}}$ is a nought and the control input $\overline{\alpha_2/C}$ is a one.

For the OR function the control inputs GHB, $\overline{\overline{\alpha_2/C}}$, $\overline{HBW/F}$, $\overline{G_{102}}$, ROP2, CA and $\overline{OUHOP_X}$ are all noughts and the remaining control inputs are all ones. The resultant configuration of the function unit is shown in FIG. 62 in which the operative gates are shown without their control inputs. From FIG. 62 it will be seen that if the input on the highway HWB or the highway HWC is a one the output from the gate 627 is a nought. Since the inputs $SOP_X$ to the gates 639 and 640 are always a nough due to the control inputs the output from the gate 639 is a one which cuts off the gates 640 and 641 and the output from the gate 644 is a one. If, however, the inputs on both highways HWB and HWC are noughts the output from the gate 627 is a one and the output from the gate 639 is a nought. The output from the gate 640 is therefore a one and the output from the gate 644 is a nought.

For the NOT OR function the control inputs are the same as for OR except that the control input $\overline{\overline{\alpha_2/C}}$ is a nought and the control input $\overline{\alpha_2/C}$ is a one.

If the control inputs are the same as for the OR function except that the control input $\overline{Sh0U4_X}$ is also a nought the output $SOP_X$ is a one and the gates 639 and 640 are cut off and the function unit then carries out a NOR function.

The function unit is also used as a shift network and for this purpose the gates 628, 630, 631, 632, 633 or 633A, 634, 635, 636, 637 or 637A and 638 or 638A are used. The control inputs other than the CA inputs to the gates 633A, 637A and 638A are derived from the network shown in FIG. 63. This network includes a double input NOR gate 670 having one input connected to a shaft determining digit input $\overline{ShD4}$ and the other input connected to a shift control input $\overline{Sh}$. The output of the gate 670 is connected to the input of a single input NOR gate 671 and also to the input of a single input OR gate 672. An OR gate is a gate which gives a one output if any one or more of the inputs to the gate is a one. If all inputs to an OR gate are noughts the output is a nought. The ouptut of the gate 672 produces the control input $\overline{Sh0U1_{0-23}}$ the suffixes indicating the bit numbers to which the control input is applied. Thus the control input $\overline{Sh0U1_{0-23}}$ is the control input $\overline{Sh0U1_X}$ applied to the gate 628 (FIG. 54) for all twenty-four bits. The output of the gate 671 is connected to one input of a double input NOR gate 673 and also to the input of a single input OR gate 674 the output of which produces the control input $\overline{Sh16U_{0-23}}$. The second input of the gate 673 is connected to a control input $\overline{NEA}$ and the output thereof is connected to one input of a double input OR gate 675 the output of which produces the control input $\overline{Sh0U2_{0-15}}$ which is the control input $\overline{Sh0U2_X}$ applied to the gate 631 (FIG. 54) for the bits nought to fifteen.

A double input NOR gate 676 has one input connected to a shift determining digit input $\overline{ShD_3}$ and the other input connected to the control input $\overline{Sh}$. The output of the gate 676 is connected to the second input of the gate 675 and to the input of a single input OR gate 677 the output of which produces the control input $\overline{Sh0U2_{16-23}}$ which is the control input $\overline{Sh0U2_X}$ applied to the gate 631

(FIG. 54) for the bits sixteen to twenty-three. The output of the gate 676 is also connected to the input of a single input NOR gate 678 the output of which is connected to the input of a single input OR gate 679 and also to one input of a double input OR gate 680 the other input of which is connected to a control input NEA. The output of the gate 679 produces the control input $\overline{Sh8U}_{8-23}$ and the output of the gate 680 produces the control input $\overline{Sh8U}_{0-7}$.

A double input NOR gate 681 has one input connected to a shift determining digit input $\overline{ShD2}$ and the other input connected to the control input $\overline{Sh}$. The output of the gate 681 is connected to the input of a single input NOR gate 682 and also to the input of a single input OR gate 683 the output of which produces the control input $\overline{Sh0U3}_{0-23}$. The output of the gate 682 is connected to one input of a double input NOR gate 684 and also to the input of a single input OR gate 685 the output of which produces the control input $\overline{Sh4U}_{0-23}$. The other input of the gate 684 is connected to the control input $\overline{NEA}$ and the output thereof produces an output B4D which is connected to one input of a double input OR gate 686 the output of which produces the control input $Sh0U4_{0-3}$.

A three-input NOR gate 687 has one input connected to a shift determining digit input ShD1, the second input connected to a shift determining digit input ShD0 and the third input connected to the control input $\overline{Sh}$. The output of the gate 687 is connected to the input of a single input NOR gate 688 the output of which is connected to the second input of the gate 686 and also to the input of a single input OR gate 689. The output of the gate 689 produces the control input $\overline{Sh0U4}_{4-23}$. A three input NOR gate 690 has one input connected to the input ShD1, the second input connected to a shift determining digit input $\overline{ShD0}$ and the third input connected to the control input $\overline{Sh}$. The output of the gate 690 is connected to the input of a single input NOR gate 691 the output of which is connected to one input of a double input OR gate 692, to the input of a single input OR gate 693 and to one input of a double input OR gate 694. The second input of the gate 692 is connected to the output B4D of the gate 684 and the second input of the gate 694 is connected to the control input NEA. The output of the gate 692 produces the control input $\overline{Sh1U}_{1-4}$, the output of the gates 693 produces the control input $\overline{Sh1U}_{5-23}$ and the output of the gate 694 produces the control input $\overline{Sh1U}_{0}$. A three input NOR gate 695 has one input connected to a shift determining digit input $\overline{ShD1}$ the second input connected to the input ShD0 and the third input connected to the control input $\overline{Sh}$. The output of the gate 695 is connected to the input of a single input NOR gate 696 the output of which is connected to one input of a double input OR gate 697, to the input of a single input OR gate 698 and to one input of a double input OR gate 699. The second input of the gate 697 is connected to the output B4D of the gate 684 and the second input of the gate 699 is connected to the control input NEA. The output of the gate 697 produces the control input $\overline{Sh2U}_{2-5}$, the output of the gate 698 produces the control input $\overline{Sh2U}_{6-23}$ and the output of the gate 699 produces the control input $\overline{Sh2U}_{0,1}$. A three input NOR gate 700 has one input connected to the input $\overline{ShD1}$, the second input connected to the input $\overline{ShD0}$ and the third input connected to the control input $\overline{Sh}$. The output of the gate 700 is connected to the input of a single input NOR gate 701 the output of which is connected to one input of a double input OR gate 702, to the input of a single input OR gate 703 and to one input of a double input OR gate 704. The second input of the gate 702 is connected to the output B4D of the gate 684 and the second input of the gate 704 is connected to the control input NEA.

In this example all shifts are towards the most significant end of a word, information shifted beyond the twenty-fourth bit being lost in the case of non-end-around shifts or entered in the least significant end of the word in the case of end-around shifts. If, for example, an end-around shift of sixteen places is required the control inputs $\overline{Sh}$ and NEA are noughts, the shift determining digit inputs $\overline{ShD4}$, ShD1 and ShD0 are noughts and the shift determining digit inputs $\overline{ShD3}$, $\overline{ShD2}$, $\overline{ShD1}$ and $\overline{ShD0}$ are ones. Under these conditions the control inputs $Sh16U_{0-23}$, $Sh0U2_{0-23}$ (i.e. the outputs of both of the gates 675 and 677), $\overline{Sh03}_{0-23}$ and $\overline{Sh0U4}_{0-23}$ are noughts and the control inputs $\overline{Sh0U1}_{0-23}$, $\overline{Sh8U}_{0-23}$, $\overline{Sh4U}_{0-23}$, $\overline{Sh1U}_{0-23}$, $\overline{Sh2U}_{0-23}$ and $\overline{Sh3U}_{0-23}$ are all ones. Therefore the gates 630, 631, 633 and 635 (FIG. 54) are open in the sets of gates associated with all twenty four bits and the required end-around shift is accomplished. If, however, a non-end-around shift of sixteen places is required the control input NEA is one and the inverse $\overline{NEA}$ is a nought, the remaining inputs being as for the end-around shift. Under these conditions the control inputs $\overline{Sh0U2}_{0-15}$ are ones, the control inputs $\overline{Sh0U2}_{16-23}$ are noughts and the remaining control inputs to the shift gates are the same as in the sixteen place end-around shift. Therefore in the sets of gates associated with bits sixteen to twenty-three the gates 630, 631, 633 and 635 are open and the information held in bits nought to seven is shifted to bits sixteen to twenty-three. In the sets of gates associated with nought to fifteen, however, the gates 630, 633 and 635 are open but the gate 631 is closed and therefore its output is a nought regardless of the input to the gate 630. The outputs $SOP_{0-15}$ are therefore all noughts and the information that was held in bits eight to twenty-three is therefore lost.

As a further example, if an end-around shift of fourteen places is required the control inputs $\overline{Sh}$ and NEA are noughts, the shift determining digit inputs $\overline{ShD3}$, $\overline{ShD2}$, $\overline{ShD1}$ and ShD0 are noughts and the shift determining digit inputs $\overline{ShD4}$, ShD1 and $\overline{ShD0}$ are ones. Under these conditions the control inputs $\overline{Sh0U1}_{0-23}$, $\overline{Sh8U}_{0-23}$, $\overline{Sh4U}_{0-23}$ and $\overline{Sh2U}_{0-23}$ are noughts and the control inputs $\overline{Sh16U}_{0-23}$, $\overline{Sh0U2}_{0-23}$, $\overline{Sh0U3}_{0-23}$, $\overline{Sh0U4}_{0-23}$, $\overline{Sh1U}_{0-23}$ and $\overline{Sh3U}_{0-23}$ are ones. Therefore, in the set of gates associated with each of the twenty-four bits the gates 628, 632, 634 and 637 (FIG. 54) are open and the required end-around shift is accomplished. If, however, a non-end-around shift of fourteen places is required the control input NEA is one and the inverse $\overline{NEA}$ is a nought, the remaining inputs being as for the end-around shift. Under these conditions the control inputs $\overline{Sh0U1}_{0-23}$, $\overline{Sh8U}_{8-23}$, $\overline{Sh4U}_{0-23}$ and $\overline{Sh2U}_{6-23}$ are noughts and the control inputs $\overline{Sh16U}_{0-23}$, $\overline{Sh0U2}_{0-23}$, $\overline{Sh8U}_{0-7}$, $\overline{Sh0U3}_{0-23}$, $\overline{Sh0U4}_{0-23}$, $\overline{Sh1U}_{0-23}$, $\overline{Sh2U}_{0-5}$, and $\overline{Sh3U}_{0-23}$ are ones. Therefore, in the set of gates associated with bits eight to twenty-three the gates 628, 632, 634 and 657 are open as for the end-around shift. In the set of gates associated with bits nought to seven, however, the gate 632 is closed and in the set of gates associated with bits nought to five the gate 637 is also closed. Since the gate 637 is closed for each of bits nought to five the outputs $SOP_{0-5}$ are all noughts. Furthermore, since the gate 632 is closed for each of bits nought to seven the outputs $SISD_{0-7}$ are all noughts. These outputs are applied to the gates 634 of the sets of gates associated with bits four to eleven and therefore the outputs $\overline{TISD}_{4-11}$ are all ones. The gates 635, 636 and 638 are all closed and the outputs $\overline{TISD}_{4-11}$ therefore do not affect any of these gates. The outputs $\overline{TISD}_{4-11}$ are also applied to the gates 637 of the sets of gates associated with bits six to thirteen and the outputs $SOP_{6-13}$ are therefore all noughts. Thus the outputs $SOP_{0-13}$ are all noughts and the information that was held in bits ten to twenty-three is therefore lost in the non-end-around shift.

The facility of end-around or non-end-around shifts is useful for many purposes particularly in double length working for which purposes the most significant twenty-four bits of the double length word are held in the mask register MA (FIG. 53) and the least significant twenty-four bits are held in the register LAR. For example a double length logic shift to the left, i.e., towards the most significant end, may be carried out in five beats. On the first beat the contents of the register MA are shifted the required number of places to the left non-end-around and the results returned to the register MA, the required number of places being determined from the five least significant bits of the shift number register SNR. On the second beat the contents of the register LAR are shifted the required number of places to the left end-around and the result entered in the accumulator $\alpha_2$. On the third beat the contents of the rgeister LAR are shifted the required number of places to the left non-end-around and the result returned to the register LAR. On the fourth beat a non-equivalence operation is performed between the contents of the accumulator $\alpha_2$ and the contents of the register LAR and the result returned to the accumulator $\alpha_2$. At this stage the contents of the accumulator $\alpha_2$ are the bits which have to be transferred from the most significant end of the least significant half of the double length word to the least significant end of the most significant half of the double length word. On the fifth beat the contents of the register MA are added to the contents of the accumlator $\alpha_2$ and the result returned to the register MA. The double length logic shift to the left is then complete.

Similarly a double length logic shift to the right may also be carried out in five beats in the following manner. For the first three of the five beats the control inputs $\overline{ROP1}$ and $\overline{ROP2}$ to the gates 624 and 643 (FIG. 54) are made noughts and the control input $\overline{GHB}$ to the gate 621 is made a one such that during these three beats words passing through the shift network are reversed and then corrected by the gates 643. By means of this reversal the left shift caused by the shift network effectively becomes a right shift. On the first beat the contents of the register LAR are shifted the required number of places to the right non-end-around and the result returned to the register LAR. On the second beat the contents of the register MA are shifted the required number of places to the right end-around and the result entered in the accumulator $\alpha_2$. On the third beat the contents of the register MA are shifted the required number of places to the right non-end-around and the result returned to the register MA. On the fourth and fifth beats the control inputs $\overline{ROP1}$ and $\overline{ROP2}$ are made ones and the control input $\overline{GHB}$ is made a nought such that the reversal does not take place. On the fourth beat a non-equivalence operation is performed between the contents of the accumulator $\alpha_2$ and the contents of the register MA and the result returned to the accumulator $\alpha_2$. On the fifth beat the contents of the register LAR are added to the contents of the accumulator $\alpha_2$ and the result returned to the register LAR. The double length logic shift to the right is then complete.

The shifting operation is also used in the field splitting operation in which an external word is split into its separate fields which are then placed into the upper and lower address registers UAR and LAR. Consider for example an external word having the field breakdown shown in FIG. 64 in which field 0 occupies bits nineteen to twenty-three, field 1 occupies bits fifteen to eighteen, field 2 occupies bits ten to fourteen and field 3 occupies bits nought to nine. To split this field the mask register MA is loaded with ones in the positions corresponding to fields 0 and 3 and with noughts in the positions corresponding to fields 1 and 2. Also a shift number is entered in the shift number register SNR (FIG. 63), the shift number being the number of places it is necessary to shift the word to bring the most significant bit of field 2 to bit 23. In the example shown in FIG. 64 the shift number is therefore nine. The pattern loaded into the mask register MA causes the outer fields, fields 0 and 3, to by-pass the function unit on the general highway HWG and to emerge on the lower output highway OHL from which they are entered into the lower address register LAR, the bits between the two fields being filled with noughts as shown in FIG. 64. The two inner fields, fields 0 and 1, are caused to pass through the function unit and are shifted end-around by the number of places set into the shift number register SNR. Fields 1 and 2 emerge from the function unit on the upper output highway OHU from which they are entered into the upper address register UAR and, due to the end-around shift, they occupy the two ends of the register UAR with field 1 at the least significant end and field 2 at the most significant end. The bits between the two fields are again filled with noughts, as shown in FIG. 64. The system of field splitting as so far described suffers from the disadvantage that the position of the least significant bit of fields 0 and 2 varies according to the length of the field. For example, where field 0 has a length of five bits as shown in FIG. 64 the least significant bit is held in bit nineteen of the register LAR whereas if field 0 had a length of three bits the least significant bit would be held in bit twenty-one of the register LAR. Where these fields are used as address fields it is desirable that the least significant bit of the field should always be held in the same bit of the register LAR. To achieve this the machine being described has been limited to operate with external machine codes in which field 3 has a maximum length of sixteen bits and fields 0 and 2, where they are used as address fields, have a length of two, three, four or five bits. If fields 0 and 2 are used as function fields they may have a maximum length of eight bits. The choice of a maximum length of five bits for fields 0 and 2 when used as address fields enables the machine to operate with the group of machine codes shown in FIG. 9. A greater maximum may be chosen if the machine is required to operate with other codes using longer address fields for fields 0 and 2 but, as will be seen later, this would require an increase in the number of additional gates provided in the function unit.

Having made this limitation, when field 0 or field 2 has a length of two, three or four bits it is shifted such that the least significant bit is held in bit nineteen of the appropriate one of the registers LAR and UAR. The number of bits by which field 0 has to be shifted is determined by detecting the boundary between field 1 and field 0, this being the boundary between noughts and ones at the most significant end of the mask register MA. The number of bits by which field 2 has to be shifted is determined by inserting the appropriate number in bits ten and eleven of the shift number register SNR.

Therefore in splitting the I.C.T. 1900 machine code shown at B in FIG. 65 the mask register MA is loaded with ones in bits nought to eleven and bits twenty-one to twenty three and with noughts in bits twelve to twenty. Also bits five to nine of the shift number register SNR are loaded with the number ten and bits ten and eleven of the register SNR are loaded with the number three, this being the number of bits by which field 2 must be moved after a shift of ten bits to bring its least significant bit into bit nineteen of the upper address register UAR. FIG. 65 shows the contents of the registers LAR and UAR after the word has been split. Field 3 is held in the twelve least significant bits of the register LAR and field 0 is held in bits nineteen to twenty-one of the register LAR, the bits between the two fields and bits twenty-two and twenty-three being filled with noughts. Field 1 is held in the six least significant bits of the register UAR and field 2 is held in bits nineteen and twenty of the register UAR, the bits between the two fields and bits twent-one to twenty-three being filled with noughts.

To achieve the method of field splitting described the control waveform for the gates 651, 652, 653 and 659 (FIGS. 54 and 55) are derived from the set of gates shown in FIG. 66 and the control waveforms for the gates 644, 645 and 646 (FIGS. 54 and 55) are derived from the set of gates shown in FIG. 67.

Referring now to FIG. 66 the set of gates includes a four input NOR gate 710 having the first input connected to a control waveform $\overline{FS}$. The output of the gate 710 is connected to one input of a double input NOR gate 711 the other input of which is connected to a control waveform GHLBPG. The output of the gate 711 produces the control input $\overline{GHLBP}_{16-23}$, the suffices indicating the bit numbers to which the control input is applied. A double input NOR gate 712 has one input connected to the control input GHLBPG and the other input connected to a further control input FS. The output of the gate 712 produces the control input $\overline{GHLBP}_{0-15}$. A single input NOR gate 713 has its input connected to a control input GH2DG and its output produces the control input $\overline{GH1D}_{0-18,23}$. A three-input NOR gate 714 has one input connected to the control input $\overline{FS}$. The second input of the gate 714 is connected to the output $MA_{19}$ from bit nineteen of the mask register MA and the third input of the gate 714 is connected to the inverse output $\overline{MA_{20}}$ from bit twenty of the register MA. The output of the gate 714 is connected to the second input of the gate 710 and also to one input of a double input NOR gate 715. The other input of the gate 715 is connected to the control input GH1DG and the output thereof produces the control input $\overline{GH1D}_{19-22}$.

A single input NOR gate 716 has its input connected to a control input GR2DG and its output produces the control input $\overline{GH2D}_{0-18,22,23}$. A three-input NOR gate 717 has one input connected to the control input $\overline{FS}$. The second input of the gate 717 is connected to the output $MA_{20}$ from bit twenty of the register MA and the third input of gate 717 is connected to the inverse output $\overline{MA_{21}}$ from bit twenty-one of the register MA. The output of the gate 717 is connected to the third input of the gate 710 and also to one input of a double input NOR gate 718. The other input of the gate 718 is connected to the control input GH2DG and the output thereof produces the control input $\overline{GH2D}_{19-21}$. A three-input NOR gate 719 has one input connected to the control input $\overline{FS}$. The second input of the gate 719 is connected to the output $MA_{21}$ from bit twenty-one of the register MA and the third input of the gate 719 is connected to the inverse output $\overline{MA_{22}}$ from bit twenty-two of the register MA. The output of the gate 719 is connected to the fourth input of the gate 710 and also to the input of a single input NOR gate 720. The output of the gate 720 produces the control input $\overline{GH3D}_{19,20}$.

The set of gates shown in FIG. 67 includes a three-input NOR gate 725 having one input connected to the control input $\overline{FS}$. The second input of the gate 725 is connected to the inverse output $\overline{SNR_{11}}$ from bit eleven of the shift number register SNR and the third input of the gate 725 is connected to the inverse output $\overline{SNR_{10}}$ of the register SNR. The output of the gate 725 is connected to one input of a four-input NOR gate 726, the second input of which is connected to the control input $\overline{FS}$. The output of the gate 726 is connected to one input of a double input NOR gate 727 the other input of which is connected to a control input OHU0PG. The output of the gate 727 produces the control input $\overline{OHU0P}_{16-23}$. A double input NOR gate 728 has one input connected to the control input OHU0PG and the other input connected to the control input FS. The output of the gate 728 produces the control input $\overline{OHU0P}_{0-15}$. A three-input NOR gate 729 has one input connected to the control input $\overline{FS}$. The second input of the gate 729 is connected to the output $SNR_{11}$ from bit eleven of the shift number register SNR and the third input of the gate 729 is connected to the inverse output $\overline{SNR_{10}}$ from the register SNR. The output of the gate 729 is connected to the third input of the gate 726 and also to one input of a double input NOR gate 730 the other input of which is connected to a control input OHU1DG. The output of the gate 730 produces the control input $\overline{OHU1D}_{16-23}$. A single input NOR gate 731 has its input connected to the control input OHU1DG and its output produces the control input $\overline{OHU1D}_{0-15}$. A three-input NOR gate 732 has one input connected to the control input $\overline{FS}$. The second input of the gate 732 is connected to the inverse output $\overline{SNR_{11}}$ from the register SNR and the third input of the gate 732 is connected to the output $SNR_{10}$ from bit ten of the register SNR. The output of the gate 732 is connected to the fourth input of the gate 726 and also to one input of a double input NOR gate 733 the other input of which is connected to a control input OHU2DG. The output of the gate 733 produces the control input $\overline{OHU2D}_{16-23}$. A single input NOR gate 734 has its input connected to the control input OHU2DG and its output produces the control input $\overline{OHU2D}_{0-15}$.

Referring again to FIG. 65 for the ICT 1900 machine code shown at B the mask register MA is set as shown with bits nought to eleven and twenty-one to twenty-three set to ones and bits twelve to twenty set to noughts. The number ten is set into bits five to nine of the shift number register SNR and the number three is set into bits ten and eleven of the register SNR, i.e., the outputs $SNR_{10}$ and $SNR_{11}$ are both ones and the inverse outputs $\overline{SNR_{10}}$ and $\overline{SNR_{11}}$ are both noughts. In FIG. 66 the control inputs $\overline{FS}$, GHLBPG, GH1DG and GH2DG are all noughts, the control inputs FS is a one and the inputs $MA_{19}$, $MA_{20}$, $\overline{MA_{21}}$ and $\overline{MA_{22}}$ are noughts and the inputs $\overline{MA_{20}}$ and $MA_{21}$ are both ones. Therefore the control inputs $\overline{GHLBP}_{16-23}$, $\overline{GH1D}_{0-23}$ (i.e., the outputs of both of gates 713 and 715), $\overline{GH2D}_{0-18,22,23}$ and $\overline{GH3D}_{19-20}$ are all ones and the control inputs $\overline{GHLBP}_{0-15}$ and $\overline{GH2D}_{19-21}$ are noughts since the gates 712 and 718 are the only ones of gates 711, 712, 713, 715, 716, 718 and 720 to have a one on their inputs. In FIG. 67 the gate 728 is the only one of gates 727, 728, 730, 731, 733 and 734 to have a one on its input and the output $\overline{OHU0P}_{0-15}$ is therefore a nought and the outputs $\overline{OHU0P}_{16-23}$, $\overline{OHU1D}_{0-23}$ and $\overline{OHU2D}_{0-23}$ are all ones. Therefore in FIGS. 54 and 55 the gates 644 associated with bits nought to fifteen are open and the gates 644 associated with bits sixteen to twenty-three are closed. All of the gates 645 and 646 are closed and the gates 655 associated with bits nineteen and twenty are open since the inputs $\overline{SNR_{10}}$, $\overline{SNR_{11}}$ and $\overline{FS}$ are all noughts. The gates 651 associated with bits nought to fifteen are open and the gates 651 associated with bits sixteen to twenty-three are closed. All of the gates 652 and the gates 653 associated with bits nought to eighteen and twenty-two and twenty-three are closed and the gates 653 associated with bits nineteen to twenty-one are open. The gates 659 associated with bits nineteen and twenty are closed.

To carry out the field splitting operation the control inputs $\overline{MB}$, $\overline{GHB}$ and $\overline{MABP}$ (FIG. 54) are noughts and the control inputs $\overline{MAB}$, $\overline{ROP1}$, $\overline{ROP2}$, $\overline{GHUBP}$, $\overline{OHU1U}$ and $\overline{OHL0P}$ are ones, the remaining control inputs being set for an end-around shift as previously described. With the mask register MA set as shown in FIG. 65 the inputs to the gates 622 (FIG. 54) cause noughts on the outputs of the gates 622 associated with bits twelve to twenty and ones on the outputs of the gates 622 associated with bits nought to eleven and twenty-one to twenty-three. The gates 621 associated with bits twelve to twenty are therefore open and the remainder of the gates 621 are closed. Therefore, the output on the highway HWB comprises noughts for bits nought to eleven, fields 1 and 2 for bits twelve to twenty and noughts for bits twenty-one to twenty-three, and this output is applied to the shift network. After shifting ten places end-around as required by bits five to nine of the shift number register SNR the SOP outputs comprise field 1 for bits nought to six, noughts for bits seven to twenty-one and field 2 for bits twenty-two and twenty-three. These outputs pass through the gates 640 and, since the control inputs $\overline{OHU0P}_{0-15}$ are noughts, bits nought to fifteen pass through the gates 644 without any further shifting. For bits sixteen to twenty-three, however, only gates 655 (FIG. 55) associated with bits nineteen and twenty are open. The inputs to these gates are connected to the outputs $\overline{AA_{22}}$ and $\overline{AA_{23}}$ associated with bits twenty-two and twenty-three and therefore the two-bit field 2 appears on the output $OHU_{19}$ and $OHU_{20}$, the outputs for bits sixteen, to eighteen and twenty-one to twenty-three being noughts. The input applied to the upper address register UAR is therefore as shown in FIG. 65.

The input on the general highway $\overline{GH_X}$ is also connected to the inputs of the gates 651, 652, 653 and 659 (FIGS. 54 and 55). With the mask register MA set as shown in FIG. 65 the outputs from the gates 649 (FIG. 54) are noughts for bits nought to eleven and twenty-one to twenty-three and ones for bits twelve to twenty. Consequently, although the control inputs $\overline{GHLBP}_{0-15}$ are noughts only gates 651 associated with bits nought to eleven are open and field 3 passes through these gates without any further shifting, the outputs from the gates 651 associated with bits twelve to twenty-three being noughts. For bits sixteen to twenty-three only gates 653 associated with bits nineteen to twenty-one are open since the control inputs $\overline{GH2D}_{19-21}$ are noughts. The inputs to these gates are connected to the inputs $\overline{GH_{21}}$, $\overline{GH_{22}}$ and $\overline{GH_{23}}$ from the general highway and therefore the three-bit field 0 appears on the outputs $OHL_{19}$, $OHL_{20}$ and $OHL_{21}$, the outputs for bits sixteen to eighteen and twenty-two and twenty-three being noughts. The input applied to the lower address register LAR is therefore as shown in FIG. 65.

ADDRESS REGISTER OUTPUT AND ADDRESS COMPOSER.—FIGS. 68 AND 69

The outputs from the upper and lower address registers UAR and LAR are fed onto the general highway GH by means of a set of gates, part of which is shown in FIG. 68. For each of bits sixteen to twenty-three of the upper and lower address registers there are provided two three-input NOR gates 740 and 741. The first input of the gate 740 is connected to the output of the bit Y of the register UAR where Y represents any one of bits sixteen to twenty-three. The second input of the gate 740 is connected to a field selection digit input $SFD_0$ and the third input thereof is connected to a field selection digit input $\overline{SFD_1}$. The first input of the gate 741 is connected to the output of the bit Y of the register LAR. The second input of the gate 741 is connected to the input $SFD_0$ and the third input thereof is connected to a field selection digit input $SFD_1$. The outputs of the gates 740 and 741 are connected together to give the output $\overline{GHY}$ for bit Y on general highway. For each of bits nought to fifteen of the upper and lower address registers there are provided two three-input NOR gates 742 and 743. The first input of the gate 742 is connected to the output of the bit Z of the register UAR where Z represents any one of bits nought to fifteen. The second input of the gate 742 is connected to a field selection digit input $\overline{SFD_0}$ and the third input thereof is connected to the input $SFD_1$. The first input of the gate 743 is connected to the output of the bit Z of the register LAR. The second input of the gate 743 is connected to the input $\overline{SFD_0}$ and the third input thereof is connected to the input $\overline{SFD_1}$. The outputs of the gates 742 and 743 are connected together to give the output $GH_Z$ for bit Z on the general highway. In the full set of gates there are eight each of the gates 740 and 741 and sixteen each of the gates 742 and 743.

To select the required field the field selection digit inputs $SFD_0$ and $SFD_1$ are set to the binary number of the required field. For example, to select field 2 which is held in the upper address register UAR as shown in FIG. 65 the inputs $SFD_0$ and $SFD_1$ would be set to nought and one respectively and the inputs $\overline{SFD_0}$ and $\overline{SFD_1}$ would therefore be one and nought respectively. Under these conditions the gates 740 would be open and the gates 741, 742 and 743 would be closed. Therefore the contents of bits sixteen to twenty-three of the upper address register UAR would be fed onto the general highway. Similarly to select field 3 which is held in the lower address register LAR the inputs $SFD_0$ and $SFD_1$ would both be set to ones. Under these conditions the gates 743 would be open and the gates 740, 741 and 742 would be closed. Therefore the contents of bits nought to fifteen of the lower address register LAR would be fed onto the general highway.

The address composer 608 (FIG. 52) is shown in FIG. 69 and comprises sixteen three-input NOR gates 745–760. The first input of each of the gates 745–760 is connected to a control input $\overline{ADS}$ and the second input of each of the gates 745–752 is connected to the field selection digit input $\overline{SFD_0}$. The third input of the gate 745 is connected to the inverse of the bit fifteen on the general highway $\overline{GH_{15}}$ and the output thereof produces the address bit $ADB_{15}$. The third input of the gate 746 is connected to the inverse of the bit fourteen on the general highway $\overline{GH_{14}}$ and the output thereof produces the address bit $ADB_{14}$. The third input of the gate 747 is connected to the inverse of the bit thirteen on the general highway $\overline{GH_{13}}$ and the output thereof produces the address bit $ADB_{13}$. The third input of the gate 748 is connected to the inverse of the bit twelve on the general highway $\overline{GH_{12}}$ and the output thereof produces the address bit $ADB_{12}$. The third input of the gate 749 is connected to the inverse of the bit eleven on the general highway $\overline{GH_{11}}$ and the output thereof produces the address bit $ADB_{11}$. The third input of the gate 750 is connected to the inverse of the bit ten on the general highway $\overline{GH_{10}}$ and the output thereof produces the address bit $ADB_{10}$. The third input of the gate 751 is connected to the inverse of the bit nine on the general highway $\overline{GH_9}$ and the output thereof produces the address bit $ADB_9$. The third input of the gate 752 is connected to the inverse of the bit eight on the general highway $\overline{GH_8}$ and the output thereof produces the address bit $ADB_8$. The second and third inputs of the gate 753 are respectively connected to the inverse of the bits eighteen and seven on the general highway $\overline{GH_{18}}$ and $\overline{GH_7}$ and the output thereof produces the address bit $ADB_7$. The second and third inputs of the gate 754 are respectively connected to the inverses of the bits seventeen and six on the general highway $\overline{GH_{17}}$ and $\overline{GH_6}$ and the output thereof produces the address bit $ADB_6$. The second and third inputs of the gate 755 are respectively connected to the inverses of the bits sixteen and five on the general highway $\overline{GH_{16}}$ and $\overline{GH_5}$ and the output thereof produces the address bit $ADB_5$. The second and third inputs of the gate 756 are respectively connected to the inverse of the bits twenty-three and four on the general highway $\overline{GH_{23}}$ and $\overline{GH_4}$ and the output thereof produces the address bit $ADB_4$. The second and third inputs of the gate 757 are respectively connected to the inverses of the bits twenty-two and three on the general highway $\overline{GH_{22}}$ and $\overline{GH_3}$ and the output thereof produces the address bit $ADB_3$. The second and third inputs of the gate 758 are respectively connected to the inverse of the bits twenty-one and two on the general highway $\overline{GH_{21}}$ and $\overline{GH_2}$ and the output thereof produces the address bit $ADB_2$. The second and third inputs of the gates 759 are respectively connected to the inverses of the bits twenty and one on the general highway $\overline{GH_{20}}$ and $\overline{GH_1}$ and the output thereof produces the address bit $ADB_1$. The second and third inputs of the gate 760 are respectively connected to the inverses of the bits nineteen and nought on the general highway $\overline{GH_{19}}$ and $\overline{GH_0}$ and the output thereof produces the address bit $ADB_0$.

In operation, when it is desired to address the store the control input $\overline{ADS}$ is made a nought and the output from the gates 745–760 is dependent on the information on the general highway which in turn is dependent on the values of the field selection digit inputs $SFD_0$ and $SFD_1$. Fields 0 and 2 are limited to a maximum length of eight bits each and when one of these two fields is selected the field selection digit input $\overline{SFD_0}$ is a one. Therefore the gates 745 and 752 are closed and the address bits $ADB_{15}$ to $ADB_8$ are all noughts. Furthermore, since the inverses of the bits nineteen to twenty-three on the general highway, $\overline{GH_{19}}$ to $\overline{HG_{23}}$ are respectively connected to the inputs to the gates 760 to 756 a five bit address field occurring in field 0 or field 2 always appears in the correct position at the least significant end of the address output.

EXECUTIVE REGISTER AND CONTROL SYSTEM.—FIGS. 70–73

Figure 70:
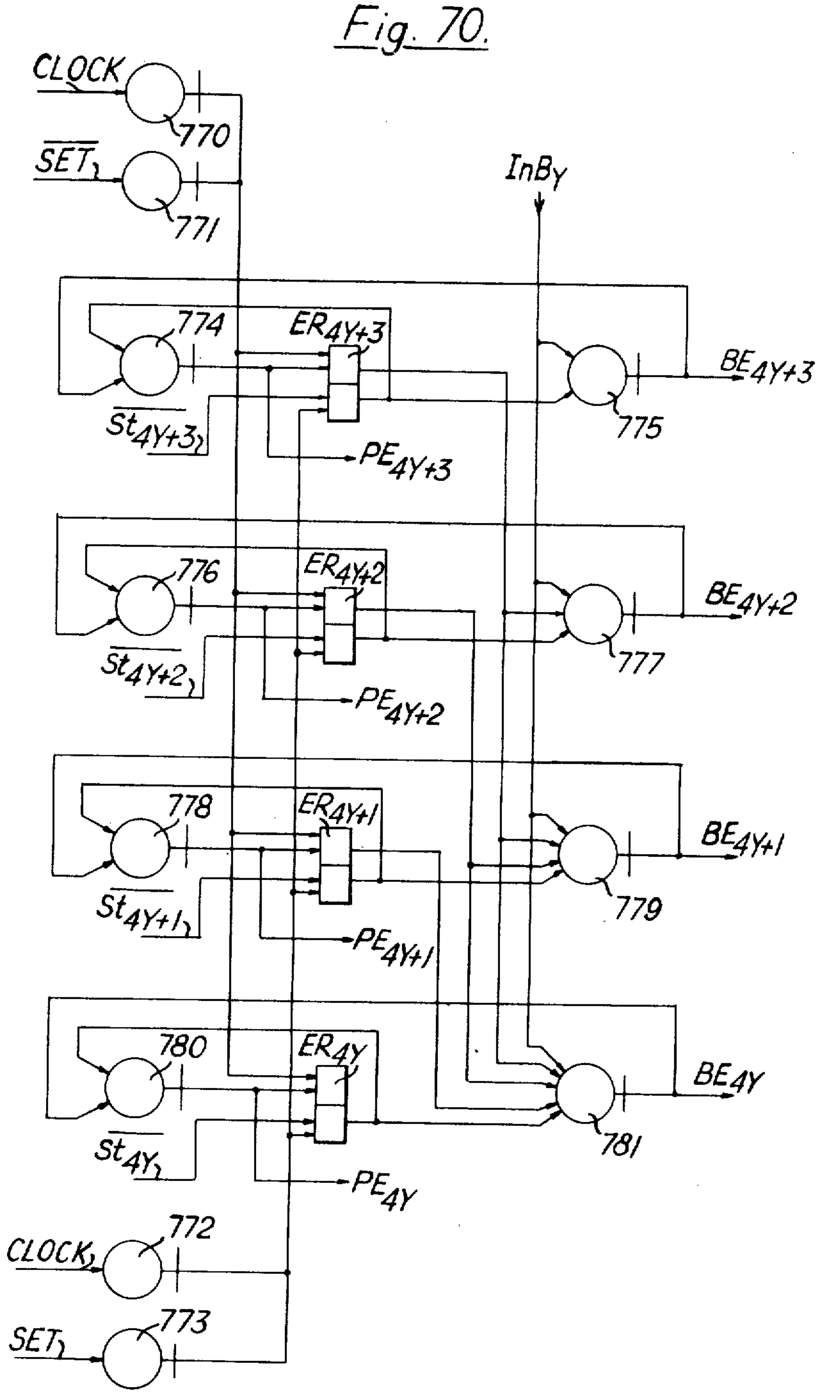

The twenty-four bits of the executive register ER and its associated gates are divided into six blocks each of four bits, the blocks being numbered from nought to five. FIG. 70 shows the set of gates associated with one block, block Y, of the blocks nought to five which includes four bits $ER_{4Y}$ to $ER_{4Y+3}$ of the register ER, Y having a value of 0, 1, 2, 3, 4, or 5. Each of the bits $ER_{4Y}$ to $ER_{4Y+3}$ has two inputs, two inverse inputs, one output and one inverse output. The first input of the bit $ER_{4Y+3}$ is connected to the combined outputs of two single input NOR gates 770 and 771. The input of the gate 770 is connected to a clock pulse input CLOCK and the input of the gate 771 is connected to a control input $\overline{SET}$. Similarly, the first inverse input of the bit $ER_{4Y+3}$ is connected to the combined outputs of two single input NOR gates 772 and 773. The input of the gate 772 is connected to one clock pulse input CLOCK and the input of the gate 773 is connected to a control input SET. The inverse output of the bit $ER_{4Y+3}$ is connected to one input of a two-input NOR gate 774 to one input of a two-input NOR gate 775. The second input of the gate 775 is connected to a control input $InB_Y$ and the output thereof produces an output $BE_{4Y+3}$ and is also connected to the second input of the gate 774. The output of the gate 774 produces an output $PE_{4Y+3}$ and is also connected to the second input of the bit $ER_{4Y+3}$. The second inverse input of the bit $ER_{4Y+3}$ is connected to the inverse output $\overline{St_{4Y+3}}$ from the store output register.

The first input of the bit $ER_{4Y+2}$ is connected to the combined outputs of the gate 770 and 771 and the first inverse input thereof is connected to the combined outputs of the gates 772 and 773. The inverse output of the bit $ER_{4Y+2}$ is connected to one input of a two-input NOR gate 776 and to one input of a three-input NOR gate 777. The second input of the gate 777 is connected to the control input $InB_Y$ and the third input thereof is connected to the output of the bit $ER_{4Y+3}$. The output of the gate 777 produces an output $BE_{4Y+2}$ and is also connected to the second input of the gate 776. The output of the gate 776 produces an output $PE_{4Y+2}$ and is also connected to the second input of the bit $ER_{4Y+2}$. The second inverse input of the bit $ER_{4Y+2}$ is connected to the inverse output $\overline{St_{4Y+2}}$ from the store output register.

The first input of the bit $ER_{4Y+1}$ is connected to the combined outputs of the gates 770 and 771 and the first inverse input thereof is connected to the combined outputs of the gates 772 and 773. The inverse output of the bit $ER_{4Y+1}$ is connected to one input of a two-input NOR gate 778 and to one input of a four-input NOR gate 779. The second input of the gate 779 is connected to the control input $InB_Y$, the third input thereof is connected to the output of the bit $ER_{4Y+3}$ and the fourth input thereof is connected to the output of the bit $ER_{4Y+2}$. The output of the gate 779 produces an output $BE_{4Y+1}$ and is also connected to the second input of the gate 778. The output of the gate 778 produces an output $PE_{4Y+1}$ and is also connected to the second input of the bit $ER_{4Y+1}$. The second inverse input of the bit $ER_{4Y+1}$ is connected to the inverse output $\overline{St_{4Y+1}}$ from the store output register.

The first input of the bit $ER_{4Y}$ is connected to the combined outputs of the gates 770 and 771 and the first inverse input thereof is connected to the combined outputs of the gates 772 and 773. The inverse output of the bit $ER_{4Y}$ is connected to one input of a two-input NOR gate 780 and to one input of a five-input NOR gate 781. The second input of the gate 781 is connected to the control input $InB_Y$, the third input thereof is connected to the output of the bit $ER_{4Y+3}$, the fourth input thereof is connected to the output of the bit $ER_{4Y+2}$ and the fifth input thereof is connected to the output of the bit $ER_{4Y+1}$. The output of the gate 781 produces an output $BE_{4Y}$ and is also connected to the second input of the gate 780. The output of the gate 780 produces an output $PE_{4Y}$ and is also connected to the second input of the bit $ER_{Y4}$. The second inverse input of the bit $ER_{4Y}$ is connected to the inverse output $\overline{St_{4Y}}$ from the store output register.

Figure 71:
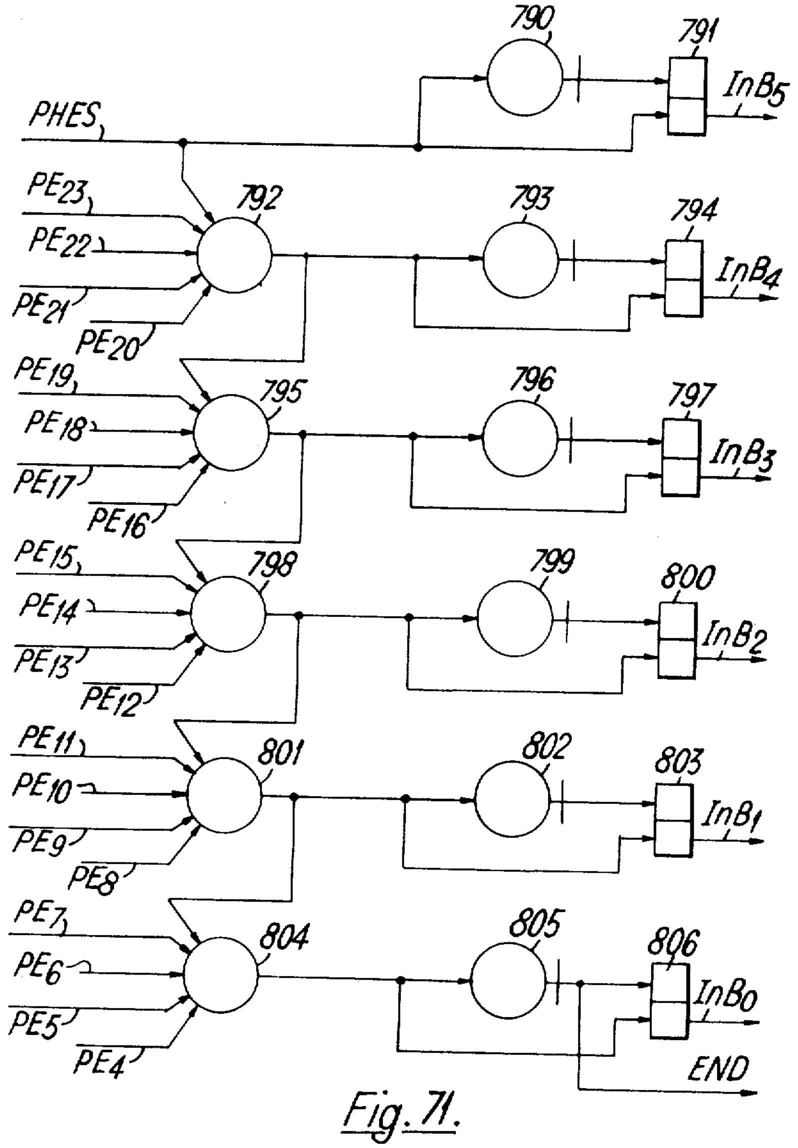

The control inputs $InB_Y$ to the gates 775, 777, 779 and 781 for each of blocks nought to five of the executive register are derived from the set of gates and flip-flops shown in FIG. 71. A control input PHES is connected via a single input NOR gate 790 to the input of a flip-flop 791 and directly to the inverse input thereof. The inverse output of the flip-flop 791 produces the control input $InB_5$ to block five of the executive register. A five-input OR gate 792 has one input connected to the control input PHES and the other four inputs respectively connected to the four outputs $PE_{23}$, $PE_{22}$, $PE_{21}$ and $PE_{20}$ from block five of the executive register. The output of the gate 792 is connected via a single input NOR gate 793 to the input of a flip-flop 794 and directly to the inverse input thereof. The inverse output of the flip-flop 794 produces the control input $InB_4$ to block four of the executive register. A five-input OR gate 795 has one input connected to the output of the gate 792 and the other four inputs respectively connected to the four outputs $PE_{19}$, $PE_{18}$, $PE_{17}$ and $PE_{16}$ from block four of the executive register. The output of the gate 795 is connected via a single input NOR gate 796 to the input of a flip-flop 797 and directly to the inverse input thereof. The inverse output of the flip-flop 797 produces the control input $InB_3$ to block three of the executive register. A five-input OR gate 798 has one input connected to the output of the gate 795 and the four inputs respectively connected to the four ouputs $PE_{15}$, $PE_{14}$, $PE_{13}$ and $PE_{12}$ from block three of the executive register. The output of the gate 798 is connected via a single input NOR gate 799 to the input of a flip-flop 800 and directly to the inverse input thereof. The inverse output of the flip-flop 800 produces the control input $InB_2$ to block two of the executive register. A five-input OR gate 801 has one input connected to the output of the gate 798 and the other four inputs respectively connected to the four outputs $PE_{11}$, $PE_{10}$, $PE_9$ and $PE_8$ from block two of the executive register. The output of the gate 801 is connected via a single input NOR gate 802 to the input of a flip-flop 803 and directly to the inverse input thereof. The inverse output of the flip-flop 803 produces the control input $InB_1$ to block one of the executive register. A five-input OR gate 804 has one input connected to the output of the gate 801 and the other four inputs respectively connected to the four outputs $PE_7$, $PE_6$, $PE_5$ and $PE_4$ from block one of the executive register. The output of the gate 804 is connected via a single input NOR gate 805 to the input of a flip-flop 806 and directly to the inverse input thereof. The inverse output of the flip-flop 806 produces the control input $InB_0$ to block nought of the executive register. The gate 805 also produces an output END.

In operation, all twenty-four bits of the executive register initially contain noughts prior to the entry of an internal order. The internal orders are of twenty-four bits and comprise a pattern of ones and noughts, the location of each one determining a particular action for the computer to carry out. To enter an internal order into the executive register from the main store, the control input SET is made a one, the input $\overline{SET}$ therefore being a nought. The output of the gate 771 is therefore a one and the input to each of the twenty-four bits of the executive register is a one regardless of the outputs of the gates 774, 776, 778 and 780 in each of blocks nought to five. The combined outputs of the gates 772 and 773 is a nought and the inverse inputs to the twenty four bits of the executive register are therefore dependent on the output from the main store. Suppose, for example, that the input $\overline{St}_{4Y+3}$ is a one both the input and the inverse input to the bit $ER_{4Y+3}$ are ones and the content of this bit remains unchanged as a nought. If the input $\overline{St}_{4Y+2}$ is a nought the input to the bit $ER_{4Y+2}$ is a one and the inverse input is a nought. Under these conditions the bit $ER_{4Y+2}$ changes its state and the content changes from a nought to a one.

After the entry of the internal order into the executive register the control input SET is changed to a nought, the input $\overline{SET}$ therefore being a one. During normal operation the control input PHES (FIG. 71) is a nought and the ones are read out from the executive register on subsequent beats starting from the most significant end of the register. Suppose, for example, that the pattern entered into the four bits $ER_{4Y+3}$ to $ER_{4Y}$ is 0, 1, 0, 1, and let block Y be block five of the executive register. Since the control input PHES is a nought the flip-flop 791 (FIG. 71) will be set to a one and the inverse output $InB_5$ will be a nought. Under these conditions on the first clock pulse after the internal order is entered into the executive register the two inputs to the gate 775 will be a nought and a one and the output $BE_{23}$ will be nought. Also, the two inputs to the gate 774 will be a one and a nought and the output $PE_{23}$ will be a nought. The bit $ER_{23}$ will therefore remain set at a nought.

The three inputs to the gate 777, however, are all noughts and the output $BE_{22}$ is therefore a one on the first clock pulse. The output of the bit $ER_{22}$ is also a one and, since this is applied to one input of each of the gates 779 and 781, the outputs $BE_{21}$ and $BE_{20}$ are both noughts regardless of the contents of the bits $ER_{21}$ and $ER_{20}$. The inputs to the gate 776 are a nought and a one and the output $PE_{22}$ will again be a nought and the bit $ER_{22}$ will be changed from a one to a nought by the clock pulse. Since the bit $ER_{21}$ is already set to a nought and the output $BE_{21}$ is a nought the output $PE_{21}$ will be a nought and the bit $ER_{21}$ will remain set at a nought. The bit $ER_{20}$ however, is set to a one and since the output $BE_{20}$ is a nought the two inputs to the gate 780 are both noughts. The output $PE_{20}$ is therefore a one and on the first clock pulse the bit $ER_{20}$ remains set at a one. Since the output $PE_{20}$ is a one the output of the OR gate 792 is also a one and therefore the outputs of the OR gates 795, 798, 801 and 804 are also all ones. Consequently, the control inputs $InB_4$, $InB_3$, $InB_2$, $InB_1$ and $InB_0$ are all ones and the outputs $BE_{19}$ to $BE_0$ are all noughts. Therefore on the first clock pulse the only output which is a one is the output $BE_{22}$.

Prior to the second clock pulse the bits $ER_{23}$, $ER_{22}$ and $ER_{21}$ are already set to noughts and the outputs $BE_{23}$, $BE_{22}$ and $BE_{21}$ are all noughts. All five inputs to the gate 781 are therefore noughts and the output $BE_{20}$ is a one. The inputs to the gate 780 are a one and a nought and the output $PE_{20}$ is a nought and the clock pulse causes the bit $ER_{20}$ to become set to a nought. Since the output $PE_{20}$ is a nought the output of the gate 792 becomes a nought. The second clock pulse therefore causes the flip-flop 794 to become reset to a one and the control input $InB_4$ becomes a nought. If there are any ones held in block four one fo the outputs $PE_{19}$ to $PE_{16}$ will be a one on the second clock pulse and the outputs of the gates 795 798, 801 and 804 will all be ones with the result that the control inputs $InB_3$ to $InB_0$ will all be ones and blocks three to nought of the executive register will be inhibited from giving a one output on the third clock pulse. If, however, clock four contains only noughts all of the outputs $PE_{19}$ to $PE_{16}$ will be noughts and the output of the OR gate 795 will also be a nought. The second clock pulse causes the flip-flop 797 to become reset to a one and the control input $InB_3$ also becomes a nought. In this way the block inhibit inputs are changed to a nought until the block containing the next most significant one is reached, the block inhibit inputs for the blocks of lesser significance remaining a one until all blocks of greater significance have been cleared of ones in the manner described above.

If it is desired for any reason to interrupt the carrying out of an internal order the control input PHES is changed from a nought to a one which causes all of the outputs of the OR gates 792, 795, 798, 801 and 804 to become ones. On the next clock pulse after this change the flip-flops 791, 794, 797, 800, 803 and 806 are all set to noughts and the control inputs $InB_5$ to $InB_0$ all become ones thereby inhibiting the output of all of the blocks of the executive register. The interrupt order, which may be held in a register similar to the executive register, is then carried out and on the last beat of the interrupt order the control input PHES is again made a nought. On the next clock pulse the flip-flops 791, 794, 797, 800, 803 and 806 are changed to the states in which they would have been if the interrupt order had not occurred and the carrying out of the internal order is then resumed.

Figure 72A:
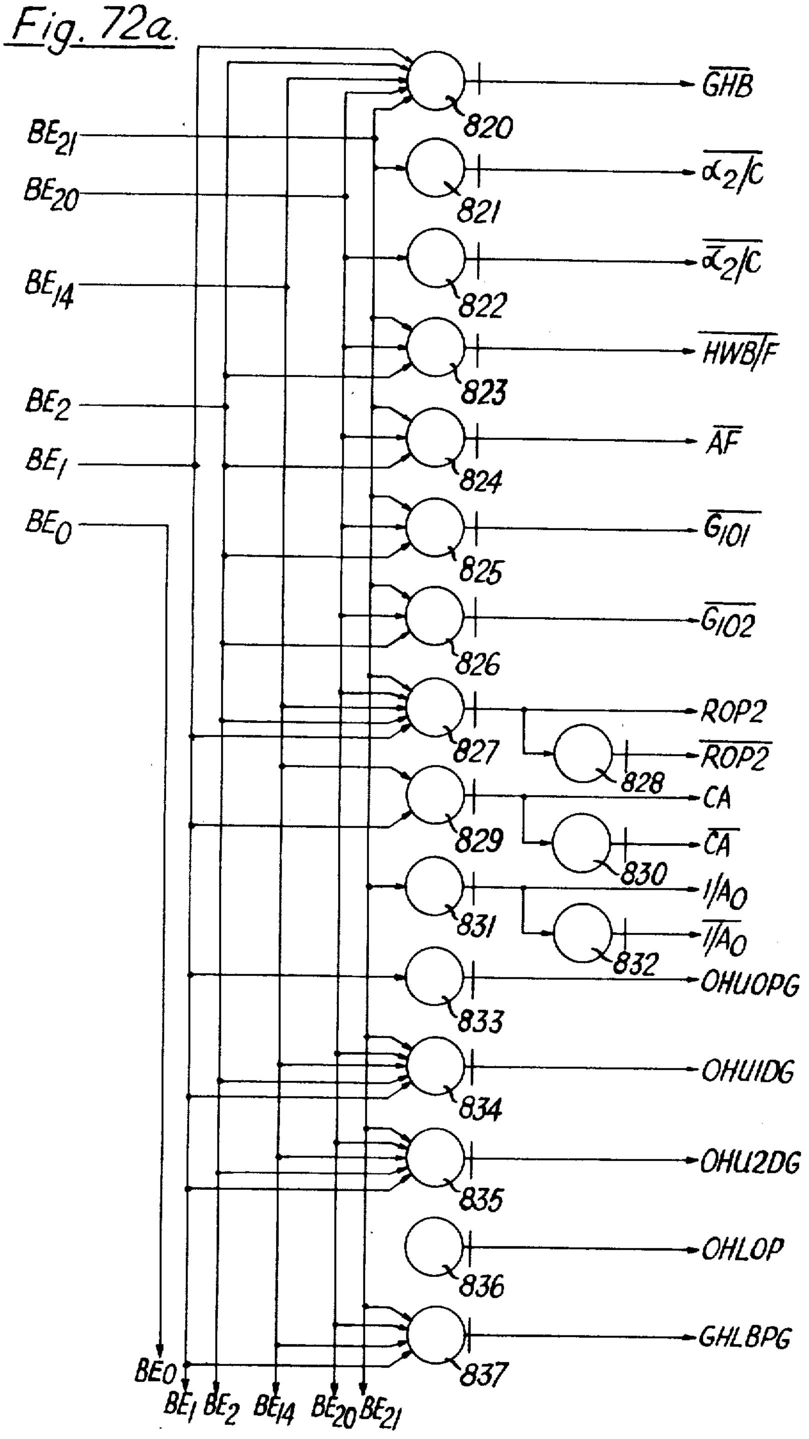
Figure 72B:
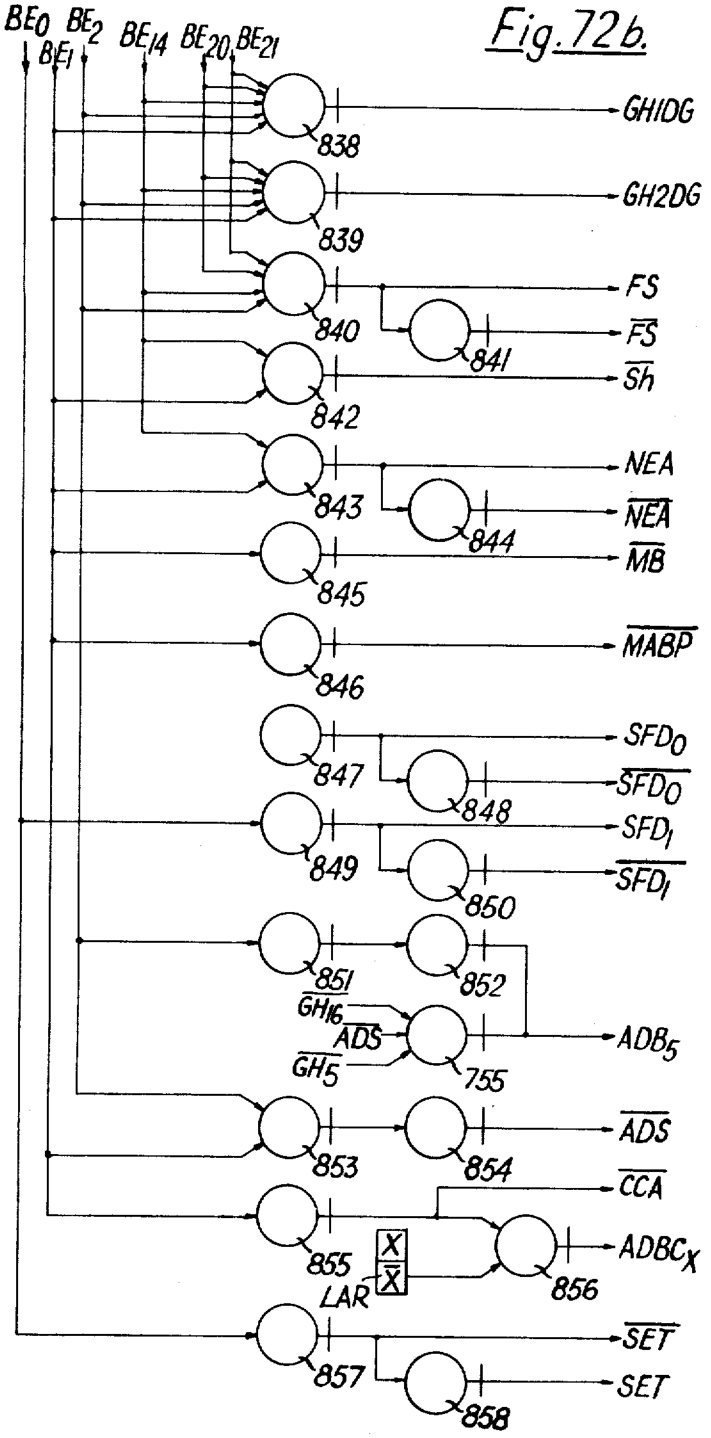

The BE outputs from the executive register system effect the control of the computer by means of the set of gates shown in FIGS. 72*a* and 72*b*. This set of gates includes a NOR gate 820 having an output producing the control input $\overline{GHB}$ and a NOR gate 821 having an output producing the control input $\alpha_2/C$. A NOR gate 822 has an output which produces the control input $\alpha_2/C$ and a NOR gate 823 has an output which produces the control input $\overline{HWB/F}$. A NOR gate 824 has an output which produces the control input $\overline{AF}$ and a NOR gate 825 has an output which produces the control input $\overline{G_{101}}$. A NOR gate 826 has an output which produces the control input $\overline{G_{102}}$ and a NOR gate 827 has an output which produces the control input ROP2. The output of the gate 827 is connected to the input of a single input NOR gate 828 the output of which produces the control input $\overline{ROP2}$. A NOR gate 829 has an output which produces the control input CA and this output is also connected to the input of a single input NOR gate 830 the output of which produces the control input $\overline{CA}$. A NOR gate 831 has an output which produces the control input $1/A_0$ and this output is also connected to the input of a single input NOR gate 832 the output of which produces the control input $\overline{1/A_0}$. A NOR gate 833 has an output which produces the control input OHU0PG and a NOR gate 834 has an output which produces the control input OHU1DG. A NOR gate 835 has an output which produces the control input OHU2DG and a NOR gate 836 has an output which produces the control input OHL0P. A NOR gate 837 has an output which produces the control input GHLBPG and a NOR gate 838 has an output which produces the control input GH1DG. A NOR gate 839 has an output which produces the control input GH2DG and a NOR gate 840 has an output which produces the control input FS and this output is also connected to the input of a single input NOR gate 841 the output of which produces the control input $\overline{FS}$. A NOR gate 842 has an output which produces the control input $\overline{Sh}$ and a NOR gate 843 has an output which produces the control input NEA and this output is also connected to the input of a single input NOR gate 844 the output of which produces the control input $\overline{NEA}$. A NOR gate 845 has an output which produces the control input $\overline{MB}$ and a NOR gate 846 has an output which produces the control input $\overline{MABP}$. A NOR gate 847 has an output which produces the field selection digit $SFD_0$ and this output is also connected to the input of a single input NOR gate 848 the output of which produces the field selection digit input $\overline{SFD_0}$. A NOR gate 849 has an output which produces the field selection digit input $SFD_1$ and this output is also connected to the input of a single input NOR gate 850 the output of which produces the field selection digit input $\overline{SFD_1}$. A NOR gate 851 has its output connected to the input of a single input NOR gate 852 the output of which is connected to the output of the gate 755 of the address composer (FIG. 69), the combined outputs giving the address bit $ADB_6$. A NOR gate 853 has its output connected to the input of a single input NOR gate 854 the output of which produces the control input $\overline{ADS}$ and a NOR gate 855 has an output which produces a control input $\overline{CCA}$.

For each of the sixteen least significant bits of the lower address register LAR there is provided a two-input NOR gate 856 having one input connected to the inverse output of the associated bit of the register LAR and the other input connected to the control input $\overline{CCA}$. The ouput of the gate 856 produces an address bit $ADBC_X$ where X has a value nought to fifteen.

A further NOR gate 857 has an output which produces the control input $\overline{SET}$ and this output is also connected to the input of a single input NOR gate 858 the output of which produces the control input SET.

In operation the BE outputs from the executive register system cause the carrying out of a single predetermined step of an internal order. Suppose, for example, that when bit twenty-one of the executive register is set to a one the output $BE_{21}$ is to cause an ADD operation. The output $BE_{21}$ is shown connected to one input of each of the gates 820, 821, 823, 824, 825, 826, 827, 831, 834, 835, 837, 838, 839 and 840. When the output $BE_{21}$ is a one the output of each of these gates is a nought. Other BE outputs are connected to further inputs of these gates but when the output $BE_{21}$ is a one the output of each of these gates is a nought. Other BE outputs are also connected to inputs of the gates 822, 829, 833, 836, 842, 843, 845, 846, 847, 849, 851, 853 and 855 but when the output $BE_{21}$ is a one all other BE outputs are noughts and the output of each of these latter gates is therefore a one. The control inputs $\overline{GHB}$, $\overline{\alpha_2/C}$, $\overline{HWB/F}$, $\overline{AF}$, $\overline{G_{101}}$, $\overline{G_{102}}$, $\overline{ROP2}$, $\overline{CA}$, $\overline{1/A_0}$, OHU1DG, OHU2DG, GHLBPG, GH1DG, GH2DG, FS, $\overline{NEA}$, $\overline{ADS}$ and SET are noughts and the remaining control inputs are ones and under these conditions the function unit is set up to carry out an ADD function in the manner previously described.

Similarly suppose that when bit twenty of the executive register is set to a one the output $BE_{20}$ is to cause a SUBTRACT operation. The output $BE_{20}$ is shown connected to one input of each of the gates 820, 822, 823, 824, 825, 826, 827, 834, 835, 837, 838, 839 and 840. When the output $BE_{20}$ is a one the output of each of these gates is a nought and the control inputs are the same as for the ADD function except that the control inputs $\overline{\alpha_2/C}$ and $\overline{1/A_0}$ are noughts and the control inputs $\alpha_2/C$ and $1/A_0$ are ones. Under these conditions the function unit is set up to carry out a SUBTRACT function in the manner previously described.

As a further example suppose that when bit fourteen of the executive register is set to a one the output $BE_{14}$ is to cause an end-around shift. The output $BE_{14}$ is shown connected to one input of each of the gates 820, 827, 829, 834, 835, 837, 838, 839, 840, 842 and 843. When the output $BE_{14}$ is a one the output of each of these gates is a nought and the control inputs $\overline{GHB}$, ROP2, CA, $\overline{1/A_0}$, OHU1DG, OHU2DG, GHLBPG, GH1DG, GH2DG, FS, *Sh*, NEA, $\overline{ADS}$ and SET are all noughts and the remaining control inputs are all ones. Under these conditions the function unit is set up to carry out an end-around shift in the manner previously described.

Figure 73:
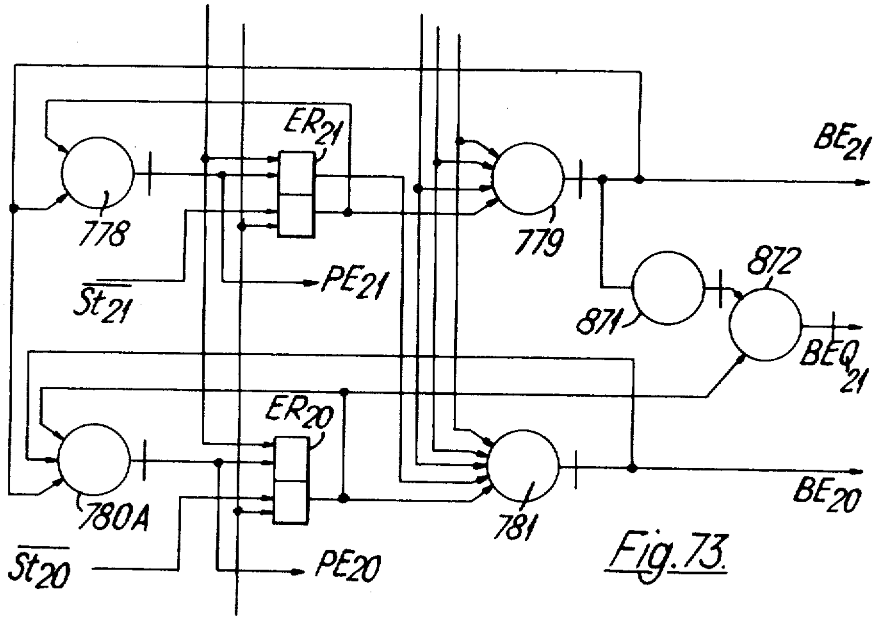

The three outputs $BE_2$, $BE_1$ and $BE_0$ are reserved for special operations to be described but the remaining twenty-one BE outputs may be used to cause twenty-one different operations of the computer in the manner described above. Other functions may require control inputs in addition to those shown in FIG. 72 and these may be provided by the addition of further NOR gates whose outputs produce the required control inputs. Furthermore, the range of operations controlled by the executive register may be extended by qualifying the operation caused by the setting of a particular bit by the setting of one or more other bits of the executive register. For example, if bit twenty-one of the executive register is set to one and bit twenty is a nought the ADD operation described above is carried out and if bit twenty-one is a nought and bit twenty is set to a one the SUBTRACT operation described above is carried out. If, however, bit twenty-one is set to a one and bit twenty is also set to a one to qualify the setting of bit twenty-one a different function such as ADD AND TEST is carried out. This qualifying action is achieved by modifying the required bits of the executive register system as shown in FIG. 73 which shows bits twenty and twenty-one of the executive register systems. The modification comprises replacing the gate 780 (FIG. 70) by a three-input NOR gate 780A, the additional input being connected to the output of the gate 779. The output of the gate 779 is also connected to the input of a single input NOR gate 871 the output of which is connected to one input of a two-input NOR gate 872. The other input of the gate 872 is connected to the inverse output of the bit $ER_{20}$ and the output of the gate 872 produces the qualifying output $BEQ_{21}$.

If the bit $ER_{21}$ is set to a one and the bit $ER_{20}$ is a nought the inverse output of the bit $ER_{20}$ is a one and the gate 872 is closed, the qualifying output $BEQ_{21}$ being a nought. When the bit $ER_{21}$ is cleared the output $BE_{21}$ is a one and the ADD operation is carried out as previously described. Similarly, if the bit $ER_{21}$ is a nought and the bit $ER_{20}$ is set to a one, when the bit $ER_{20}$ is cleared the output of the gate 779 is a nought, the output of the gate 871 is a one and the qualifying output $BEQ_{21}$ is a nought. The output $BE_{20}$ therefore causes the SUBTRACT operation to be carried out as previously described. However, when both of the bits $ER_{21}$ and $ER_{20}$ are set to a one the inverse output of the bit $ER_{20}$ is a nought. Therefore when the bit $ER_{21}$ is cleared the output $BE_{21}$ is a one, the output of the gate 871 is a nought and the qualifying output $BEQ_{21}$ is also a one and is applied to the control gates to cause the qualifying action in the same way as the BE outputs. The gate 871 is closed by the output of the bit $ER_{21}$ and the output $BE_{20}$ therefore remains a nought but since the output of the gate 779 is applied to one input of each of the gates 778 and 780A the bit $ER_{20}$ is cleared at the same time as the bit $ER_{21}$. On the next clock pulse the output $BE_{20}$ is a nought and the next most significant bit set to a one is cleared.

Although the qualifying action has been described with adjacent bits the qualifying bit may be any bit of lower significance than the bit to be qualified and if desirable, more than one qualifying bit may be provided and since each qualifying bit is cleared at the same time as the qualified bit there is no interference with the normal action of the remaining bits of the executive register system.

The three outputs $BE_2$, $BE_1$ and $BE_0$ are reserved for the special operations required to read the next external order, carry out the field splitting operation and read the next internal order into the executive register. The control counter defining the address of the next external order is held in the main store at address thirty-two and the output $BE_2$ is required to cause the contents of this address to be entered into the lower address register and also to cause the contents to be indexed and returned to the same address. This operation therefore requires a read and write operation on the main store. To achieve this the output $BE_2$ is connected to one input of each of the gates 820, 823, 824, 825, 826, 827, 834, 835, 838, 839, 840, 851 and 853 and therefore when the output $BE_2$ is a one the control inputs $\overline{GHB}$, $\overline{HWB/F}$, $\overline{AF}$, $\overline{G_{101}}$, $\overline{G_{102}}$, $\overline{ROP2}$, $\overline{CA}$, $\overline{1/A_0}$, OHU1DG, OHU2DG, GH1DG, GH2DG, FS, $\overline{NEA}$ and SET are noughts and the remaining control inputs are ones. Under these conditions the function unit is set up to carry out the INCREMENT function and, since the control input GHLBPG is a one the general highway lower by-pass gates 651, FIG. 54, are open. One input to the gate 853 is a one and the control input $\overline{ADS}$ is therefore a one and consequently the address bit outputs $ADB_{0-15}$ of the address composer, FIG. 69, are noughts with the exception of the address bit $ADB_5$ which is a one since the output of the gate 852 is a one. Address thirty-two is thus selected and the control counter contents at this address are entered onto the general highway, pass through the gates 651 onto the lower output highway OHL and are entered into the lower address register LAR. At the same time the control counter contents pass through the function unit where they are indexed, are entered onto the upper output highway OHU from which they are re-entered into the store at address thirty-two.

The ouput $BE_1$ is required to cause the next external order to be read from the main store at the address held in the lower address register LAR and to cause the field splitting operation to be carried out. This operation only requires a read operation on the main store and to achieve this the output $BE_1$ is connected to one input of each of the gates 820, 827, 829, 833, 834, 835, 837, 838, 839, 842, 843, 845, 846, 853 and 855. Therefore, when the output $BE_1$ is a one the control inputs $\overline{GHB}$, ROP2, CA, $1/A_0$, OHU0PG, OHU1DG, OHU2DG, GHLPBG, GH1DG, GH2DG, $\overline{FS}$, $\overline{Sh}$, NEA, $\overline{MB}$, $\overline{MABP}$, $\overline{CCA}$ and SET are noughts and the remaining control inputs are ones. Under these conditions the function unit is set up to carry out the field splitting operation. One input to the gate 853 is a one and the control input $\overline{ADS}$ is therefore a one and consequently the address bit outputs $ADB_{0-15}$ of the address composer, FIG. 69, are all noughts. However, the control input $\overline{CCA}$ to the gates 856 is a nought and the control counter address held in the sixteen least significant bits of the lower address register LAR appears on the address bit outputs $ADBC_X$. The external order is read from the main store at this address and split into the four fields which are entered into the upper and lower address registers UAR and LAR as previously described, the fields entered into the lower address register LAR over-writing the address previously held there.

The output $BE_0$ is required to cause the selection of the function field, here assumed to be field one, as the address of the next internal order and to cause this internal order to be entered into the executive register ER. This operation again only requires a read operation on the main store and to achieve this the output $BE_0$ is connected to one input of each of the gates 849 and 857. Therefore when the output $BE_0$ is a one the control inputs $\overline{HWB/F}$ and $\overline{AF}$ are both ones and the input gates 627 and 629. FIG. 54, to the function unit are closed preventing any input to the function unit. At the same time the control input SET is a one and the field selection digits $SFD_0$ and $SFD_1$ are a one and a nought respectively thus selecting field one for the input to the address composer FIG. 69. The next internal order is therefore read from the main store at the address defined by field one and this order is then entered into the executive register ER. On the next clock pulse the control input SET is a nought and the most significant bit of the executive register set to a one is cleared to start the carrying out of the internal order now held in the executive register.

MODIFIED FIELD SPLITTING SYSTEM.—FIGS. 74–92

In the field splitting system described with reference to FIG. 65 the fields are separated according to field number. For example, field one is always located at the least significant end of the upper address register UAR regardless of whether it is an address field or a function field. In some cases it is desirable that at least the two address fields of a four field external order should be located in the same parts of a register after the field splitting operation regardless of their location in the external word. A modified field splitting system capable of achieving this requirement will now be described. In order to limit the complexity of the system certain limitations have been placed on the field breakdown of an external order to be handled by this system. For a twenty-four bit word these limitations are as follows:

(1) Only one field may have a length of more than eight bits and no field may have a length of more than sixteen bits.

(2) The N field must be located in field 0 or field 3.

(3) If the N field is located in field 0 it may have a length of from one to sixteen bits and if the N field is located in field 3 it may have a length of from nine to sixteen bits.

(4) If field N is located in field 0 and field X is located in field 1, field X may have a maximum length of seven bits.

The majority of commonly used external orders fall within these limitations.

Figure 74:
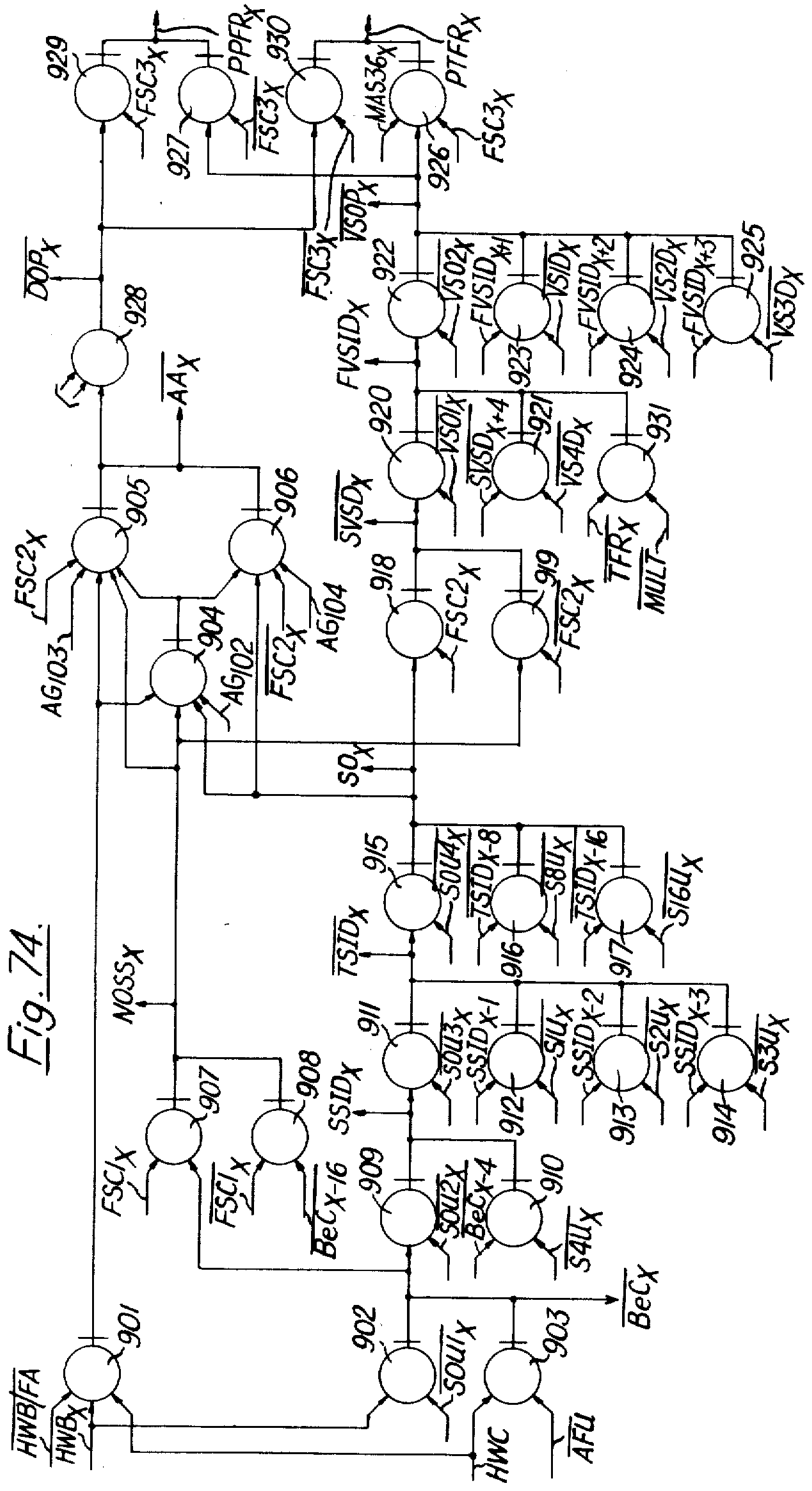

For the purposes of this field splitting system a modified function and shift unit is required and this is shown in FIG. 74 which shows the set of gates associated with the bit X of the twenty-four bits. The set of gates shown includes a three-input NOR gate 901 having one input connected to the bit X on the highway HWB, the second input connected to a control input $\overline{HWB/FA}$ and the third input connected to the bit X on the highway $HWC_X$. The bit X on the highway HWB is also connected to one input of a double input NOR gate 902 the other input of which is connected to a control input $\overline{SOU1_X}$. The bit X on the highway HWC is also connected to one input of a double input NOR gate 903 the other input of which is connected to a control input $\overline{AFU}$. The output of the gate 901 is connected to the first input of a four-input NOR gate 904 and to the first input of a five-input NOR gate 905. The output of the gate 904 is connected to the second input of the gate 905 and to the first input of a four-input NOR gate 906 the second input of which is connected to a control input $\overline{FSC2_X}$ and the third input of which is connected to a further control input $AG_{104}$. The second input of the gate 904 is connected to a control input $\overline{AG_{102}}$, the third input of the gate 905 is connected to a control input $FSC2_X$ and the fourth input therefor is connected to a further control input $AG_{103}$.

The outputs of the gates 902 and 903 are connected together to give an output $\overline{BcC_X}$ and are also connected to one input of a double input NOR gate 907 the other input of which is connected to a control input $FSC1_X$. A further double input NOR gate 908 has one input connected to a control input $\overline{FSC1_X}$ and the other input connected to the output $\overline{BcC_{X-16}}$ from the set of gates associated with the bit X—16, these connections being made end-around. The combined outputs of the gates 907 and 908 produce an output $NOSS_X$ and are also connected to the third input of the gate 904 and to the fifth input of the gate 905.

The output $NOSS_X$ from the gates 902 and 903 is also connected to one input of a double input NOR gate 909 the other input of which is connected to a control input $\overline{SOU2_X}$. A further double input NOR gate 910 has one input connected to the output $\overline{BCC_{X-4}}$ from the set of gates associated with bit X–4 and the other input connected to a control input $\overline{S4U_X}$. The outputs of the gates 909 and 910 are connected together to give an output $SSID_X$ and are also connected to one input of a double input NOR gate 911 the other input of which is connected to a control input $\overline{SOU3_X}$. The output $SSID_{X-1}$ from the set of gates associated with the bit X—1 is connected to one input of a double input NOR gate 912 the other input of which is connected to a control input $\overline{S1U_X}$ and the output $SSID_{X-2}$ from the set of gates associated with the bit X—2 is connected to one input of a double input NOR gate 913 the other input of which is connected to a control input $\overline{S2U_X}$. The output $SSID_{X-3}$ from the set of gates associated with the bit X—3 is connected to one input of a double input NOR gate 914 the other input of which is connected to a control input $\overline{S3U_X}$. The outputs of the gates 911, 912, 913 and 914 are connected together to give an output $\overline{TSID_X}$ and are also connected to one input of a double input NOR gate 915 the other input of which is connected to a control input $\overline{S3U4_X}$. The output $\overline{TSID_{X-8}}$ from the set of gates associated with the bit X–8 is connected to one input of a double input NOR gate 916 the other input of which is connected to a control input $\overline{S8U_X}$ and the output $\overline{TSID_{X-16}}$ from the set of gates associated with the bit X—16 is connected to one input of a double input NOR gate 917 the other input of which is connected to a control input $S16U_X$. The outputs of the gates 915, 916 and 917 are connected together to give an output $SO_X$ and are also connected to the fourth input of the gate 904, to the fourth input of the gate 906 and to the first input of a double input NOR gate 918 the other input of which is connected to the control input $FSC2_X$. The output $NOSS_X$ from the gates 907 and 908 is also connected to one input of a double input NOR gate 919 the other input of which is connected to the control input $FSC2_X$. The outputs of the gates 918 and 919 are connected together to give an output $\overline{SVSD_X}$ and are also connected to one input of a double input NOR gate 920 the other input of which is connected to a control input $\overline{VSO1_X}$. The output $\overline{SVSD_{X+4}}$ from the set of gates associated with the bit X+4 is connected to one input of a double input NOR gate 921 the other input of which is connected to a control input $\overline{VS4D_X}$. The outputs of the gates 920 and 921 are connected together to give an output $FVSID_X$ and are also connected to one input of a double input NOR gate 922 the other input of which is connected to a control input $\overline{VSO2_X}$. The output $FVSID_{X+1}$ from the set of gates associated with the bit X+1 is connected to one input of a double input NOR gate 923 the other input of which is connected to a control input $\overline{VS1D_X}$. The output $FVSID_{X+2}$ from the set of gates associated with the bit X+2 is connected to one input of a double input NOR gate 924 the other input of which is connected to a control input $\overline{VS2D_X}$, and the output $FVSID_{X+3}$ from the set of gates associated with the bit X+3 is connected to one input of a double input NOR gate 925 the other input of which is connected to a control input $\overline{VS3D_X}$. The outputs of the gates 922, 923, 924 and 925 are connected together to give an output $\overline{VSOP_X}$ and are also connected to one input of a three-input NOR gate 926 and to one input of a double input NOR gate 927. The second input of the gate 926 is connected to a control input $FSC3_X$ and the third input thereof is connected to a control input $MAS36_X$. The third input is provided on the gates 926 associated with bits one to fifteen only, the gates 926 associated with bits nought and sixteen to twenty-three being double input gates. The second input of the gate 927 is connected to a control input $\overline{FSC3_X}$.

The outputs of the gates 905 and 906 are connected together to give an output $\overline{AA_X}$ and are also connected to one input of an OR gate 928 and other inputs of which will be described later with reference to masking. The output of the gate 928 produces an output $\overline{DOP_X}$ and is connected to one input of a double input NOR gate 929 and to one input of a double input NOR gate 930. The second input of the gate 929 is connected to the control input $FSC3_X$ and the second input of the gate 930 is connected to the control input $\overline{FSC3_X}$.

The outputs of the gates 927 and 929 are connected together to give an output $PPFR_X$ which is connected to the input of bit X of a permanent field register and the outputs of the gates 926 and 930 are connected together to give an output $PTFR_X$ which is connected to the input of bit X of a temporary field register.

The gates 901, 902, 903, 907, 904, 905 and 906 correspond to the gates 627, 628, 629, 642, 639, 641 and 640 of the function unit shown in FIG. 54 and are operated in a similar manner to give the required functions. Furthermore, the output $\overline{AA_X}$, FIG. 74, is cnnected to output gates corresponding to the gates 644 to 647, FIG. 54, but since these play no part in the field splitting system being described they are not shown in FIG. 74. Similarly the input gates to the function unit corresponding to the gates 621 and 623 to 626, FIG. 54, are not shown in FIG. 74. Also, the gates 909 to 917 form a shift network corresponding to that formed by the gates 628, 630 to 638, FIG. 54, and normal shifts, either end-around or non-end-around, are performed in a similar manner except that in FIG. 74 shifts of eight or sixteen places for which the gates 916 or 917 are used are carried out after shifts of one to seven places instead of before such shifts, as in FIG. 54. In FIG. 74 the gates 920 to 925 form an additional fine or vernier shift network used in the field splitting operation to give shifts of up to seven places towards the least significant end of the twenty-four bits.

When the function unit is in the field splitting configuration the control inputs $\overline{HWB/FA}$, $\overline{AFU}$ and $\overline{AG_{102}}$ are ones and the gates 901, 903 and 904 are closed during the field splitting operation, and the control inputs $AG_{103}$ and $AG_{104}$ are noughts such that the gates 905 and 906 are under the control of the control inputs $FSC2_X$, $FSC2_X$ respectively. The twenty-four bits of the external order may then be passed directly through the gates 907, through the gates 908 in which case the word is shifted sixteen places end-around towards the most significant end of the word, or through the shift network formed by the gates 909 to 917. The gates 909 to 914 are operated in the usual manner to cause an end-around shift of up to seven places towards the most significant end but the gates 915, 916 and 917 are operated in a particular manner in three groups of eight bits to separate adjacent fields. The gates 918 and 919 are operated to select the sixteen least significant bits of either the SO outputs or the NOSS outputs together with the eight most significant bits of eiher the SO outputs or the NOSS outputs. The non-selected bits pass through the gates 905 or 906 and through the masking gate 902 where unwanted bits are masked. The selected bits pass through the vernier shift network formed by the gates 920 to 925 which are operated to apply independent shifts of up to seven places towards the least significant end to the sixteen least significant bits and the eight most significant bits. The N and X fields are then extracted by the gates 927 and 929 and the remaining two fields are extracted by the gates 926 and 930.

Since the two fields entered into the temporary field register are not address fields they are only used at the beginning of an order and are not required after the initial internal order has been fetched from the main store. Therefore the register used as the temporary field register may be one that is used for other purposes when an order is being carried out such as multiplication. In this example the temporary field register and the vernier shift network are used as the self shifting register for use in multiplication and to achieve this an additional double input NOR gate 931 is provided. The gate 931 has one input connected to the inverse output $\overline{TFR_X}$ of the bit X of the temporary field register and the other input connected to a control input $\overline{MULT}$. The output of the gate 931 is connected to the combined outputs of the gates 920 and 921.

In this field splitting system there are six cases to be considered. These are the three cases when the N field occupies field 0 and the X field occupies field three, two or one and the three cases when the N field occupies field three and the X field occupies field nought, one or two. These six cases are shown in FIGS. 75 to 80 in which the field breakdowns do not correspond to any particular machine code but have been chosen arbitrarily to meet the limitations stated previously.

Figure 75:
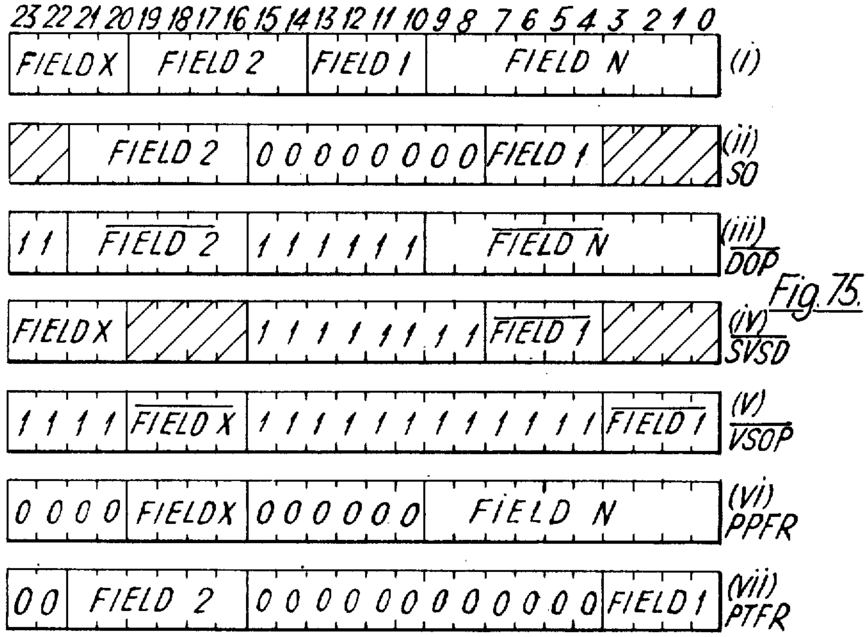

Referring now to FIG. 75 the field breakdown of the external order is shown at (*i*) from which it will be seen that the N field occupies bits 0 to 9, field one occupies bits 10 to 13, field two occupies bits 14 to 19 and the X field occupies bits 20 to 23. To split this order the control input $FSC1_{0-23}$ is made a nought and $\overline{FSC1}_{0-23}$ is therefore a one such that the gates 907 are open and the gates 908 are closed for all twenty-four bits. The control inputs to the gates 909 to 914 of the shift network are chosen to cause an end-around shift to shift the least significant bit of field two to the nearest one of the bits 0, 8 or 16, in this case bit sixteen, which requires a shift of two places. The control inputs to the gates 915, 916 and 917 are chosen such that for bits sixteen to twenty-three the gates 915 are open and the gates 916 and 917 are closed, i.e., the control input $\overline{SOU4}_{16-23}$ is a nought and the control inputs $\overline{S8U}_{16-23}$ and $\overline{S16U}_{16-23}$ are ones, for bits eight to fifteen all the gates 915, 916 and 917 are closed, i.e., the control inputs $\overline{SOU4}_{8-15}$, $\overline{S8U}_{8-15}$ and $\overline{S16U}_{8-15}$ are all ones, and for bits nought to seven the gates 915 and 916 are closed and the gates 917 open, i.e., the control inputs $\overline{SOU4}_{0-7}$ and $\overline{S8U}_{0-7}$ are ones and the control input $\overline{S16U}_{0-7}$ is a nought. The resulting SO outputs therefore comprise part of field N in bits 0 to 3, field one in bits 4 to 7, noughts in bits 8 to 15, field two in bits 16 to 21 and part of field X in bits 22 and 23. The SO outputs are shown at (ii) in FIG. 75 and since the partial fields are unwanted they are indicated by hatching of the relevant bits. The gates 905 and 906 are operated such that the sixteen least significant bits of the NOSS outputs and the eight most significant bits of the SO outputs are passed through the masking gates 922, i.e., the control inputs $FSC2_{0-15}$ and $\overline{FSC2}_{16-23}$ are noughts. The resultant $\overline{DOP}$ outputs are shown at (iii) in FIG. 75, the unwanted partial fields in bits 10 to 15 and 22 and 23 having been masked out and since at this stage the required fields are inverted the unwanted bits are filled with ones through the relevant ones of the gates 928. Since the control inputs $\overline{FSC2}_{0-15}$ and $FSC2_{16-23}$ are ones the gates 918 and 919 are operated such that the sixteen least significant bits of the SO outputs and the eight most significant bits of the NOSS outputs are selected to pass through the vernier shift network, the $\overline{SVSD}$ outputs being shown at (iv) in FIG. 75. As previously stated, the vernier shift network is operated to provide separate shifts of up to seven places towards the least significant end to the sixteen least significant bits and the eight most significant bits. These shifts are not end-around and there is a boundary between bits fifteen and sixteen such that the bits of higher significance are not shifted into bits nine to fifteen, when shifts are applied to the sixteen least significant bits. In the case at present being considered vernier shifts of four places are applied to both the sixteen least significant bits and the eight most significant bits with the result that field one is shifted to the least significant end and field X is shifted such that its least significant bit occupies bit sixteen, the vernier shifted outputs $\overline{VSOP}$ being shown out (v) in FIG. 75. The gates 927 and 929 are operated to select the sixteen least significant bits of the $\overline{DOP}$ outputs and the eight most significant bits of the $\overline{VSOP}$ outputs, i.e., the control inputs $FSC3_{0-15}$ and $\overline{FSC3}_{16-23}$ are noughts such that the input to the permanent field register comprises field N in bits 0 to 9, field X in bits 16 to 19 and noughts in all other bits, the PPFR outputs being shown at (vi) in FIG. 75. The control inputs $MAS36_X$ are noughts and since the control inputs $\overline{SCF3}_{0-15}$ and $FSC3_{16-23}$ are ones the gates 926 and 930 are operated to select the sixteen least significant bits of the $\overline{VSOP}$ outputs and the eight most significant bits of the $\overline{DOP}$ outputs with the result that the input to the temporary field register comprises field one in bits 0 to 3, field two in bits 16 to 21 and noughts in all other bits, the PTFR outputs being shown at (vii) in FIG. 75.

Figure 76:
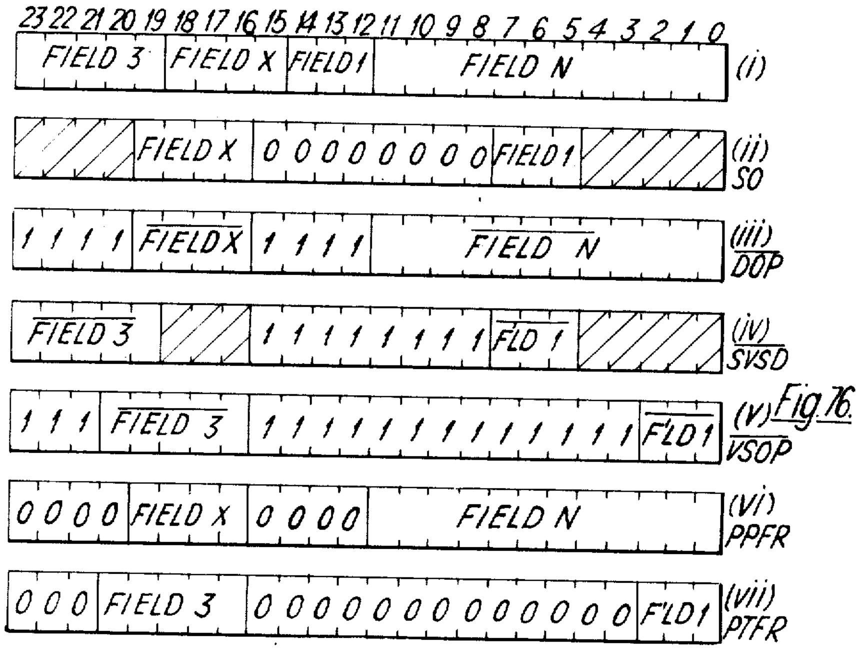

The second case is shown in FIG. 76 in which the external order is again shown at (i). In this case the N field occupies bits 0 to 11, field one occupies bits 12 to 14, the X field occupies bits 15 to 18 and field three occupies bits 19 to 23. To split this order the control input $FSC1_{0-23}$ is made a nought such that the gates 907 are open and the gates 908 are closed. The control inputs to the gates 909 to 914 are operated to cause a shift of one place to shift the least significant bit of the X field to bit sixteen. The control inputs to the gates 915, 916 and 917 are the same as the previous case and consequently the shifted outputs SO comprise field one in bits 5 to 7, field X in bits 16 to 19, noughts in bits 8 to 15 together with unwanted parts of field N and field three in bits 0 to 4 and 20 to 23 as shown at (ii) in FIG. 76. The control inputs $FSC2_{0-15}$ and $\overline{FSC2}_{16-23}$ are again both made noughts such that the sixteen least significant bits of the NOSS outputs and the eight most significant bits of the SO outputs are passed through the masking gates 928. The resultant $\overline{DOP}$ outputs comprise the inverse of field N in bits 0 to 11, the inverse of field X in bits 16 to 19, and ones in bits 12 to 15 and 20 to 23 as shown at (iii) in FIG. 76. The control inputs $\overline{FSC2}_{0-15}$ and $FSC_{16-23}$ are ones and therefore bits 16 to 23 of the NOSS outputs and bits 0 to 15 of the SO outputs pass through the gates 918 and 919 as the selected vernier shift digits, these being shown at (iv) in FIG. 76. The vernier shift network is operated to produce a shift of five places towards the least significant end for bits 0 to 15 and three places towards the least significant end for bits 16 to 23. The resultant vernier shifted outputs comprise the inverse of field one in bits 0 to 3, the inverse of field three in bits 16 to 20 and ones in bits 4 to 15 and 21 to 23 as shown at (v) in FIG. 76. The control inputs $FSC3_{0-23}$ are made noughts such that all twenty-four bits of the $\overline{DOP}$ outputs pass through the gates 929 with the result that the inputs to the permanent field register comprise field N in bits 0 to 11, field X in bits 16 to 19 and noughts in bits 12 to 15 and 20 to 23 as shown at (vi) in FIG. 76. The control inputs $MAS36_X$ are again noughts such that all twenty-four bits of the $\overline{VSOP}$ outputs pass through the gates 926 with the result that the inputs to the temporary field register comprise field one in bits 0 to 2, field three in bits 16 to 20 and noughts in bits 3 to 15 and 21 to 23 as shown at (vii) in FIG. 76.

Figure 77:
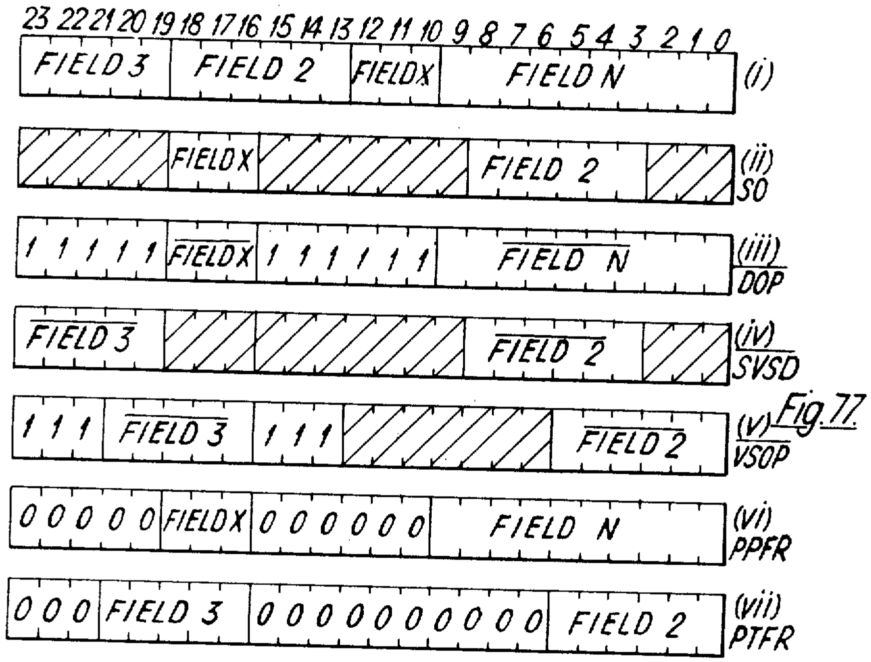

The third case is shown in FIG. 77 in which the external order is shown at (i). In this case the N field occupies bits 0 to 9, the X field occupies bits 10 to 12, field two occupies bits 13 to 18 and field three occupies bits 19 to 23. To split this order the control input $FSC1_{0-23}$ is made a nought such that the gates 907 are open and the gates 908 are closed. The control inputs to the gates 909 to 914 are operated to cause a shift of six bits to shift the least significant bit of the X field to bit sixteen. For bits 16 to 23 the control input $\overline{SOU4}_{16-23}$ is again made a nought and the control inputs $\overline{S8U}_{16-23}$ and $\overline{S16U}_{16-23}$ are again made ones such that the eight most significant bits pass through the gates 915. In this case, however, for all of bits 0 to 15 the control inputs $\overline{SOU4}_{0-15}$ and $\overline{S8U}_{0-15}$ are made ones and the control inputs $\overline{S16U}_{0-15}$ are made noughts such that for the sixteen least significant bits there is an end-around shift of sixteen places. Consequently the shifted outputs SO comprise field X in bits 0 to 2 and 16 to 18, field 2 in bits 3 to 8 and unwanted partial fields in bits 9 to 15 and 19 to 23 as shown at (ii) in FIG. 77. Field X has to be duplicated in this case since after using the gates 909 to 914 to make a shift of seven places it is only possible to make a shift of eight or sixteen places using the gates 916 or 917. The X field located in bits 0 to 2 is therefore also an unwanted field and is subsequently removed by the vernier shift. The maximum vernier shift is one of seven places and therefore in this case the X field is limited to a maximum length of seven bits. Also since it is necessary to make the shift of sixteen places over all of the sixteen least significant bits field two is now separated from field X in bits 16 to 18 by unwanted partial fields and in this case it is necessary to provide additional masking, which is applied on the gates 926, to remove these unwanted partial fields. The control inputs $FSC2_{0-15}$ and $\overline{FSC2}_{16-23}$ are again both made noughts such that the sixteen least significant bits of the NOSS outputs and the eight most significant bits of the SO ouputs are passed through the masking gates 928. The resultant $\overline{DOP}$ outputs comprise the inverse of field N in bits 0 to 9, the inverse of field X in bits 16 to 18 and ones in bits 10 to 15 and 19 to 23 as shown at (iii) in FIG. 77. The control inputs $\overline{FSC2}_{0-15}$ and $FSC2_{16-23}$ are ones and therefore bits 16 to 23 of the NOSS outputs and bits 0 to 15 of the SO outputs pass through the gates 918 and 919 as the selected vernier shift digits, these being shown at (iv) in FIG. 77. The vernier shift network is operated to produce a shift of three places towards the least significant end for both bits 0 to 15 and bits 16 to 23. The resultant varnier shifted outputs comprise the inverse of field two in bits 0 to 5, the inverse of field three in bits 16 to 20, ones in bits 13 to 15 and 21 to 23 and unwanted partial fields in bits 6 to 12 as shown at (v) in FIG. 77. The control inputs $FSC3_{0-23}$ are made nought such that all twenty-four bits of the $\overline{DOP}$ outputs pass through the gates 929 with the result that the inputs to the permanent field register comprise field N in bits 0 to 9, field X in bits 16 to 18 and noughts in bits 10 to 15 and 19 to 23 as shown at (vi) in FIG. 77. In this case the control inputs $MAS36_{6-15}$ applied to the gates 926 for bits six to fifteen are made ones, the control inputs $MAS36_{0-5}$ again being noughts. Consequently, bits 0 to 5 and 16 to 23 of the $\overline{VSOP}$ outputs pass through the gates 926 with the result that the inputs to the temporary field register comprise field two in bits 0 to 5, field three in bits 16 to 20 and noughts in bits 6 to 15 and 21 to 23, the unwanted partial fields having been masked out on bits 6 to 12. The resultant PTFR outputs are shown at (vii) in FIG. 77.

Figure 78:
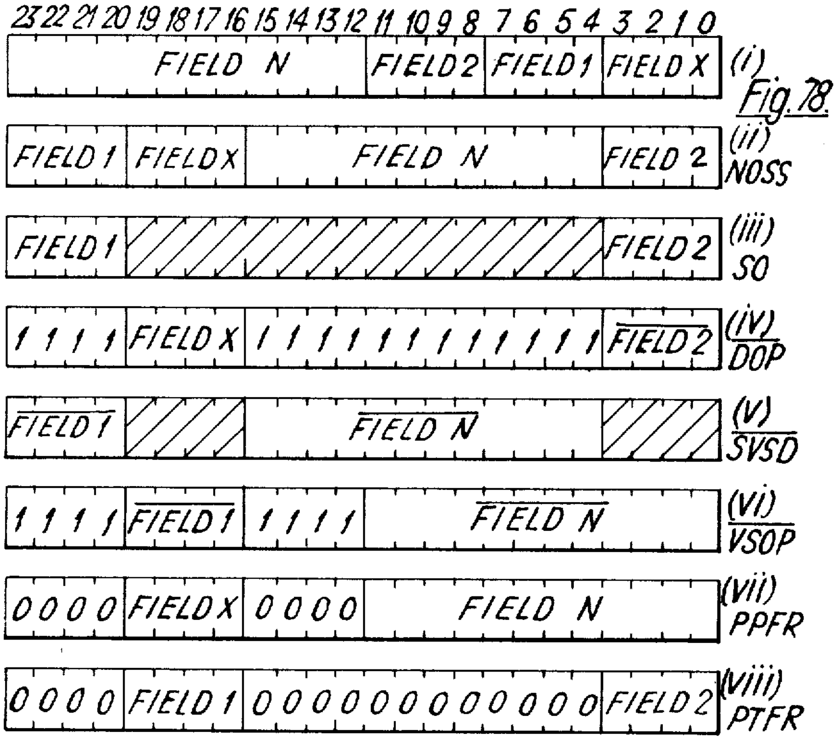

The fourth case is shown in FIG. 78 in which the external order is shown at (i). In this case the X field occupies bits 0 to 3, field one occupies bits 4 to 7, field two occupies bits 8 to 11 and the N field occupies bits 12 to 23. To split this field the control input $FSC1_{0-23}$ is made a one such that the gates 908 are open and the gates 907 are closed. Consequently the NOSS outputs comprise the external order shifted through sixteen places end-around such that the most significant bit of the N field occupies bit fifteen as shown at (ii) in FIG. 78. The control inputs to the gates 909 to 917 are operated to cause a shift of sixteen places end-around such that field two becomes located at the least significant end and field one at the most significant end as shown at (iii) in FIG. 78. In this case the control inputs $FCS2_{0-7}$ and $\overline{FSC2}_{8-23}$ are made noughts such that the eight least significant bits of the NOSS outputs and the sixteen most significant bits of the SO outputs are passed through the masking gates 929. The resultant $\overline{DOP}$ outputs comprise the inverse of field two in bits 0 to 3, the inverse of the X field in bits 16 to 19 and ones in bits 4 to 15 and 20 to 23 as shown at (iv) in FIG. 78. The control inputs $\overline{FSC2}_{0-7}$ and $FSC_{8-23}$ are ones and therefore bits 8 to 23 of the NOSS outputs and bits 0 to 7 of the SO outputs pass through the gates 918 and 919 as the selected vernier shift digits, these being shown at (v) in FIG. 78. The vernier shift network is operated to produce a shift of four places towards the least significant end for both bits 0 to 15 and 16 to 23. The resultant vernier shifted outputs comprise the inverse of the N field in bits 0 to 11, the inverse of field one in bits 16 to 19 and ones in bits 12 to 15 and 20 to 23 as shown at (vi) in FIG. 78. The control inputs $\overline{FSC3}_{0-15}$ and $FSC3_{16-23}$ are made noughts such that the sixteen least significant bits of the $\overline{VSOP}$ outputs and the eight most significant bits of the $\overline{DOP}$ outputs pass through the gates 927 and 929 with the result that the inputs to the permanent field register comprise field N in bits 0 to 10, field X in bits 16 to 19 and noughts in bits 11 to 15 and 20 to 23 as shown at (vii) in FIG. 78. The control inputs $MAS36_X$ are again noughts and since the control inputs $FSC3_{0-15}$ and $\overline{FSC3}_{16-23}$ are ones the sixteen least significant bits of the $\overline{DOP}$ ouputs and the eight most significant bits of the $\overline{VSOP}$ outputs pass through the gates 926 and 930 with the result that the inputs to the temporary field register comprise field two in bits 0 to 3, field one in bits 16 to 19 and noughts in bits 4 to 15 and 20 to 23 as shown at (viii) in FIG. 78.

Figure 79:
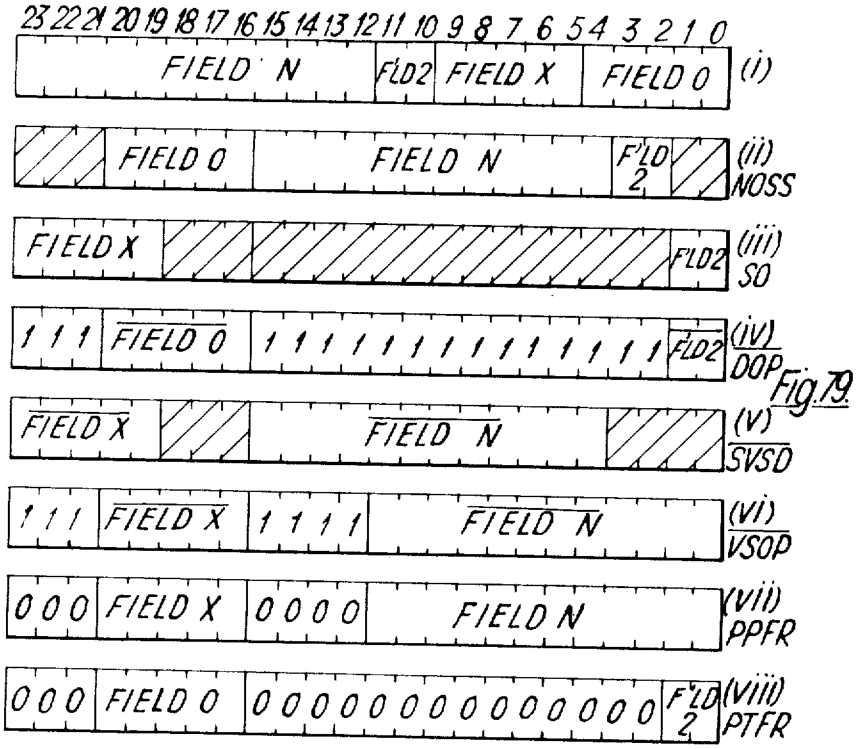

The fifth case is shown in FIG. 79 in which the external order is shown at (i). In this case field nought occupies bits 0 to 4, field X occupies bits 5 to 9, field two occupies bits 10 and 11 and field N occupies bits 12 to 23. To split this field the control input $FSC1_{0-23}$ is made a one such that the gates 908 are open and the gates 907 are closed. Consequently the NOSS outputs comprise the external order shifted through sixteen places end-around such that the most significant bit of the N field occupies bit fifteen as shown at (ii) in FIG. 79. The control inputs to the gates 909 to 914 are operated to cause a shift of fourteen places to shift the least significant bit of field two to bit nought. Consequently the shifted outputs SO comprise field two in bits 0 and 1, field X in bits 19 to 23, and unwanted fields in bits 2 to 18 as shown at (iii) in FIG. 79. The control inputs $\overline{FSC2}_{0-15}$ and $FSC2_{16-23}$ are made noughts such that the sixteen least significant bits of the SO outputs and the eight most significant bits of the NOSS outputs are passed through the masking gates 928. The resultant $\overline{DOP}$ outputs comprise the inverse of field two in bits 0 and 1, the inverse of field nought in bits 16 to 20 and ones in bits 3 to 15 and 21 to 23 as shown at (iv) in FIG. 79. The control inputs $FSC2_{0-15}$ and $\overline{FSC2}_{16-23}$ are ones and therefore bits 0 to 15 of the NOSS outputs and bits 16 to 23 of the $\overline{VSOP}$ outputs pass through the gates 918 and 919 as the selected vernier shift digits, these being shown at (v) in FIG. 79. The vernier shift network is operated to produce a shift of four places towards the least significant end for bits 0 to 15 and three places towards the least significant end for bits 16 to 23. The resultant vernier shifted outputs comprise the inverse of field N in bits 0 to 11, the inverse of field X in bits 16 to 20 and ones in bits 12 to 15 and 21 to 23 as shown at (vi) in FIG. 79. The control inputs $\overline{FSC3}_{0-23}$ are made noughts such that all twenty-four bits of the $\overline{VSOP}$ outputs pass through the gates 927 with the result that the inputs to the permanent field register comprise field N in bits 0 to 11, field X in bits 16 to 20 and noughts in bits 12 to 15 and 21 to 23. Since the control inputs $FSC3_{0-23}$ are ones all twenty-four bits of the $\overline{DOP}$ outputs pass through the gates 930 with the result that the inputs to the temporary field register comprise field two in bits 0 and 1, field nought in bits 16 to 20 and noughts in bits 2 to 15 and 21 to 23 as shown at (viii) in FIG. 79.

Figure 80:
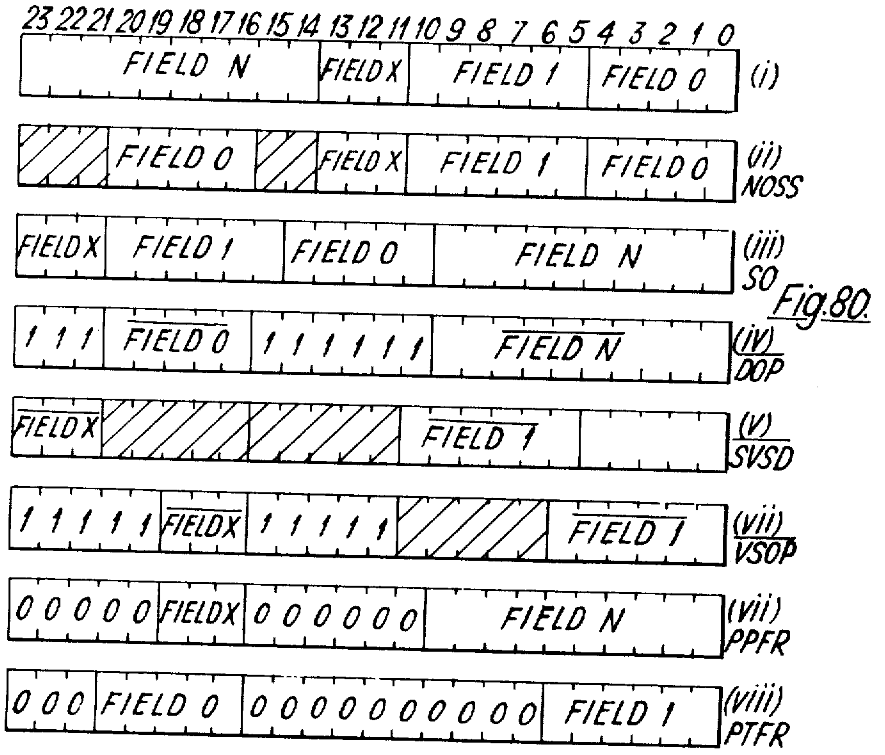
Figure 81:
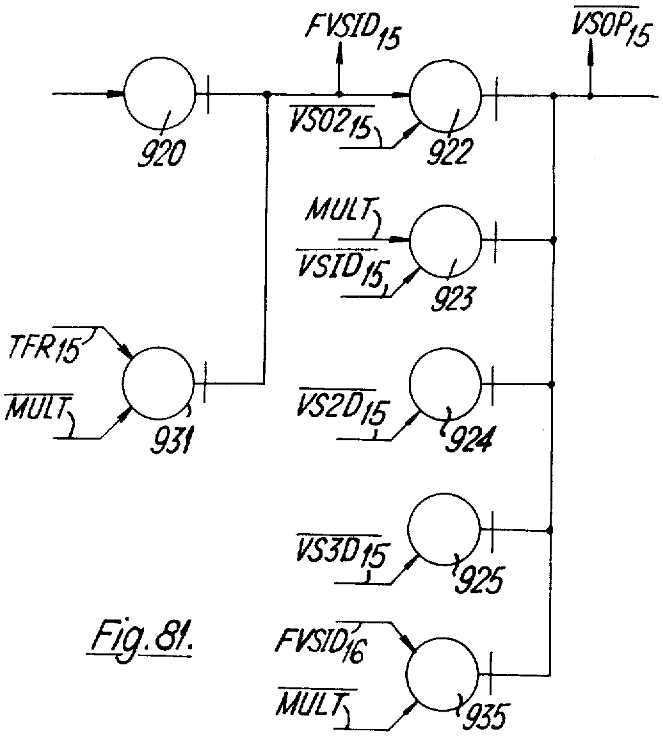

The sixth and last case is shown in FIG. 80 in which gate 945 to one input of each of three NOR gates 946, 947 and 948. The gate 946 is a double input gate and has its second input connected to the mask digit input $\overline{MDL_0}$ and its output connected to one input of the gate $928_{11}$ which is a four-input gate. The gate 947 is a double input gate and has its other input connected to the mask digit input $\overline{MDL_1}$ and its output connected to one input of the gate $928_{11}$ and to one input of the gate $928_{10}$ which is a three-input gate. The gate 948 is a three-input gate and has its second input connected to the mask digit input $\overline{MDL_0}$, its third input connected to the mask digit input $\overline{MDL_1}$ and its output connected to one input of the gate $928_9$ which is a three-input gate. A double input NOR gate 949 has one input connected to the control input $\overline{MG}$, the other input connected to a mask digit input $\overline{MDL_3}$ and its output connected to one input of each of the gates $928_8$ to $928_{15}$, the gate $928_8$ being a double input gate. A three-input NOR gate 950 has its first input connected to the control input $\overline{MG}$, its second input connected to a mask digit input $MDL_2$ and its third input connected to the mask digit input $\overline{MDL_3}$. The output of the gate 950 is connected via a single input NOR gate 951 to one input of each of three NOR gates 952, 953 and 954. The gate 952 is a double input gate and has its other input connected to the mask digit input $\overline{MDL_0}$ and its output connected to one input of the gate $928_7$, which is a four-input gate. The gate 953 is a double input gate and has its other input connected to the mask digit input $\overline{MDL_1}$ and its output connected to one input of the gate $928_6$ which is a three-input gate. The gate 954 is a three-input gate and has its second input connected to the mask digit input $\overline{MDL_0}$, its third input connected to the mask digit input $\overline{MDL_1}$ and its output connected to one input of the gate $928_5$ which is a three-input gate. A three-input NOR gate 955 has its first input connected to the control input $\overline{MG}$, its second input connected to the mask digit input $\overline{MDL_2}$ and its third input connected to the mask digit input $\overline{MDL_3}$. The output of the gate 955 is connected to one input of each of the gates $928_4$ to $928_7$, the gate $928_4$ being a three-input gate. The output of the gate 955 is also connected via a single input NOR gate 956 to one input of each of three NOR gates 957, 958 and 959. The gate 957 is a double input gate and has its other input connected to the mask digit input $\overline{MDL_0}$ and its output connected to one input of the gate $928_3$ which is a three-input gate. The gate 958 is a double input gate and has its other input connected to the mask digit input $\overline{MDL_1}$ and its output connected to one input of each of the gates $928_2$ and $928_3$, the gate $928_2$ being a double input gate. The gate 959 is a three-input gate and has its second input connected to the mask digit input $\overline{MDL_0}$, its third input connected to the mask digit input $\overline{MDL_1}$ and its output connected to one input of the gate $928_1$ which is a double input gate. Since it is not necessary to apply any masking on bit nought the gate $928_0$ is a single input gate having its input connected to the output $\overline{AA_0}$.

When the field splitting operation is being carried out the general mask control input $\overline{MG}$ is made a nought and the appropriate ones of the mask digit inputs selected according to the number of bits at the most significant end of the lower sixteen bits which it is desired to mask. If for example it is required to mask the three-most significant bits, i.e., bits thirteen, fourteen and fifteen, the mask digit inputs $MDL_0$ and $MDL_1$ are made ones and the mask digit inputs $MDL_2$ and $MDL_3$ are made noughts. Consequently, the inputs $\overline{MDL_0}$ and $\overline{MDL_1}$ are noughts and the inputs $\overline{MDL_2}$ and $\overline{MDL_3}$ are ones. Under these conditions each of the gates 941, 942 and 943 has all noughts applied to its inputs and therefore produces a one output with the result that the output of each of the OR gates $928_{13}$, $928_{14}$ and $928_{15}$ is a one regardless of the outputs $\overline{AA_{13}}$, $\overline{AA_{14}}$ and $\overline{AA_{15}}$. There is, however, a one input to each of the gates 944, 946 to 949, 952 to 955 and 957 to 959 with the result that each of these gates produces a nought output. Therefore the outputs of the gates $928_0$ to $928_{12}$ are determined by the outputs $\overline{AA_0}$ to $\overline{AA_{12}}$ and there is no masking applied to these gates. Similarly, if it is required to mask the upper ten bits, i.e. bits six to fifteen, the inputs $MDL_1$ and $MDL_3$ are made ones and the inputs $MDL_0$ and $MDL_2$ are noughts. Consequently the inputs $\overline{MDL_1}$ and $\overline{MDL_3}$ are noughts and the inputs $\overline{MDL_0}$ and $\overline{MDL_2}$ are ones. Under these conditions both of the inputs to the gate 949 are noughts and its output is therefore a one. Since this output is applied to one input of each of the gates $928_8$ to $928_{15}$ the output of each of these gates is a one regardless of the outputs $\overline{AA_8}$ to $\overline{AA_{15}}$. The output of the gate 950 is also a one and the output of the gate 951 is therefore a nought. The output of the gate 952 is a nought but the output of the gate 953 is a one and this output is applied to one input of each of the gates $928_6$ and $928_7$. The outputs of the gates $928_6$ and $928_7$ are therefore also ones regardless of the outputs $\overline{AA_6}$ and $\overline{AA_7}$. There is a one input to each of the gates 954, 955 and 957 to 959 with the result that each of these gates produces a nought output. Therefore the outputs of the gates $928_0$ to $928_5$ are determined by the outputs $\overline{AA_0}$ $\overline{AA_5}$ and there is no masking applied to these gates.

Figure 85:
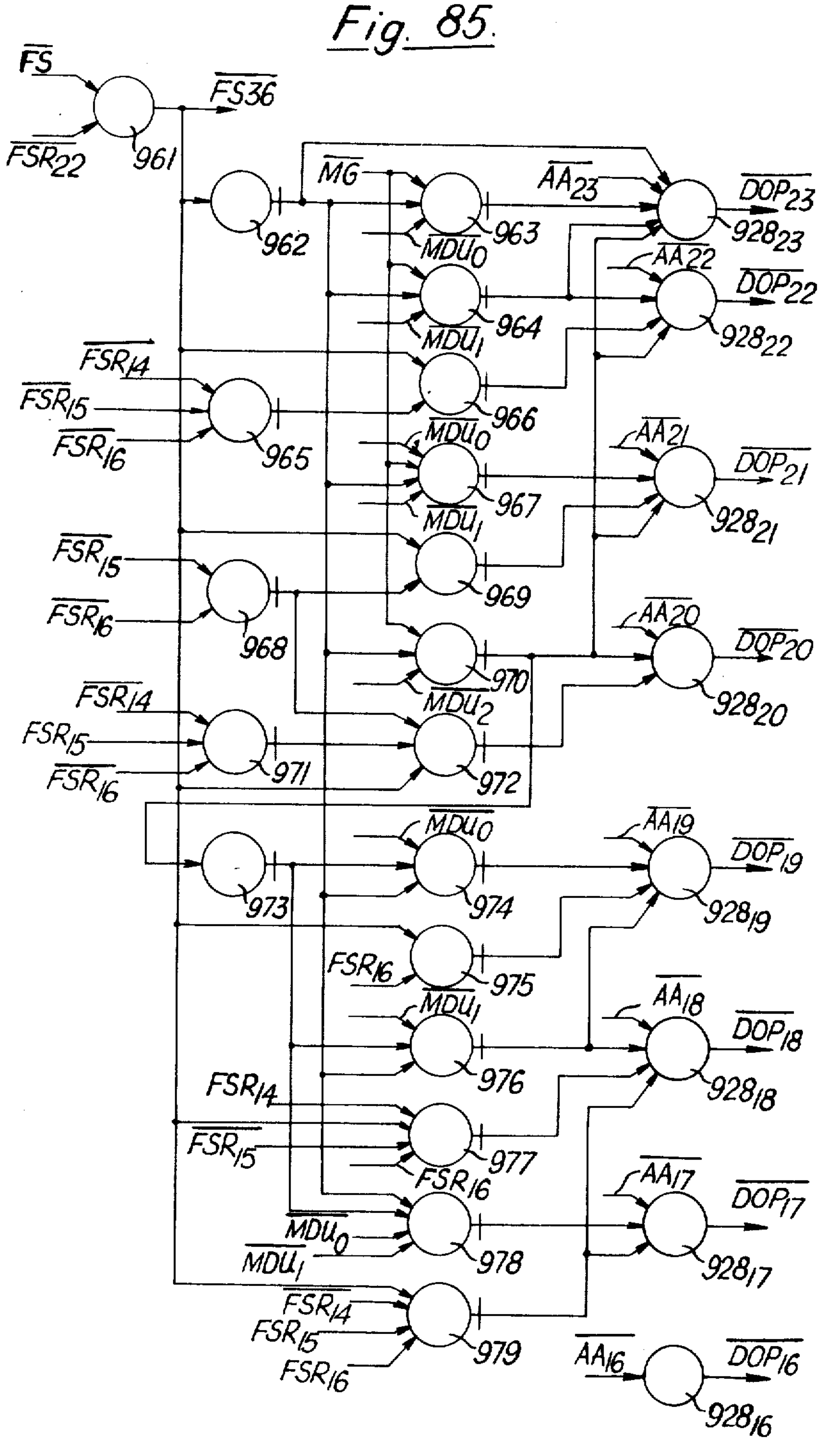

To obtain the masking on the gates 928 for bits sixteen to twenty-three the set of gates shown in FIG. 85 is provided. This set of gates includes a double input OR gate 961 having its first input connected to the control input $\overline{FS}$ and its second input connected to the inverse output $\overline{FSR_{22}}$ from bit twenty-two of the register FSR. The output of the gate 961 produces a control input $\overline{FS36}$ and is also connected to the input of a single input NOR gate 962. The output of the gate 962 is connected to one input of a three-input NOR gate 963 and also to one input of the OR gate $928_{23}$ which is a five-input gate. The second input of the gate 963 is connected to the general mask control input $\overline{MG}$ and the third input thereof is connected to a mask digit input $\overline{MDU_0}$. The output of the gate 963 is connected to the second input of the gate $928_{23}$. A three-input NOR gate 964 has its first input connected to the control input $\overline{MG}$, its second input connected to the output of the gate 962 and its third input connected to a mask digit input $\overline{MDU_1}$. The output of the gate 964 is connected to the third input of the gate $928_{23}$ and also to one input of the OR gate $928_{22}$ which is a four-input gate. A three-input NOR gate 965 has its first input connected to the inverse output $\overline{FSR_{14}}$, its second input connected to the inverse output $\overline{FSR_{15}}$ and its third input connected to the inverse output $\overline{FSR_{16}}$. The output of the gate 965 is connected to one input of a double input NOR gate 966 the other input of which is connected to the output of the gate 961. The output of the gate 966 is connected to the second input of the gate $928_{22}$. A four-input NOR gate 967 has its first input connected to the control input $\overline{MG}$, its second input connected to the output of the gate 962, its third input connected to the mask digit input $\overline{MDU_0}$ and its fourth input connected to the mask digit input $\overline{MDU_1}$. The output of the gate 967 is connected to one input of the gate $928_{21}$ which is a four-input gate. A double input NOR gate 968 has its first input connected to the inverse output $\overline{FSR_{15}}$ and its second input connected to the inverse output $\overline{FSR_{16}}$. The output of the gate 968 is connected to one input of a double input NOR gate 969 the other input of which is connected to the output of the gate 961. The output of the gate 969 is connected to the second input of the gate $928_{21}$. A three-input NOR gate 970 has its first input connected to the control input $\overline{MG}$, its second input connected to the output of the gate 962 and its third input connected to a mask digit input the external order is shown at (i). In this case field nought occupies bits 0 to 4, field one occupies bits 5 to 10, field X occupies bits 11 to 13 and field N occupies bits 14 to 23. To split this order the control inputs $FSC1_{0-15}$ and $\overline{FSC1}_{16-23}$ are made noughts such that for bits 0 to 15 the gates 907 are open and the gates 908 are closed and for bits 16 to 23 the gates 907 are closed and the gates 908 are open. Consequently, the NOSS outputs comprise field nought in bits 0 to 4, field one in bits 5 to 10, field X in bits 11 to 13, field nought in bits 16 to 20 and unwanted parts of field N in bits 14, 15, 21, 22 and 23 as shown at (ii) in FIG. 80. The control inputs to the gates 909 to 917 are operated to cause an end-around shift of ten places such that field N becomes located at the least significant end as shown at (iii) in FIG. 80. The control inputs $\overline{FSC2}_{0-15}$ and $FSC2_{16-23}$ are made noughts such that the sixteen least significant bits of the SO outputs and the eight most significant bits of the NOSS outputs are passed through the masking gates 928. The resultant $\overline{DOP}$ outputs comprise the inverse of field N in bits 0 to 10, the inverse of field nought in bits 16 to 20 and ones in bits 11 to 15 and 21 to 23 as shown at (iv) in FIG. 80. Since the control inputs $FSC2_{0-15}$ and $\overline{FSC2}_{16-23}$ are ones bits 0 to 15 of the NOSS outputs and bits 16 to 23 of the SO outputs pass through the gates 918 and 919 as the selected vernier shift digits. These comprise the inverse of field one in bits 5 to 10, the inverse of field X in bits 21 to 23 and unwanted fields and partial fields in bits 0 to 4 and 11 to 20 as shown at (v) in FIG. 80. The vernier shift network is operated to cause a shift of five places towards the least significant end to both the sixteen least significant bits and the eight most significant bits such that the resultant vernier shifted outputs comprise the inverse of field one in bits 0 to 5, the inverse of field X in bits 16 to 18, ones in bits 11 to 15 and 19 to 23 and unwanted partial field in bits 6 to 10 as shown at (vi) in FIG. 80. The control inputs $FSC3_{0-15}$ and $\overline{FSC3}_{16-23}$ are made noughts such that the sixteen least significant bits of the $\overline{DOP}$ outputs and the eight most significant bits of the $\overline{VSOP}$ outputs pass through the gates 927 and 929 with the result that the input to the permanent field register comprise field N in bits 0 to 9, field X in bits 16 to 18 and noughts in bits 10 to 15 and 19 to 23 as shown at (vii) in FIG. 80. The control inputs $FSC3_{0-15}$ and $FSC3_{16-23}$ are ones and in this case the control inputs $MAS36_{6-15}$ applied to the gates 926 for bits six to fifteen are made ones, the control inputs $MAS36_{0-5}$ again being noughts. Consequently, bits 0 to 5 of the VSOP outputs pass through the gates 926 and bits 16 to 23 of the DOP outputs pass through the gates 930 with the result that the inputs to the temporary field register comprise field one in bits 0 to 5, field nought in bits 16 to 20 and noughts in bits 6 to 15 and 21 to 23 as shown at (viii) in FIG. 80.

Thus in all six cases the external orders are split in such a manner that the N field occupies the least significant end of the permanent field register and the X field is located with its least significant bit in bit sixteen of the permanent field register.

In order to achieve the required boundary between bits fifteen and sixteen of the vernier shift network and since end-around shifts are not required in the vernier shift network the gates 921 are omitted for bits twelve to fifteen and twenty to twenty-three. Also, for bits fifteen and twenty-three the inputs $FVSID_{X+1}$, $FVSID_{X+2}$ and $FVSID_{X+3}$ to gates 923, 924 and 925 are omitted, for bits fourteen and twenty-two the inputs $FVSID_{X+2}$ and $FVSID_{X+3}$ to gates 924 and 925 are omitted, and for bits thirteen and twenty-one the inputs $FVSID_{X+3}$ to gate 925 are omitted. The omission of the inputs $FVSID_{X+1}$ to the gates 923 for bits fifteen and twenty-three requires modification to these bits to permit the self shift operations used for multiplication as mentioned earlier. For bit fifteen the modification involves the provision of a further double input NOR gate 925, FIG. 81, having one input connected to the output $FVSID_{16}$ from the gates associated with bit sixteen, the other input connected to the control input $\overline{MULT}$ and its output connected to the combined outputs of the gates 922 to 925. Additionally the gate 923 has an input connected to a control input MULT.

Figure 82:
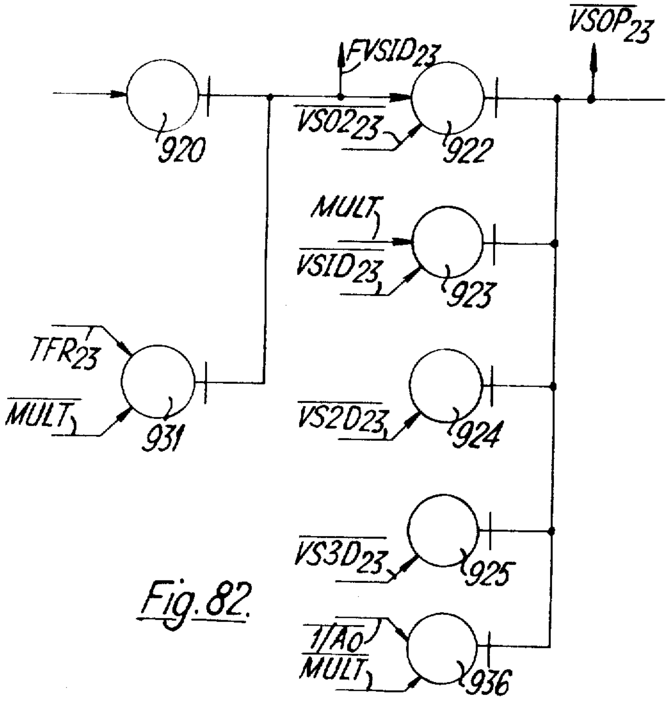

For bit twenty-three the modification similarly involves the provision of a further double input NOR gate 936, FIG. 82, having one input connected to the input $\overline{1/A_0}$, the other input connected to the control input $\overline{MULT}$ and its output connected to the combined outputs of the gates 922 to 925. The gate 923 again has an input connected to the control input MULT.

When the control input MULT is a one the gates 923 for bits fifteen and twenty-three are closed and the gates 935 and 936 are open since the control input $\overline{MULT}$ is a nought. The boundary between bits fifteen and sixteen is then bridged by the input to the gate 935 and the temporary field register used as a self-shifting register for shifts of one place towards the least significant end, the input $\overline{1/A_0}$ being applied to bit twenty-three. It will be clear that if shifts of more than one place are required they may be obtained by the provision of more gates similar to the gate 935 for bridging the boundary between bits nought and fifteen.

Figure 83:
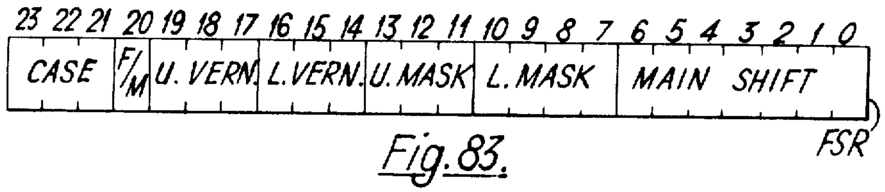

The information required to define the field breakdown of the external order is held in a field splitting register FSR shown in FIG. 83. In the register FSR bits nought to six define the main shift number for controlling the operation of the main shift gates 909 to 917, FIG. 74. Bits seven to ten define the lower mask requirements for the masking of bits nought to fifteen and bits eleven to thirteen define the upper mask requirements for the masking of bits sixteen to twenty-three. Bits fourteen to sixteen define the lower shift number for controlling the operation of the vernier shift gates 920 to 925 for shifting bits nought to fifteen and bits seventeen to nineteen define the upper shift number for controlling the operation of the vernier shift gates for shifting bits sixteen to twenty-three. Bit twenty determines which of the two fields held in the temporary field register TFR is used first when carrying out an order and bits twenty-one to twenty-three determine the case number of the external order, i.e. which of the six cases described with reference to FIGS. 75 to 80 applies tothe external order.

Figure 84:
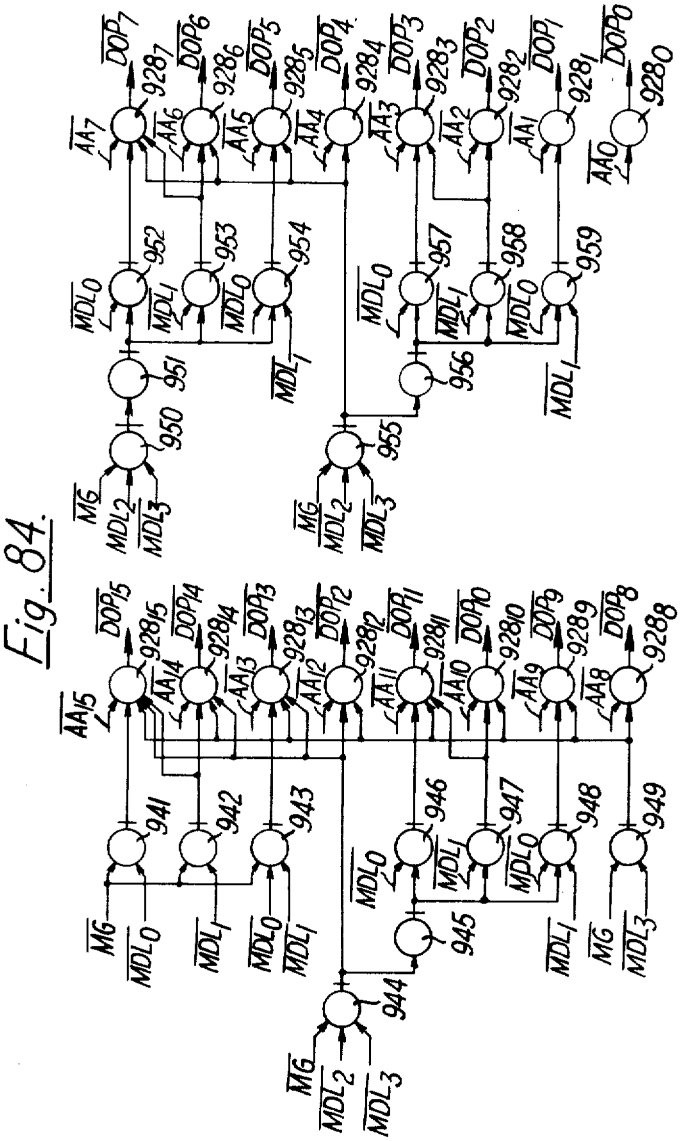

To obtain the masking on the gates 928 bits nought to fifteen the set of gates shown in FIG. 84 is provided. This set of gates includes a double-input NOR gate 941 having one input connected to a general mask control input $\overline{MG}$ and the other input connected to a mask digit input $\overline{MDL_0}$. The output of the gate 941 is connected to one input of the OR gate $928_{15}$, associated with bit fifteen. (The suffixes indicate the number of the bit with which the gate or the particular input or output are associated.) The gate $928_{15}$ is a five-input gate and the second input thereof is connected to the output $\overline{AA_{15}}$ as shown in FIG. 74. A double input NOR gate 942 has one input connected to the control input $\overline{MG}$ and the other input connected to a mask digit input $\overline{MDL_1}$. The output of the gate 942 is connected to the third input of the gate $928_{15}$ and to one input of the gate $928_{14}$ which is a four-input gate. A three-input NOR gate 943 has its first input connected to the control input $\overline{MG}$, its second input connected to the mask digit input $\overline{MDL_0}$ and its third input connected to the mask digit input $\overline{MDL_1}$. The output of the gate 943 is connected to one input of the gate $928_{13}$ which is a four-input gate. A three-input NOR gate 944 has its first input connected to the control input $\overline{MG}$, its second input connected to a mask digit input $\overline{MDL_2}$ and its third input connected to a mask digit input $MDL_3$. The output of the gate 944 is connected to one input of each of the gates $928_{12}$, $928_{13}$, $928_{14}$ and $928_{15}$, the gate $928_{12}$ being a three-input gate. The output of the gate 944 is also connected via a single input NOR $\overline{MDU_2}$. The output of the gate 970 is connected to one input of each of the gates $928_{23}$, $928_{22}$, $928_{21}$ and also to one input of the gates $928_{20}$ which is a three-input gate. A three-input NOR gate 971 has its first input connected to the inverse output $\overline{FSR_{14}}$, its second input connected to the output $FSR_{15}$ and its third input connected to the inverse output $\overline{FSR_{16}}$. The output of the gate 971 is connected to one input of a three-input NOR gate 972, the second input of which is connected to the output of the gate 968 and the third output of which is connected to the output of the gate 961. The output of the gate 972 is connected to the second input of the gate $928_{20}$. The output of the gate 970 is also connected to the input of a single input NOR gate 973 the output of which is connected to one input of a three-input NOR gate 974. The second input of the gate 974 is connected to the control input $\overline{MG}$ and the third input thereof is connected to the mask digit input $\overline{MDU_0}$. The output of the gate 974 is connected to one input of the gate $928_{19}$ which is a four-input gate. A double input NOR gate 975 has its first input connected to the output of the gate 961 and its second input connected to the output $FSR_{16}$. The output of the gate 975 is connected to the second input of the gate $928_{19}$. A three-input NOR gate 976 has its first input conneced to the control input $\overline{MG}$, its second input connected to the output of the gate 973 and its third input connected to the mask digit input $\overline{MDU_1}$. The output of the gate 976 is connected to the third input of the gate $928_{19}$ and also to one input of the gate $928_{18}$ which is a four-input gate. A four-input NOR gate 977 has its first input connected to the output of the gate 961, its second input connected to the output $FSR_{14}$, its third input connected to the inverse output $\overline{FSR_{15}}$ and its fourth input connected to the output $FSR_{16}$. The output of the gate 977 is connected to the second input of the gate $928_{18}$. A four-input NOR gate 978 has its first input connected to the control input $\overline{MG}$, its second input connected to the output of the gate 973, its third input connected to the mask digit input $\overline{MDU_0}$ and its fourth input connected to the mask digit input $\overline{MDU_1}$. The output of the gate 978 is connected to one input of the gate $928_{17}$ which has a three-input gate. A four-input NOR gate 979 has its first input connected to the output of the gate 961, its second input connected to the inverse output $\overline{FSR_{14}}$, its third input connected to the output $FSR_{15}$ and its fourth input connected to the output $FSR_{16}$. The output of the gate 979 is connected to one input of each of the gates $928_{18}$ and $928_{17}$. Since it is not necessary to apply any masking on bit sixteen the gate $928_{16}$ is a single input gate having its input connected to the output $\overline{AA_{16}}$.

When the field splitting operation is being carried out the control inputs $\overline{FS}$ and $\overline{MG}$ are noughts. Furthermore, the coding of bits twenty-one, twenty-two and twenty-three of the register FSR, as is explained in more detail later, is such that bit twenty-two is set to a one only for cases three and six. For cases one, two, four and five therefore the inverse output $\overline{FSR_{22}}$ is a one and the output of the OR gate 961 is also a one. Consequently the gates 966, 969, 972, 975, 977 and 979 are closed and the $\overline{DOP}$ outputs for bits twenty-three to seventeen are determined by the outputs of the gates 963, 964, 967, 970, 974, 976 and 978. These outputs are in turn determined by the masking digit inputs $\overline{MDU_0}$, $\overline{MDU_1}$ and $\overline{MDU_2}$ which are selected according to the number of bits at the most significant end of the upper eight bits in a similar manner to that described above for the lower sixteen bits.

For cases three and six the inverse output $\overline{FSR_{22}}$ is a nought and the output of the gate 961 is therefore a nought. Consequently the output of the gate 962 is a one and the gates 963, 964, 967, 970, 974, 976 and 978 are closed. The $\overline{DOP}$ output for bit twenty-three is therefore always a one for cases three and six since for these cases the fields being masked by the gates 928 are limited to a length of seven bits. The $\overline{DOP}$ outputs for bits twenty-two to seventeen are determined by the outputs of the gates 966, 969, 972, 975, 977 and 979 which in turn are determined by the field splitting register outputs $FSR_{14}$, $FSR_{15}$ and $FSR_{16}$. These three bits of the register FSR determine the lower vernier shift, but reference to FIGS. 77 and 80 will show that for cases three and six the number of bits to be shifted by the lower vernier shift is the same as the length of the field in the upper eight bits which has to be masked by the gates 928. For cases three and six this is always so since the lower vernier shift requirement is determined by the field which is shifted to the upper eight bits to be masked by the gate 928. The outputs $FSR_{14}$, $FSR_{15}$ and $FSR_{16}$ and their inverses are connected to the inputs of the gates 965, 968, 971, 975, 977 and 979 in such manner that the required masking is acheived. Thus in FIG. 77 a lower vernier shift of three places is required and the outputs $FSR_{16}$, $FSR_{15}$ and $FSR_{14}$ are nought, one and one respectively. Under these conditions the outputs $\overline{DOP_{23-19}}$ are ones and the outputs $\overline{DOP_{18}}$, $\overline{DOP_{17}}$ and $\overline{DOP_{16}}$ are determined by the outputs $\overline{AA_{18}}$, $\overline{AA_{17}}$ and $\overline{AA_{16}}$ applied to the inputs of the gates $928_{18}$, $928_{17}$ and $928_{16}$, all other inputs to these gates being noughts. The use of the outputs $FSR_{14}$, $FSR_{15}$ $FSR_{16}$ to determine the upper masking requirements for cases three and six permits the use of the outputs $FSR_{11}$, $FSR_{12}$ and $FSR_{13}$, which for other cases determine the upper masking requirements, for determining the additional masking inputs $MAS36_X$ to the gates 926, FIG. 74, required for cases three and six.

The bits twenty-one to twenty-three of the register FSR are coded to define the six cases in the following manner:

| | Register FSR bit No. | | |
|---|---|---|---|
| | 23 | 22 | 21 |
| Case No.: | | | |
| 1 | 0 | 0 | 0 |
| 2 | 0 | 0 | 1 |
| 3 | 0 | 1 | 0 |
| 4 | 1 | 0 | 0 |
| 5 | 1 | 0 | 1 |
| 6 | 1 | 1 | 0 |

Figure 86:
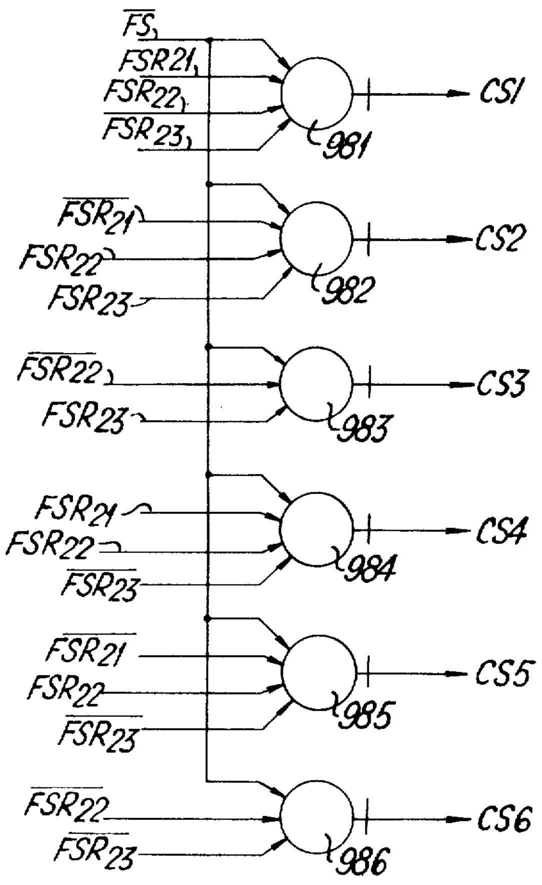

The case number is determined from the information held in bits twenty-one to twenty-three of the register FSR by means of the set of gates shown in FIG. 86. This set of gates includes a four-input NOR gate 981 having its first input connected to the field-splitting control input $\overline{FS}$, its second input connected to the output $FSR_{21}$ from bit twenty-one of the register FSR, its third input connected to the output $FSR_{22}$ and its fourth input connected to the ouput $FSR_{23}$. The output of the gate 981 produces an output CS1. A four-input NOR gate 982 has its first input connected to the control input $\overline{FS}$, its second input connected to the inverse output $\overline{FSR_{21}}$, its third input connected to the output $FSR_{22}$ and its fourth input connected to the output $FSR_{23}$. The output of the gate 982 produces an ouput CS2. A three-input NOR gate 983 has its first input connected to the control input $\overline{FS}$, its second input connected to the inverse output $\overline{FSR_{22}}$ and its third input connected to the output $FSR_{23}$. The output of the gate 983 produces an output CS3. A four-input NOR gate 984 has its first input connected to the control input $\overline{FS}$, its second input connected to the output $FSR_{21}$, its third input connected to the output $FSR_{22}$ and its fourth input connected to the inverse output $\overline{FSR_{23}}$. The output of the gate 984 produces an output CS4. A four-input NOR gate 985 has its first input connected to the control input $\overline{FS}$, its second input connected to the inverse output $\overline{FRS_{21}}$, its third input connected to the output $FSR_{22}$ and its fourth input connected to the inverse output $\overline{FSR_{23}}$. The output of the gate 985 produces an output CS5. A three-input NOR gate has its first input connected to the control input $\overline{FS}$, its second input connected to the inverse output $\overline{FSR_{22}}$ and its third input connected to the inverse output $\overline{FSR_3}$. The output of the gate 986 produces an output CS6.

In operation the appropriate one of the outputs CS1 to CS6 is a one in accordance with the information held in bits twenty-one to twenty-three of the register FSR. Thus for case 2 these bits are set to one, nought and nought respectively. Consequenlty the inputs $\overline{FSR_{21}}$, $FSR_{22}$ and $FSR_{23}$ to the gate 982 are all noughts and the outputs CS2 is a one. Each of the remaining gates 981, 983 to 986 has a one on at least one input and the outputs CS1, CS3 to CS6 are therefore all noughts. Only two outputs from the register FSR are used to determine cases 3 and 6 and in these two cases it is immaterial whether the bit $FSR_{21}$ is set to a nought, as shown in the table above, or a one.

The CS outputs from the gates 981 to 986 are used to determine the field-splitting control inputs FSC1, FSC2 and FSC3 thereby determining the routing of the external order through the function and shift unit shown in FIG. 74. The field-splitting control inputs are determined from the CS outputs by means of the set of gates shown in FIG. 87. This set of gates includes a three-input NOR gate 991 having its first input connected to the output CS4, its second input connected to the output CS5 and its third input connected to the output CS6. The output of the gate 991 produces the control input $\overline{FSC1}_{16-23}$ and is also connected to the input of a single input NOR gate 992 the output of which produces the control input $FSC1_{16-23}$. A double input NOR gate 993 has its first input connected to the output CS4 and its second input connected to the output CS5. The output of the gate 993 produces the control input $\overline{FSC1}_{0-15}$ and is also connected to the input of a single input NOR gate 994 the output of which produces the control input $FSC1_{0-15}$. A four-input NOR gate 995 has its first input connected to the control input $\overline{FS}$, its second input connected to the output CS1, its third input connected to the ouput CS2 and its fourth input connected to the output CS3. The output of the gate 995 produces the control input $\overline{FSC2}_{16-23}$ and is also connected to one input of a double input NOR gate 996 the other input of which is connected to the control input $\overline{FS}$. The output of the gate 996 produces the control input $FSC2_{16-23}$. A four-input NOR gate 997 has its first input connected to the control input $\overline{FS}$, its second input connected to the output CS4, its third input connected to the output CS5 and its fourth input connected to the output CS6. The output of the gate 997 produces the control input $\overline{FSC2}_{0-15}$ and is also connected to one input of a double input NOR gate 998 and other input of which is connected to the control input $\overline{FS}$. The output of the gate 998 produces the control input $FSC2_{0-15}$. A three-input NOR gate 999 has its first input connected to the output CS1, its second input connected to the output CS5 and its third input connected to the output CS6. The output of the gate 999 produces the control input $\overline{FSC3}_{16-23}$ and is also connected to the input of a single input NOR gate 1000 the output of which produces the control input $FSC3_{16-23}$. A double input NOR gate 1001 has its first input connected to the output CS4 and its second input connected to the output CS5. The output of the gate 1001 produces the control input $\overline{FSC3}_{0-15}$ and is also connected to the input of a single input NOR gate 1002 the output of which produces the control input $FSC3_{0-15}$.

In operation the field splitting control inputs are determinated by the CS outputs. Thus for case 2, for example, the output CS2 is a one and the outputs CS1, CS3 to CS6 are noughts. Therefore the outputs of the gates 991, 993, 997, 999 and 1001 are ones and the output of the gate 995 is a nought. Consequently the control inputs $FSC1_{0-23}$, $FSC2_{0-15}$, $\overline{FSC2}_{16-23}$ and $\overline{FSC3}_{0-23}$ are noughts and the remaining FSC inputs are ones. his results in all of the gates 907, FIG. 74, being open and all of the gates 908 being closed. For bits nought to fifteen the gates 905 and 918 are open and the gates 906 and 919 are closed and for bits sixteen to twenty-three the gates 906 and 919 are open and the gates 905 and 918 are closed. Therefore the sixteen least significant bits of the NOSS outputs and the eight most significant bits of the SO outputs are passed through the masking gates 928 and the sixteen least significant bits of the SO outputs and the eight most significant bits of the NOSS outputs pass through the gates 918 and 919 as the selected vernier shift digits. For bits nought to twenty-three the gates 926 and 929 are open and the gates 927 and 930 are closed and therefore all twenty-four bits of the $\overline{DOP}$ outputs pass through the gates 929 to the permanent field register and all twenty-four bits of the $\overline{VSOP}$ outputs pass through the gates 926 to the temporary field register.

Figure 88:
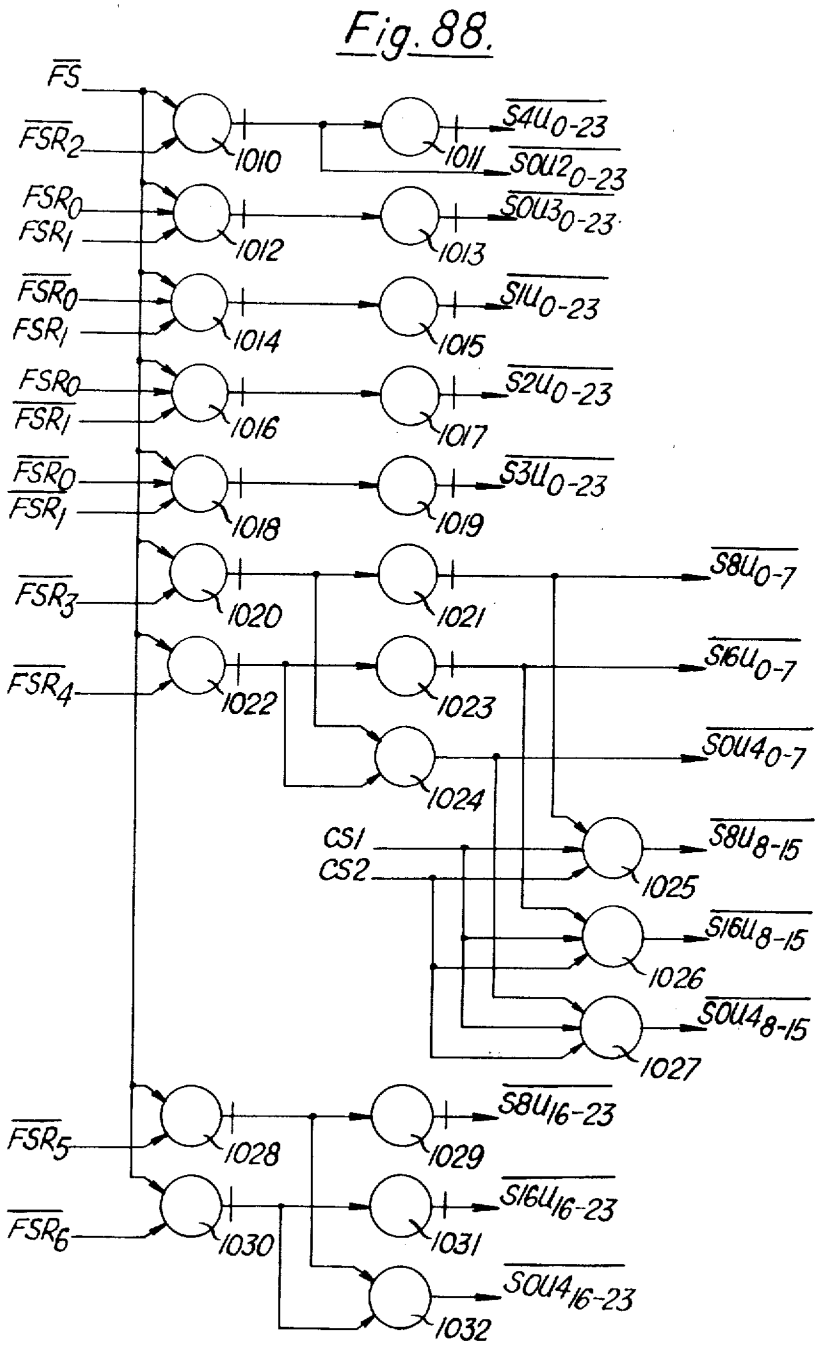

The main shift number digits held in bits nought to six of the register FSR are decoded by means of the set of gates shown in FIG. 88. This set of gates includes a double input NOR gate 1010 having its first input connected to the control input $\overline{FS}$ and its second input connected to the inverse output $\overline{FSR_2}$ from bit two of the register FSR. The output of the gate 1010 produces the control input $\overline{SOU2}_{0-23}$ and is also connected to the input of a single input NOR gate 1011 the output of which produces the control input $\overline{S4U}_{0-23}$. A three-input NOR gate 1012 has its first input connected to the control input $\overline{FS}$, its second input connected to the output $FSR_0$ and its third input connected to the output $FSR_1$. The output of the gate 1012 is connected to the input of a single input NOR gate 1013 the output of which produces the control input $\overline{SOU3}_{0-23}$. A three-input NOR gate 1014 has its first input connected to the control input $\overline{FS}$, its second input connected to the inverse output $\overline{FSR_0}$ and its third input connected to the output $FSR_1$. The output of the gate 1014 is connected to the input of a single input NOR gate 1015 the output of which produces the control input $\overline{S1U}_{0-23}$. A three-input NOR gate 1016 has its first input connected to the control input $\overline{FS}$, its second input connected to the output $FSR_0$ and its third input connected to the inverse output $\overline{FSR_1}$. The output of the gate 1016 is connected to the input of a single input NOR gate 1017 the output of which produces the control input $\overline{S2U}_{0-23}$. A three-input NOR gate 1018 has its first input connected to the control input $\overline{FS}$, its second input connected to the inverse output $\overline{FSR_0}$ and its third input connected to the inverse output $\overline{FSR_1}$. The output of the gate 1018 is connected to the input of a single input NOR gate 1019 the output of which produces the control input $\overline{S3U}_{0-23}$. A double input NOR gate 1020 has its first input connected to the control input $\overline{FS}$ and its second input connected to the inverse output $\overline{FSR_3}$. The output of the gate 1020 is connected to the input of a single input NOR gate 1021 the output of which produces the control input $\overline{S8U}_{0-7}$. A double input NOR gate 1022 has its first input connected to the control input $\overline{FS}$ and its second input connected to the inverse output $\overline{FSR_4}$. The output of the gate 1022 is connected to the input of a single input NOR gate 1023 the output of which produces the control input $\overline{S16U}_{0-7}$. A double input OR gate 1024 has its first input connected to the output of the gate 1020 and its second input connected to the output of the 1022. The output of the gate 1024 produces the control input $\overline{SOU4}_{0-7}$. A three-input OR gate 1025 has its first input connected to the output of the gate 1021, its second input connected to the output CS1, and its third input connected to the output CS2. The output of the gate 1025 produces the control input $\overline{S8U}_{8-15}$. A three-input OR gate 1026 has its first input connected to the output of the gate 1023, its second input connected to the output CS1 and its third input connected to the output CS2. The output of the gate 1026 produces the control input $\overline{S16U}_{8-15}$. A three-input OR gate 1027 has its first input connected to the output of the gate 1024, its second input connected to the output CS1 and its third input connected to the output CS2. The output of the gate 1027 produces the control input $\overline{SOU}_{8-15}$. A double input NOR gate 1028 has its first input connected to the control input $\overline{FS}$ and its second input connected to the inverse output $\overline{FSR_5}$. The output of the gate 1028 is connected to the input of a single input NOR gate 1029 the output of which produces the control input $\overline{S8U}_{16-23}$. A double input NOR gate 1030 has its first input connected to the control input $\overline{FS}$ and its second input connected to the inverse output $\overline{FSR_6}$. The output of the gate 1030 is connected to the input of a single input NOR gate 1031 the output of which produces the control input $\overline{S16U}_{16-23}$. A double input OR gate 1032 has its first input connected to the output of the gate 1028 and its second input connected to the output of the gate 1030. The output of the gate 1032 produces the control input $\overline{SOU4}_{16-23}$.

Shifts of up to seven places are determined by bits nought, one and two of the register FSR in the normal manner. Thus for a shift of seven places the outputs $FSR_0$, $FSR_1$ and $FSR_2$ would all be ones with the result that the control inputs $\overline{S3U}_{0-23}$ and $\overline{S4U}_{0-23}$ would both be noughts and the control inputs $\overline{SOU2}_{0-23}$, $\overline{S1U}_{0-23}$ and $\overline{S2U}_{0-23}$ would all be ones thereby causing a shift of seven places. Shifts of eight and sixteen places are determined by bits three to six of the register FSR. Except for cases one and two bits three and four of the register FSR determine shifts of eight and sixteen places respectively for bits nought to fifteen since the outputs of the gates 1025, 1026 and 1027 are respectively the same as the outputs of the gates 1021, 1023 and 1024. For case one or case two, however the output CS1 or CS2 is a one which is applied to one input of each of the OR gates 1025, 1026 and 1027. Consequently all of the control inputs $\overline{S8U}_{8-15}$, $\overline{S16U}_{8-15}$ and $\overline{SOU4}_{8-15}$ are ones such that the outputs $SO_{8-15}$, FIG. 74, are all noughts as is required for these two cases, and bits three and four of the register FSR determine shifts of eight and sixteen places respectively only for bits nought to seven. In all cases bits five and six of the register FSR determine shifts of eight and sixteen places respectively for bits sixteen to twenty-three. Thus for a case other than case one or case two for a shift of sixteen places to all twenty-four bits the outputs $FSR_3$ and $FSR_5$ would be noughts and the outputs $FSR_4$ and $FSR_6$ would be ones. Consequently, the inputs $\overline{FSR_3}$ and $\overline{FSR_5}$ to gates 1020 and 1028 respectively would be ones and the control inputs $\overline{S8U}_{0-23}$ and $\overline{SOU4}_{0-23}$ would be ones. The inputs $\overline{FSR_4}$ and $\overline{FSR_6}$ to gates 1022 and 1030, however, would be noughts and the control inputs $\overline{S16U}_{0-23}$ would be noughts.

For the example of case one described with reference to FIG. 75 it is necessary to provide a shift of two places to all twenty-four bits followed by a zero shift for bits sixteen to twenty-three and a shift of sixteen places to bits eight to fifteen to shift the information in these bits into bits nought to seven. To achieve this bits $FSR_1$ and $FSR_4$ are set to ones, the output CS1 also being a one, and bits $FSR_0$, $FSR_2$, $FSR_3$, $FSR_5$ and $FSR_6$ are noughts. Consequently the control inputs $\overline{SOU2}_{0-23}$, $\overline{S2U}_{0-23}$, $\overline{S16U}_{0-7}$, and $\overline{SOU4}_{16-23}$ are noughts and the control inputs $\overline{SOU3}_{0-23}$, $\overline{SOU4}_{0-15}$, $\overline{S1U}_{0-23}$, $\overline{S3U}_{0-23}$, $\overline{S4U}_{0-23}$, $\overline{S8U}_{0-23}$ and $\overline{S16U}_{8-23}$ are all ones. Under these conditions the SO outputs are as shown at (ii) in FIG. 75.

Figure 89:
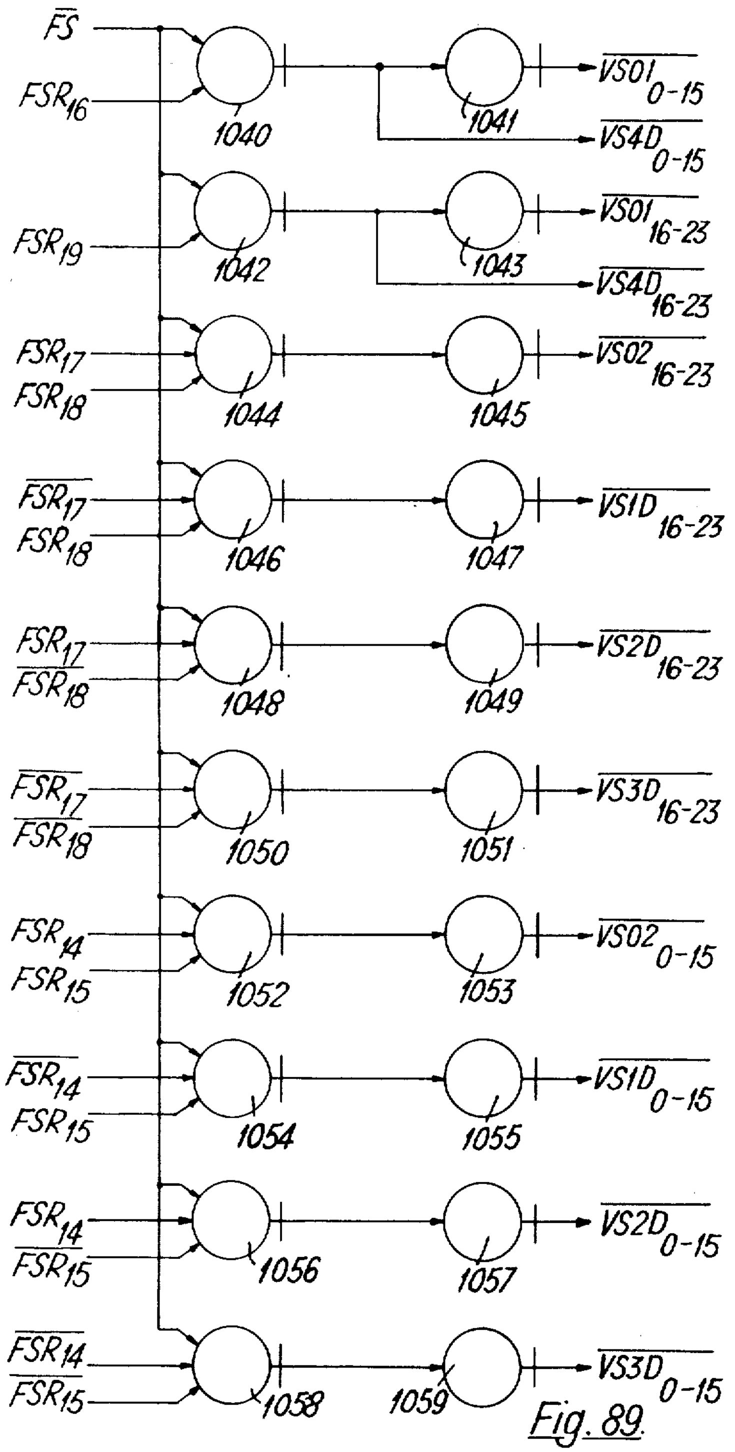

The lower and upper vernier shift number digits held in bits fourteen to nineteen of the register FSR are decoded by means of the set of gates shown in FIG. 89. This set of gates includes a double input NOR gate 1040 having its first input connected to the control input $\overline{FS}$ and its second input connected to the output $FSR_{16}$. The output of the gate 1040 produces the control input $\overline{VS4D}_{0-15}$ and is also connected to the input of a single input NOR gate 1041 the output of which produces the control input $\overline{VSO1}_{0-15}$. A double input NOR gate 1042 has its first input connected to the control input $\overline{FS}$ and its second input connected to the output $FSR_{19}$. The output of the gate 1042 produces the control input $\overline{VS4D}_{16-23}$ and is also connected to the input of a single input NOR gate 1043 the output of which produces the control input $\overline{VSO1}_{16-23}$. A three-input NOR gate 1044 has its first input connected to the control input $\overline{FS}$, its second input connected to the output $FSR_{17}$ and its third input connected to the output $FSR_{18}$. The output of the gate 1044 is connected to the input of a single input NOR gate 1045 the output of which produces the control input $\overline{VSO2}_{16-23}$. A three-input NOR gate 1046 has its first input connected to the control input $\overline{FS}$, its second input connected to the inverse output $\overline{FSR_{17}}$ and its third input connected to the output $FSR_{18}$. The output of the gate 1046 is connected to the input of a single input NOR gate 1047 the output of which produces the control input $\overline{VS1D}_{16-23}$. A three-input NOR gate 1048 has its first input connected to the control input $\overline{FS}$, its second input connected to the output $FSR_{17}$ and its third input connected to the inverse output $\overline{FSR_{18}}$. The output of the gate 1048 is connected to the input of a single input NOR gate 1049 the output of which produces the control input $\overline{VS2D}_{16-23}$. A three-input NOR gate 1050 has its first input connected to the control input $\overline{FS}$, its second input connected to the inverse output $\overline{FSR_{17}}$ and its third input connected to the inverse output $\overline{FSR_{18}}$. The output of the gate 1050 is connected to the input of a single input NOR gate 1051 the output of which produces the control input $\overline{VS3D}_{16-23}$. A three-input NOR gate 1052 has its first input connected to the control input $\overline{FS}$, its second input connected to the output $FSR_{14}$ and its third input connected to the output $FSR_{15}$. The output of the gate 1052 is connected to the input of a single input NOR gate 1053 the output of which produces the control input $\overline{VSU2}_{0-15}$. A three-input NOR gate 1054 has its first input connected to the control input $\overline{FS}$, its second input connected to the inverse output $\overline{FSR_{14}}$ and its third input connected to the output $FSR_{15}$. The output of the gate 1054 is connected to the input of a single input NOR gate 1055 the output of which produces the control input $\overline{VS1D}_{0-15}$. A three-input NOR gate 1056 has its first input connected to the control input $\overline{FS}$, its second input connected to the output $FSR_{14}$ and its third input connected to the inverse output $\overline{FSR_{15}}$. The output of the gate 1056 is connected to the input of a single input NOR gate 1057 the output of which produces the control input $\overline{VS1D}_{0-15}$. A three-input NOR gate 1056 has its first input connected to the control input $\overline{FS}$, its second input connected to the inverse otput $\overline{FSR_{14}}$ and its third input connected to the inverse output $\overline{FSR_{15}}$. The output of the gate 1058 is connected to the input of a single input NOR gate 1059 the output of which produces the control input $\overline{VS3D}_{0-15}$.

Vernier shifts of up to seven places are determined by bits fourteen to sixteen and seventeen to nineteen of the register FSR for the lower sixteen and upper eight bits respectively. Thus to cause a vernier shift of three places for bits nought to fifteen and five places for bits sixteen to twenty-three the outputs $FSR_{14}$ and $FSR_{15}$ would be ones and the output $FSR_{16}$ would be a nought to determine the shift of three places and the outputs $FSR_{17}$ and $FSR_{19}$ would be ones and the output $FSR_{18}$ would be a nought to determine the shift of five places. Under these conditions the control inputs $\overline{VSO1}_{0-15}$ and $\overline{VS3D}_{0-15}$ are nought and the control inputs $\overline{VSD2}_{0-15}$, $\overline{VS1D}_{0-15}$, $\overline{VS2D}_{0-15}$ and $\overline{VS4D}_{0-15}$ are ones to cause a shift of three places for bits nought to fifteen, and the control inputs $\overline{VS1D}_{16-23}$ and $\overline{VS4D}_{16-23}$ are noughts and the control inputs $\overline{VSO1}_{16-23}$, $\overline{VSO2}_{16-23}$, $\overline{VS2D}_{16-23}$ and $\overline{VS3D}_{16-23}$ are ones to cause a shift of five places for bits sixteen to twenty-three.

Figure 90:
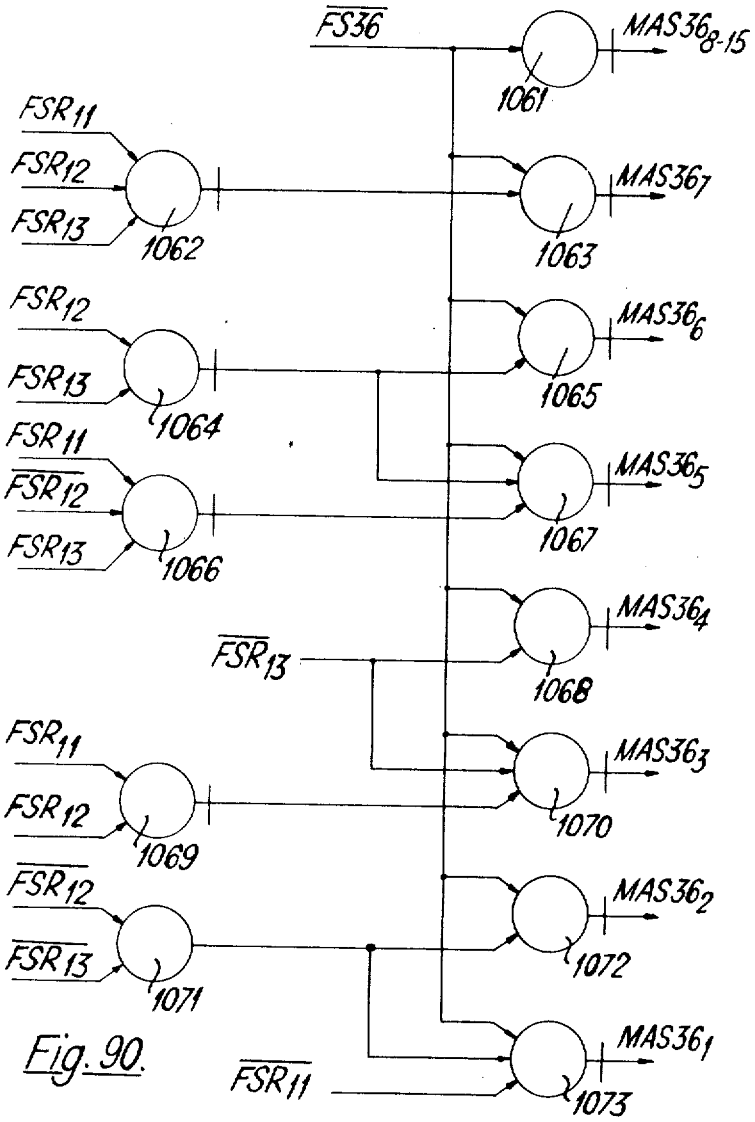

To provide the additional masking on the gates 926, FIG. 74, for cases three and six the set of gates shown in FIG. 90 is provided. This set of gates includes a single input NOR gate 1061 having its input connected to the control input $\overline{FS36}$ derived from the gate 961, FIG. 85. The output of the gate 1061 produces the control input $MAS36_{8-15}$. A three-input NOR gate 1062 has its first input connected to the output $FSR_{11}$ from bit eleven of the register FSR, its second input connected to the output $FSR_{12}$ and its third input connected to the output $FSR_{13}$. The output of the gate 1062 is connected to one input of a double input NOR gate 1063 the other input of which is connected to the control input $\overline{FS36}$. A double input NOR gate 1064 has its first input connected to the output $\overline{FSR}_{12}$ and its third input connected to the output $FSR_{13}$. The output of the gate 1064 is connected to one input of a double input NOR gate 1065 the other input of which is connected to the control input $\overline{FS36}$. A three-input NOR gate 1066 has its first input connected to the output $FSR_{11}$, its second input connected to the inverse ouput $\overline{FSR}_{12}$ and its third input connected to the output $FSR_{13}$. The output of the gate 1066 is connected to the first input of a three-input NOR gate 1067, the second input of which is connected to the output of the gate 1064. The third input of the gate 1067 is connected to the control input $\overline{FS36}$ and the output thereof produces the control input $MAS36_5$. A double input NOR gate 1068 has its first input connected to the control input $\overline{FS36}$ and its second input connected to the inverse output $\overline{FSR}_{13}$. The output of the gate 1068 produces the control input $MAS36_4$. A double input NOR gate 1069 has its first input connected to the output $FSR_{11}$ and its second input connected to the output $FSR_{12}$. The output of the gate 1069 is connected to the first input of a three-input NOR gate 1070, the second input of which is connected to the inverse output $\overline{FSR}_{13}$. The third input of the gate 1070 is connected to the control input $\overline{FS36}$ and the output thereof produces the control input $MAS36_3$. A double input OR gate has its first input connected to the inverse output $\overline{FSR}_{12}$ and its second input connected to the inverse output $\overline{FSR}_{13}$. The output of the gate 1071 is connected to the first input of a double input NOR gate 1072 the second input of which is connected to the control input $\overline{FS36}$. The output of the gate 1072 produces the control input $MAS36_2$. A three-input NOR gate 1073 has its first input connected to the control input $\overline{FS36}$, its second input connected to the inverse output $\overline{FSR}_{11}$ and its third input connected to the output of the gate 1071. The output of the gate 1073 produces the control input $MAS36_1$.

In operation, for cases three and six the bits eleven, twelve and thirteen of the register FSR are set according to the number of bits at the most significant end of the lower eight bits which it is required to mask, bits eight to fifteen always being masked for these two cases. Thus if it is required to mask, bits five, six and seven the bits eleven, twelve and thirteen of the register FSR are set to one, one and nought respectively. For cases three and six the control input $\overline{FS36}$ is a nought and under these conditions the control inputs $MAS36_5$, $MAS36_6$, $MAS36_7$ and $MAS36_{8-15}$ are ones thus masking bits five to fifteen and the control inputs $MAS36_{1-4}$ are noughts such that the five least significant bits of the sixteen least significant bits of the $\overline{VSOP}$ outputs pass through the gates 926, FIG. 74.

Figure 91:
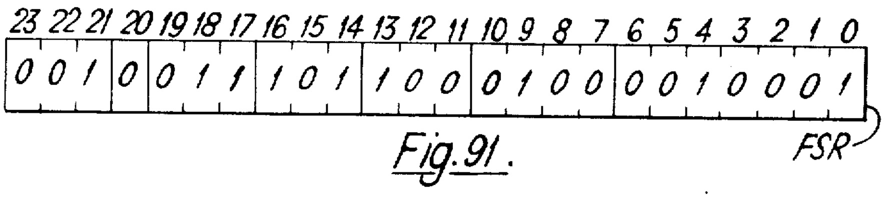

To carry out the field splitting operation on the external order shown at (i) in FIG. 76 the register FSR is set in the manner shown in FIG. 91. The outputs $FSR_{21}$, $FSR_{22}$ and $FSR_{23}$ determine that the function and shift unit is set up for case two. Since the field splitting operation is being carried out the control input $\overline{FS}$ is a nought and therefore the gate 982 FIG. 86 is the only one of the gates 981 to 986 to have all noughts on its inputs with the result that the output CS2 is a one and the remaining CS outputs are all noughts. Consequently the control inputs $FSC1_{0-23}$, $FSC2_{0-15}$, $\overline{FSC2}_{16-23}$ and $FSC3_{0-23}$ are noughts and the remaining FSC inputs are ones as previously described with reference to FIG. 87 and the function and shift unit is therefore set up for case two.

Since the output $FSR_{22}$ is a nought the control input $\overline{FS36}$ derived from the output of the gate 961, FIG. 85, is a one and consequently all of the control inputs $MAS36_{1-15}$, FIG. 90, are noughts and there is no masking applied to the gate 926, FIG. 74.

The outputs $FSR_{0-6}$ are decoded by the set of gates shown in FIG. 88 to give the main shift requirements. With bits nought to six of the register FSR set as shown in FIG. 91 the control inputs $\overline{SOU3}_{0-23}$, $\overline{SOU4}_{16-23}$, $S1U_{0-23}$ and $S16U_{0-7}$ are noughts and the control inputs $\overline{SOU3}_{0-23}$, $\overline{SOU4}_{0-15}$, $\overline{S2U}_{0-23}$, $\overline{S3U}_{0-23}$, $\overline{S4U}_{0-23}$, $\overline{S8U}_{0-23}$, and $\overline{S16U}_{8-23}$ are ones. These are the required conditions to produce the SO outputs shown at (ii) in FIG. 76.

Bits seven to ten of the register FSR determine the lower masking requirements and the outputs $FSR_7$, $FSR_8$, $FSR_9$ and $FSR_{10}$ correspond respectively to the mask digit inputs $MDL_0$, $MDL_1$, $MDL_2$ and $MDL_3$, FIG. 84. Thus with bits seven to ten of the register FSR set as shown in FIG. 91 the mask digit inputs $MDL_0$, $MDL_1$, $MDL_2$ and $MDL_3$ are 0, 0, 1 and 0 respectively and under these conditions the outputs $\overline{DOP}_{12-15}$ are ones and the outputs $\overline{DOP}_{0-11}$ are determined by the inputs $\overline{AA}_{0-11}$ to give the inverse of field N as shown at (iii) in FIG. 76.

Similarly, bits eleven to thirteen of the register FSR determine the upper masking requirements and the outputs $FSR_{11}$, $FSR_{12}$ and $FSR_{13}$ correspond respectively to the mask digit inputs $MDU_0$, $MDU_1$ and $MDU_2$, FIG. 85. Thus with bits eleven to thirteen of the register FSR set as shown in FIG. 91 the mask digit inputs $MDU_0$, $MDU_1$ and $MDU_2$ are 0, 0 and 1 respectively. Furthermore, since the output $\overline{FS36}$ is a one the gates 966, 969, 972, 975, 977 and 979 are closed. Under these conditions the outputs $\overline{DOP}_{20-23}$ are ones and the outputs $\overline{DOP}_{16-19}$ are determined by the inputs $\overline{AA}_{16-19}$ to give the inverse of field X as shown at (iii) in FIG. 76.

The outputs $FSR_{14-16}$ and $FSR_{17-19}$ are decoded by the set of gates shown in FIG. 89 to give the lower and upper vernier shift requirements respectively. With bits fourteen to nineteen of the register FSR set as shown in FIG. 91 the control inputs $\overline{VSO1}_{0-15}$, $\overline{VSO2}_{0-15}$, $\overline{VS2D}_{0-15}$ and $\overline{VS3D}_{0-15}$ are ones and the control inputs $\overline{VS4D}_{0-15}$ and $\overline{VS1D}_{0-15}$ are noughts to cause a vernier shift of five places to bits nought to fifteen and the control inputs $\overline{VSO2}_{16-23}$, $\overline{VS1D}_{16-23}$, $\overline{VS2D}_{16-23}$ and $\overline{VS4D}_{16-23}$ are ones and the control inputs $\overline{VSO1}_{16-23}$ and $\overline{VS3D}_{16-23}$ are noughts to cause a vernier shift of three places to bits sixteen to twenty-three.

Bit twenty of the register FSR is a nought to determine that field one is to be used before field three in carrying out the external order.

Figure 92:
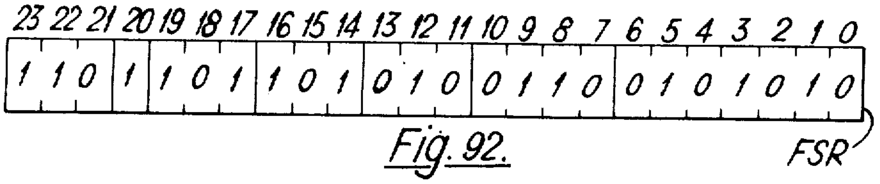

To carry out the field splitting operation on the external order shown at (i) in FIG. 80 the register FSR is set in the manner shown in FIG. 92. The outputs $FSR_{21}$, $FSR_{22}$ and $FSR_{23}$ now determine that the function and shift unit is set up for case six. The control input $\overline{FS}$ is again a nought and therefore the gate 986, FIG. 86, is the only one of the gates 981 to 986 to have all noughts on its inputs with the result that the output CS6 is a one and the remaining CS outputs are all noughts.

Figure 87:
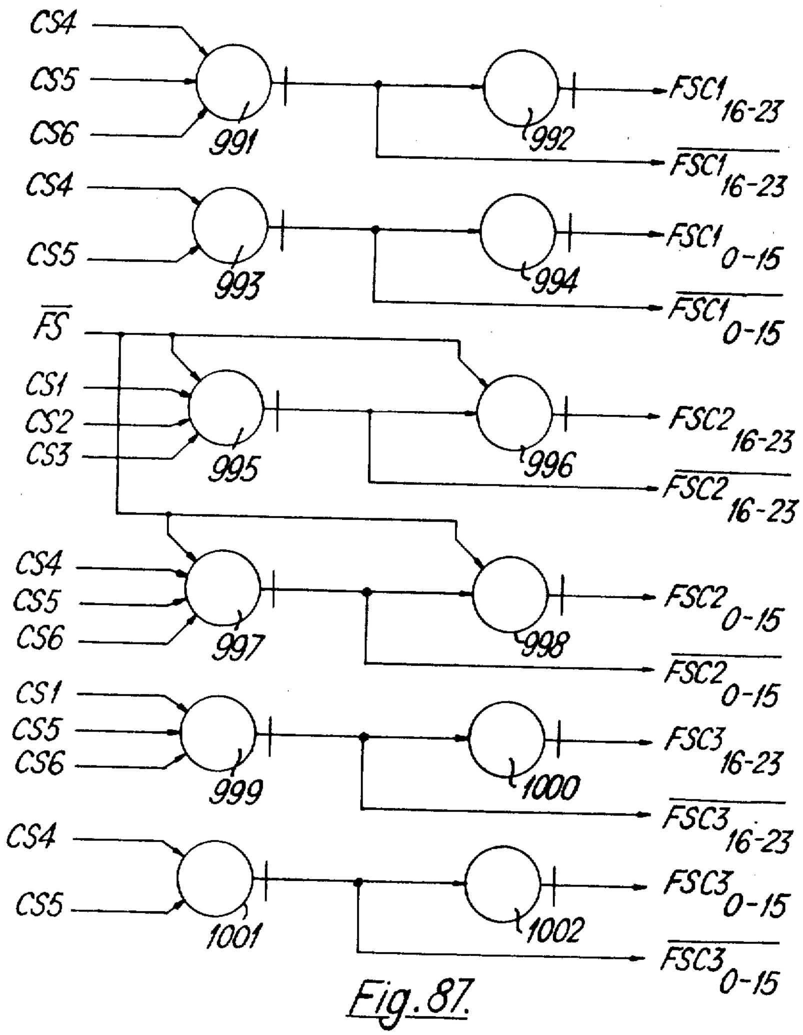

Consequently, the control inputs derived from the set of gates shown in FIG. 87 the control inputs $\overline{FSC1}_{0-15}$, $\overline{FSC1}_{16-23}$, $FSC2_{0-15}$, $FSC2_{16-23}$, $FSC3_{0-15}$ and $\overline{FSC3}_{16-23}$ are ones and the control inputs $FSC1_{0-15}$, $\overline{FSC1}_{16-23}$, $\overline{FSC2}_{0-15}$, $FSC2_{16-23}$, $FSC3_{0-15}$ and $\overline{FSC3}_{16-23}$ are noughts. Consequently for bits nought to fifteen the gates 907, FIG. 74, are open and the gates 908 are closed and for bits sixteen to twenty-three the gates 907 are closed and the gates 908 are open resulting in the NOSS outputs shown at (ii) in FIG. 80. For bits nought to fifteen the gates 906 and 919 are open and the gates 905 and 918 are closed and for bits sixteen to twenty-three the gates 905 and 918 are open and the gates 906 and 919 are closed. This results in the $\overline{DOP}$ and $\overline{SVSD}$ outputs shown at (iv) and (v) in FIG. 80. Also for bits sixteen to twenty-three the gates 927 and 930 are open and the gates 929 and 926 are closed and for bits nought to fifteen the gates 927 and 930 are closed and the gates 929 are open. The control inputs $FSC3_{0-15}$ applied to the gates 926 are noughts but since the output $FSR_{22}$ is a one the control input $\overline{FS36}$ derived from the gate 961, FIG. 85, is a nought and the $\overline{MAS36}$ inputs to the gates 926 determine whether or not these gates are open for bits nought to fifteen. Consequently the PPFR and PTFR outputs are as shown at (vii) and (viii) in FIG. 80.

The outputs $FSR_{0-6}$ are decoded by the set of gates shown in FIG. 88 to give the main shift requirements. With bits nought to six of the register FSR set as shown in FIG. 92 the control inputs $\overline{SOU3}_{0-23}$, $\overline{SOU4}_{0-23}$, $\overline{S1U}_{0-23}$, $\overline{S3U}_{0-23}$, $\overline{S4U}_{0-23}$ and $\overline{S16U}_{0-23}$ are ones and the control inputs $\overline{SOU2}_{0-23}$, $\overline{S2U}_{0-23}$ and $\overline{S8U}_{0-23}$ are noughts to cause a shift of ten places to all twenty-four bits.

Bits seven to ten of the register FSR again determine the lower masking requirements and with these bits set as shown in FIG. 92 the mask digit inputs $MDL_0$, $MDL_1$, $MDL_2$ and $MDL_3$, FIG. 84 are 0, 1, 1, and 0 respectively. Under these conditions the outputs $DOP_{10-15}$ are ones and the outputs $\overline{DOP}_{0-9}$ are determined by the inputs $\overline{AA}_{0-9}$ to give the inverse of field N as shown at (iv) in FIG. 80.

Since this is a case six operation and the control input $\overline{FS36}$, FIG. 85, is a nought, the gates 963, 964, 967, 970, 974, 976 and 978 are closed and the upper masking requirements are determined by the setting of bits fourteen, fifteen and sixteen of the register FSR. With these bits set as shown in FIG. 92, the outputs $\overline{DOP}_{21-23}$ are ones and the outputs $\overline{DOP}_{16-20}$ are determined by the inputs $\overline{AA}_{16-20}$ to give the inverse of field nought as shown at (iv) in FIG. 80.

The outputs $FSR_{14-16}$ also determines the lower vernier shift requirements and the outputs $FSR_{17-19}$ again determine the upper vernier shift requirements. The outputs $FSR_{14-19}$ are decoded by the set of gates shown in FIG. 89 and with bits fourteen to nineteen of the register FSR set as shown in FIG. 92 the control inputs $\overline{VSO1}_{0-15}$, $\overline{VSO2}_{0-15}$, $\overline{VS2D}_{0-15}$ and $\overline{VS3D}_{0-15}$ are ones and the control inputs $\overline{VS4D}_{0-15}$ and $\overline{VS1D}_{0-15}$ are noughts to cause a vernier shift of five places to bits nought to fifteen, and the control inputs $\overline{VSO1}_{16-23}$, $\overline{VSO2}_{16-23}$, $\overline{VS2D}_{16-23}$, and $\overline{VS3R}_{16-23}$ are ones and the control inputs $\overline{VS4D}_{16-23}$ and $\overline{VS1D}_{16-23}$ are noughts to cause a vernier shift of five places to bits sixteen to twenty-three.

The outputs $FSR_{11-13}$ are decoded by the set of gates shown in FIG. 90 to determine the additional masking necessary for case six. With bits eleven to thirteen of the register FSR set as shown in FIG. 92 the control inputs $MAS36_{6-15}$ are ones and the control inputs $MAS36_{1-5}$ are noughts to give the PTFR outputs shown at (viii) in FIG. 80.

Bit twenty of the register FSR is set to a one to determine that field nought is to be used before field one in carrying out the external order.

Although the information required to define the field breakdown of the external order has been described as being held in a single twenty-four bit register the information may be held in several parts of different registers and assembled on the highway HWC when it is necessary to carry out a field splitting operation, the appropriate outputs from the highway HWC being connected in place of the outputs from the register FSR as described.

The computer systems described may be modified in many ways. For example, an executive register system of the kind described with reference to FIGS. 45 to 50 may be combined with an executive register system of the kind described with reference to FIGS. 70, 71 and 73 such that internal orders of both the multi-bit character order kind and single bit register setting kind may be used. Also, although in the examples described the logic circuits have been shown incorporating NOR or OR gates other kinds of logic circuits, such as logic circuits incorporating NAND or AND gates, are equally suitable. Furthermore, the examples have been described with reference to machine codes having words of twenty-four bits length but the invention may also be used with words of any other length such as the commonly used words of thirty-two bit length. The invention is also suitable for use with machines operating in the serial mode as well as with machines operating in the parallel mode as described.

What I claim is:

1. A computer including first means for holding one word of one of a plurality of computer machine codes, said word comprising a plurality of fields including a function field, second means for holding information defining the field breakdown of a machine code word held in said first means, the information held in said second means being variable according to the machine code of the word held in said first means, third means for acting in conjunction with said second means for selecting a desired one of the fields of a word held in said first means, fourth means for controlling the operation of said computer in accordance with the function field of the word held in said first means, and circuit means operably interconnecting said first, second, third and fourth means.

2. A computer as claimed in claim 1 in which said second means comprises register means.

3. A computer as claimed in claim 2 in which said register means comprises two bits for each bit of a machine code word held in said first means.

4. A computer as claimed in claim 2 in which said register means comprises two bits for each of a plurality of zones, each zone representing at least one bit of each of a plurality of computer machine codes.

5. A computer as claimed in claim 2 wherein said register means comprises one bit for each of one or more selected ones of a plurality of zones and two bits for each of the remaining ones of said zones, each zone representing at least one bit of each of a plurality of computer machine codes.

6. A computer as claimed in claim 2 wherein said register means comprises one bit for each of one or more selected pairs of a plurality of zones, one bit for each of one or more selected ones of said zones and two bits for each of the remaining ones of said zones, each zone representing at least one bit of each of a plurality of computer machine codes.

7. A computer as claimed in claim 1 in which said second means comprises register means and shift number storing means.

8. A computer as claimed in claim 7 in which each bit of a machine code word held in said first means is represented by one bit of said register means, the bits of said register maens in operation being set to one state for those bits representing the fields of said machine code word held in said first means at the least and most significant end of said word and set to another state for those bits representing the remaining fields, said shift number storing means in operation holding at least one shift number determined by the number of places it is necessary to shift the first field adjacent to the field at the least significant end of said machine code word to a predetermined position.

9. A computer as claimed in claim 8 in which said predetermined position is a position in which the least significant bit of said first field is located in a particular bit number.

10. A computer as claimed in claim 8 in which said shift number storing means comprises further register means.

11. A computer as claimed in claim 7 in which said register means in operation holds information defining the machine code word held in said first means as one of a predetermined number of types of machine code and in which said shift number means in operation holds shift numbers determined by the number of places it is necessary to shift fields of said machine code word to predetermined positions.

12. A computer as claimed in claim 1 in which said third means comprises masking means for masking unwanted fields and shifting means for shifting said desired field to a predetermined position.

13. A computer as claimed in claim 12 in which said masking means comprises a set of gates adapted to be controlled in accordance with information held in said second means together with field selection information.

14. A computer as claimed in claim 13 in which said shifting means comprises a shift network and a shift decoding network adapted to be controlled in accordance with control inputs derived from the output of said masking means.

15. A computer as claimed in claim 8 in which said third means comprises field splitting means for splitting said machine code word held in said first means into separate fields and entering such fields into separate storage locations and means for selecting the appropriate one of said storage locations containing said desired one of the fields.

16. A computer as claimed in claim 15 in which said separate storage locations conprise further means.

17. A computer as claimed in claim 15 in which said field splitting means comprises means for acting in conjunction with information held in said register means to separate said fields at the least and most significant ends of said word from the remaining fields and shifting means for shifting said remaining fields in accordance with at least one shift number held in said shift number storing means.

18. A computer as claimed in claim 17 in which said machine code word has four fields.

19. A computer as claimed in claim 18 in which said shift number storing means in operation holds two shift numbers, one of which controls said shifting means to shift the two inner fields such that the field adjacent to the field at the most significant end of said word is shifted to the least significant end and the other of which controls said shifting means to cause the first field adjacent to the field at the least significant end to be shifted to a position in which the least significant bit of said first field is located in a particular bit number.

20. A computer as claimed in claim 11 in which said third means comprises field splitting means for splitting said machine code word held in said first means into separate fiields and entering said fields into separate storage locations at least said function field always being entered into the same storage location, and means for selecting the appropriate one of said storage locations containing said desired one of the fields.

21. A computer as claimed in claim 20 in which said separate storage locations comprise further register means.

22. A computer as claimed in claim 20 in which said field splitting means comprises first and second shifting means and means for acting in conjunction with information held in said register means to cause at least one of said fields to pass through said first shifting means and the remaining fields to bypass said first shifting means and thereafter to cause at least one of said fields to pass through said second shifting means and the remaining fields to bypass said second shifting means, said first and second shifting means causing shifts in accordance with shift numbers held in said shift number means.

23. A computer as claimed in claim 22 in which two adjacent fields are caused to pass through said first shifting means which is adapted to be operated in such manner as to separate said two adjacent fields.

24. A computer as claimed in claim 1 in which said fourth means comprises a store for holding internal orders for causing said computer to carry out particular functions, executive register means for receiving internal orders from an initial address determined by said function field, and control means for controlling the operation of said computer to cause the loading of said executive register means and the carrying out of particular functions in accordance with the contents of said executive register.

25. A computer as claimed in claim 24 in which said internal orders are of different kinds defined by particular bits of each order.

26. A computer as claimed in claim 25 in which one of said kinds of internal order comprises a plurality of character orders each comprising a character order function field and a character order address field.

27. A computer as claimed in claim 25 in which one of said kinds of internal order comprises a plurality of character orders and a jump address, each of said character orders comprising a character order function field and a character order address field.

28. A computer as claimed in claim 25 in which one of said kinds of internal order comprises a single character order and a store address, said character order comprising a character order function field and a character order address field.

29. A computer as claimed in claim 25 in which one of said kinds of internal order includes at least one character order having a character order function field and a character order address field and in which said character order address field represents either a direct address or an indirect address.

30. A computer as claimed in claim 24 in which each bit of an internal order may be set to cause the computer to carry out a particular function.

31. A computer as claimed in claim 30 in which the setting of at least two bits together causes a further function to be performed.

32. A computer as claimed in claim 25 in which said control means comprises control logic including means for causing the loading of said executive register with an internal order from said store, means for detecting the kind of internal order and means for causing the carrying out of each character order of said internal order.

33. A computer as claimed in claim 32 in which said means for causing the carrying out of each internal order comprises address decoding means and function decoding means.

34. A computer as claimed in claim 30 in which said control means comprises control logic including means for causing the loading of said executive register with an internal order from said store and means for causing the carrying out of each internal order in accordance with the setting of each bit of said executive register.

35. A computer as claimed in claim 1 including interrupt means for causing the interruption of the carrying out of an internal order to permit the carrying out of an interrupt order.

36. A digital computer including storage means for holding internal orders defining functions to be carried out by the computer and external orders in the form of words of one of a plurality of computer machine codes, at least some of said words comprising a plurality of fields including a function field, an external order register operably connected to said storage means for receiving from said store one of said external orders to be carried out, external order defining means operably connected to said external order register for defining the field breakdown for an external order held in said external order register, field selection means operably connected to said external order defining means for acting in conjunction with said external order defining means to select any desired one of the fields of said external order, executive register means operably connected to said storage means for receiving from said storage means one of said internal orders, the initial internal order received by said executive register means when carrying out an external order being determined by the function field of that external order, a function unit operably connected to said storage means for carrying out the functions defined by said internal orders and control means connected to said executive register means for controlling the operation of said computer in accordance with the contents of said executive register means.

37. A computer as claimed in claim 36 in which said external order defining means comprises register means having for each bit of said external order a plurality of bits which in operation are set to uniquely define each field of said external order.

38. A computer as claimed in claim 37 in which said external order has four fields and in which said register means has two bits for each bit of said external order.

39. A computer as claimed in claim 36 in which said external order defining means comprises register means having a plurality of bits for each of a plurality of zones, each zone representing at least one bit of each of a plurality of external orders of different computer machine codes, the bits of said register means in operation being set to uniquely define each field of said external order held in said external order register.

40. A computer as claimed in claim 39 in which said external orders of different computer machine codes each has a maximum of four fields and in which said register means has two bits for each of said zones.

41. A computer as claimed in claim 40 modified in that said register means comprises one bit for each of a selected one or more of said zones and two bits for each of the remaining ones of said zones.

42. A computer as claimed in claim 40 modified in that said register means comprises one bit for each of one or more selected pairs of said zones, one bit for each of one or more selected ones of said zones and two bits for each of the remaining ones of said zones.

43. A computer as claimed in claim 36 in which said external order has four fields numbered nought, one, two and three counting from the least significant end and in which said external order defining means comprises a mask register having bits corresponding to the bits of said external order, the bits of said mask register in operation being set to one state for the bits corresponding to fields nought and three and to another state for the bits corresponding to fields one and two, and a shift number register for holding a shift number determined by the number of places it is necessary to shift fields one and two such that field two is shifted to the least significant end of said external order and field one is shifted to the most significant end of said external order.

44. A computer as claimed in claim 43 in which said shift number register is also for holding a further shift number determined by the number of places it is necessary to shift field one from the most significant end of said external order to a position in which the least significant bit of field one is located in a predetermined bit number.

45. A computer as claimed in claim 43 in which said field selection means comprises first and second registers operably connected for receiving said fields, a shift network operably connected to said shift number register for shifting said fields in accordance with the contents of said shift number register, a mask network operable in conjunction with said said mask register to cause fields nought and three to bypass said shift network and enter said first register and to cause fields one and two to pass through said shift network and enter said second register, and selection means operably connected to said first and second registers for selecting the desired field from said first and second registers.

46. A computer as claimed in claim 36 in which said external order defining means comprises a type register for holding information defining said external order as one of a predetermined number of types of machine code in which said fields each have a maximum length, a shift number register for holding a plurality of shift numbers determined by the number of places it is necessary to shift fields of said external order to predetermined positions according to the type of machine code, and a mask register for holding information determined by the difference in length of a particular field and the maximum length of that field.

47. A computer as claimed in claim 46 in which said type register, said shift number register and said mask register are separate parts of a single field splitting register.

48. A computer as claimed in claim 46 in which said external order has four fields and in which said field selection means comprises first and second registers for receiving said fields, first and second shift networks for shifting selected ones of said fields in accordance with shift numbers held in said shift number register, shift selection means for determining which of said fields are caused to pass through said shift networks according to the type of machine code, masking means for masking unwanted digits in accordance with information held in said mask register, gating means to cause two of said fields to enter said first register and the other two of said fields to enter said second register, and selection means for selecting the desired field from said first and second registers.

49. A computer as claimed in claim 48 in which two of said fields are address fields and in which said shift selection means and said gating means are operable such that said address fields are always entered into the same one of said first and second registers regardless of which of said type of machine codes said external order is.

50. A computer as claimed in claim 48 in which said first shift network is such that it may be operated to cause separation of two adjacent fields passing therethrough.

51. A computer as claimed in claim 48 in which said first shift network is capable of causing shifts of a number of places equal to the total number of bits of said external order and said second shift network is capable of causing five shifts of a number of places determined by the maximum length of the shortest one of said fields.

52. A computer as claimed in claim 36 in which said internal orders are of different kinds, defined by particular bits of each order.

53. A computer as claimed in claim 52 in which one of said kinds of internal order comprises a plurality of character orders each comprising a character order function field and a character order address field.

54. A computer as claimed in claim 52 in which one of said kinds of internal order comprises a plurality of character orders and a jump address, each of said character orders comprising a character order function field and a character order address field.

55. A computer as claimed in claim 52 in which one of said kinds of internal order comprises a single character order and a store address, said characters order comprising a character order function field and a character order address field.

56. A computer as claimed in claim 52 in which one of said kinds of internal order includes at least one character order having a character order function field and a character order address field and in which said character order address field represents either a direct address or an indirect address.

57. A computer as claimed in claim 36 in which said control means comprises control logic including means for causing the loading of internal orders into said executive register means, detection means for detecting the kind of internal order, means for causing the carrying out of each of said internal orders in accordance with the kind of internal order detected by said detection means, and means for loading the next external order into said external order register after the completion of the carrying out of an external order, said internal orders being of different kinds, defined by particular bits of each order.

58. A computer as claimed in claim 57 in which said means for causing the carrying out of each of said internal orders comprises address decoding means and function decoding means, the output of said function decoding means producing in operation control inputs for controlling the operation of said function unit.

59. A computer as claimed in claim 36 in which each bit of an internal order may be set to cause the carrying out of a particular function.

60. A computer as claimed in claim 59 in which the setting of at least two bits together causes a further function to be performed.

61. A computer as claimed in claim 36 in which which each bit of an internal order may be set to cause the carrying out of a particular function, and said control means comprises an address composer for forming addresses from different sources and control logic including means for causing the loading of internal orders into said executive register means, means for causing the carrying out of each internal order in accordance with the setting of the bits of said executive register means and means for loading the next external order into said external order register after the completion of the carrying out of an external order.

62. A computer as claimed in claim 61 in which said means for causing the carrying out of each internal order comprises decoding means for decoding the setting of the bits of said executive register means to produce control inputs for controlling the output of said address composer and for controlling the operation of said function unit.

63. A computer as claimed in claim 36 including interrupt means for causing the interruption of the carrying out of an internal order to permit the carrying out of an interrupt order.

64. A field selection system for selecting any desired one of a plurality of fields which together comprise one word of a computer code, said system comprising word storage means for holding said word, word defining register means operably connected to said word storage means for holding information defining the field breakdown of a word held in said word storage means and selection means operably connected to said word defining register means for acting in accordance with information held in said word defining register means to select the desired one of said fields and shift it to a predetermined location.

65. A field selection system as claimed in claim 64 in which said word storage means comprises a word register.

66. A field selection system as claimed in claim 64 in which said word defining register means has for each bit of said word a plurality of bits which in operation are set to uniquely define each one said plurality of fields.

67. A field selection system as claimed in claim 66 in which said word has a maximum of four fields and in which said word defining register means has two bits for each bit of said word.

68. A field selection system as clamed in claim 64 in which said word defining register means comprises a plurality of bits for each of a plurality of zones, each zone representing at least one bit of said word, the bits of said word defining register means in operation being set to uniquely define each one of said plurality of fields.

69. A field selection system as claimed in claim 68 in which said word has a maximum of four fields and in which said word defining register means has two bits for each of said zones.

70. A field selection system as claimed in claim 69 modified in that said word defining register means comprises one bit for each of a selected one or more of said zones and two bits for each of the remaining ones of said zones.

71. A field selection system as claimed in claim 69 modified in that said word defining register means comprises one bit for each of one or more selected pairs of said zones, one bit for each of one or more selected ones of said zones, and two for each of the remaining ones of said zones.

72. A field selection system as claimed in claim 64 in which said word defining register means comprises a mask register having bits corresponding to the bits of said word and a shift number register, said shift number register in operation holding at least one shift number determined by the number of places it is necessary to shift at least one of said fields to a predetermined location, said mask register in operation being set to determine which of said fields is to be shifted.

73. A field selection system as claimed in claim 72 in which said word has four fields numbered nought, one two and three counting from the least significant end, and in which the bits of said mask register in operation are set to one state for the bits corresponding to fields nought and three and to another state for the bits corresponding to fields one and two, said shift number register in operation holding a shift number determined by the number of places it is necesary to shift fields one and two such that field two is shifted to the least significant end of said word and field one is shifted to the most significant end of said word.

74. A field selection system as claimed in claim 73 in which said shift number register in operation holds a further shift number determined by the number of places it is necessary to shift field one from the most significant end of said word to a position in which the least significant bit of field one is located in a predetermined bit number.

75. A field selected system as claimed in claim 73 in which said selection means comprises first and second register for receiving said fields, a shift network for shifting said fields in accordance with the contents of said shift number register, a mask network operable in conjunction with said mask register to cause fields nought and three to bypass said shift network and enter said first register and to cause fields one and two to pass through said shift network and enter said second register, and means for selecting the desired field from said first and second registers.

76. A field selection system as claimed in claim 64 in which said word defining register means comprises a type register for holding information defining said word as one of a predetermined number of types of word in which said fields each have a maximum length, a shift number register for holding a plurality of shift numbers determined by the number of places it is necessary to shift fields of said word to predetermined positions according to the type of machine code, and a mask register for holding information determined by the difference in length of a particular field and the maximum length of that field.

77. A field selection system as claimed in claim 76 in which said type register, said shift number register and said mask register are separate parts of a single field splitting register.

78. A field selection system as claimed in claim 76 in which said word has four fields and in which said selection means comprises first and second registers for receiving said fields, first and second shift networks for shifting selected ones of said fields in accordance with shift numbers held in said shift number register, shift selection means for determining which of said fields are caused to pass through said shift networks according to the type of word, masking means for masking unwanted digits in accordance with information held in said mask register, gating means to cause two of said fields to enter said first register and the other two of said fields to enter said second register, and means for selecting the desired field from said first and second registers.

79. A field sleection system as cliamed in claim 78 in which two of said fields are address fields and in which said shift selection means and said gating means are operable such that said address fields are always entered into the same locations in said first and second registers regardless of which of said types of word said word is.

80. A field selection system as claimed in claim 78 in which said first shift network is such that it may be operated to cause separation to two adjacent fields of said word passing therethrough.

81. A field selection system as claimed in claim 78 in which said first shift network is capable of causing shifts of a number of places equal to the total number of bits of said word and said second shift network is capable of causing five shifts of a number of places determined by the maximum length of the shortest one of said field.

References Cited

UNITED STATES PATENTS

| | | | |
|---|---|---|---|
| 3,251,037 | 5/1966 | Coil et al. | 340—172.5 |
| 3,343,139 | 9/1967 | Ulrich | 340—172.5 |
| 3,346,850 | 10/1967 | Wehrig | 340—172.5 |
| 3,351,915 | 11/1967 | Fought et al. | 340—172.5 |

RAULFE B. ZACHE, Primary Examiner